United States Patent
Shimazaki et al.

(10) Patent No.: US 6,246,640 B1
(45) Date of Patent: *Jun. 12, 2001

(54) MAGNETO-OPTICAL RECORDING MEDIUM CAPABLE OF RECORDING MULTIPLE VALUE SIGNALS

(75) Inventors: Katsusuke Shimazaki; Masafumi Yoshihiro; Akito Sakemoto; Norio Ohta; Osamu Ishizaki; Satoru Ohnuki, all of Ibaraki; Toshinori Sugiyama, Tsukuba; Kazuko Ishitsuka, Iwai, all of (JP)

(73) Assignee: Hitachi Maxell, Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,750

(22) Filed: Aug. 5, 1998

Related U.S. Application Data

(62) Division of application No. 08/737,365, filed as application No. PCT/JP95/00888 on May 10, 1995, now Pat. No. 6,061,307.

(30) Foreign Application Priority Data

May 10, 1994 (JP) .................................................. 6-096690

(51) Int. Cl.[7] .................................................. G11B 11/00
(52) U.S. Cl. ............................................................... 369/13
(58) Field of Search ............................... 369/13, 14, 110, 369/116, 275.2; 365/122; 300/59, 114; 428/694 ML, 694 MM

(56) References Cited

U.S. PATENT DOCUMENTS

| 4,938,915 | 7/1990 | Saito . | |
|---|---|---|---|
| 5,159,584 | 10/1992 | Yanagida et al. . | |
| 5,191,561 | * 3/1993 | Fukami et al. | 369/13 |
| 5,278,809 | 1/1994 | Ogata . | |
| 5,398,219 | 3/1995 | Itoh et al. . | |
| 5,432,761 | * 7/1995 | Maeda | 369/13 |
| 5,440,531 | 8/1995 | Sato et al. . | |
| 5,449,566 | 9/1995 | Fujii et al. . | |
| 5,702,830 | * 12/1997 | Miller et al. | 428/611 |
| 5,815,469 | * 9/1998 | Shimokawato et al. | 369/13 |

FOREIGN PATENT DOCUMENTS

| 61217903 | 9/1986 | (EP) . |
|---|---|---|
| 63009001 | 1/1988 | (EP) . |
| 01178104 | 7/1989 | (EP) . |
| 0401041 | 12/1990 | (EP) . |
| 04030303 | 2/1992 | (EP) . |
| 0576286A2 | 12/1993 | (EP) . |
| 9015409 | 12/1990 | (WO) . |

OTHER PUBLICATIONS

Digests of the 13th Annual Conference on Magnetics in Japan, vol. 13, pp. 62–64 (1989).

(List continued on next page.)

Primary Examiner—Tan Dinh
(74) Attorney, Agent, or Firm—Birch, Stewart, Kolasch & Birch, LLP

(57) ABSTRACT

On a surface of a transparent substrate 1 having a preformat pattern 2 formed thereon are laminated a first recording layer 4 in which a recording state exists in one different magnetic field region of an applied external magnetic field and a second recording layer 6 in which two recording states exist in magnetic field regions different from that for the first recording layer. As required, dielectric layers 3, 5 and 7, a reflecting layer 8 and a protection layer 9 can be laminated. The 4-valued recording of information becomes possible by assigning information signals "1", "0", "3", and "2" to $H_0$, $H_1$, $H_2$ and $H_3$, respectively.

7 Claims, 143 Drawing Sheets

OTHER PUBLICATIONS

Proceedings of the International Symposium on Optical Memory, Kobe (E1803), pp. 343–347 (1989).

S. Tsunashima, Exchange Coupled Films for Magnetooptic Recording Applications, *IEEE Translation Journal on Magnetics in Japan*, vol. 7, No. 8, (Aug. 1992).

Patent Abstracts of Japan, vol. 015, No. 327 (P–1240), Aug. 20, 1991 (JP 03 119538A).

Patent Abstracts of Japan, vol. 013, No. 424 (P–934), Sep. 21, 1989 (JP 01 155533A).

Patent Abstracts of Japan, vol. 015, No. 469 (P–1281), Nov. 27, 1991 (JP 03 201232A).

Patent Abstracts of Japan, vol. 013, No. 191 (P–867), May 9, 1989 (JP 01 017248A).

Patent Abstracts of Japan, vol. 018, No. 330 (P–1758), Jun. 22, 1994 (JP 06 076390A).

* cited by examiner

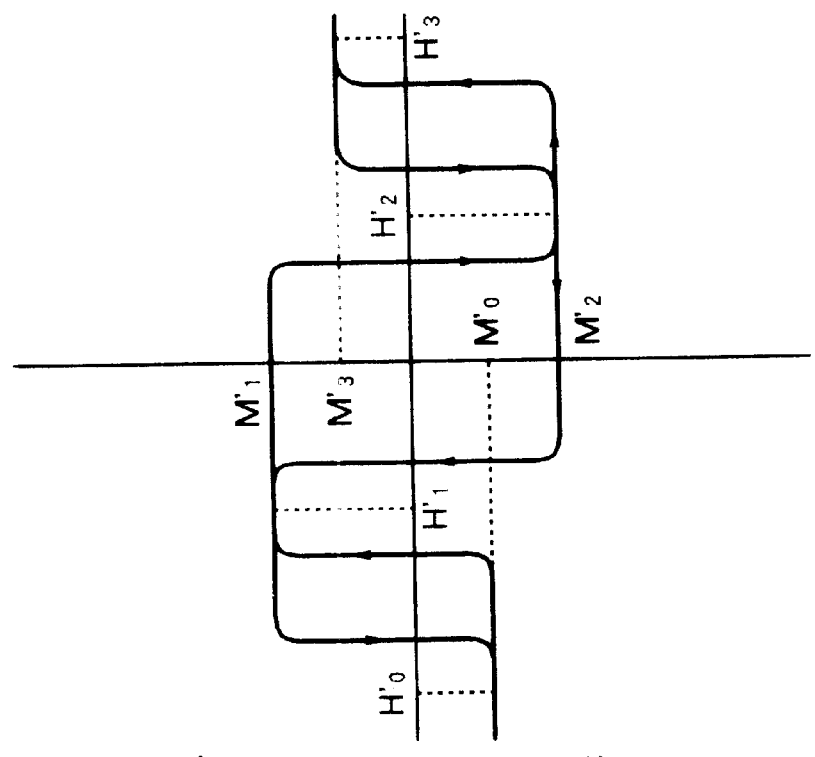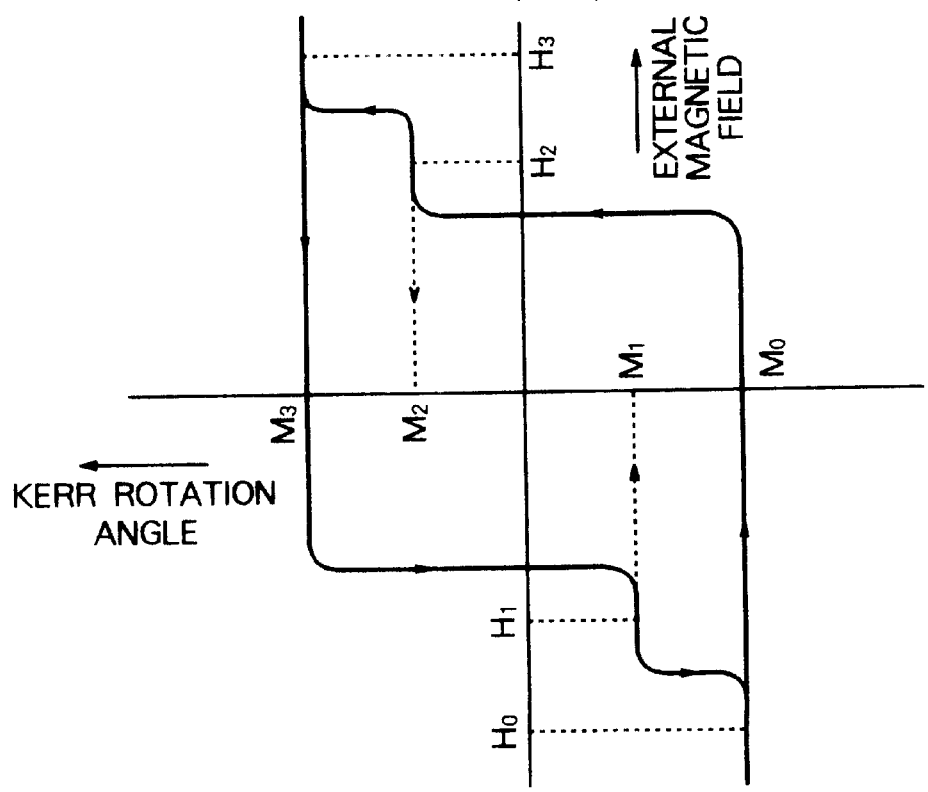

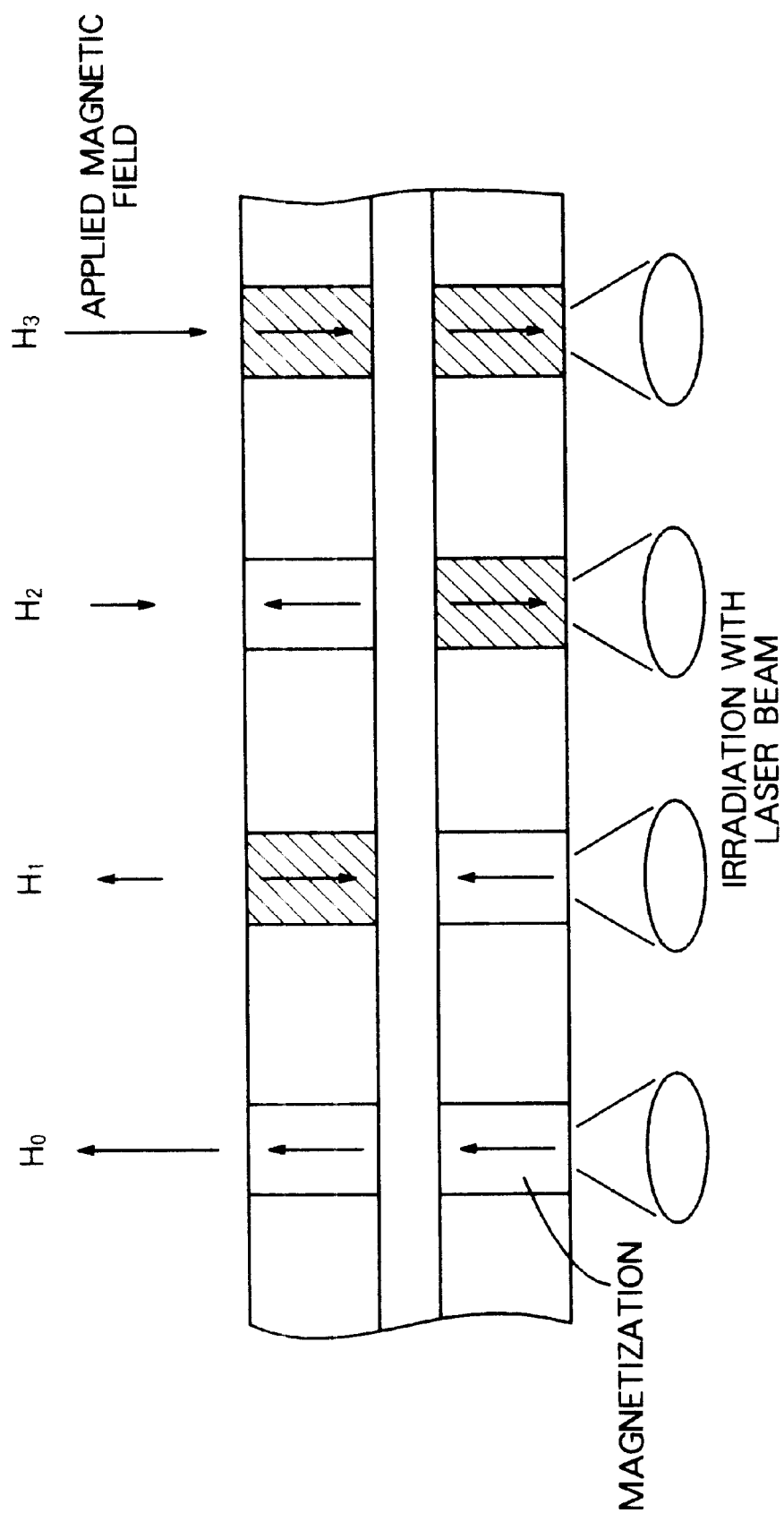

RELATIVE SIGNAL OUTPUT

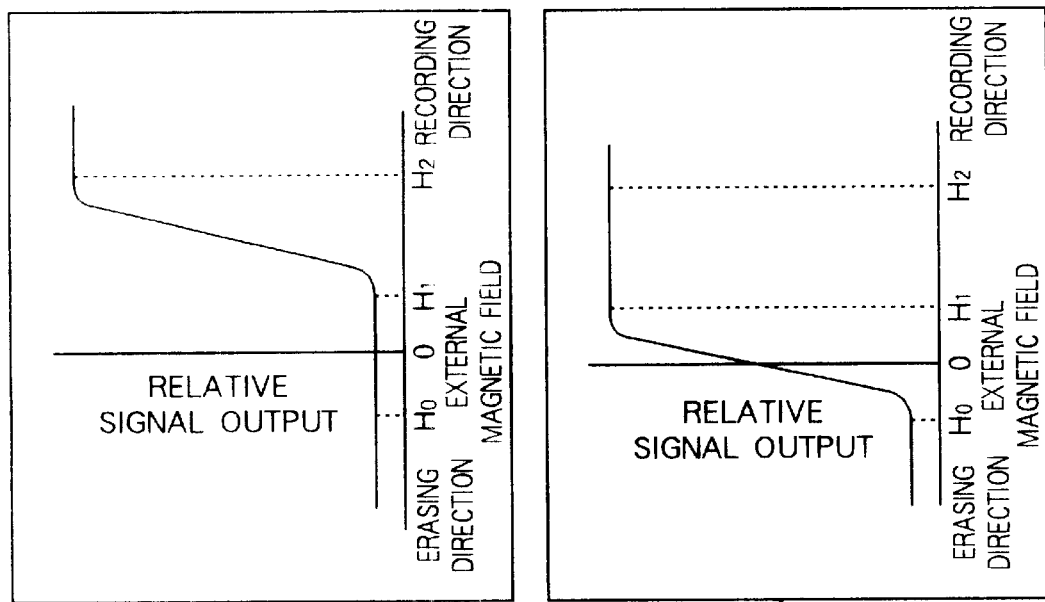
FIG. 9C
FIG. 9B
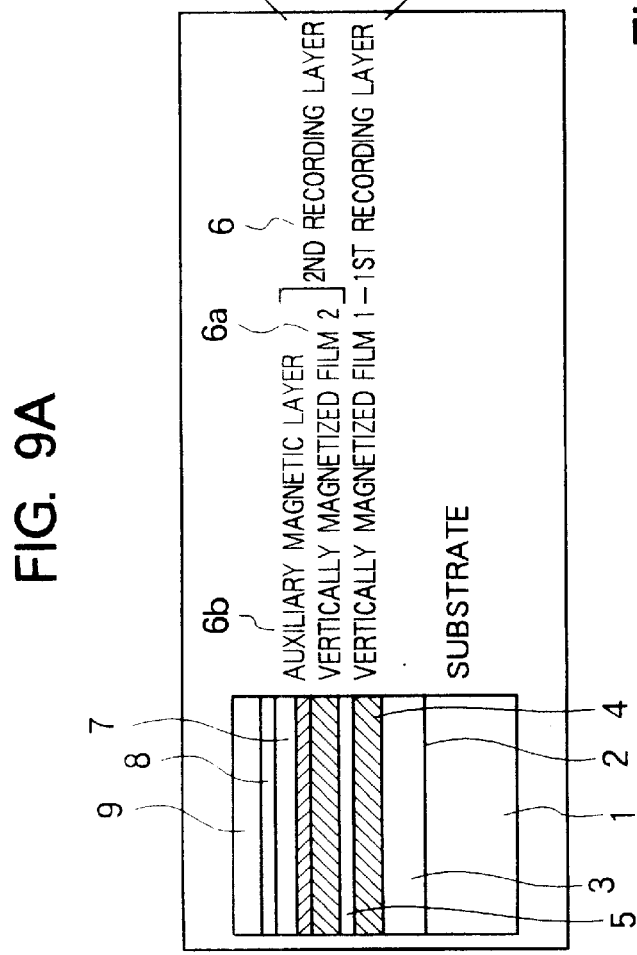
FIG. 9A

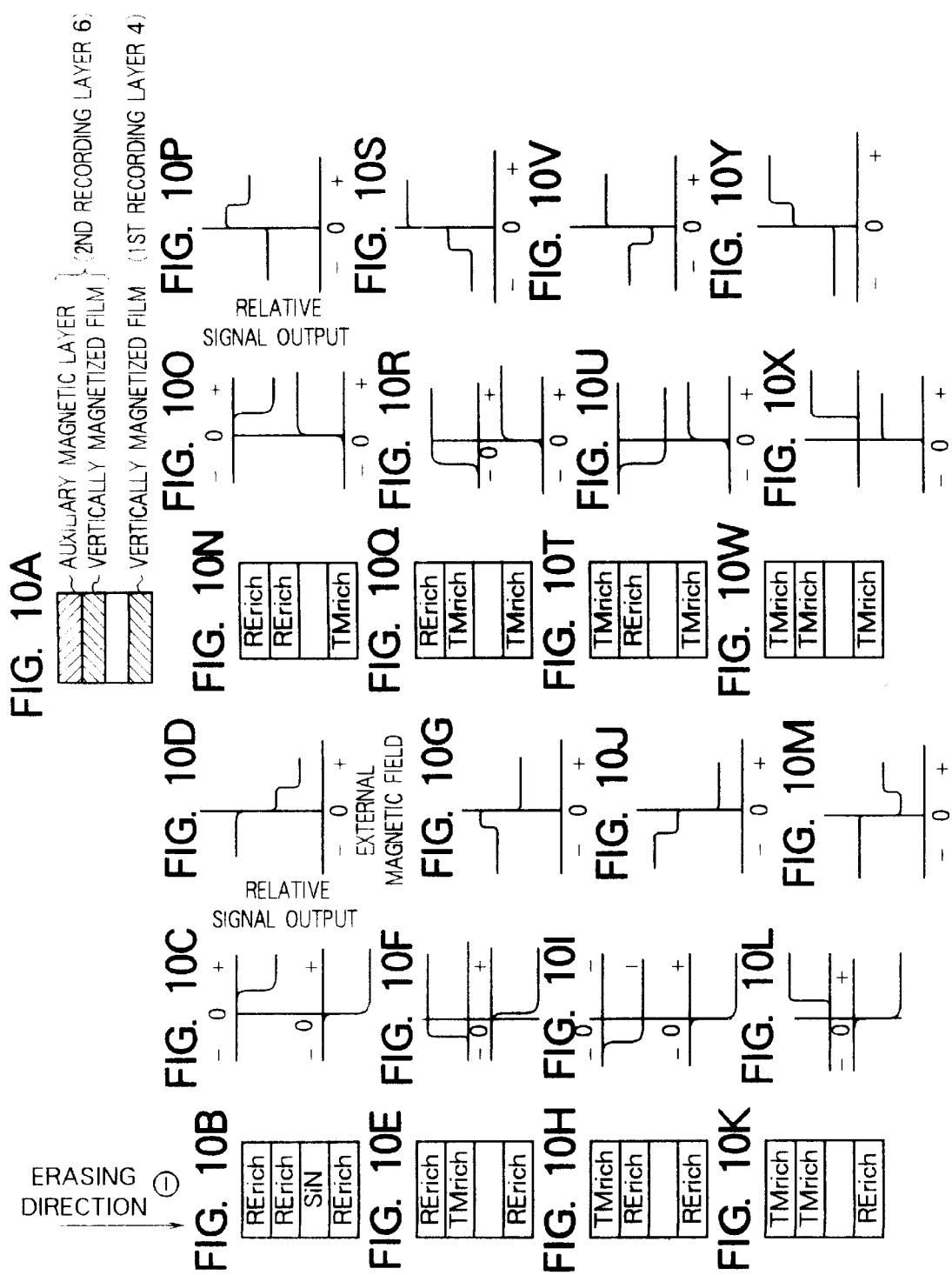

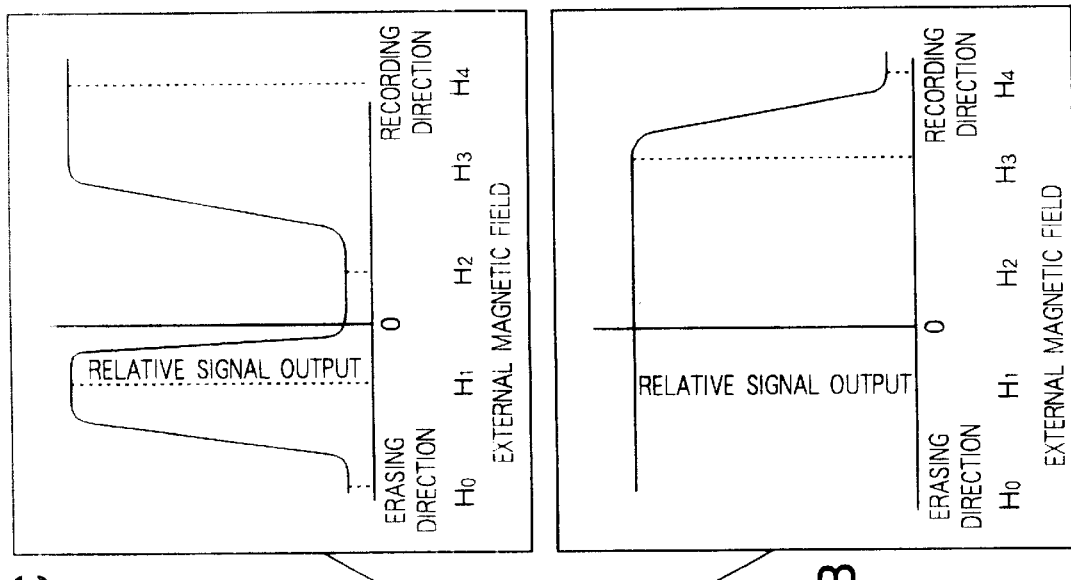
FIG. 21C                    FIG. 21B
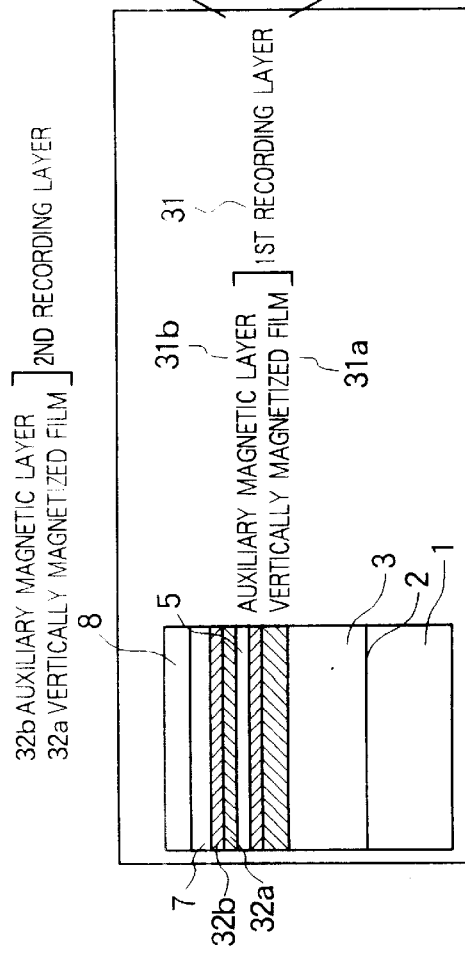
FIG. 21A

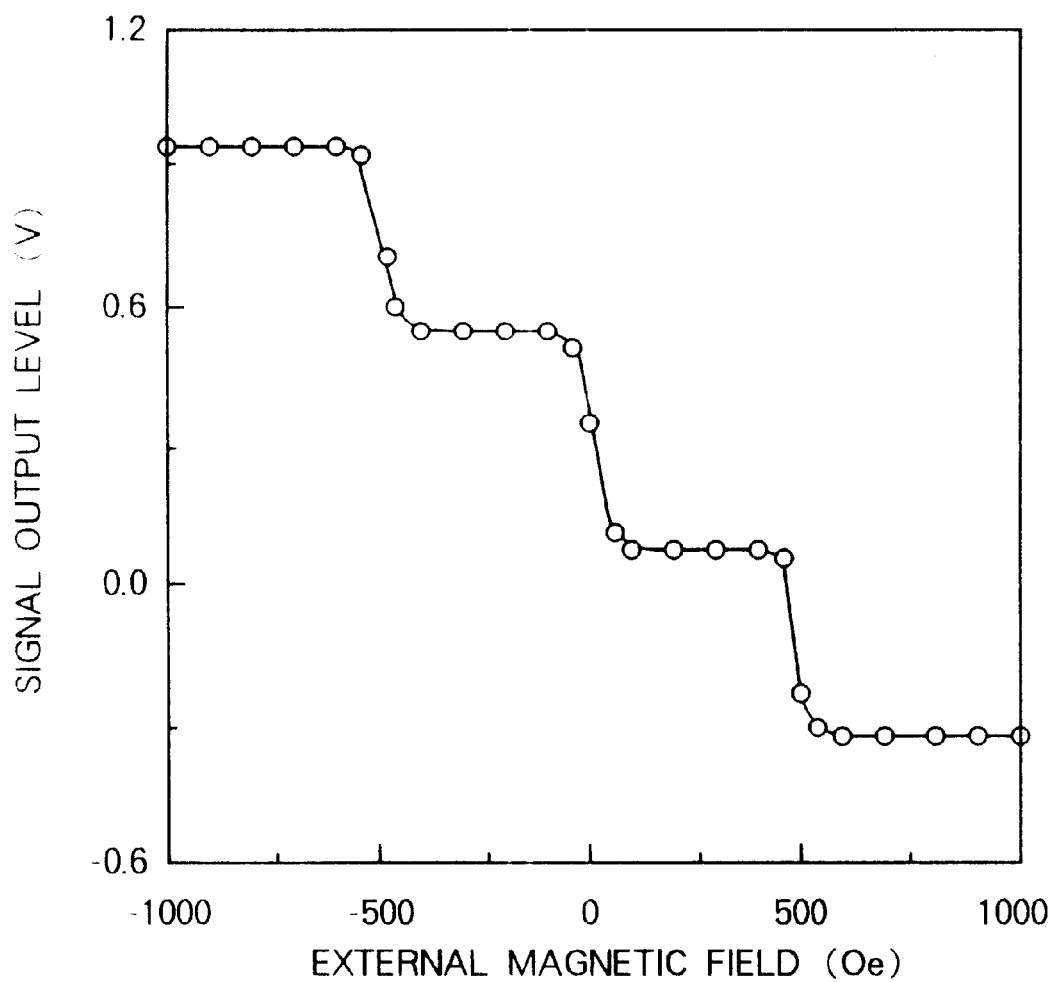

FIG. 45

| EMBODIMENT / FILM | 14TH EMBODIMENT | 15TH EMBODIMENT | 16TH EMBODIMENT | 17TH EMBODIMENT | 18TH EMBODIMENT |
|---|---|---|---|---|---|
| 112 | — | Al | — | — | — |
| 111 | SiN | SiAlON | SiN | SiN | SiN |
| 110 | PtCo | GdFeCo OR PtCo | — | — | GdFeCo OR PtCo |
| 109 | TbFeCo | GdTbFeCo | GdTbFeCo | GdTbFeCo | GdTbFeCo |
| 108 | — | TbFeCoNb | — | — | — |
| 107 | GdFeCo | GdFeCo | — | — | — |
| 106 | SiN | SiAlON | — | — | SiN |
| 105 | — | TbFeCo-O, PtCo OR Co | — | TbFeCo-O, PtCo OR Co | TbFeCo-O, PtCo, Co, OR NONE |
| 104 | TbFeCo | TbFeCo | TbFeCo | TbFeCo | TbFeCo |
| 103 | — | TbFeCoNb | — | — | — |
| 102 | GdFeCo | GdFeCo | GdFeCo | GdFeCo | GdFeCo |
| 101 | SiN | SiAlON | SiN | SiN | SiN |

TEST AREA 22
USER AREA 21

TEST AREA 22
21

FIG. 50
(a) EXTERNAL MAGNETIC FIELD
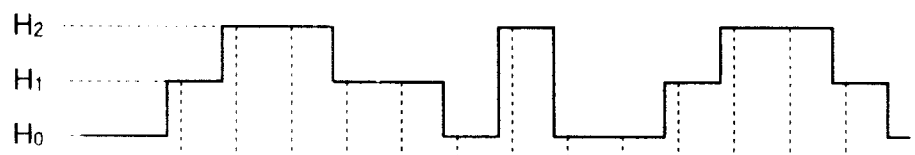
(b) OPTICAL PULSE
(c) DOMAIN FORM
(d) REPRODUCED WAVEFORM

FIG. 75
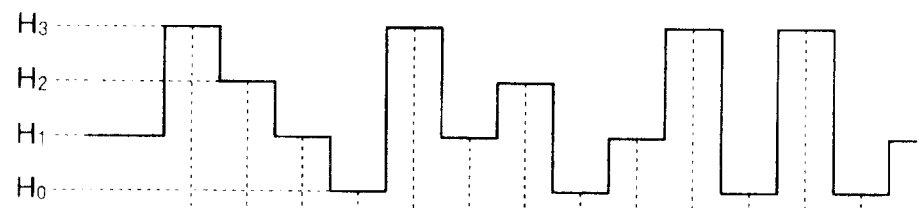
(a) EXTERNAL MAGNETIC FIELD
(b) OPTICAL PULSE
(c) DOMAIN FORM
(d) REPRODUCED WAVEFORM
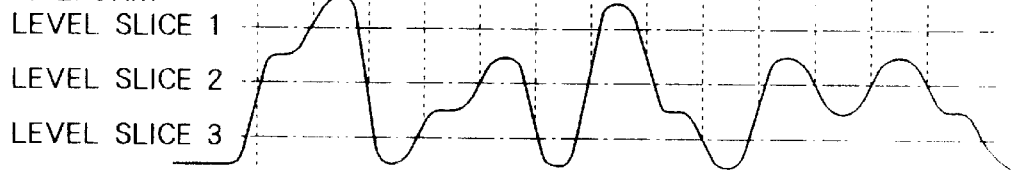
LEVEL SLICE 1
LEVEL SLICE 2
LEVEL SLICE 3
(d) TIMING CHART
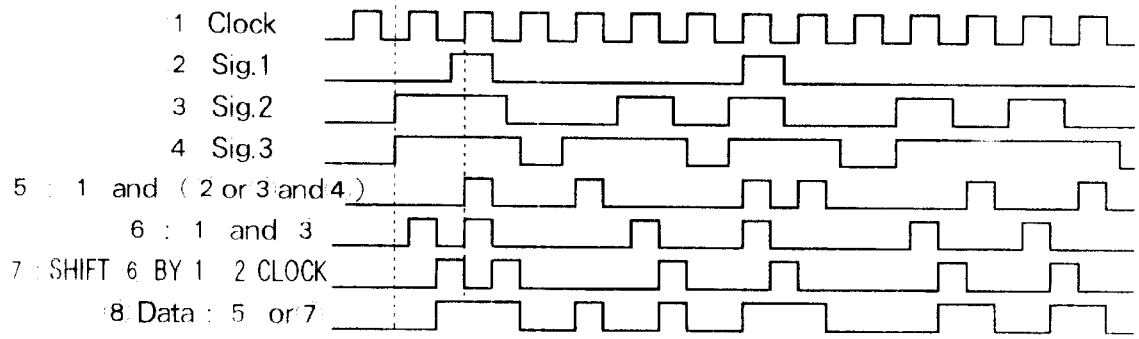
1 Clock
2 Sig.1
3 Sig.2
4 Sig.3
5 : 1 and ( 2 or 3 and 4 )
6 : 1 and 3
7 SHIFT 6 BY 1 2 CLOCK
8 Data : 5 or 7

FIG. 76
(a) TIMING CHART
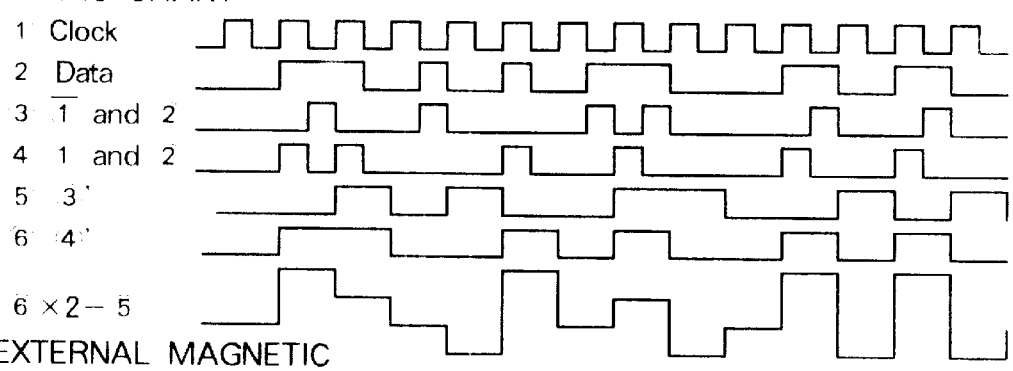
(b) EXTERNAL MAGNETIC FIELD
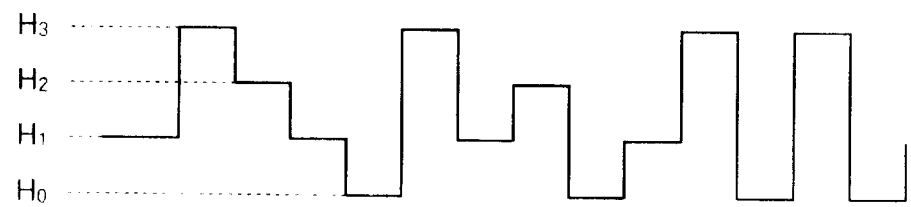
(c) OPTICAL PULSE

FIG. 86
(a) EXTERNAL MAGNETIC FIELD
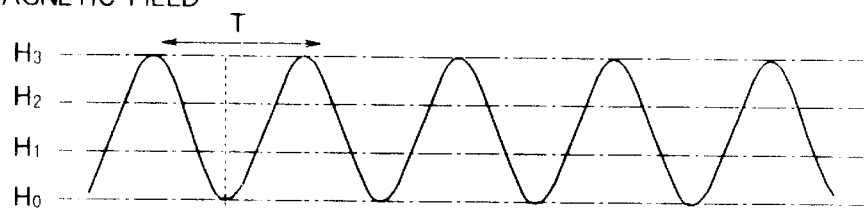
(b) OPTICAL PULSE
(c) DOMAIN FORM
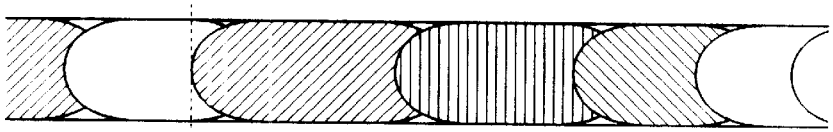
(d) REPRODUCED WAVEFORM
LEVEL SLICE 1
LEVEL SLICE 2
LEVEL SLICE 3
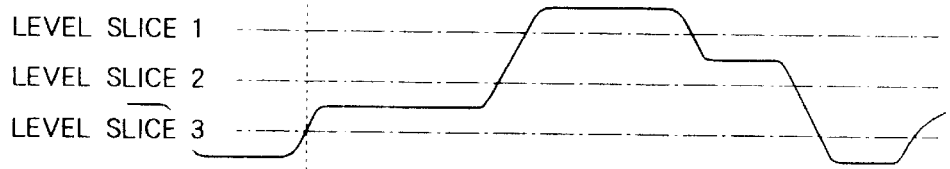
(d) TIMING CHART
1 Clock
2 Sig.1
3 Sig.2
4 Sig.3
5 : 1 and (2 or 3 and 4)
6 : 1 and 3
7 SHIFT 6 BY 1/2 CLOCK
8 Data : 5 or 7
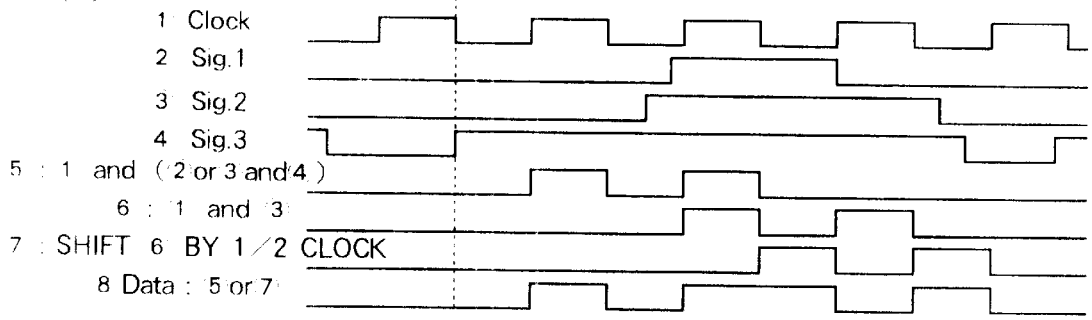

FIG. 90
(a) EXTERNAL MAGNETIC FIELD
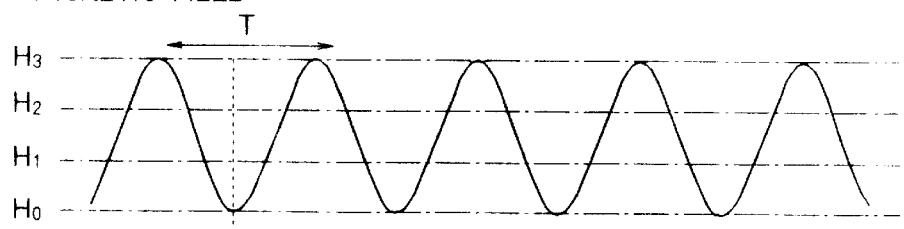
(b) OPTICAL PULSE
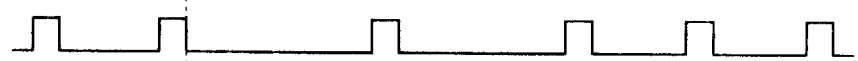
(c) DOMAIN FORM
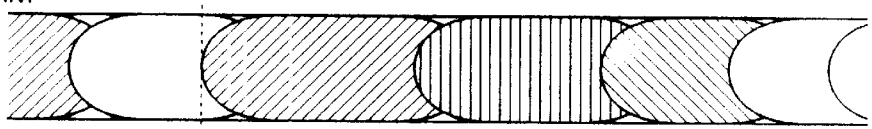
(d) REPRODUCED WAVEFORM
LEVEL SLICE 1
LEVEL SLICE 2
LEVEL SLICE 3
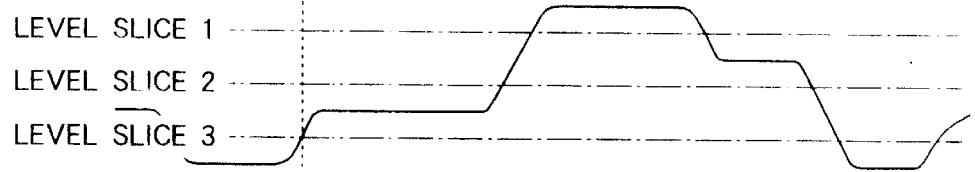
(d) TIMING CHART
1 Clock
2 Sig.1
3 Sig.2
4 Sig.3
5 1 and (2 or 3 and 4)
6 : 1 and 3
7 SHIFT 6 BY 1/2 CLOCK
8 Data : 5 or 7
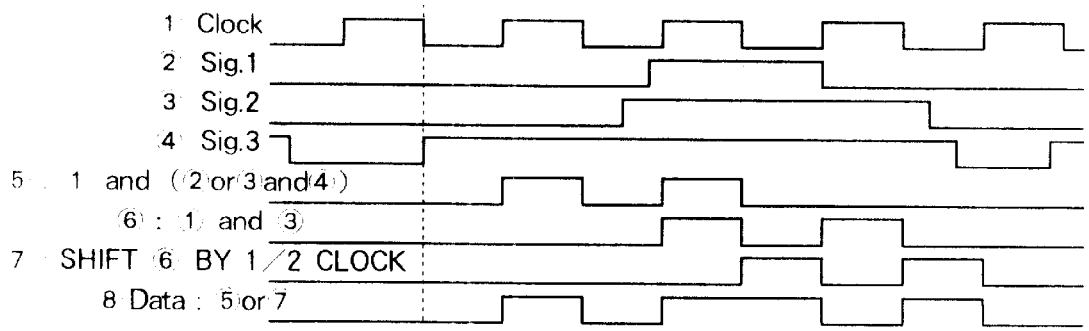

FIG. 91A
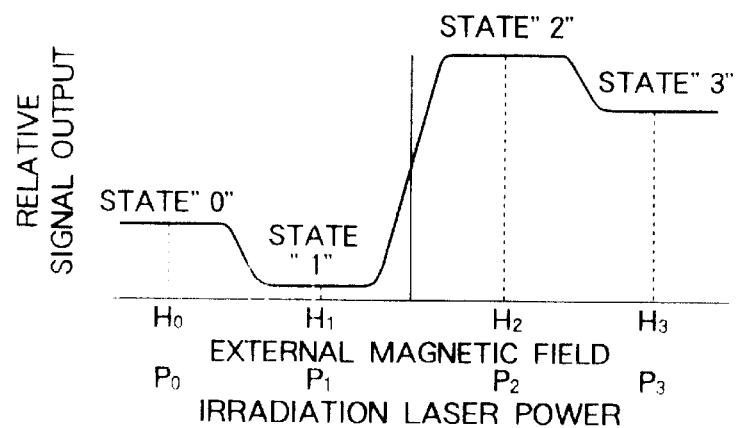
FIG. 91B
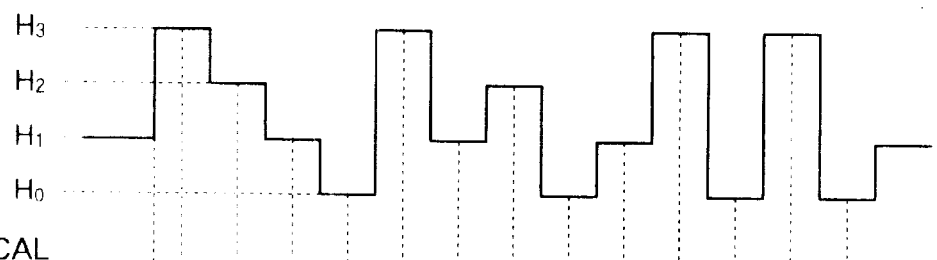
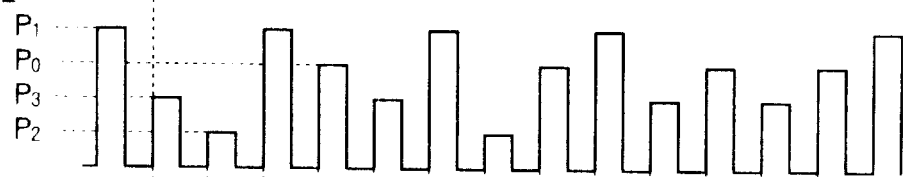

FIG. 92A
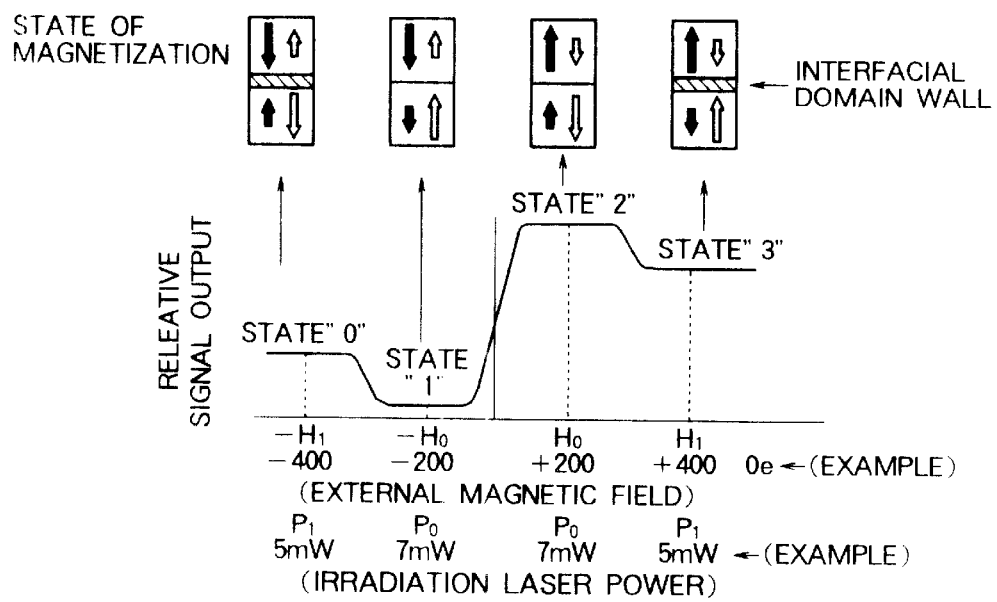
FIG. 92B
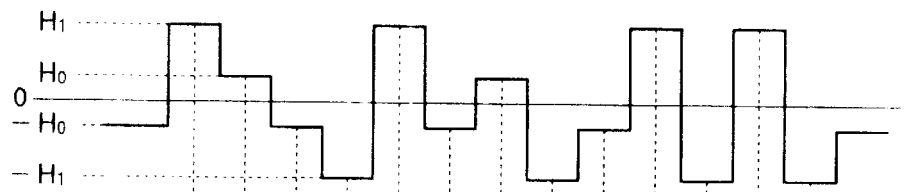

FIG. 93A
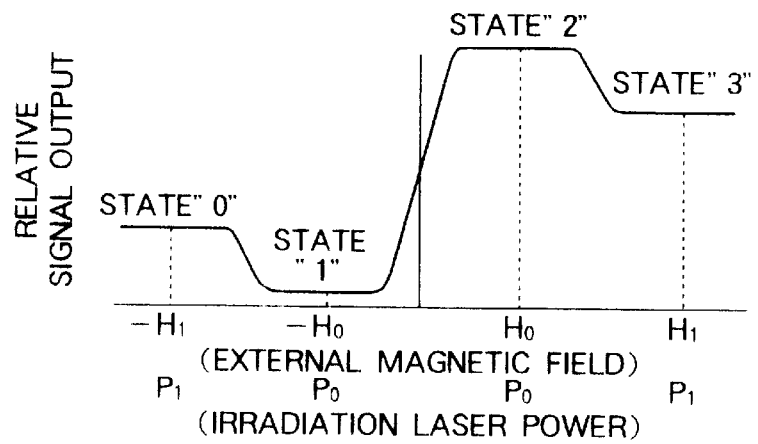
FIG. 93B
(b) EXTERNAL MAGNETIC FIELD
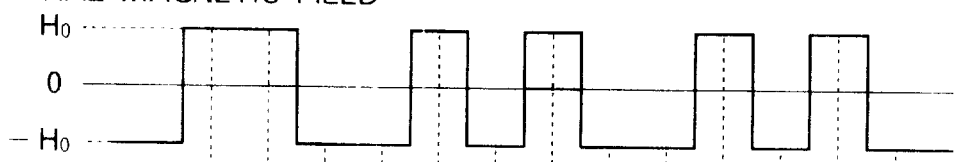
(c) OPTICAL PULSE
(d) DOMAIN FORM
(e) REPRODUCED WAVEFORM
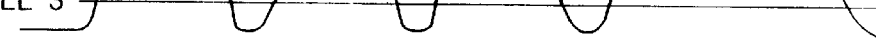

FIG. 133A
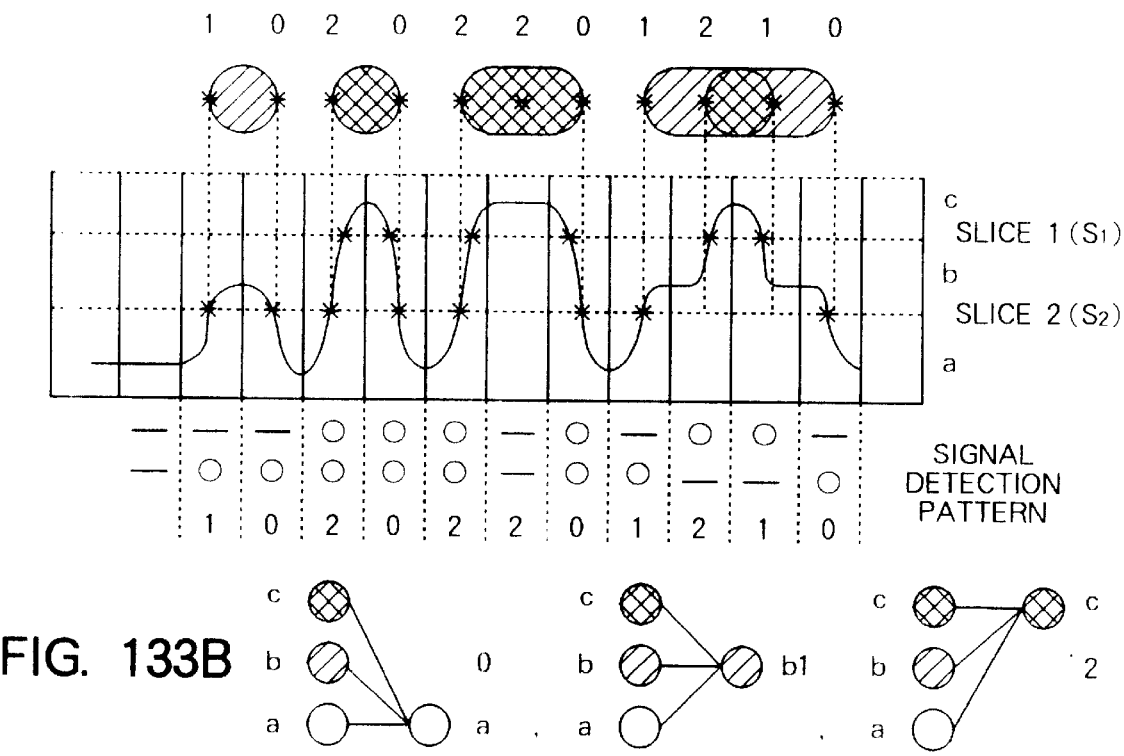
FIG. 133B
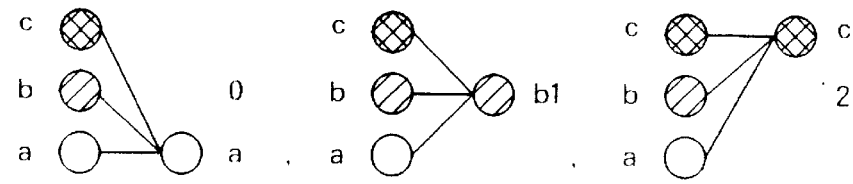
FIG. 133C
| ONE-PRECEDING DATA | DETECTED SIGNAL | REPRODUCED DATA |
|---|---|---|
| 2 | ○○ | 2 |
|  | ○× | 1 |
|  | ○○ | 0 |
| 1 | ○× | 2 |
|  | ×○ | 1 |
|  | ×○ | 0 |
| 1 | ○○ | 2 |
|  | ×○ | 1 |
|  | ×× | 0 |

FIG. 149A
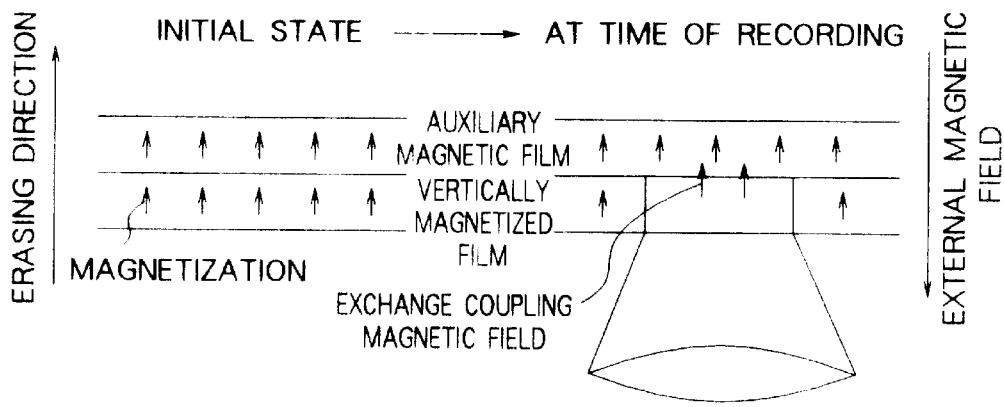
FIG. 149B  FIG. 149C
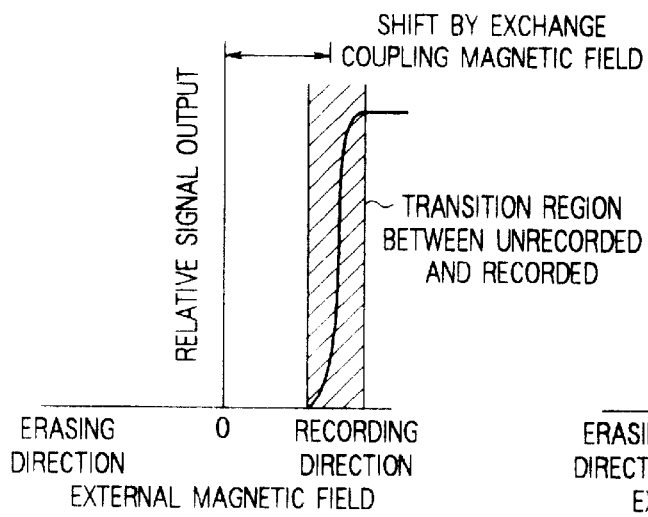
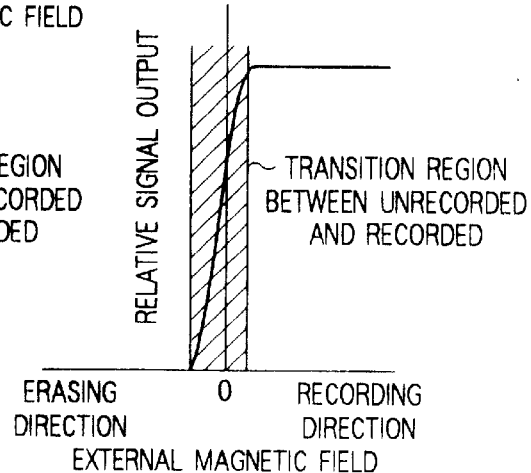
FIG. 149D
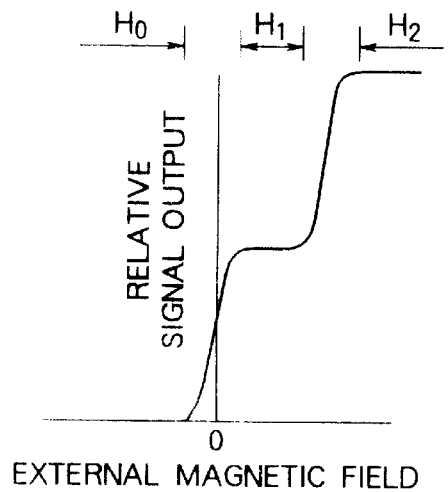

US 6,246,640 B1

MAGNETO-OPTICAL RECORDING MEDIUM CAPABLE OF RECORDING MULTIPLE VALUE SIGNALS

This application is a divisional of application Ser. No. 08/737,365, U.S. Pat. No. 6,061,307 filed on Nov. 8, 1996, application Ser. No. 08/737,365 is the national phase of PCT International Application No. PCT/JP95/00888 filed on May 10, 1995 under 35 U.S.C. § 371. The entire contents of each of the above identified applications are hereby incorporated by reference.

TECHNICAL FIELD

The present invention relates to an optomagnetic recording medium, a recording/reproducing system for optomagnetic recording medium, and a recording/reproducing apparatus for optomagnetic recording medium, and more particularly to the laminated structure of a magnetic layer of an optomagnetic recording medium in which a multi-valued recording is possible, a multi-valued recording system which uses such an optomagnetic recording medium, and the construction of a magnetic head which is suitable for multi-valued recording for an optomagnetic recording medium.

BACKGROUND ART

In the field of optomagnetic recording media, the improvement of a recording density is one of the most important technical subjects. As means for improving the recording density of an optomagnetic recording medium is hitherto proposed a system in which a signal is recorded with multi values. The multi-valued recording system is disclosed by, for example, 13th-Lecture Abstracts of the Society of Applied Magnetism of Japan (1989), p. 63 or Japanese Journal of Applied Physics, Vol. 28 (1989) Supplement 28-3, pp. 343–347.

In the known multi-valued recording system, a plurality of magnetic layers having different coercive forces are laminated and the intensity of a magnetic field applied to the magnetic layers is modulated multi-stepwise to invert the magnetization of a specified magnetic layer selectively. It is said that according to this system, the 4-valued recording of a signal becomes possible with the provision of three magnetic layers having different coercive forces.

In the known multi-valued recording system, however, when an optomagnetic recording medium is irradiated with a laser beam at the time of recording of a signal so that the temperature of each magnetic layer is raised up to the vicinity of its Curie temperature, there is little difference in coercive force between the magnetic layers. Therefore, it is actually difficult to cause the selective inversion of the magnetization of each magnetic layer. Even if the selective inversion of the magnetization of each magnetic layer is possible in a laboratory level by strictly adjusting the magnetic characteristic of each magnetic layer while strictly controlling a laser intensity and an external magnetic field intensity at the time of recording, the mass production of such optical recording media and recording/reproducing apparatuses is impossible from the aspect of cost. Also, since margins for changes in laser intensity and external magnetic field intensity at the time of recording become remarkably small, it is impossible to maintain a stable recording/reproducing state for a long time and hence there is no practicability by any possibility. If the recording of a signal is performed in a state in which the temperature of each magnetic layer is not raised up to the vicinity of the Curie temperature or a difference in coercive force between the magnetic layers is sufficiently large, the above inconvenience will not be encountered but a large magnetic field is necessitated for the recording and erasion of a signal. This brings about another serious inconvenience that a magnetic field generating device such as a magnetic head and hence a recording/reproducing apparatus become large in size and a power consumption is increased. In this case too, therefore, the practisation is actually impossible.

In the following, the inconveniences of the prior art will be explained in more detail on the basis of FIGS. 142A, 142B, 142C and 142D. For facilitating the explanation, the following explanation will now be made taking as an example an optomagnetic recording medium in which two magnetic films (or magnetic layers) having their coercive force versus temperature characteristics represented by symbols A and B in FIG. 142B are laminated on a substrate.

(1) The temperature of a portion irradiated with a recording laser beam is raised up to a temperature equal to or higher than the Curie temperature of each magnetic layer or in the vicinity thereof. Therefore, even if a difference in coercive force between the magnetic layers is large at the room temperature, this difference becomes remarkably small at the temperature-raised portion, as shown in FIG. 142B. Accordingly, it is actually difficult to cause the selective inversion of the magnetization of each magnetic layer.

(2) The minute area of a portion irradiated with a recording laser beam has a sharp temperature distribution which extends between the room temperature and a temperature equal to or higher than the Curie temperature, as shown in FIG. 142A. Accordingly, a coercive force distribution of each magnetic layer in the corresponding area is also sharp, as shown in FIG. 142C. Therefore, whatever magnitude the set value of an applied magnetic field takes, the size of a recording domain has only an insignificant change and hence it is not possible to effect separate recording for the two magnetic layers by virtue of the magnitude of the applied magnetic field.

(3) The carrier-to-noise ratio of a signal read from each of the magnetic layers A and B for the intensity of an external magnetic field at the time of recording is as shown in FIG. 142D. Namely, a transition region between an unrecorded region and a recorded region in the case of the magnetic layer A and that in the case of the magnetic layer B nearly overlap each other in regard to the intensity of the external magnetic field and hence the carrier-to-noise ratio of the signal read from the magnetic layer A and the carrier-to-noise ratio of the signal read from the magnetic layer B have only a slight shift from each other due to a difference in leakage magnetic field to a recorded portion which difference is caused from a difference in magnetization between the magnetic layers A and B. Accordingly, the optomagnetic recording medium including the deposition of the magnetic layers A and B has only one stable recording state as shown in FIG. 142E by the carrier-to-noise ratio of a read signal. Therefore, the digitization of a recording signal into multi values by the change-over of an external magnetic field is impossible.

(4) Also, the prior art has an inconvenience that the direct overwriting of a signal is not possible. Namely, for example, in the optomagnetic recording medium including the two-layer deposition of the magnetic layer (or A layer) having a coercive force versus temperature characteristic A shown in FIG. 142B and the magnetic layer (or B layer) having a coercive force versus temperature characteristic B, the application of an external magnetic field having a magnitude $H_1$ shown in FIG. 142B results in the inversion of magnetization of only the B layer, as shown in FIG. 143(b) and the application of an external magnetic field having a magnitude $H_2$ shown in FIG. 142B results in the inversion of magnetization of both the A and B layers, as shown in FIG. 143(b). Accordingly, in the case where a state of FIG. 143(b) is to be recorded on a state of FIG. 143(c), the state of FIG. 143(b) is attainable provided that the magnetic field of $H_2$ is once applied in an erasing direction for return to an initial state of FIG. 143(a) and the recording is thereafter performed again by applying the magnetic field of $H_1$ in a recording direction. Thus, the direct overwriting of a signal is impossible.

(5) Further, in the case where a signal is recorded on this optomagnetic recording medium on the basis of, for example, a magnetic field modulating system, the application of a larger external magnetic field for performing the recording of a signal for a magnetic layer having a larger coercive force results in that a portion recorded by a smaller external magnetic field is necessarily formed around a portion recorded by the larger external magnetic field. This is because in a transition process until the external magnetic field reaches a predetermined value, the external magnetic field necessarily passes the value of recording magnetic field for a magnetic layer having smaller coercive force. Therefore, a reproduced signal having a high S/N ratio is not obtainable. Further, when the recording of a signal is made with a high density, there is a problem that the discrimination between a portion recorded by a larger external magnetic field and a portion recorded by a naturally smaller external magnetic field becomes difficult, thereby making it impossible to improve the recording density. Also, such inconveniences are similarly encountered in the case where a signal is recorded on the basis of a light modulating system.

The present invention is made to solve such deficiencies of the prior art and aims at the provision of an optomagnetic recording medium in which a recording state corresponding to each value in multi-valued recording can exist stably in regard to an external magnetic field, direct overwriting in multi-valued recording is possible, the recording and erasion of a signal can be made by a small external magnetic field and a small-output laser and the signal recording with a high S/N and a high recording density can be realized, the provision of a multi-valued signal recording system which uses such an optomagnetic recording medium, and the provision of a magnetic head for recording/reproducing apparatus which is suitable for the multi-valued recording of a signal on such an optomagnetic recording medium.

DISCLOSURE OF THE INVENTION

To solve the above-mentioned various subjects, an optomagnetic recording medium of the present invention comprises a plurality of magnetic layers laminated directly or through non-magnetic layers and is constructed to have the following magnetization characteristic when the temperature of the plurality of magnetic layers and an external magnetic field applied to the magnetic layers are changed. Namely, in a high-temperature condition, each of at least three different magnetic field regions according to the change of the applied external magnetic field provides the state of magnetization in which the total magnetization of the plurality of magnetic layers is single and stable. On the other hand, in a low-temperature condition, at least three states of magnetization stably exist under the condition of the external magnetic field of zero and in accordance with the magnitude of the external magnetic field applied at the time of high temperature.

Concretely, there is provided a first construction comprising at least two magnetic layers laminated on a substrate, at least one of the magnetic layers being formed by an optomagnetic recording film in which recording states exist respectively in two or more different magnetic field regions of an applied external magnetic field, and the other magnetic layer being formed by an optomagnetic recording film in which at least one recording state exists in a magnetic field region different from those for the one magnetic layer.

There is provided a second construction comprising a plurality of magnetic layers which are laminated and carried on a substrate and each in which one recording state exists in one of magnetic field regions of an applied external magnetic field different for the respective magnetic layers.

There is provided a third construction in which at least one first magnetic layer in which two or more recording states exist respectively in different magnetic field regions of an applied external magnetic field and at least one second magnetic layer in which at least one recording state exists in a magnetic field region of the applied external magnetic field different from those for the first magnetic layer, are laminated and carried on a substrate with the total number of layers being three or more than that.

There is provided a fourth construction in which when the reproducing laser beam incidence side of at least one of magnetic layers forming an optomagnetic recording medium is irradiated with a reproducing laser beam, an aperture smaller than the spot diameter of the reproducing laser beam is thermomagnetically formed in the magnetic layer, thereby providing an aperture forming layer for realizing the reading of a recording magnetic domain based on a so-called super-resolution system.

There is provided a fifth construction in which when the reproducing laser beam incidence side of at least one of magnetic layers forming an optomagnetic recording medium is irradiated with a reproducing laser beam, an aperture smaller than the spot diameter of the reproducing laser beam is thermomagnetically formed in the magnetic layer, thereby providing an aperture forming layer and a cut-off layer for realizing the reading of a recording magnetic domain based on a so-called super-resolution system.

At least one of magnetic layers of each of the optomagnetic recording media according to the first to fifth constructions can be formed by a vertically magnetized film and an auxiliary magnetic film magnetically coupled with the vertically magnetized film. As the vertically magnetized film can be used any known vertically magnetized film. Particularly, an amorphous alloy of a rare earth element and a transition metal is preferable since it has a large magneto-optical effect. As the auxiliary magnetic film can be used a film made of a magnetic material having a Curie temperature which is the same as or higher than that of the vertically magnetized film. In this case, a magnetic field region for a recording state of the magnetic layer including the auxiliary magnetic film and the vertically magnetized film can be shifted to the high magnetic field region side or the low magnetic field region side relative to the other magnetic layer. As the auxiliary magnetic film can also be used a film made of a magnetic material in which the rotation of magnetization in the direction of an external magnetic field is easy as compared with the vertically magnetized film. In this case, the magnetic layer including the auxiliary magnetic film and the vertically magnetized film can be caused to have recording states which exist respectively in two or more different magnetic field regions of the applied external magnetic field. It is preferable that the auxiliary magnetic film includes the multi-layer deposition of a plurality of thin magnetic films each having a thickness on the order of 1 to 30 Å or a plurality of thin metal films each having a thickness on the order of 1 to 30 Å.

Regarding a preformat for the optomagnetic recording medium, it is constructed such that a data recording area is divided into a plurality of data recording units and a head portion of each data recording unit is provided with a test region for setting the slice level of each signal which is included in a multi-valued recording signal to be recorded in that data recording unit and/or a test region for generating a timing signal which provides a reference timing for detection of the edge of the multi-valued recording signal to be recorded in that data recording unit. Also, there is provided a construction in which a tracking pit for performing a tracking control of a recording or reproducing laser beam and a buried pit for pulling in a clock signal to be offered for the recording/reproduction of the multi-valued recording signal are provided together with the test region or separately from the test region in the head portion of the data recording unit. Further, there is provided a construction in which a test area for detecting the optimum recording condition is provided outside of a user area.

Regarding a recording/reproducing system for the optomagnetic recording medium, there is provided a first construction in which an optical head and a magnetic head are driven relative to any one of the optomagnetic recording media having the above-mentioned first to fifth constructions so that a recording track of the optomagnetic recording medium is irradiated therealong with a laser beam from the optical head while an external magnetic field having an applied magnetic field intensity signal-modulated multi-stepwise in accordance with a recording signal is applied from the magnetic head to a portion irradiated with the laser beam, whereby a signal is recorded with multi values on the optomagnetic recording medium. This is a signal recording based on a so-called magnetic field intensity modulating system. In this case, the irradiation with the laser beam can be made either with a fixed intensity or periodically or pulsewise.

According to a second construction, an optical head and a magnetic head are driven relative to any one of the optomagnetic recording media having the above-mentioned first to fifth constructions so that an external magnetic field is applied from the magnetic head to the optomagnetic recording medium while a recording track of the optomagnetic recording medium is irradiated therealong with a laser beam from the optical head having a laser intensity signal-modulated multi-stepwise in accordance with a recording signal, whereby a signal is recorded with multi values on the optomagnetic recording medium. This is a signal recording based on a so-called light intensity modulating system. In this case, the external magnetic field can be applied with a fixed intensity or changed at a fixed frequency.

According to a third construction, an optical head and a magnetic head are driven relative to any one of the optomagnetic recording media having the above-mentioned first to fifth constructions so that an external magnetic field having an applied magnetic field intensity signal-modulated multi-stepwise in accordance with a recording signal is applied from the magnetic head to the optomagnetic recording medium while a recording track of the optomagnetic recording medium is irradiated therealong with a laser beam from the optical head having a laser intensity signal-modulated multi-stepwise in accordance with the recording signal, whereby a signal is recorded with multi values on the optomagnetic recording medium. This is a signal recording based on a so-called light and magnetic field intensity modulating system.

According to a fourth construction, an optical head and a magnetic head are driven relative to any one of the optomagnetic recording media having the above-mentioned first to fifth constructions so that the same track on the optomagnetic recording medium is repeatedly scanned with an irradiation laser beam from the optical head while a recording condition including the intensity, modulation frequency or pulse width of the irradiation laser beam from the optical head and/or the intensity, modulation frequency or modulation amplitude range of a magnetic field applied from the magnetic head is changed over multi-stepwise each time the scan is repeated, whereby a signal is recorded with multi values on the same track. Namely, this is a system in which a series of multi-valued recording signals are divided into a plurality of signal strings different in recording condition (or combination of laser power and external magnetic field intensity) and the signal recording onto the same track is repeated for each recording condition.

A fifth construction as a recording/reproducing system for an optomagnetic recording medium having a test region provided at a head portion of each data recording unit is such that when a multi-valued recording signal is to be recorded in the data recording unit, a test signal for setting the slice level for each signal included in the multi-valued recording signal is recorded in the test region with at least one test signal being provided for each signal included in the multi-valued recording signal and when the multi-valued recording signal is to be reproduced from the data recording unit, the multi-valued recording signal is reproduced by reading the test signal from the head portion of the data recording unit to setting a slice level corresponding to each signal included in the multi-valued recording signal and slicing a read signal from the data recording unit on the basis of the set slice levels.

There is also provided a construction in which when a multi-valued recording signal is to be recorded in the data recording unit, a test signal for generating a timing signal providing the reference timing for detection of the edge of the multi-valued recording signal is recorded at the head portion of the data recording unit or at fixed intervals in the data recording unit with at least one test signal being provided for each of all edges between the signal levels of multi values, and when the multi-valued recording signal is to be reproduced from the data recording unit, the multi-valued recording signal is reproduced by reading the test signal from the head portion of the data recording unit to generate a reference timing for detection of the edge of each signal included in the multi-valued recording signal so that the respective edges of signals included in a read signal from the data recording unit are detected independently from each other on the basis of the generated reference timings and thereafter composing each edge detection signal in reference to the reference timing for edge detection.

Further, there can be employed a construction in which a test signal for setting the slice level for each signal included in a multi-valued recording signal and a test signal for generating a timing signal providing a reference timing for detection of the edge of the multi-valued recording signal are recorded at the head portion of the data recording unit or at fixed intervals in the data recording unit when the multi-valued recording signal is to be recorded in the data recording unit, and the multi-valued recording signal is reproduced on the basis of signals read from these test signals.

A sixth construction as a recording/reproducing system for an optomagnetic recording medium having a test area provided outside of a user area is such that after the optomagnetic recording medium is mounted to a recording/reproducing apparatus, an optical head and a magnetic head are positioned at the test area provided outside of the user area, a fixed test pattern including the combination of signals included in a multi-valued recording signal to be recorded on the optomagnetic recording medium is written while changing the intensity and pulse width of an irradiation laser beam from the optical head stepwise or continuously, and the test pattern is thereafter reproduced so that a reproduced signal amplitude is compared with a reference signal amplitude, thereby determining the optimum recording condition of each signal included in the multi-valued recording signal.

There is also provided a construction in which after the optomagnetic recording medium is mounted to a recording/reproducing apparatus, an optical head and a magnetic head are positioned at the test area provided outside of the user area, a fixed test pattern including the combination of signals included in a multi-valued recording signal to be recorded on the optomagnetic recording medium is written while changing the intensity of an external magnetic field applied from the magnetic head stepwise or continuously, and the test pattern is thereafter reproduced so that a reproduced signal amplitude is compared with a reference signal amplitude, thereby determining the optimum recording condition of each signal included in the multi-valued recording signal.

According to a seventh construction, in order that a more valued recording signal than the number of magnetic field regions for stable recording states possessed by an optomagnetic recording medium for multi-valued recording is recorded on the optomagnetic recording medium, an optical head for making the irradiation of a recording track therealong with a laser beam and a magnetic head for applying an external magnetic field to a portion of the above-mentioned magnetic layer irradiated with the laser beam are driven relatively so that a step of writing, a first signal string in a plurality of signal strings obtained by dividing a multi-valued recording signal, for one recording track by use of a laser beam or an external magnetic field signal-modulated into multi values by the first signal string and thereafter overwriting, a second writing signal string having a width smaller than that the first writing signal string, onto the first writing signal string by use of a laser beam or an external magnetic field signal-modulated into multi values by the second signal string, is repeated for all of the divisional signal strings.

Concretely, there can be employed a method in which a 4-valued recording signal is divided into two (or first and second) signal strings, the writing of the first signal string for one recording track is performed in such a manner that the one recording track is irradiated therealong with a laser beam from the optical head having a fixed intensity while an external magnetic field signal-modulated pulsewise into four values by the first signal string is applied to a portion irradiated with the laser beam, and the second writing signal string having a width smaller than that the first writing signal string is thereafter overwritten in a central portion of the first writing signal string in such a manner that the one recording track is irradiated therealong with a laser beam form the optical head having a fixed intensity while an external magnetic field signal-modulated pulsewise into four values by the second signal string is applied, whereby the recording signal is recorded with 16 values on the one recording track. In addition to a signal recording based on such a magnetic field modulating system, a similar signal recording can also be realized on the basis of a light modulating system or a light and magnetic field modulating system. The reproduction of the signal can be performed by irradiating the recording track therealong with a reproducing laser beam having a spot diameter which is equivalent to or larger than the width of the first writing signal string formed by writing the first signal string.

Regarding a recording/reproducing apparatus for the optomagnetic recording medium, an optomagnetic recording/reproducing apparatus comprising a driver for driving the optomagnetic recording medium and an optical head and a magnetic head disposed opposite to the optomagnetic recording medium mounted to the driver is constructed such that the magnetic head has two or more windings in one magnetic circuit and the respective windings are independently driven to apply a multi-stepped external magnetic field to the optomagnetic recording medium. In this case, it can also be constructed such that a fixed bias magnetic field is applied to the optomagnetic recording medium by any one of the two or more windings.

In another construction, an optomagnetic recording/reproducing apparatus similar to that mentioned above is constructed such that the magnetic head includes two or more magnetic heads which are driven independently from each other and arranged in proximity to each other. In this case, it can also be constructed such that a fixed bias magnetic field is applied to the optomagnetic recording medium by any one of the two or more magnetic heads.

In a further construction, an optomagnetic recording/reproducing apparatus similar to that mentioned above is constructed such that a permanent magnet is disposed in proximity of the magnetic head so that a fixed bias magnetic field is applied to the optomagnetic recording medium by the permanent magnet.

When there is used an optomagnetic recording medium including the deposition of a first magnetic layer in which recording states exist respectively in two different magnetic field regions of an applied external magnetic field and a second magnetic layer in which one recording state exists in a magnetic field region different from those for the first magnetic layer, the 4-valued recording of a signal becomes possible by applying different four-stepped external magnetic fields corresponding to the respective recording states of the magnetic layers. Also, in the case where there is used an optomagnetic recording medium including the deposition of a first magnetic layer in which recording states exist respectively in two different magnetic field regions of an applied external magnetic field and a second magnetic layer in which two recording states exist respectively in magnetic field regions different from those for the first magnetic layer, the 4-valued recording of a signal becomes possible by applying different four-stepped external magnetic fields corresponding to the respective recording states of the magnetic layers.

Namely, in the first magnetic layer including the deposition of a vertically magnetized film and a predetermined auxiliary magnetic film, the carrier-to-noise ratio of a light-modulated recording signal for an external magnetic field has two peaks (or recording states), for example, as shown in FIG. 144.

On the other hand, in the second magnetic layer including no auxiliary magnetic film, the carrier-to-noise ratio of a light-modulated recording signal for an external magnetic field has one peak, for example, as shown in FIG. 145. Also, in the first layer including the deposition of the vertically magnetized film and the predetermined auxiliary magnetic film, the sense of the magnetization of the whole of the magnetic layer can be directed to the external magnetic field direction or a direction reverse thereto since the sub-lattice magnetic moment of a transition metal in the vertically magnetized film is easily inverted to the direction of an exchange coupling magnetic field by the action of the auxiliary magnetic film, as the present inventors have disclosed in Japanese Patent Application No. 3-210430 and Japanese Patent Application No. 4-15388 (see JP-A-3-210430). On the other hand, in the second magnetic layer having no auxiliary magnetic layer and having one recording state in a magnetic field region different from that for the first magnetic layer, the sense of the magnetization of the whole of the magnetic layer is easily inverted to the sense of the external magnetic field in the temperature-raised condition.

Accordingly, if a first magnetic layer A made of a ferromagnetic substance with the sub-lattice magnetic moment of rare earth atoms being more dominant than that of transition metal atoms between the room temperature and the Curie temperature and a second magnetic layer B made of a ferromagnetic substance with the sub-lattice magnetic moment of transition metal atoms being more dominant than that of rare earth atoms are laminated on each other and the recording of a signal is performed with a downward external magnetic field taken as an external magnetic field in a recording direction and an upward external magnetic field taken as an external magnetic field in an erasing direction, for example, as shown in FIG. 146A, there results in the following.

(i) When an external magnetic field $H_0$ having a magnitude capable of directing the sense of magnetization of the whole of the first magnetic layer A (or an external magnetic field in a region 1 shown in FIG. 144) to the erasing direction is applied in the erasing direction, it is possible to direct the sub-lattice magnetic moment of transition metal atoms of the first magnetic layer A to the recording direction and the sub-lattice magnetic moment of transition metal atoms of the second magnetic layer B to the erasing direction, respectively.

(ii) When an external magnetic field $H_1$ having a magnitude capable of directing the sense of magnetization of the whole of the first magnetic layer A (or an external magnetic field in a region 2 shown in FIG. 144) to the recording direction is applied in the erasing direction, it is possible to direct both the sub-lattice magnetic moment of transition metal atoms of the first magnetic layer A and the sub-lattice magnetic moment of transition metal atoms of the second magnetic layer B to the erasing direction.

(iii) When an external magnetic field $H_2$ having a magnitude capable of directing the sense of magnetization of the whole of the first magnetic layer A (or an external magnetic field in a region 3 shown in FIG. 144) to the erasing direction is applied in the recording direction, it is possible to direct both the sub-lattice magnetic moment of transition metal atoms of the first magnetic layer A and the sub-lattice magnetic moment of transition metal atoms of the second magnetic layer B to the recording direction.

(iv) When an external magnetic field $H_3$ having a magnitude capable of directing the sense of magnetization of the whole of the first magnetic layer A (or an external magnetic field in a region 4 shown in FIG. 144) to the recording direction is applied in the recording direction, it is possible to direct the sub-lattice magnetic moment of transition metal atoms of the first magnetic layer A to the erasing direction and the sub-lattice magnetic moment of transition metal atoms of the second magnetic layer B to the recording direction, respectively.

Since the magnitude of the change of a Kerr rotation angle detected as a signal from the optomagnetic recording medium is proportional to the sum of the sub-lattice magnetic moments of transition metal atoms of the first magnetic layer A and the second magnetic layer B, a relative signal output shown in FIG. 146B is obtained from a recording track to which the magnetic fields $H_0$, $H_1$, $H_2$ and $H_3$ are successively applied. Accordingly, the 4-valued recording of a signal can be performed by positioning a recording state by the external magnetic field $H_1$ as "0", a recording state by the external magnetic field $H_0$ as "1", a recording state by the external magnetic field $H_3$ as "2" and a recording state by the external magnetic field $H_3$ as "3", for example, as shown in FIG. 146B.

Also, in the case where there is used an optomagnetic recording medium including the deposition of a first magnetic layer in which recording states exist respectively in two different magnetic field regions of an applied external magnetic field and a second magnetic layer in which two recording states exist respectively in magnetic field regions different from those for the first magnetic layer, the 4-valued recording of a signal can be performed on the basis of a principle similar to that mentioned above. For example, in the case where the first magnetic layer having a characteristic shown by one-dotted line in FIG. 147B and the first magnetic layer having a characteristic shown by broken line in the same figure are laminated, four recording states of "0", "1", "2" and "3" shown in FIG. 147B can be realized by applying the respective external magnetic fields $H_0$, $H_1$, $H_2$ and $H_3$ shown in FIG. 147A. Accordingly, the 4-valued recording of a signal can be performed by an external magnetic field on the order of ±100 (Oe) by positioning a recording state by the external magnetic field $H_0$ as "0", a recording state by the external magnetic field $H_1$ as "1", a recording state by the external magnetic field $H_2$ as "2" and a recording state by the external magnetic field $H_2$ as "3", for example, as shown in FIG. 147A and 147B. In this case, if a DC bias magnetic field is applied to an external magnetic field so that the center magnetic field of the external magnetic field is shifted to the negative side by about −50 (Oe), as shown in FIG. 148, the 3-valued recording by a small external magnetic field on the order of ±50 (Oe) becomes possible.

Thus, in the optomagnetic recording medium of the present invention, the 4-valued recording of a signal becomes possible by the provision of two magnetic layers. Therefore, the optomagnetic recording medium of the present invention can realize the signal recording with a higher density and a simpler construction in comparison with the conventional optomagnetic recording medium in which the provision of two magnetic layers enables only the 3-valued recording of a signal. Since each recording state is very stable to a change in external magnetic field, as apparent from FIGS. 144 147 and 148, it is not necessary to delicately match the magnetic characteristic of each magnetic layer and a laser beam intensity and an external magnetic field intensity at the time of recording/reproduction. Therefore, it is possible to structure an optomagnetic recording/reproducing system which is excellent in mass-producibility and reliability.

Also, when a magnetic layer including a vertically magnetized film and an auxiliary magnetic film adjoining the vertically magnetized film and having a Curie temperature higher than or the same as that of the vertically magnetized film is irradiated with a recording or erasing laser beam so that there turns into a state in which the magnetization of the vertically magnetized film is rotatable by an external magnetic field, the direction of the magnetization of the auxiliary magnetic film keeps the initial state so that it exerts an exchange coupling force on the vertically magnetized film, as shown in FIG. 149A. The exchange coupling force has a strength which comes to several-ten KOe at the room temperature when expressed in terms of magnetic field. This exchange coupling magnetic field serves as a bias added to the external magnetic field at the time of recording or erasing. By virtue of this bias magnetic field based on the exchange coupling, that transition region of the reproduced signal output of the magnetic layer (including the vertically magnetized film and the auxiliary magnetic film) for an external magnetic field at the time of recording, which extends from an unrecorded state to a recorded state, is shifted from the vicinity of zero magnetic field to a high magnetic field direction (or recording direction) or a low magnetic field direction (or erasing direction), as shown in FIG. 149B.

On the other hand, that transition region of the reproduced signal output of a vertically magnetized film as a single layer (having no auxiliary magnetic film) for an external magnetic field at the time of recording, which extends from an unrecorded state to a recorded state, is in the vicinity of zero magnetic field, as shown in FIG. 149C. Accordingly, between the magnetic layer including the vertically magnetized film having the auxiliary magnetic film (hereinafter referred to as first magnetic layer) and the magnetic layer including the vertically magnetized film as a single layer film having no auxiliary magnetic film (hereinafter referred to as second magnetic layer), there exist magnetic field regions in which the intensities of external magnetic fields for recording states do not overlap each other.

An optomagnetic recording medium including the deposition of the two (or first and second) magnetic layers exhibits three clear steps in the change of a recorded signal for an external magnetic field, as shown in FIG. 149D. Namely, this optomagnetic recording medium has an external recording region in which stable recording is possible between the transition regions of the respective magnetic layers. Accordingly, the 3-valued recording of a signal can be performed by positioning a recording state by an external magnetic field $H_0$ not larger than the transition region of the first magnetic layer as "0", a recording state by an external magnetic field $H^1$ larger than the transition region of the first magnetic layer and not larger than the transition region of the second magnetic layer as "1" and a recording state by an external magnetic field $H_2$ larger than the transition region of the second magnetic layer as "2", respectively, as shown in FIG. 149D.

As apparent from FIG. 149D, each recording state in this optomagnetic recording medium is very stable to a change in external magnetic field and it is therefore unnecessary to delicately match the magnetic characteristic of each magnetic layer and a laser beam intensity and an external magnetic field intensity at the time of recording/reproduction. Accordingly, it is possible to structure an optomagnetic recording/reproducing system which is excellent in mass-producibility and reliability.

If magnetic layers are laminated with the number of layers which is two or more than that, the multi-valued recording of higher order corresponding to the number of laminated magnetic layers becomes possible. Also, if an optomagnetic recording medium includes the three- or more-layer deposition of magnetic layers at least one of which is formed by an optomagnetic recording film in which recording states exist respectively in two or more different magnetic field regions for an applied external magnetic field, the 5- or more-valued recording of a signal becomes possible by making the intensity of the external magnetic field correspond to the recording state of each magnetic layer.

In the following, explanation will be made of the operation of a recording/reproducing system in which a recording signal including more values than the number of magnetic field regions for stable recording states of an optomagnetic recording medium for multi-valued recording is recorded on the optomagnetic recording medium.

A multi-valued signal to be recorded in the optomagnetic recording medium can be divided into a plurality of signal strings by a proper method. For example, a 4-valued recording signal (0031220012032133113023011320310) can be converted into a signal string of (00), (31), (22), (00), (12), (03), (21), (33), (11), (30), (23), (01), (13), (20), (32), (10) by partitioning the 4-valued recording signal two by two from the head thereof. Further, this signal string can be divided into a first signal string of (0320102313201231) and a second signal string of (0120231310313020) by separately extracting the first signal and the second signal of each set in the converted signal string.

The recording of the first signal string for an optomagnetic recording medium for 4-valued recording can be performed in accordance with the method explained earlier. Also, the overwriting of the second signal string onto the first signal string written in the optomagnetic recording medium is possible by setting a laser intensity and/or an external magnetic field intensity to a condition with which the magnetization of the first writing signal string can be inverted. Further, when the second signal string is overwritten onto the first writing signal string, the rewriting of a part of the first writing signal string to the second signal string with the width of the second signal string made smaller than the width of the first signal string (or the width of a magnetic domain) is possible by adjusting the size of a laser spot. In addition, the synchronization of the head of the first writing signal string with the second writing signal string can also be made easily by use of the prior art. Accordingly, it is possible to record a plurality of divisional signal strings with different widths on the same track by operating a recording laser beam plural times on the same track.

When the optomagnetic recording medium having the first signal string and the second signal string thus overwritten with different widths on the same track in synchronism with each other in a track direction are irradiated with a reproducing laser spot having a diameter which is the same to or larger than the width of the first writing signal string, a 16-valued recording signal can be detected since the state of total magnetization in an area irradiated with the reproducing laser spot is different among a region where the signals of the first and second signal strings are both "3", a region where the signal of the first signal string is "3" and the signal of the second signal string is "2", a region where the signal of the first signal string is "3" and the signal of the second signal string is "1", a region where the signal of the first signal string is "3" and the signal of the second signal string is "0", a region where the signal of the first signal string is "2" and the signal of the second signal string is "3", a region where the signal of the first signal string is "2" and the signal of the second signal string is "2", a region where the signal of the first signal string is "2" and the signal of the second signal string is "1", a region where the signal of the first signal string is "2" and the signal of the second signal string is "0", a region where the signal of the first signal string is "1" and the signal of the second signal string is "3", a region where the signal of the first signal string is "1" and the signal of the second signal string is "2", a region where the signal of the first signal string is "1" and the signal of the second signal string is "1", a region where the signal of the first signal string is "1" and the signal of the second signal string is "0", a region where the signal of the first signal string is "0" and the signal of the second signal string is "3", a region where the signal of the first signal string is "0" and the signal of the second signal string is "2", a region where the signal of the first signal string is "0" and the signal of the second signal string is "1", and a region where the signals of the first and second signal strings are both "0". Also, if the recording signal is divided into three signal strings and the three signal strings are overwritten onto the same track, a 16-valued signal recording can be performed on the basis of a similar principle.

Accordingly, the multi-valued signal recording of higher order can be realized using an optomagnetic recording medium according to the present invention, thereby making it possible to provide an optomagnetic recording medium which is low in cost and has a large amount of recording information.

A 4-valued recording signal can be obtained by converting a 2-valued recording signal, for example, by the following method. Namely, a 2-valued recording signal (000011011010000001100011100111110101110010110 00-10111100011100100) is converted into a signal string of (00), (00), (11), (01), (10), (10), (00), (00), (01), (10), (00), (11), (10), (01), (11), (11), (01), (01), (11), (00), (10), (11), (00), (01), (01), (11), (10), (00), (11), (10), (01), (00) by partitioning the 2-valued recording signal two by two from the head thereof. Next, the set of (00), the set of (01) and the set of (10) are assigned with a signal "0", a signal "1" and a signal "2", respectively. Thereby, it is possible to tain the 4-valued recording signal (00312200120321331130230113203210) above referred to.

BRIEF DESCRIPTION OF THE DRAWINGS

FIGS. 1A and 1B are graphs exemplifying the characteristic of an optomagnetic recording medium according to the present invention.

FIG. 2 is an explanatory diagram showing the principle of a multi-valued recording method according to the present invention.

FIGS. 9A, 9B and 9C are diagrams for explaining an optomagnetic recording medium according to a first example of construction.

FIGS. 10A, 10B, 10C, 10D, 10E, 10F, 10G, 10H, 10I, 10J, 10K, 10L, 10M, 10N, 10O, 10P, 10Q, 10R, 10S, 10T, 10U, 10V, 10W, 10X and 10Y are diagrams showing the external magnetic field versus relative signal output characteristic of various optomagnetic recording media belonging to the first example of construction.

FIGS. 21A, 21B and 21C are diagrams for explaining an optomagnetic recording medium according to a fourth example of construction.

FIG. 35 is a diagram showing an external magnetic field versus signal output level characteristic in the sixteenth embodiment.

FIG. 45 is a table showing the film structure of each optomagnetic recording medium included in the seventh example of construction.

FIG. 50 is an explanatory diagram showing a first example of a multi-valued recording/reproducing system according to the present invention.

FIG. 75 is an explanatory diagram showing an eighteenth example of a multi-valued recording/reproducing system according to the present invention.

FIG. 76 is an explanatory diagram showing a system for signal-modulating the intensity of an external magnetic field in the eighteenth example of the multi-valued recording/reproducing system.

FIG. 86 is a diagram for explaining the operation of the circuit shown in FIG. 85.

FIG. 90 is a diagram for explaining the operation of the circuit shown in FIG. 89.

FIG. 91A is a diagram for explaining the recorded signal characteristic of a recording medium which is applied to a twenty-first example of a multi-valued recording/reproducing system.

FIG. 91B is a diagram for explaining a first example of the combination of an applied magnetic field intensity and an irradiation laser intensity which is applied to the twenty-first example of the multi-valued recording/reproducing system.

FIG. 92A is a diagram for explaining the recorded signal characteristic of a recording medium which is applied to the twenty-first example of the multi-valued recording/reproducing system.

FIG. 92B is a diagram for explaining a second example of the combination of an applied magnetic field and an irradiation laser intensity which is applied to the twenty-first example of the multi-valued recording/reproducing system.

FIG. 93A is a diagram for explaining the recorded signal characteristic of a recording medium which is applied to the twenty-first example of the multi-valued recording/reproducing system.

FIG. 93B is a diagram for explaining a third example of the combination of an applied magnetic field intensity and an irradiation laser intensity which is applied to the twenty-first example of the multi-valued recording/reproducing system.

FIG. 118 is a waveform diagram showing a reproduced signal waveform of a test signal recorded by the method shown in FIG. 116.

FIG. 119 is a waveform diagram showing a reproduced signal waveform of a test signal recorded by the method shown in FIG. 117.

FIG. 120 is a block diagram showing an optimum condition detecting circuit which is applied to the multi-valued recording/reproducing system according to the thirty-first example.

FIG. 121 is an explanatory diagram showing a thirty-second example of a multi-valued recording/reproducing system.

FIG. 122 is an explanatory diagram showing a thirty-third example of a multi-valued recording/reproducing system.

FIG. 123 is an explanatory diagram showing the effect of the multi-valued recording/reproducing system according to the thirty-third example.

FIG. 124 is an explanatory diagram showing a first example of an on-pit recording method which belongs to a thirty-fourth example of a multi-valued recording/reproducing system.

FIG. 125 is an explanatory diagram showing a second example of an on-pit recording method which belongs to the thirty-fourth example of the multi-valued recording/reproducing system.

FIG. 126 is an explanatory diagram showing a third example of an on-pit recording method which belongs to the thirty-fourth example of the multi-valued recording/reproducing system.

FIG. 127 is an explanatory diagram showing a fourth example of an on-pit recording method which belongs to the thirty-fourth example of the multi-valued recording/reproducing system.

FIG. 128 is an explanatory diagram showing a fifth example of an on-pit recording method which belongs to the thirty-fourth example of the multi-valued recording/reproducing system.

FIG. 129 is an explanatory diagram showing another example of a multi-valued recording/reproducing system according to the present invention.

Figure 130:
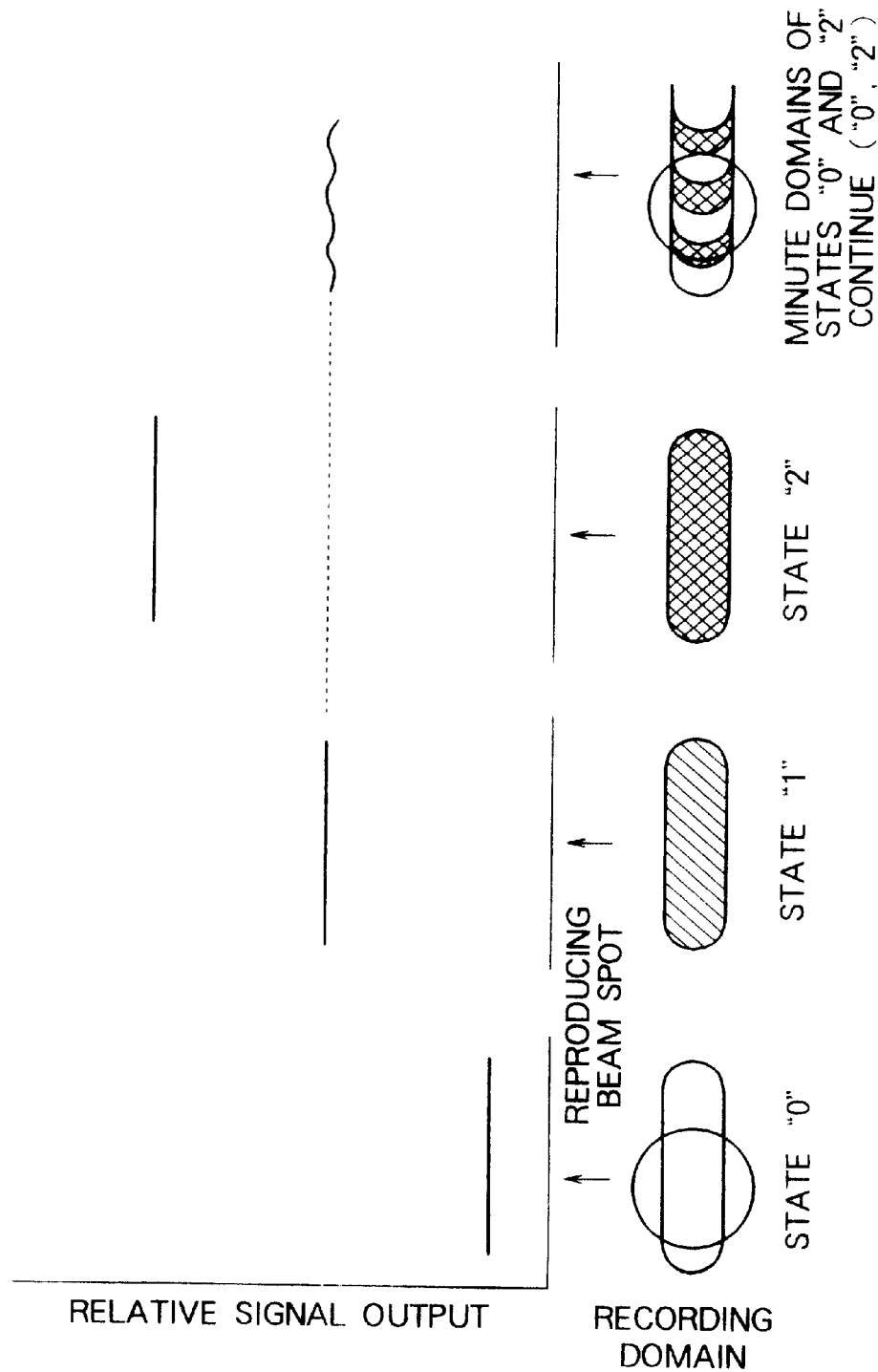

FIG. 130 is an explanatory diagram showing a further example of a multi-valued recording/reproducing system according to the present invention.

Figure 131:
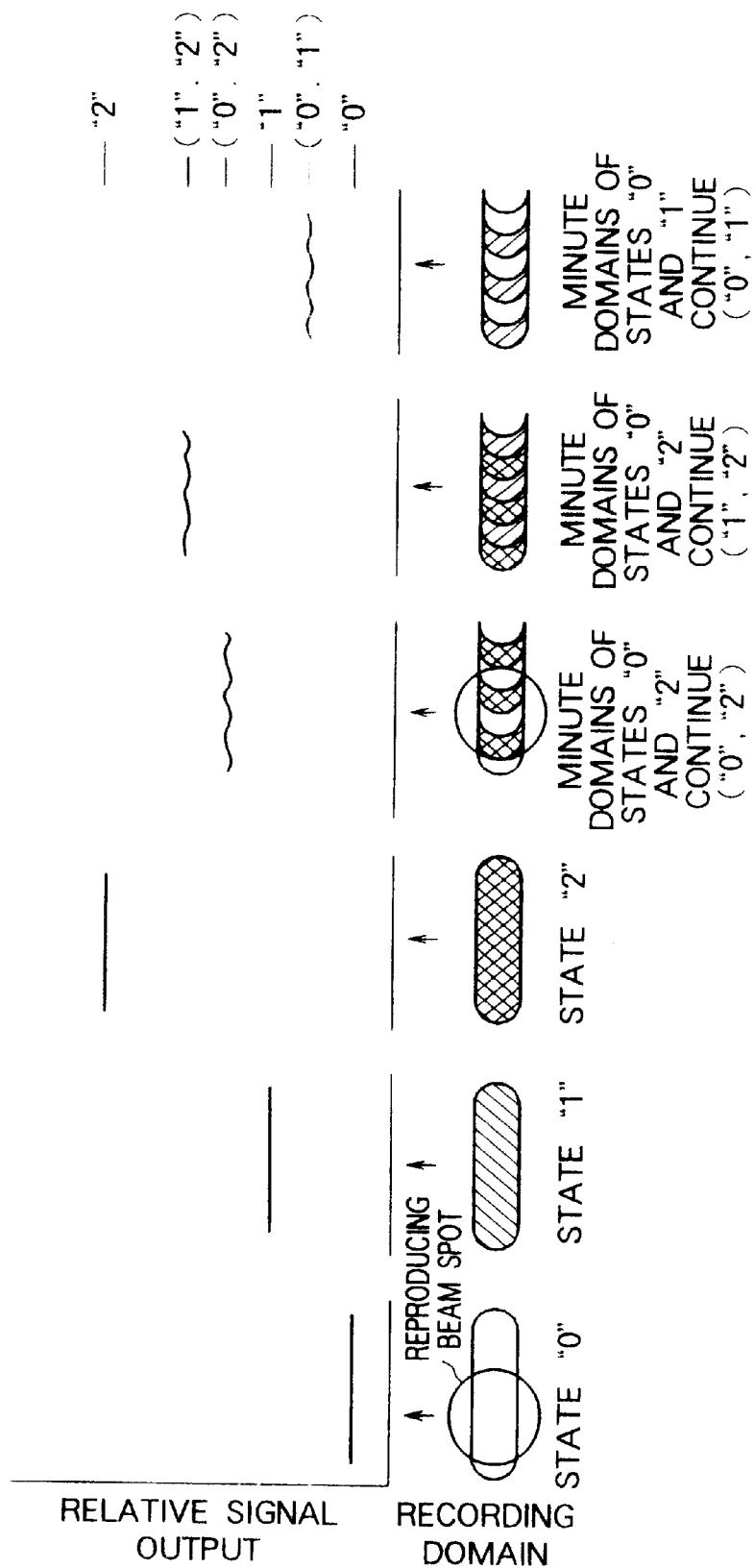

FIG. 131 is an explanatory diagram showing a still further example of a multi-valued recording/reproducing system according to the present invention.

Figure 132:
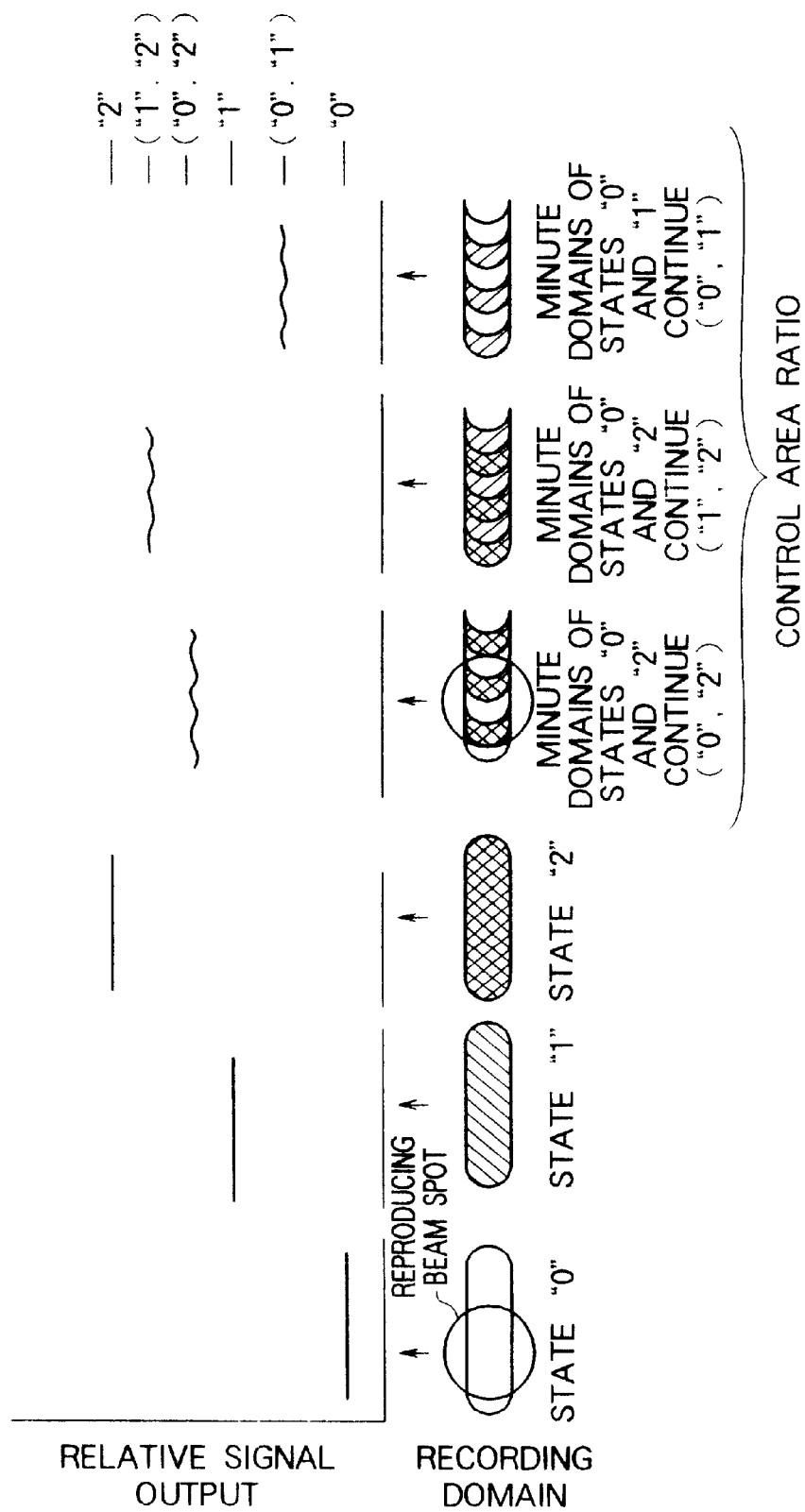

FIG. 132 is an explanatory diagram showing a further-more example of a multi-valued recording/reproducing system according to the present invention.

FIGS. 133A, 133B and 133C are explanatory diagrams showing a still furthermore example of a multi-valued recording/reproducing system according to the present invention.

Figure 134:
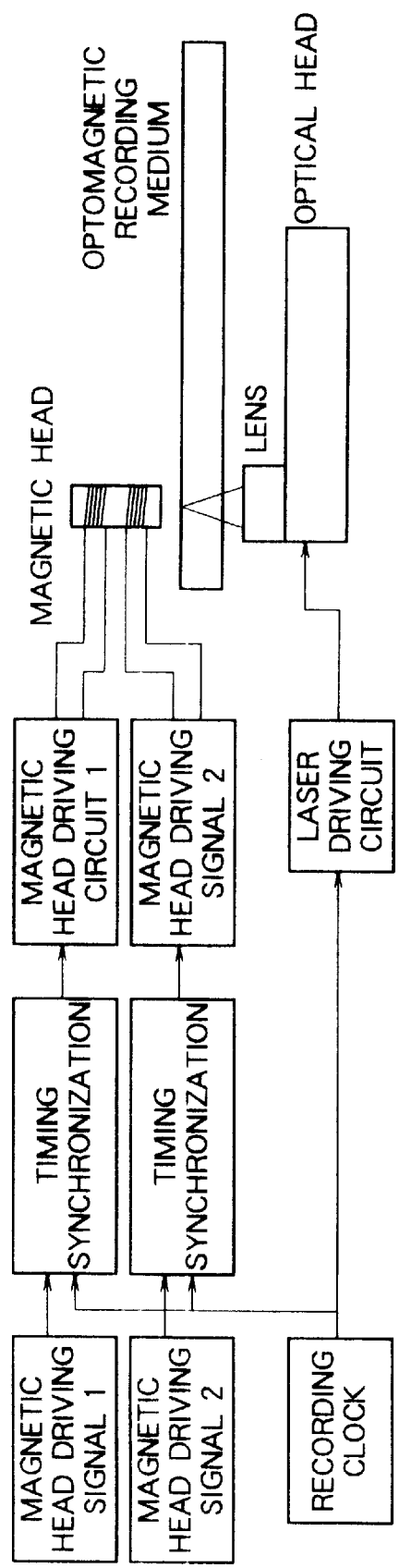

FIG. 134 is a block diagram showing a first example of a magnetic head device.

Figure 135:
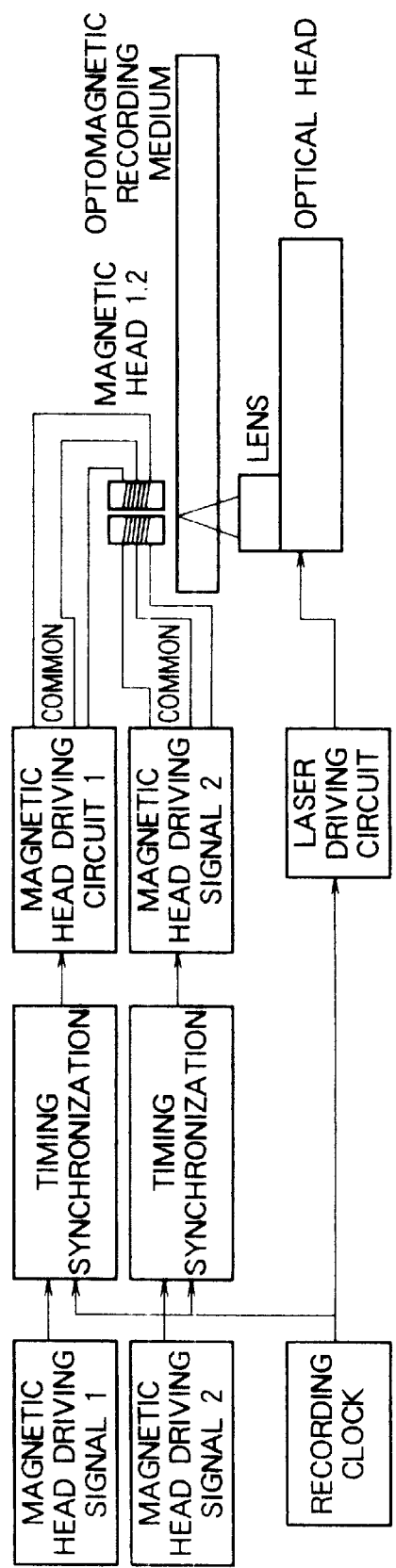

FIG. 135 is a block diagram showing a second example of a magnetic head device.

Figure 136:
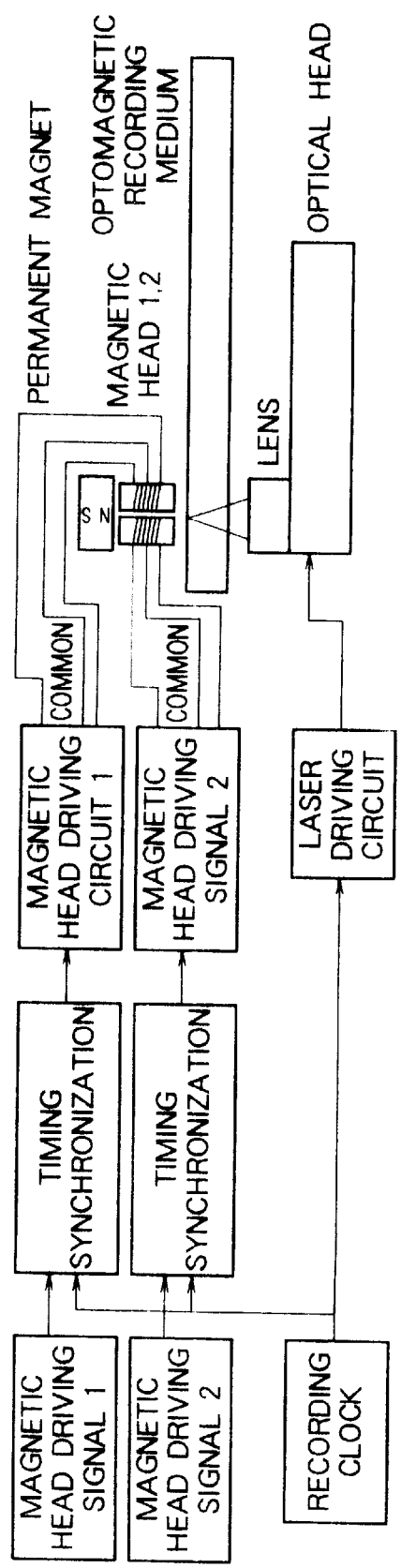

FIG. 136 is a block diagram showing a third example of a magnetic head device.

Figure 137:
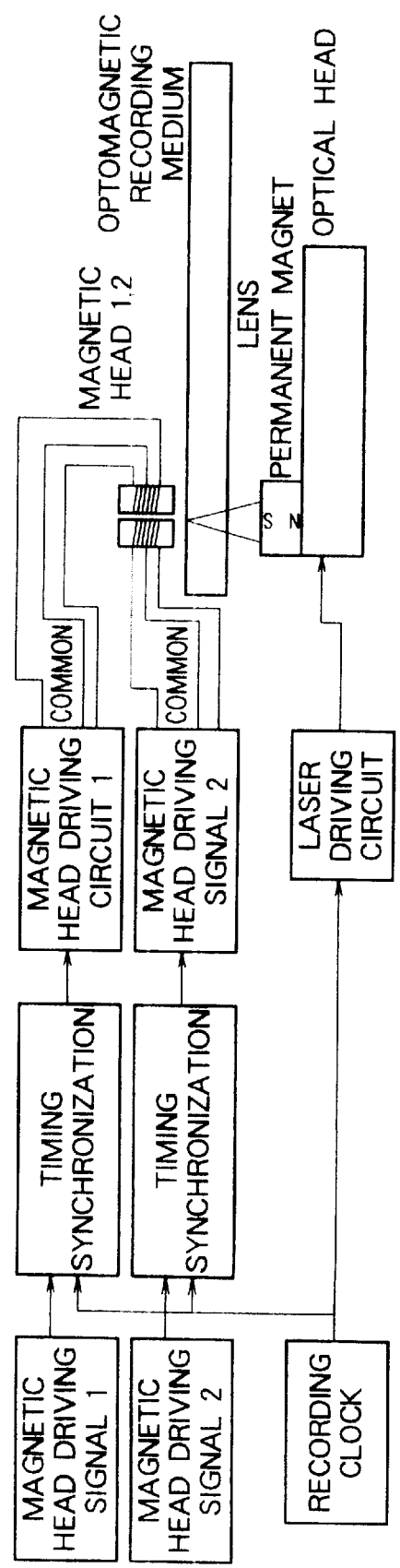

FIG. 137 is a block diagram showing a fourth example of a magnetic head device.

Figure 138:
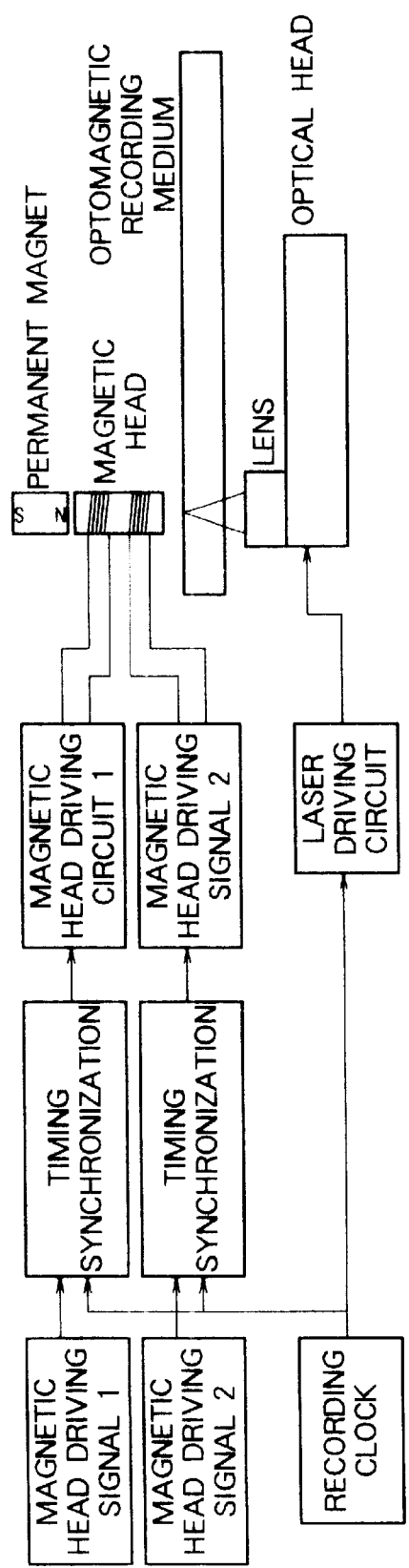

FIG. 138 is a block diagram showing a fifth example of a magnetic head device.

Figure 139:
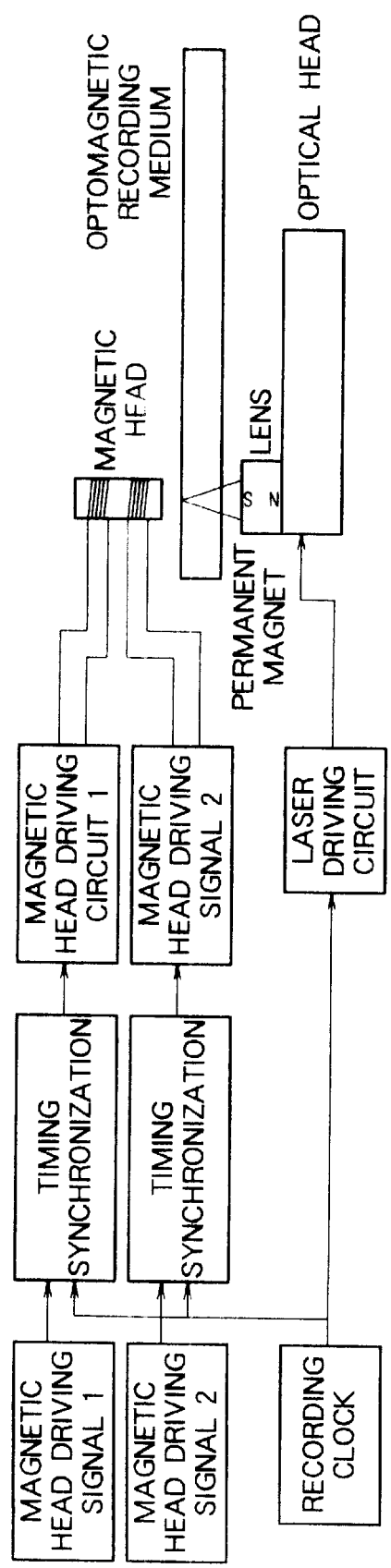

FIG. 139 is a block diagram showing a sixth example of a magnetic head device.

Figure 140:
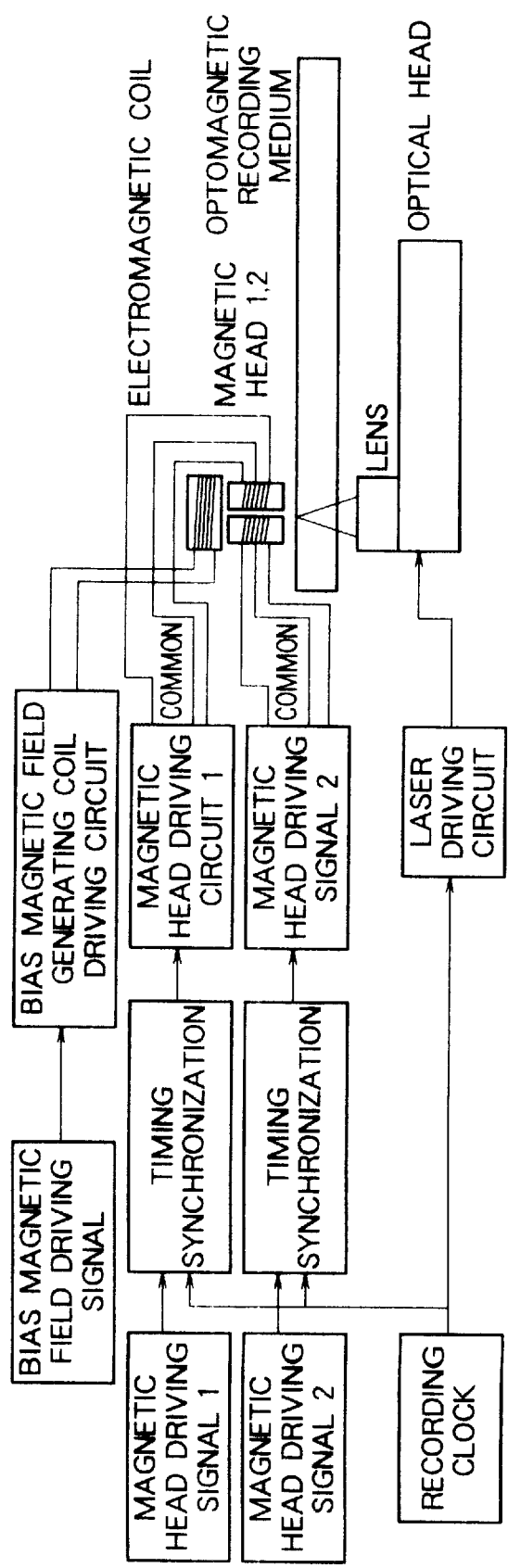

FIG. 140 is a block diagram showing a seven example of a magnetic head device.

Figure 141:
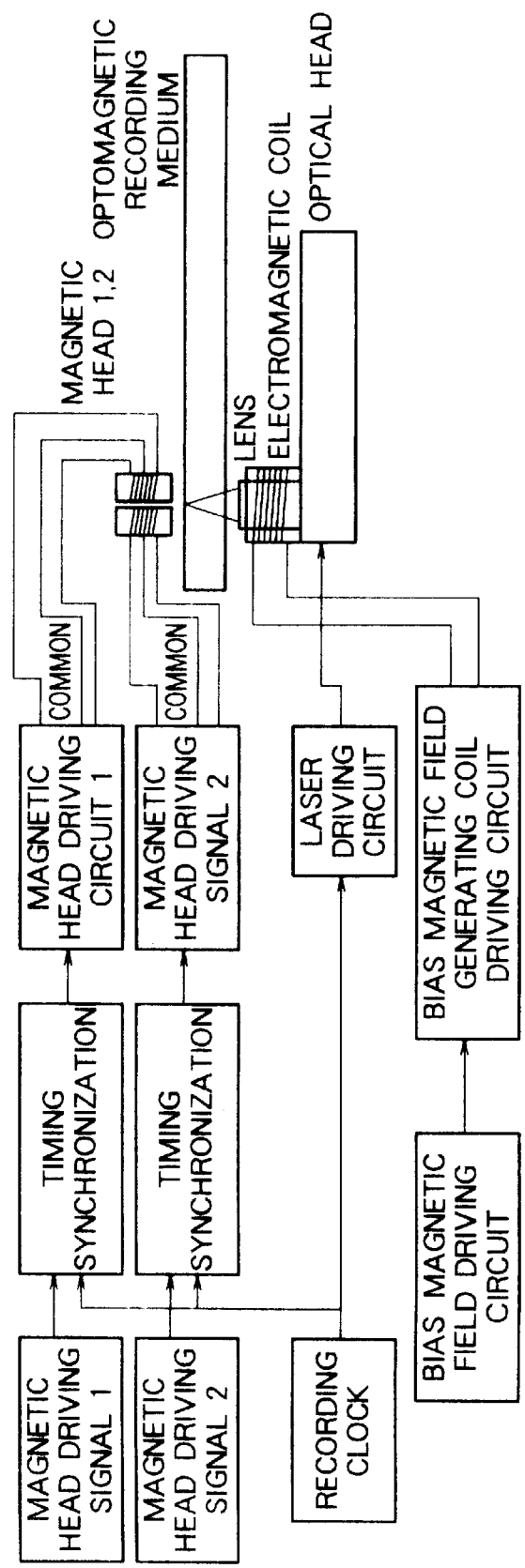
Figure 142A:
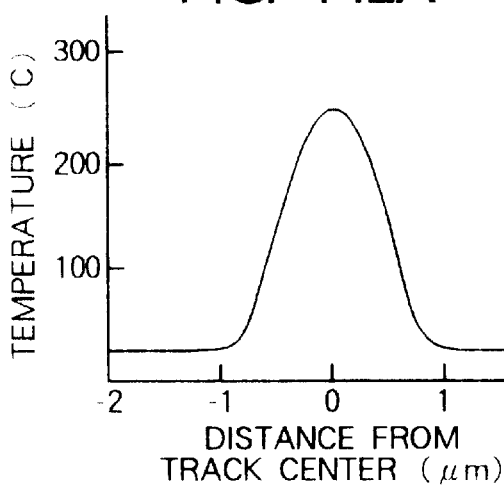
Figure 142D:
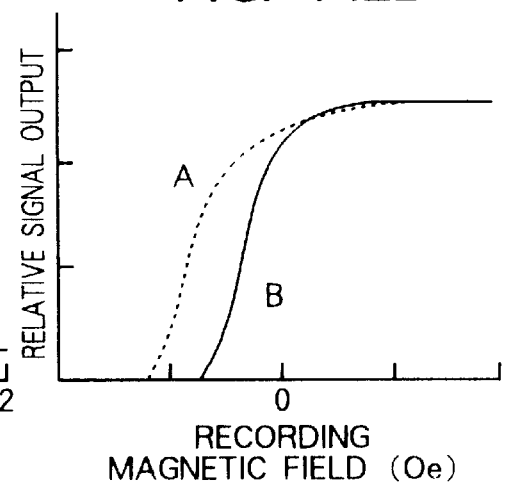
Figure 142B:
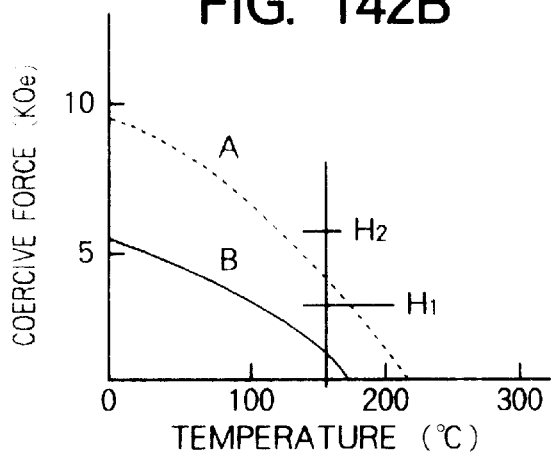
Figure 142E:
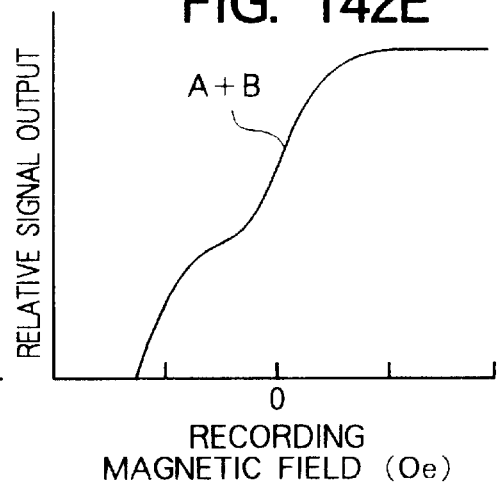
Figure 142C:
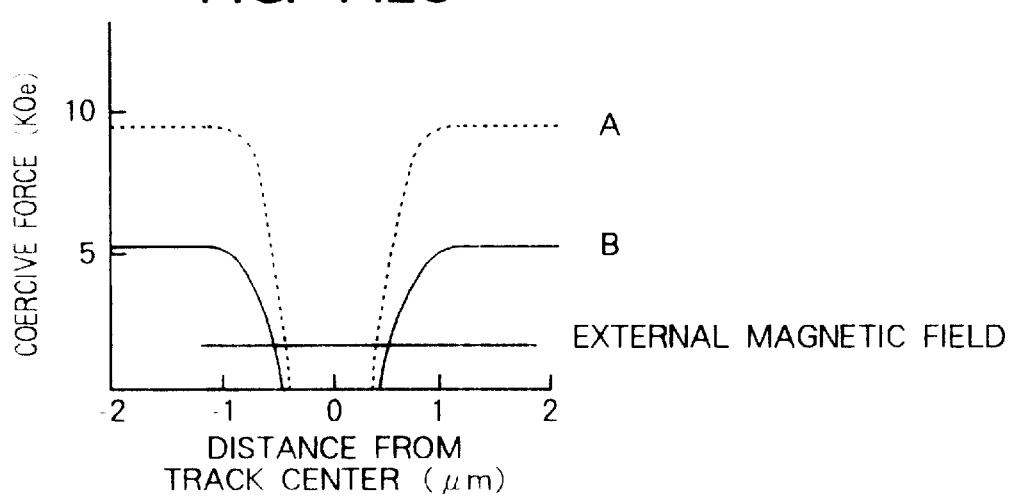

FIG. 141 is a block diagram showing an eighth example of a magnetic head device.

FIGS. 142A, 142B, 142C, 142D, and 142E are diagrams for explaining the prior art.

Figure 143:
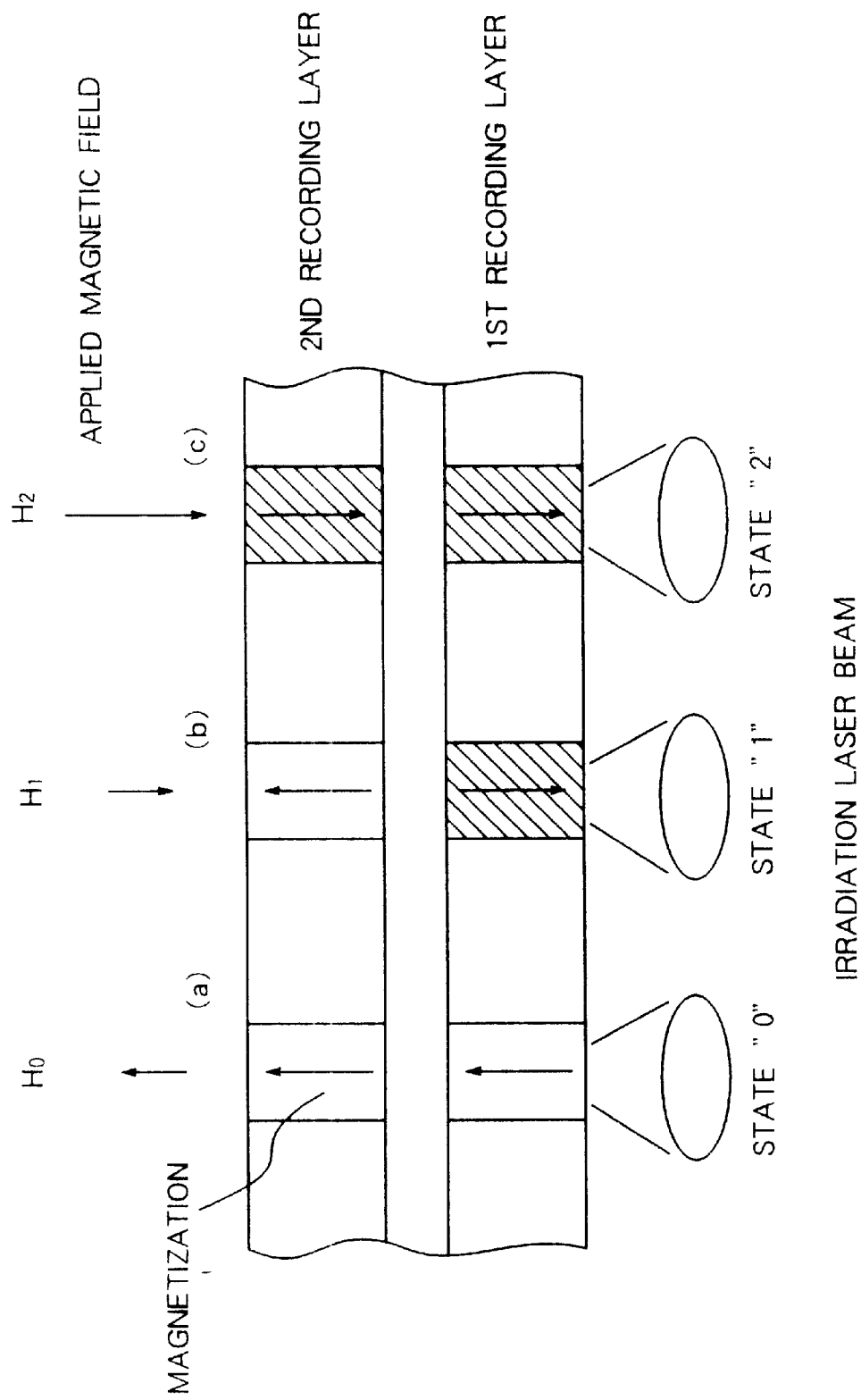

FIG. 143 is a diagram for explaining the prior art.

Figure 144:
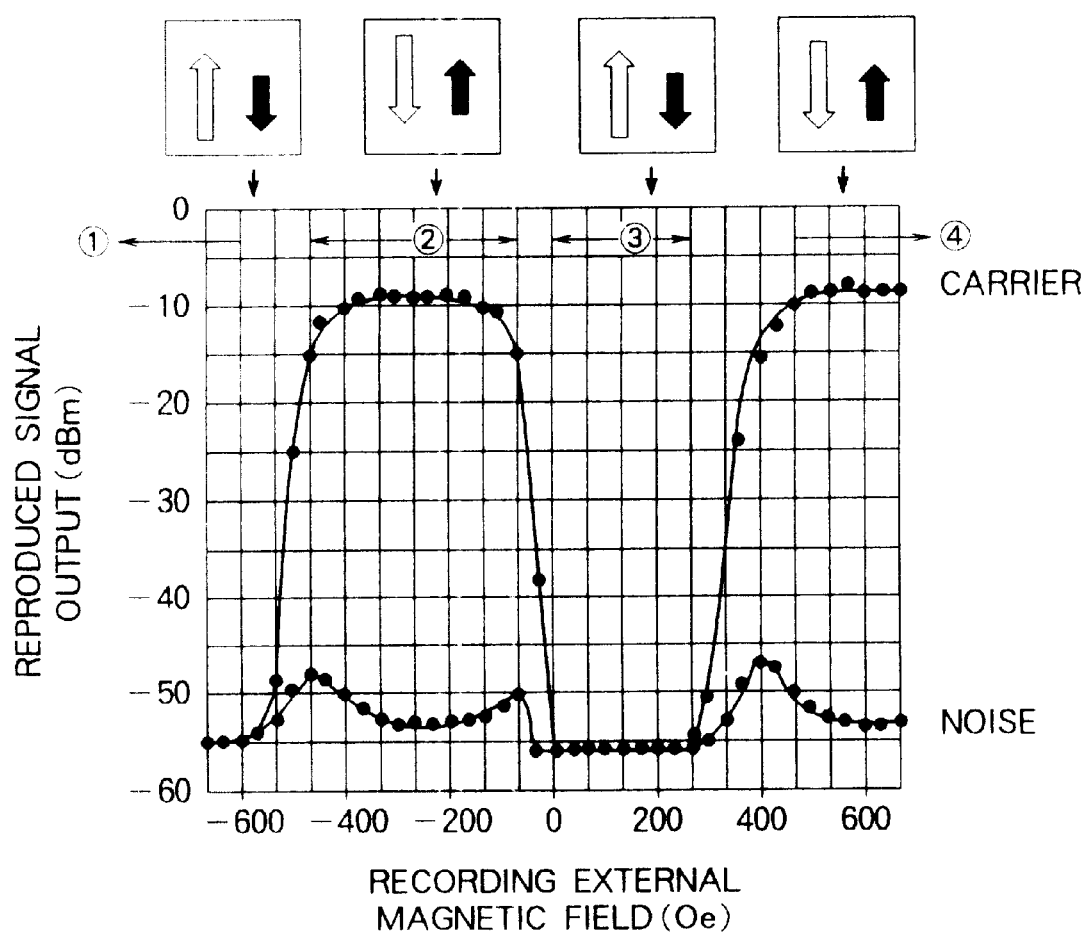

FIG. 144 is a graph exemplifying the external magnetic field characteristic of a recording layer in which two recording states exist for an external magnetic field.

Figure 145:
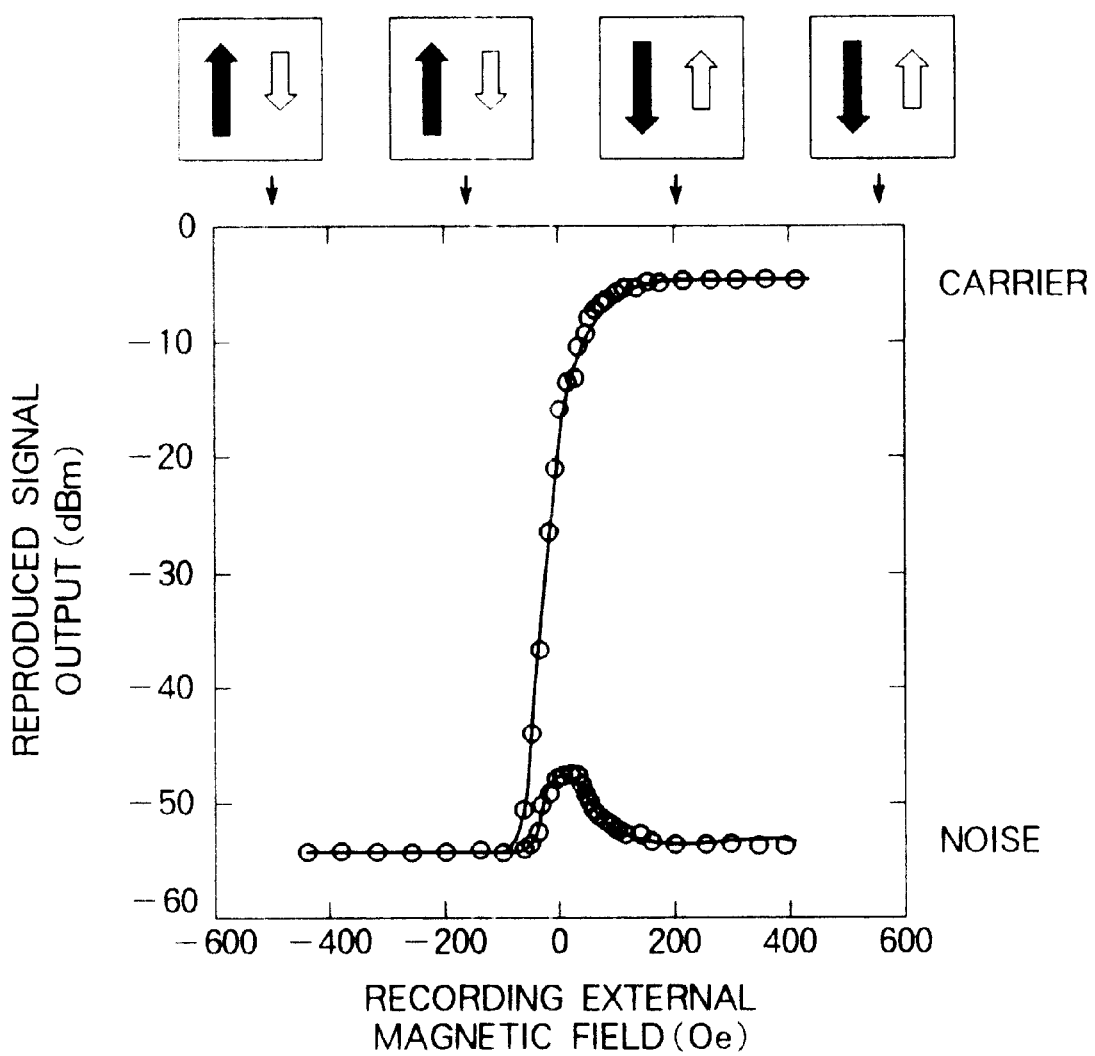

FIG. 145 is a graph exemplifying the external magnetic field characteristic of a recording layer in which one recording state exists for an external magnetic field.

Figure 146A:
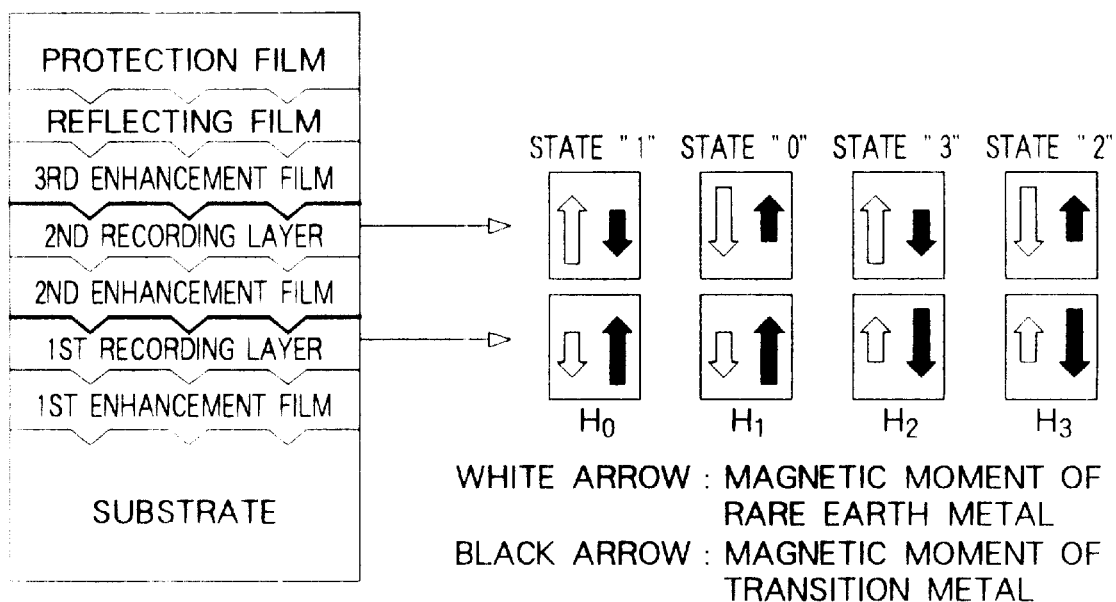
Figure 146B:
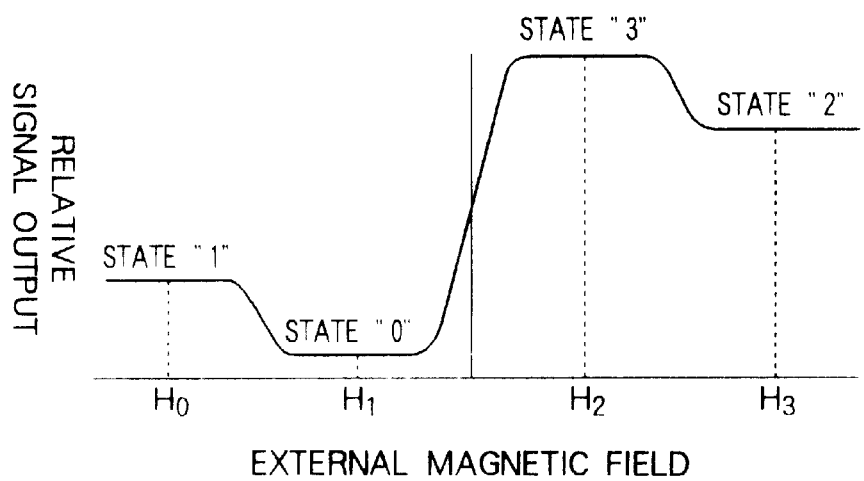

FIGS. 146A and 146B are explanatory diagrams showing a first example of the multi-valued recording principle of an optomagnetic recording medium according to the present invention.

Figure 147A:
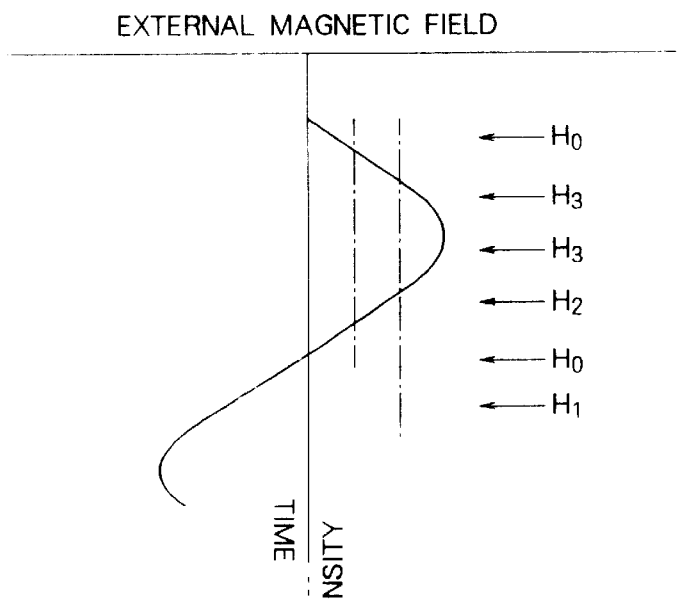
Figure 147B:
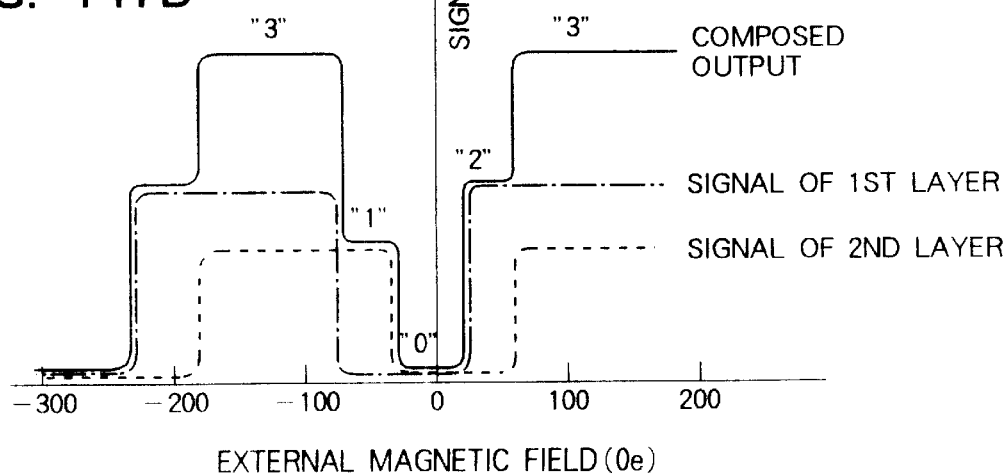

FIGS. 147A and 147B are explanatory diagrams showing a second example of the multi-valued recording principle of an optomagnetic recording medium according to the present invention.

Figure 148:
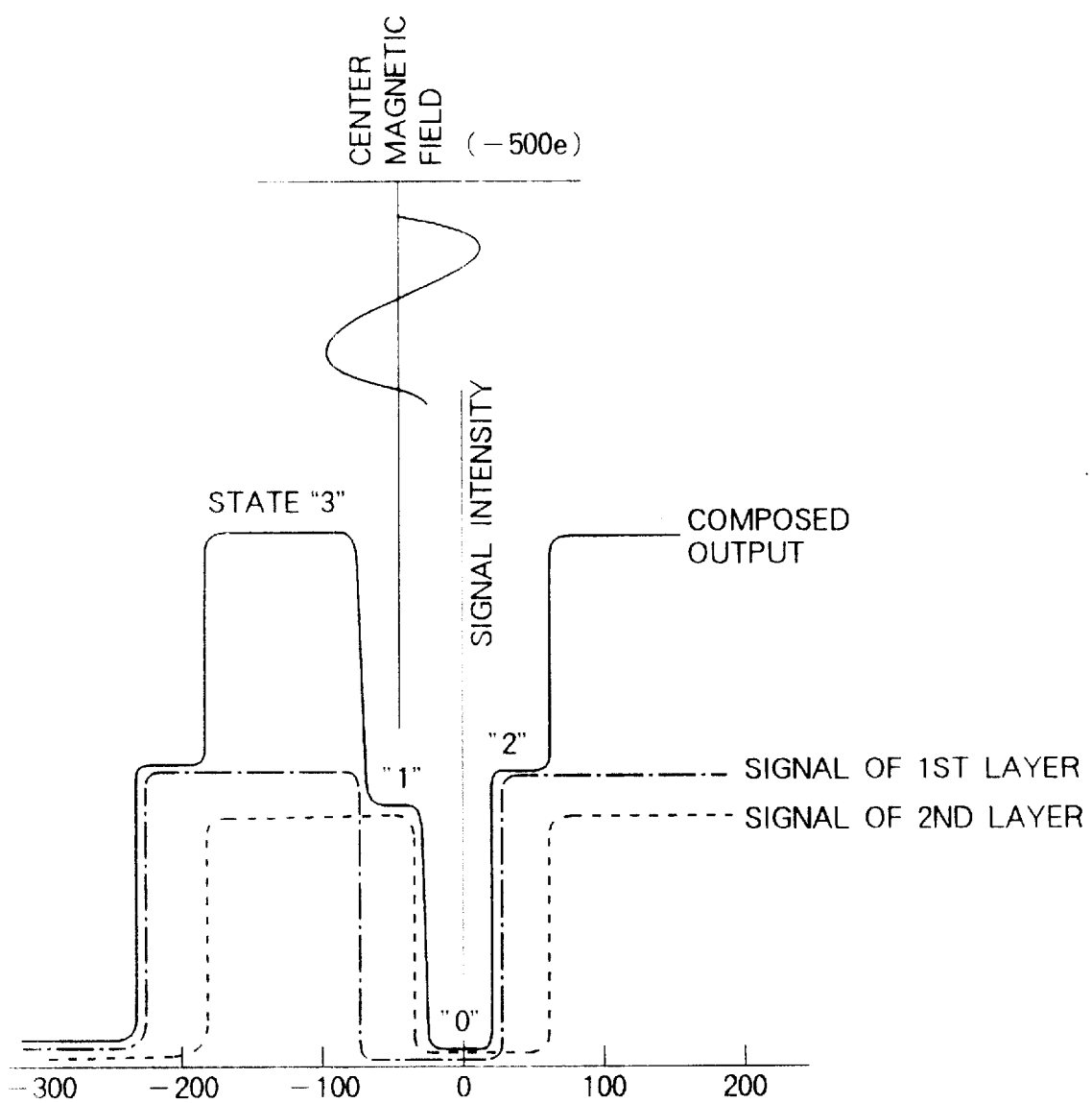

FIG. 148 is an explanatory diagram showing a third example of the multi-valued recording principle of an optomagnetic recording medium according to the present invention.

FIG. 149A is a diagram for explaining the state of magnetization in an initial state and the state of magnetization at the time of recording.

FIG. 149B is a diagram for explaining a shift caused by exchange coupling.

FIG. 149C is an explanatory diagram showing an unrecorded-recorded transition region.

FIG. 149D is a diagram showing a relationship between an external magnetic field and a relative output signal characteristic.

BEST MODE FOR CARRYING OUT THE INVENTION

First, typical examples of an optomagnetic recording medium for multi-valued recording according to the present invention will be explained on the basis of FIGS. 3 to 8.

As exemplified in FIGS. 3 to 8, an optomagnetic recording medium for multi-valued recording according to the present invention is characterized in that a recording layer is formed not by the deposition of a plurality of magnetic layers having different coercive forces as in the known optomagnetic recording medium for multi-valued recording but by a plurality of magnetic layers having the following magnetization characteristic when a temperature and an external magnetic field exerted on the recording layer (or magnetic layers) are changed or by the combination of these magnetic layers with non-magnetic layers. Namely, in a high-temperature condition, each of at least three different magnetic field regions according to the change of the applied external magnetic field provides a recording state in which the total magnetization is stable. On the other hand, in a low-temperature condition, at least three states of magnetization stably exist under the condition of the external magnetic field of zero and in accordance with the magnitude of the external magnetic field applied at the time of high temperature. In other words, as apparent from FIGS. 3 to 8, it can also be said that the recording layer is formed by the plurality of magnetic layers having the configuration of a hysteresis loop in the high-temperature condition separated into three or more regions, or by the combination of these magnetic layers with non-magnetic layers.

Figure 3C:
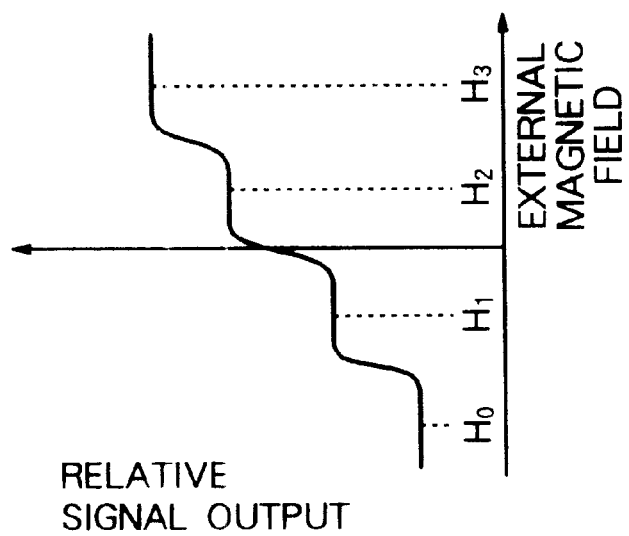
FIGS. 3A, 3B and 3C are explanatory diagrams exemplifying a relationship between the film construction of an optomagnetic recording medium according to the present invention and a magnetization characteristic thereof.
Figure 3B:
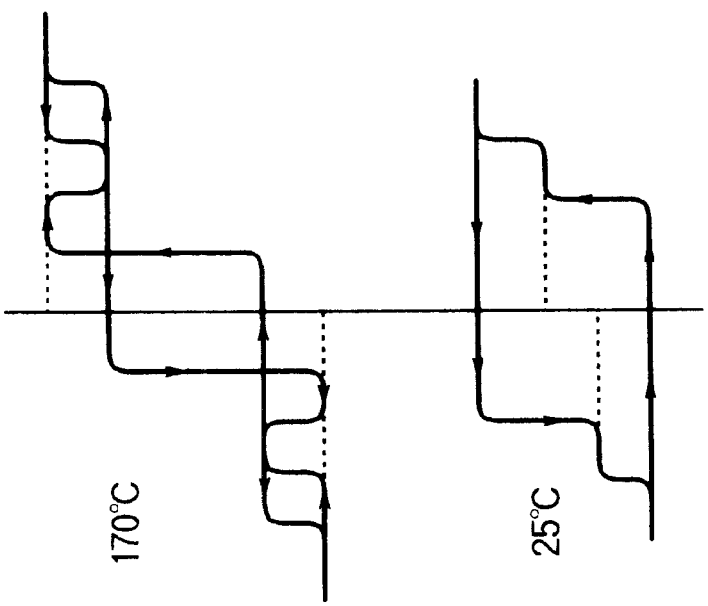
Figure 3A:
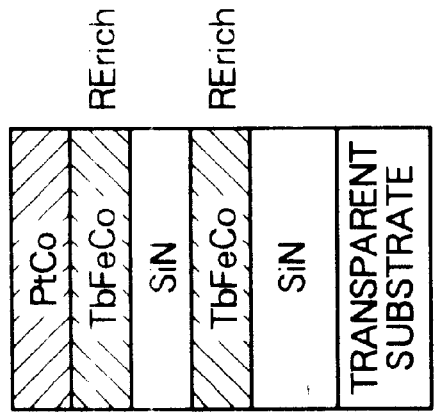

An optomagnetic recording medium shown in FIG. 3A includes an SiN film, an RE (rare earth metal) rich TbFeCo film, an SiN film, an RE rich TbFeCo film and a PtCo film which are laminated successively in the mentioned order from the side of a transparent substrate. The lower TbFeCo film is a first magnetic layer, the upper TbFeCo film is a second magnetic layer and the PtCo film is an auxiliary magnetic layer for the second magnetic layer. Hysteresis loops of the optomagnetic recording medium of the present example in a high-temperature condition (or at 170° C.) and a low-temperature condition (or at 25° C.) exhibit forms as shown in FIG. 3B, and a magnetization characteristic thereof exhibits a form as shown in FIG. 3C. Accordingly, the 4-valued recording of a signal becomes possible by assigning the recording states of "0", "1", "2" and "3" to $H_0$, $H_1$, $H_2$ and $H_3$, respectively.

Figure 4C:
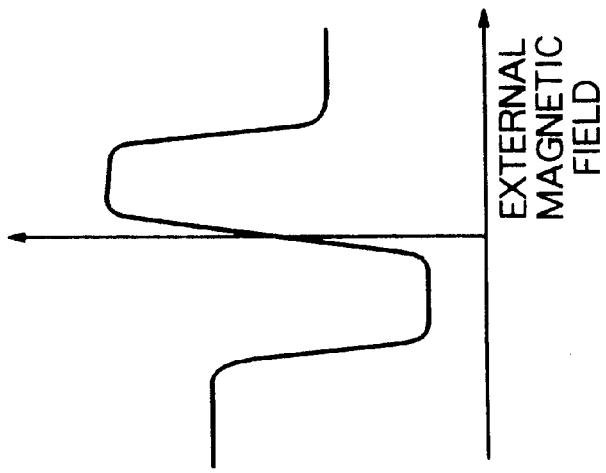
FIGS. 4A, 4B and 4C are explanatory diagrams exemplifying a relationship between the film construction of another optomagnetic recording medium according to the present invention and a magnetization characteristic thereof.
Figure 4B:
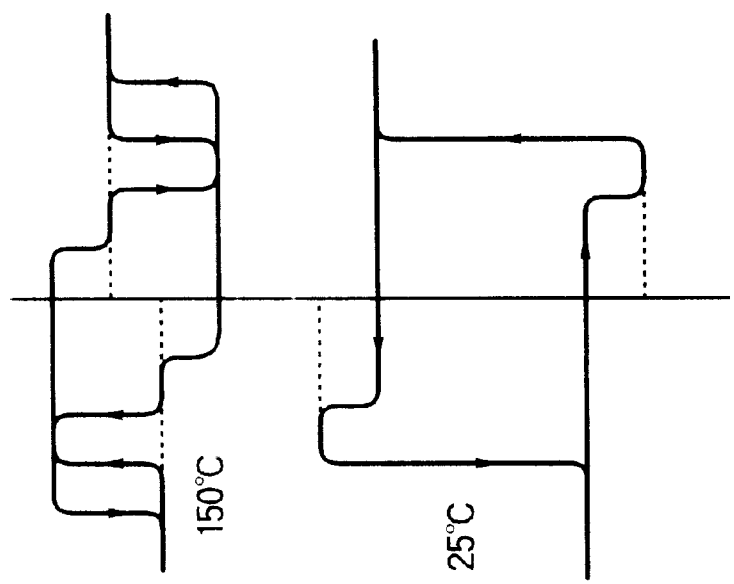
Figure 4A:
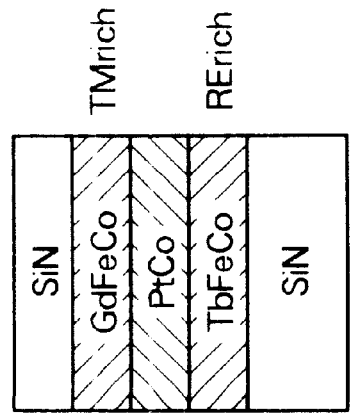

An optomagnetic recording medium shown in FIG. 4A includes an SiN film, an RE rich TbFeCo film, a PtCo film, a TM (transition metal) rich GdFeCo film and an SiN film which are laminated successively in the mentioned order from the side of a transparent substrate (not shown). The TbFeCo film is a first magnetic layer, the GdFeCo film is a second magnetic layer and the PtCo film is an auxiliary magnetic layer for the first magnetic layer and the second magnetic layer. Hysteresis loops of the optomagnetic recording medium of the present example in a high-temperature condition (or at 50° C.) and a low-temperature condition (or at 25° C.) exhibit forms as shown in FIG. 4B, and a magnetization characteristic thereof exhibits a form as shown in FIG. 4C. Accordingly, the 4-valued recording of a signal becomes possible by assigning the recording states of "0", "1", "2" and "3" to $H_0$, $H_1$, $H_2$ and $H_3$, respectively.

Figure 5C:
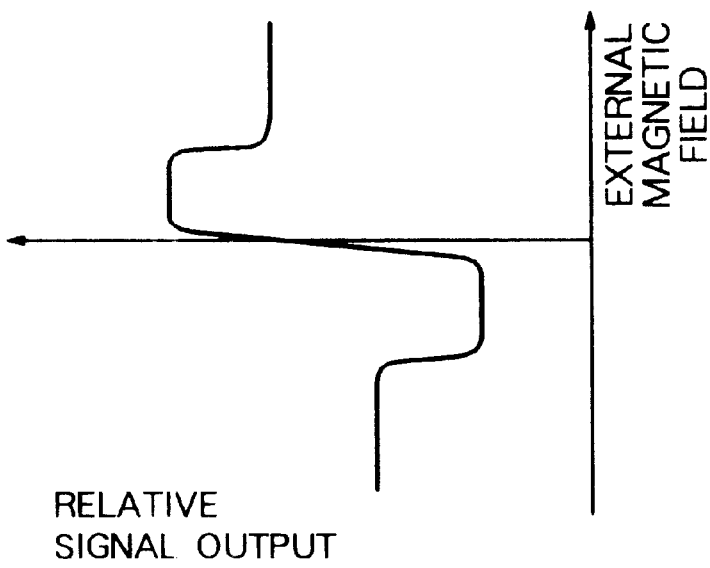
FIGS. 5A, 5B and 5C are explanatory diagrams exemplifying a relationship between the film construction of a further optomagnetic recording medium according to the present invention and a magnetization characteristic thereof.
Figure 5B:
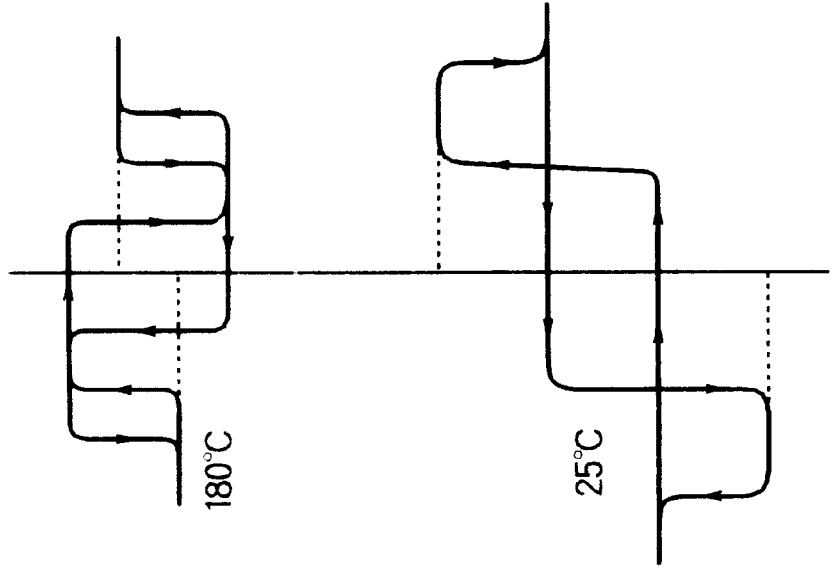
Figure 5A:
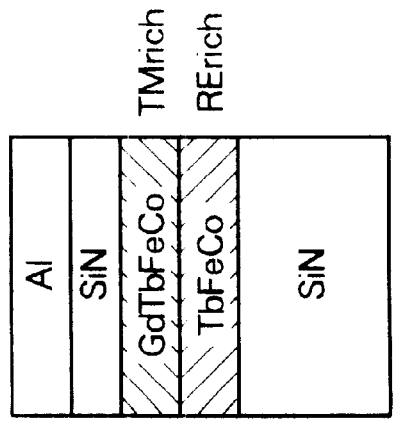

An optomagnetic recording medium shown in FIG. 5A includes an SiN film, an RE rich TbFeCo film, a TM rich GdTbFeCo film, an SiN film and an Al film which are laminated successively in the mentioned order from the side of a transparent substrate (not shown). The TbFeCo film is a first magnetic layer and the GdTbFeCo film is a second magnetic layer. Hysteresis loops of the optomagnetic recording medium of the present example in a high-temperature condition (or at 180° C.) and a low-temperature condition (or at 25° C.) exhibit forms as shown in FIG. 5B, and a magnetization characteristic thereof exhibits a form as shown in FIG. 5C. Accordingly, the 4-valued recording of a signal becomes possible by assigning the recording states of "0", "1", "2" and "3" to $H_0$, $H_1$, $H_2$ and $H_3$, respectively.

Figure 6C:
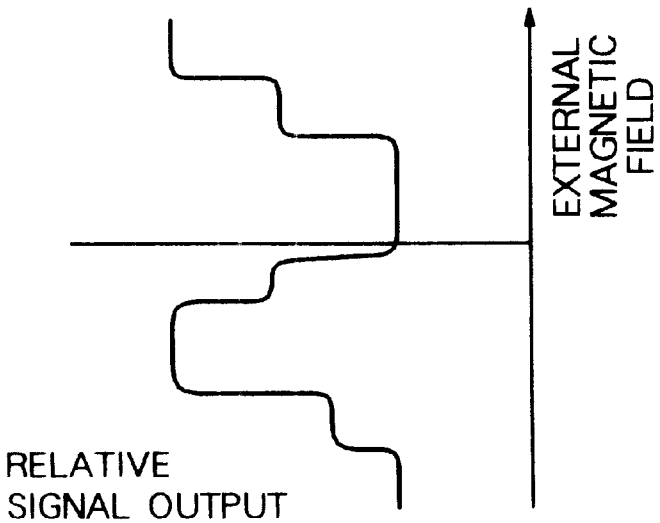
FIGS. 6A, 6B and 6C are explanatory diagram exemplifying a relationship between the film construction of a still further optomagnetic recording medium according to the present invention and a magnetization characteristic thereof.
Figure 6B:
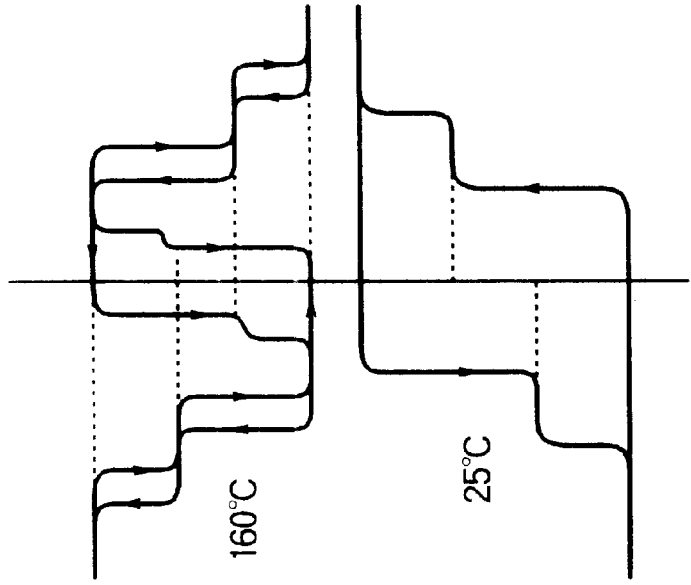
Figure 6A:
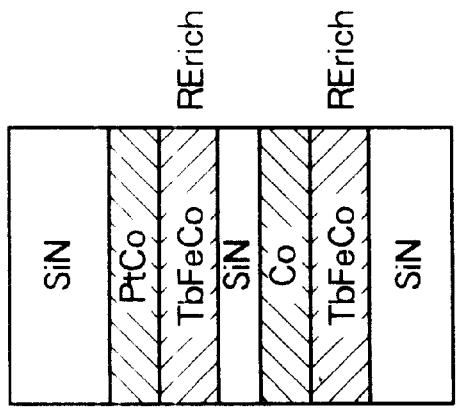

An optomagnetic recording medium shown in FIG. 6A includes an SiN film, an RE rich TbFeCo film, a Co film, an SiN film, a RE rich TbFeCo film, a PtCo film and an SiN film which are laminated successively in the mentioned order from the side of a transparent substrate (not shown). The lower TbFeCo film is a first magnetic layer, the Co film is an auxiliary magnetic layer for the first magnetic layer, the upper TbFeCo film is a second magnetic layer and the PtCo film is an auxiliary magnetic layer for the second magnetic layer. Hysteresis loops of the optomagnetic recording medium of the present example in a high-temperature condition (or at 170° C.) and a low-temperature condition (or at 25° C.) exhibit forms as shown in FIG. 6B, and a magnetization characteristic thereof exhibits a form as shown in FIG. 6C. Accordingly, the 5-valued recording of a signal becomes possible by assigning the recording states of "0", "1", "2", "3", and "4", to $H_0$, $H_1$, $H_2$, $H_3$ and $H_4$, respectively.

Figure 7C:
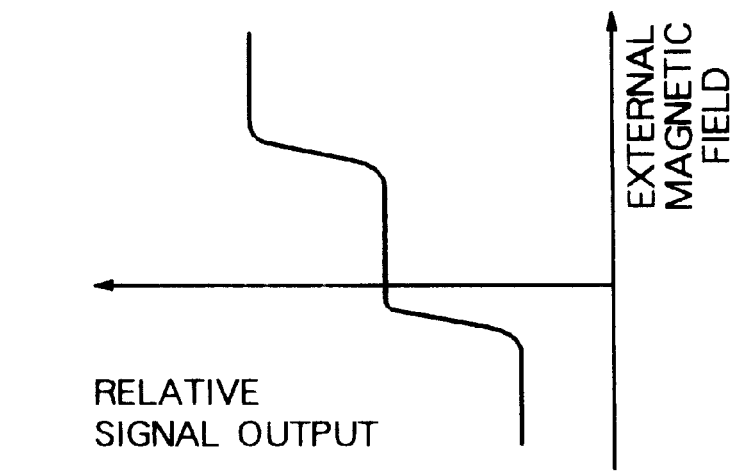
FIGS. 7A, 7B and 7C are explanatory diagrams exemplifying a relationship between the film construction of a furthermore optomagnetic recording medium according to the present invention and a magnetization characteristic thereof.
Figure 7B:
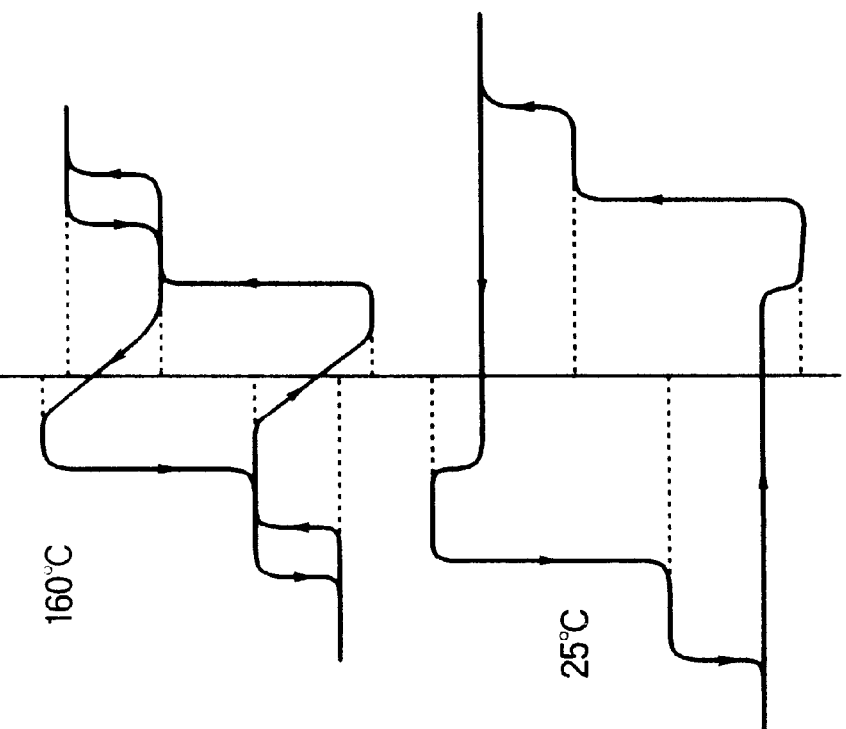
Figure 7A:
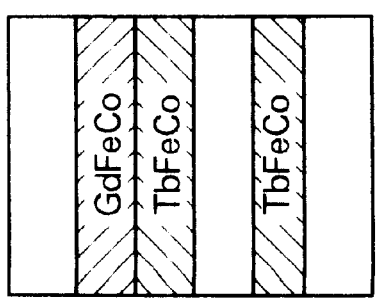

An optomagnetic recording medium shown in FIG. 7A includes an SiN film, a TM rich TbFeCo film, an SiN film, a TM rich TbFeCo film, an RE rich GdFeCo film and an SiN film which are laminated successively in the mentioned order from the side of a transparent substrate (not shown). The lower TbFeCo film is a first magnetic layer, the upper TdFeCo film is a second magnetic layer and the GdFeCo film is an auxiliary magnetic layer for the second magnetic layer. Hysteresis loops of the optomagnetic recording medium of the present example in a high-temperature condition (or at 160° C.) and a low-temperature condition (or at 25° C.) exhibit forms as shown in FIG. 7B, and a magnetization characteristic thereof exhibits a form as shown in FIG. 7C. Accordingly, the 3-valued recording of a signal becomes possible by assigning the recording states of "0", "1" and "2" to $H_0$, $H_1$ and $H_2$, respectively.

Figure 8C:
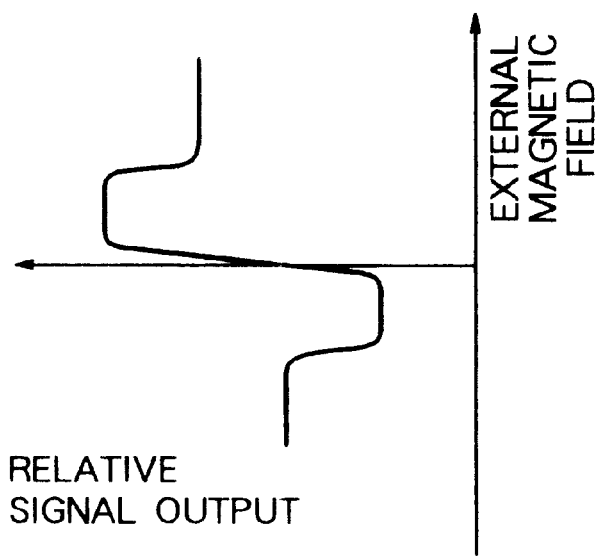
FIGS. 8A, 8B and 8C are explanatory diagrams exemplifying a relationship between the film construction of a still furthermore optomagnetic recording medium according to the present invention and a magnetization characteristic thereof.
Figure 8B:
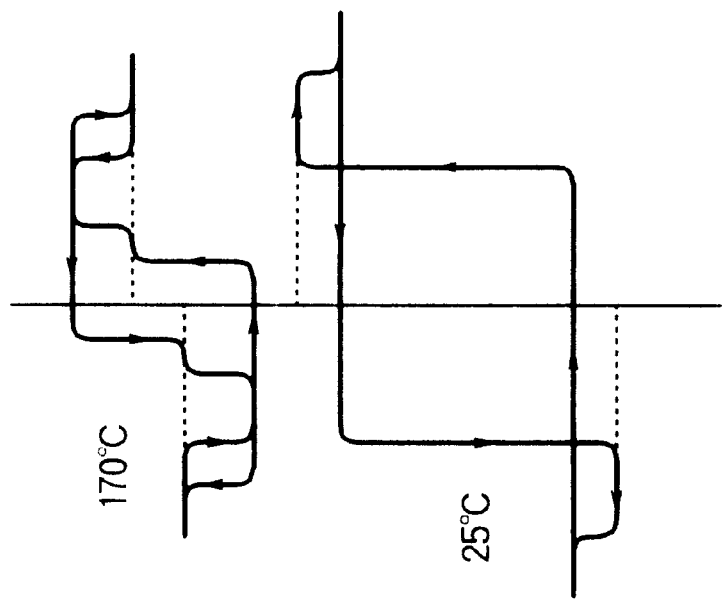
Figure 8A:
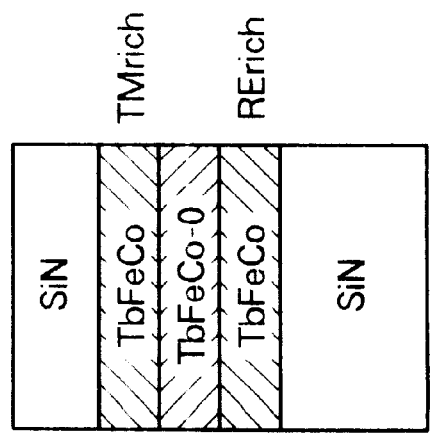

An optomagnetic recording medium shown in FIG. 8A includes an SiN film, an RE rich TbFeCo film, a TbFeCo-O film (or oxidized TbFeCo film), a TM rich TbFeCo film and an SiN film which are laminated successively in the mentioned order from the side of a transparent substrate (not shown). The lower TbFeCo film is a first magnetic layer, the upper TbFeCo film is a second magnetic layer and the oxidized TbFeCo film is an auxiliary magnetic layer for the first and second magnetic layers. Hysteresis loops of the optomagnetic recording medium of the present example in a high-temperature condition (or at 170° C.) and a low-temperature condition (or at 25° C.) exhibit forms as shown in FIG. 8B, and a magnetization characteristic thereof exhibits a form as shown in FIG. 8C. Accordingly, the 4-valued recording of a signal becomes possible by assigning the recording states of "0", "1", "2" and "3" to $H_0$, $H_1$, $H_2$ and $H_3$, respectively.

It is most preferable that the material of the magnetic layer is an amorphous alloy of a rare earth metal and a transition metal, as exemplified in FIGS. 3 to 8. However, the magnetic layer material applicable to the present invention is not limited to such an alloy. There can be used a garnet series or ferrite series oxide magnetic substance, the alternate deposition of a noble metal such as Pt or Pd and a transition metal such as Fe or Co and/or a rare earth metal such as Tb or Gd, a Heuslar alloy such as PtMnSb, or another material such as MnBi which has a large magneto-optical effect and a thin film of which can be formed. Also, in the case where a magnetic layer on the side irradiated with a laser beam is made of a metal, it is required that the magnetic layer should be made sufficiently thin so as to allow the sufficient transmission of the laser beam therethrough. It is desired that the thickness of the magnetic layer is not larger than 500 Å or more preferably not larger than 250 Å.

Next, the principle of multi-valued recording for the optomagnetic recording medium according to the present invention will be explained on the basis of hysteresis loops shown in FIGS. 1A and 1B. FIG. 1A shows a typical hysteresis loop of the optomagnetic recording medium according to the present invention at the time of low temperature (the room temperature or a temperature range until the time of irradiation with a reproducing laser beam), and FIG. 1B shows a typical hysteresis loop thereof at the time of high temperature (a temperature range at the time of rewriting of information).

At the time of high temperature, this optomagnetic recording medium is such that the magnetization takes single-values of $M_0'$, $M_1'$, $M_2'$ and $M_3'$ for four external magnetic field regions of $H_0'$, $H_1'$, $H_2'$ and $H_3'$, respectively, as shown in FIG. 1B. On the other hand, at the time of low-temperature, a large hysteresis loop includes one region. In this loop, if an external magnetic field is applied starting from the magnetization state of $M_0$ and is turned into 0 after reaches the magnitude of $H_3$, the magnetization state $M_3$ is assumed. And, when there is performed an operation of returning the external magnetic field to 0 at a stage in which the external magnetic field reaches the magnitude of $H_2$, that is, an operation of generating a small hysteresis loop, the magnetization state of $M_2$ stably exists. Also, if an external magnetic field is applied in a negative direction starting from the magnetization state of $M_3$ and is turned into zero after it reaches the magnitude of $H_0$, the magnetization state of $M_0$ is assumed. And, when the external magnetic field is returned to 0 at a stage in which it reaches the magnitude of $H_1$, the magnetization state of $M_1$ stably exists. Thus, in the low temperature region, four magnetization states of $M_0'$, $M_1'$, $M_2'$ and $M_3'$ stably exist by virtue of the large hysteresis loop and the small hysteresis loops when the external magnetic field is 0. Accordingly, the 4-valued recording of a signal becomes possible by assigning the recording states of "0", "1", "2" and "3", to $H_0$, $H_1$, $H_2$ and $H_3$, respectively, as shown in FIG. 2.

Further, it is apparent from FIG. 1B that whatever state the state of magnetization before the recording of a certain signal is, the rising of the temperature of the optomagnetic recording medium up to the high-temperature condition and the application of a predetermined external magnetic field necessary for obtaining a stable magnetization state result in that the magnetization of the magnetic layer after the lowering of the temperature assumes a magnetization state corresponding to the magnitude of the applied external magnetic field irrespective of the previous hysteresis. In the optomagnetic recording medium of the present invention, therefore, the direct overwriting of information or the direct writing of new information onto the earlier recorded information without erasing the earlier recorded information is possible.

Since it is proper to set a temperature at the time of rewriting of information to a value not lower than the temperature of a portion irradiated with a reproducing laser beam, the definition of the hysteresis loop in the above-mentioned high temperature region may be realized at any temperature between the temperature of the portion irradiated with the reproducing laser beam and a Curie temperature. Usually, the temperature of the portion irradiated with the reproducing laser beam is not lower than 80° C.

In all of the optomagnetic recording media having the film structures exemplified in FIGS. 3 to 8 as well as the optomagnetic recording medium having such hysteresis loops as shown in FIG. 1 at the time of high temperature and at the time of low temperature, the multi-valued recording of a signal is possible.

In the following, the examples of the construction of an optomagnetic recording medium for multi-valued recording based on the above-mentioned principle will be enumerated and explained.

[First Example Of Construction]

As shown in FIG. 9A, an optomagnetic recording medium according to the present example includes a transparent substrate 1 having a desired preformat pattern 2 formed on one surface thereof, a first dielectric layer 3 formed on the preformat pattern 2, a first magnetic layer 4 formed on the first dielectric layer 3, a second dielectric layer 5 form on the first magnetic layer 4, as required, a second magnetic layer 6 formed on the second dielectric layer 5 or the first magnetic layer 4, a third dielectric layer 7 formed on the second magnetic layer 6, as required, a reflecting layer 8 formed on the second magnetic layer 6 or the third dielectric layer 7, as required, and a protection layer 9 formed on the reflecting layer 8.

As the transparent substrate 1 can be used any known transparent substrate, for example, a substrate made of a transparent resin material such as polycarbonate, poly methyl methacrylate, poly methyl pentene or epoxy and shaped into a desired form, or a glass plate shaped into a desired form and having one surface onto which a transparent resin layer having a desired preformat pattern 2 transferred thereto adheres. Since the construction, arrangement and formation method of the preformat pattern 2 and so forth are known and are not the subject matter of the present example of construction, the explanation thereof will be omitted.

Each of the first, second and third dielectric layers 3, 5 and 7 is provided for causing the multiple interference of a reproducing laser beam in the film to increase an apparent Kerr rotation angle and is formed by an inorganic dielectric having a refraction factor larger than that of the transparent substrate 1. The oxide or nitride of silicon, aluminum, zirconium, titanium or tantalum is particularly preferable as the dielectric layer material. The first dielectric layer 3 is formed with a thickness of 600 Å to 1200 Å. Each of the second and third dielectric layers 5 and 7 is formed with any thickness not larger than 500 Å, as required. The layers 5 and 7 may be omitted if circumstances require.

The reflecting layer 8 is provided for increasing the reflection factor to increase an effective Kerr rotation angle of the medium and adjusting the thermal conductivity to adjust the recording sensitivity of the medium. The reflecting layer 8 is formed by a substance which exhibits a high reflection factor for the reproducing laser beam. Concretely, an alloy including one or more kinds of metal elements selected from a group including Al, Ag, Au, Cu and Be and one or more kinds of metal elements selected from a group including Cr, Ti, Ta, Sn, Si, Rb, Pe, Nb, Mo, Li, Mg, W and Zr is particularly preferable as the reflecting layer material. In the case where such an alloy is used, the reflecting layer 8 is formed with a thickness of 300 Å to 1000 Å.

The protection layer 9 is provided for protecting the film structure or the layers 3 to 8 against mechanical shocks or chemical infections and is deposited covering the whole of the film structure. A resin material can be exemplified as the protection layer material. In particular, an ultraviolet-ray cured resin is preferable since the formation of a film is easy.

The first magnetic layer 4 is formed by a vertically magnetized amorphous film of 20 to 500 Å thickness made of a rare earth element-transition metal series amorphous alloy. It is particularly preferable that the composition of the first magnetic layer 4 is represented by the following general expression:

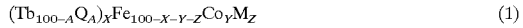

$$(Tb_{100-A}Q_A)_X Fe_{100-X-Y-Z} Co_Y M_Z \qquad (1)$$

where X, Y, Z and A satisfy 15 atomic $\% \leq X \leq 35$ atomic %, 5 atomic $\% \leq Y \leq 15$ atomic %, 0 atomic $\% \leq Z \leq 10$ atomic %, and 0 atomic $\% \leq A \leq 20$ atomic %, Tb is terbium which is a rare earth element, Fe is iron which is a transition metal, Co is cobalt which is a transition metal, M is at least one kind of element selected from Nb, Cr, Pt, Ti and Al, and Q is at least one kind of element selected from Gd, Nd and Dy.

In the rare earth element-transition metal series amorphous alloy having such a composition, a transition region between a recorded state and an unrecorded state in the change of a relative signal output for an external magnetic field is almost positioned in the vicinity of the magnetic field of zero, as shown in FIG. 9B.

The second magnetic layer 6 is formed by a vertically magnetized amorphous film 6a of 50 to 500 Å thickness made of a rare earth element-transition metal series amorphous alloy and an auxiliary magnetic film 6b of 1 to 100 Å thickness provided adjoining the vertically magnetized amorphous film 6a.

The rare earth element-transition metal series vertically magnetized amorphous film 6a can use a composition represented by a general expression which is the same as that of the first magnetic layer 4. In particular, when the first magnetic layer 4 and the vertically magnetized amorphous film 6a of the second magnetic layer 6 take the same composition, the formation of each of these films becomes very easy so the fabrication cost of the optomagnetic recording medium can be made low.

As specific examples of the auxiliary magnetic film 6b can be enumerated:

(1) a rare earth element-transition metal series vertically magnetized amorphous film, or a rare earth element-transition metal series alloy such as GdFeCo alloy, GdTbFeCo alloy, GdDyFeCo or NdFeCo alloy which contains Gd or Nd;

(2) a rare earth element-transition metal series alloy which contains oxygen or nitrogen in a larger quantity than a usual one (for example, in a quantity equal to or larger than 5 atomic %);

(3) a thin film of an alloy of at least one kind of element selected from a noble element group which includes Pt, Al, Ag, Au, Cu and Rh and at least one kind of element selected from a transition metal group which includes Fe, Co and Ni;

(4) a laminated film of 1 to 30 Å or several-atomic layer thickness made of a simple substance of a transition metal such as Fe, Co or Ni or an alloy which contains such a transition metal in a large quantity; and so forth.

According to the composition, the auxiliary magnetic film 6b exerts an exchange coupling force on the magnetic moment of the transition metal of the vertically magnetized amorphous film 6a laminated adjoining the auxiliary magnetic film 6b. Therefore, in the second magnetic layer 6 including the deposition of the vertically magnetized amorphous film 6a and the auxiliary magnetic film 6b, the change of the relative output of a recording signal for an external magnetic field is such that the transition region between the recorded state and the unrecorded state is shifted from the vicinity of the magnetic field of zero to the direction of a recording magnetic field or the direction of an erasing magnetic field, as shown in FIG. 9C.

Each of the vertically magnetized film 6a and the auxiliary magnetic film 6b formed by a rare earth element-transition metal vertically magnetized amorphous film assumes a ferrimagnetic material in which the magnetic moment of the rare earth element and the magnetic moment of the transition metal are arranged in anti-parallel (or inverse-parallel). Provided that a composition with the magnetic moment of the rare earth element being predominant at the room temperature and a composition with the magnetic moment of the transition metal being predominant at the room temperature are called an RE rich composition and a TM rich composition, respectively, the direction of an exchange coupling magnetic field generated by the magnetic moment of the transition metal of the auxiliary magnetic film 6b at the time of recording or at the time of erasing and hence the direction of shift of the transition region leading between the unrecorded state and the recorded state are determined by whether the auxiliary magnetic film 6b has the RE rich composition or the TM rich composition.

In the case where the auxiliary magnetic film 6b has the RE rich composition, the alignment of the magnetization at the time of initialization in the erasing direction results in that the magnetic moment of the transition metal of the auxiliary magnetic film 6b is directed to the recording direction so that it exerts, on the magnetic moment of the transition metal of the vertically magnetized film 6a, an exchange coupling magnetic field which makes the magnetic moment of the transition metal of the vertically magnetized film 6a parallel to the magnetic moment of the transition metal of the auxiliary magnetic film 6b.

In the case where the vertically magnetized film 6a too has the RE rich composition, the magnetic moment of the transition metal of the vertically magnetized film 6a is also directed to the recording direction at the time of erasing (or at the time of initialization). In order to performing the recording by inverting the total magnetization of the vertically magnetized film 6a parallel to the magnetic moment of the transition metal of the auxiliary magnetic film 6b, it is therefore necessary to invert the magnetic moment of the vertically magnetized film 6a against an exchange coupling magnetic field from the magnetic moment of the transition metal of the auxiliary magnetic film 6b. Thus, a strong external magnetic field is required correspondingly. Namely, in this case, the above-mentioned transition region for the external magnetic field is shifted to the recording magnetic field direction.

On the other hand, in the case where the vertically magnetized film 6a has the TM rich composition, the magnetic moment of the transition metal of the vertically magnetized film 6a is directed to the erasing direction when the magnetization is directed to the erasing direction. Therefore, the magnetic moment of the transition metal of the vertically magnetized film 6a becomes inversely parallel to the magnetic moment of the transition metal of the auxiliary magnetic film 6b. Between the vertically magnetized film 6a and the auxiliary magnetic film 6b is generated an interfacial magnetic domain wall or a region in which magnetic moments are arranged at a fixed angle to provide a bridge between the inversely parallel magnetic moments. This region takes a higher energy state than a parallel state.

When the recording is performed, the magnetization of the vertically magnetized film 6a is inverted and the magnetic moment of the transition metal of the vertically magnetized film 6a is also inverted correspondingly so that it becomes parallel to the magnetic moment of the transition metal of the auxiliary magnetic film 6b. But, the interfacial magnetic domain wall energy acts to assist the inversion of the magnetic moment of the transition metal of the vertically magnetized film 6a. In this case, therefore, the transition region for an external magnetic field is shifted to the erasing magnetic field direction.

Similarly, in the case where the auxiliary magnetic film 6b has the TM rich composition and the vertically magnetized film 6a has the RE rich composition, the transition region is shifted to the erasing magnetic field direction. Also, in the case where the auxiliary magnetic film 6b has the TM rich composition and the vertically magnetized film 6a has the TM rich composition, the transition region is shifted to the recording magnetic field direction.

The amount of shift of the transition region can be adjusted by changing the composition or thickness of the auxiliary magnetic film 6b. Accordingly, various optomagnetic recording media different from each other in magnetic field region for recording state can be fabricated by properly combining various auxiliary magnetic films 6b different from each other in the direction of shift and the amount of shift of the transition region and various vertically magnetized films 6a different from each other in composition. FIGS. 10A to 10Y show various optomagnetic recording media different in combination of the vertically magnetized film 6a and the auxiliary magnetic film 6b and magnetic field regions for recording states.

The deposition positions of the first magnetic layer 4 and the second magnetic layer 6 can be interchanged. If the deposition positions of the first magnetic layer 4 and the second magnetic layer 6 are interchanged, the magnitude of the Kerr rotation angle of each recording state corresponding to the magnitude of an external magnetic field or the magnitude of an irradiation laser power at the time of recording changes but the multi-valued recording of a signal is possible or there is no change in a characteristic and an effect as an optomagnetic recording medium. Also, the multi-valued recording of higher order is possible by laminating the magnetic layers with the number thereof equal to or larger than 3. Corresponding thereto, the composition of each film may be changed properly.

In the following, more specific embodiments of an optomagnetic recording medium belonging to the present example will be shown.

[First Embodiment]

Figure 11:
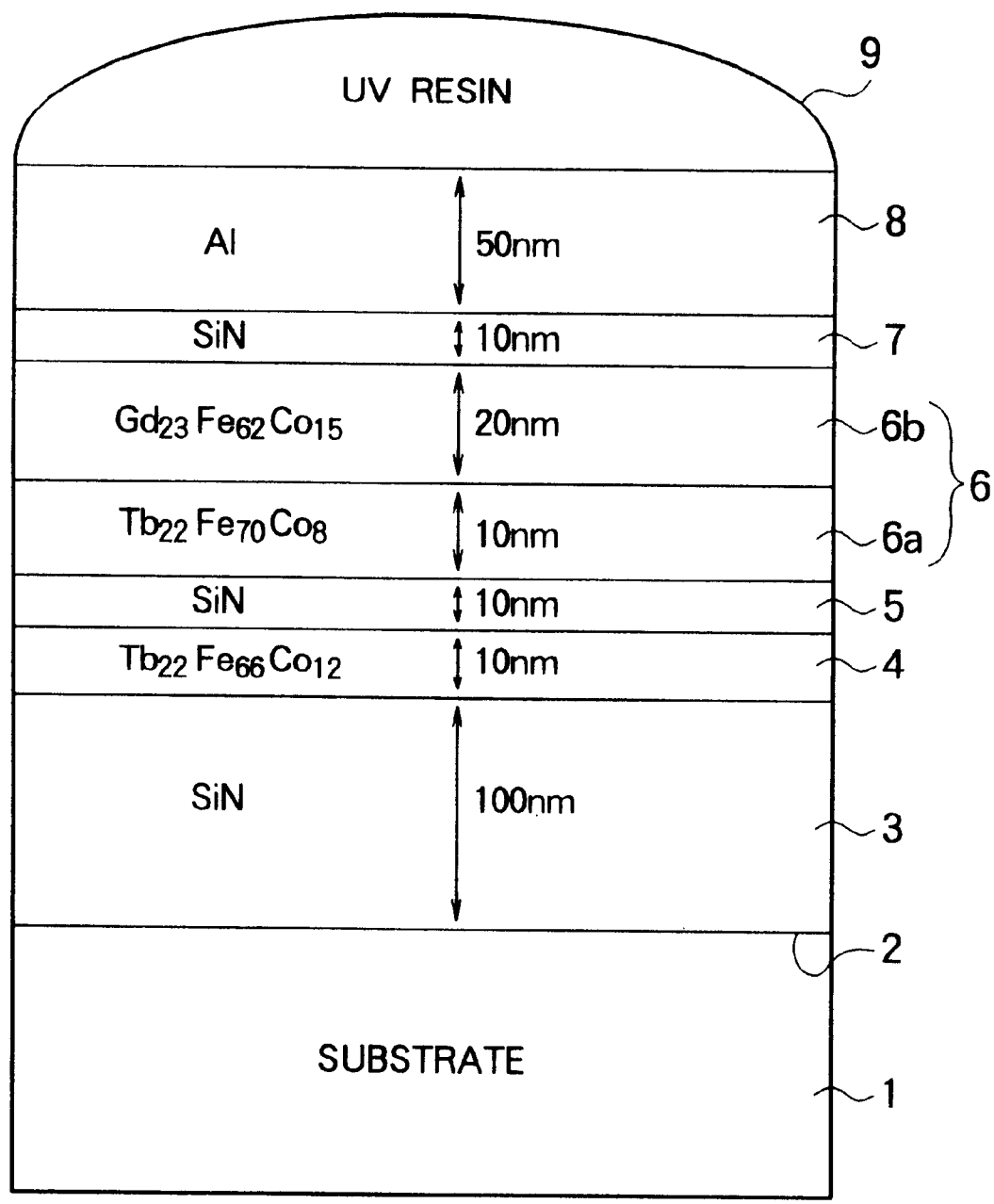
FIG. 11 is the cross section of a main part schematically showing an optomagnetic recording medium according to a first embodiment.

As shown in FIG. 11, an optomagnetic recording medium of the present embodiment includes an SiN film of 100 nm thickness, a $Tb_{22}Fe_{66}Co_{12}$ (herein and hereinafter, subscript number representing atomic %) film of 10 nm thickness, an SiN film of 10 nm thickness, a $Tb_{22}Fe_{70}Co_8$ film of 10 nm thickness, a $Gd_{23}Fe_{62}Co_{15}$ film of 20 nm thickness, an SiN film of 10 nm thickness and an Al film of 50 nm thickness which are laminated successively in the mentioned order on a surface 2 of a transparent substrate 1 having a preformat pattern formed thereon. These films are covered with an ultraviolet-ray cured resin film.

The SiN film of 100 nm thickness forms a first dielectric layer 3, and the two SiN films of 10 nm thickness form second and third dielectric layers 5 and 7, respectively. The $Tb_{22}Fe_{66}Co_{12}$ film forms a first magnetic layer 4 in the form of a single layer. In the first magnetic layer 4, one recording state exists in a specified magnetic field region. The directly laminated $Tb_{22}Fe_{70}Co_8$ film and $Gd_{23}Fe_{62}Co_{15}$ film form a second magnetic layer 6 and have Curie temperatures of 180° C. and 320° C., respectively. Thus, the Curie temperature of the auxiliary magnetic film is set to a value at least equal to or higher than that of the vertically magnetized film in order that the auxiliary magnetic film can exert an exchange coupling force on the vertically magnetized film. In the second magnetic layer 6, one recording state exists in a magnetic field region which is different from that for the first magnetic layer 4. Further, the Al film forms a reflecting layer 8 and the ultraviolet-ray cured resin film forms a protection film 9.

In the optomagnetic recording medium of the present embodiment, each of the $Tb_{22}Fe_{66}Co_{12}$ film forming the first magnetic layer 4 and the $Tb_{22}Fe_{70}Co_8$ film and the $Gd_{23}Fe_{62}Co_{15}$ film forming the second magnetic layer 6 has a TM rich composition. Therefore, the optomagnetic recording medium of the present embodiment exhibits the change of a recorded signal for an external magnetic field corresponding to FIGS. 10W, 10X and 10Y. The optomagnetic recording medium of the present embodiment has a merit that a large signal amplitude can be obtained, as apparent from FIGS. 10W, 10X and 10Y.

[Second Embodiment]

Figure 12:
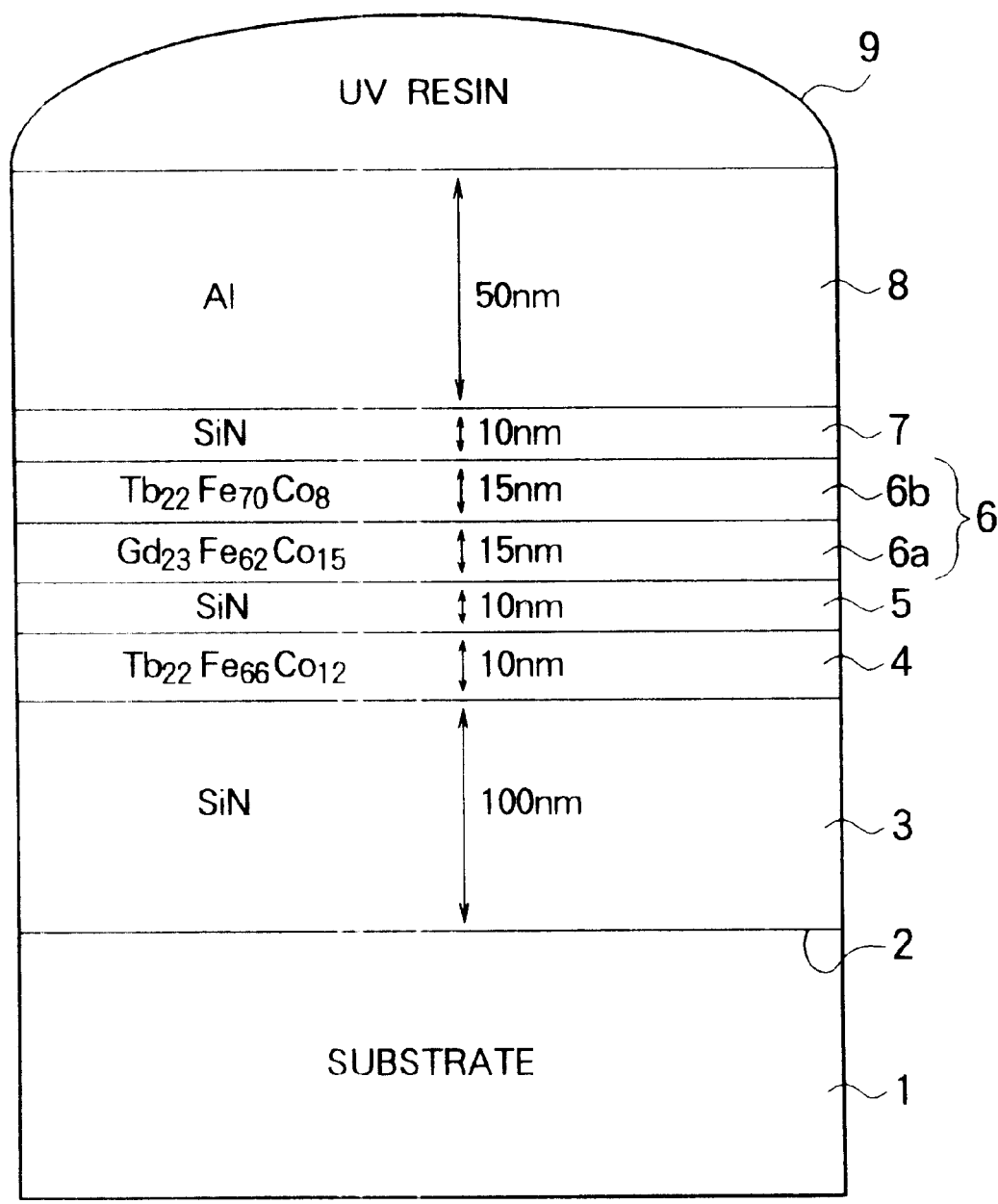
FIG. 12 is the cross section of a main part schematically showing an optomagnetic recording medium according to a second embodiment.

As shown in FIG. 12, an optomagnetic recording medium of the present embodiment includes an SiN film of 100 nm thickness, a $Tb_{22}Fe_{66}Co_{12}$ film of 10 nm thickness, an SiN film of 10 nm thickness, a $Gd_{23}Fe_{62}Co_{15}$ film of 15 nm thickness, a $Tb_{22}Fe_{70}Co_8$ film of 15 nm thickness, an SiN film of 10 nm thickness and an Al film of 50 nm thickness which are laminated successively in the mentioned order on a surface 2 of a transparent substrate 1 having a preformat pattern formed thereon. These films are covered with an ultraviolet-ray cured resin film.

The SiN film of 100 nm thickness forms a first dielectric layer 3, and the two SiN films of 10 nm thickness form second and third dielectric layers 5 and 7, respectively. The $Tb_{22}Fe_{66}Co_{12}$ film forms a first magnetic layer 4 in the form of a single layer. In the first magnetic layer 4, one recording state exists in a specified magnetic field region. The directly laminated $Gd_{23}Fe_{62}Co_{15}$ film and $Tb_{22}Fe_{70}Co_8$ film form a second magnetic layer 6. In the second magnetic layer 6, one recording state exists in a magnetic field region which is different from that for the first magnetic layer 4. Further, the Al film forms a reflecting layer 8 and the ultraviolet-ray cured resin film forms a protection film 9.

The optomagnetic recording medium of the present embodiment is characterized in that the $Gd_{23}Fe_{62}Co_{15}$ film as an auxiliary magnetic film is arranged nearer to the laser beam incidence side than the $Tb_{22}Fe_{70}Co_8$ film forming a vertically magnetized film of the second magnetic layer 6. The Kerr rotation angle of the $Gd_{23}Fe_{62}Co_{15}$ film is larger than that of the $Tb_{22}Fe_{70}Co_8$ film. Accordingly, in an optomagnetic recording medium including an auxiliary magnetic film and a vertically magnetized film, it is possible to obtain a larger signal amplitude when the auxiliary magnetic film is arranged nearer to the laser beam incidence side than the vertically magnetized film.

[Third Embodiment]

Figure 13:
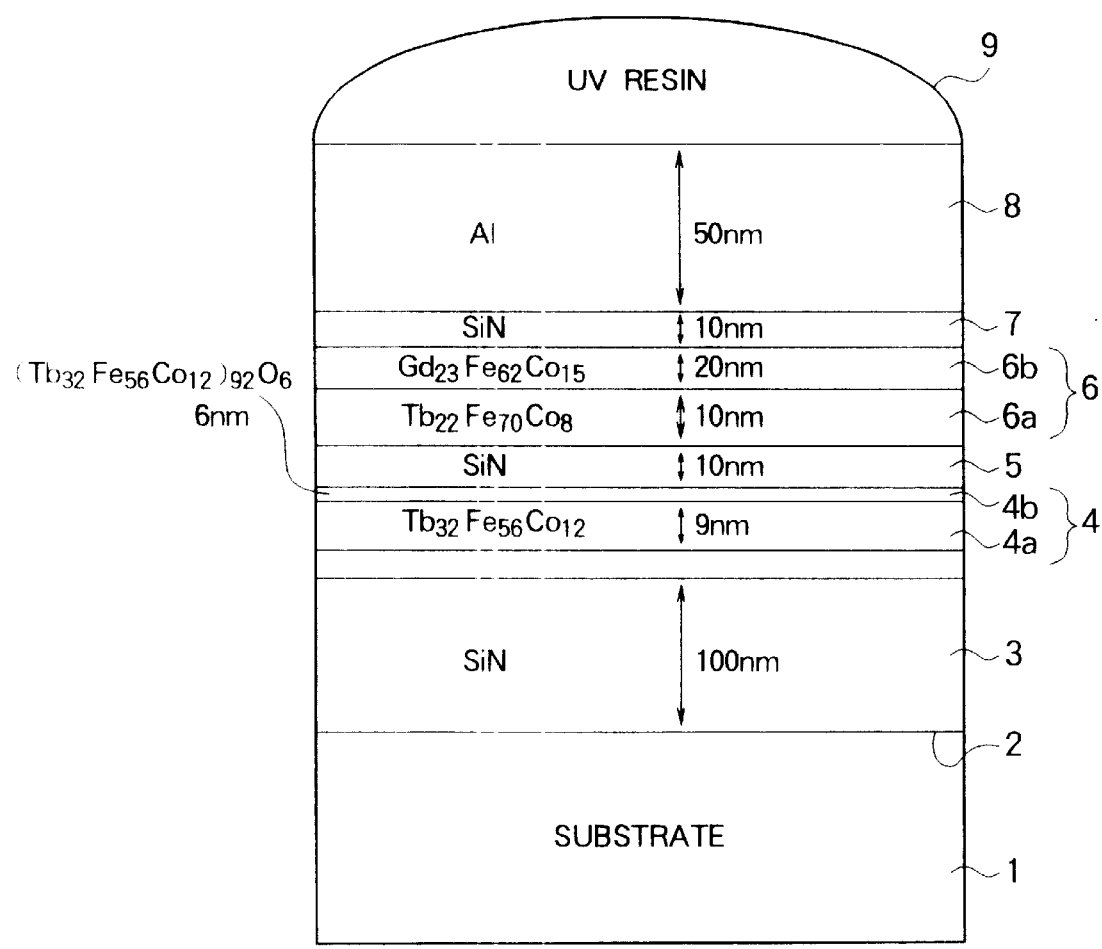
FIG. 13 is the cross section of a main part schematically showing an optomagnetic recording medium according to a third embodiment.

As shown in FIG. 13, an optomagnetic recording medium of the present embodiment has a structure in which an SiN film of 100 nm thickness, a $Tb_{32}Fe_{56}Co_{12}$ film of 9 nm thickness, a $(Tb_{32}Fe_{56}Co_{12})_{92}$—$O_8$ film of 6 nm thickness, an SiN film of 10 nm thickness, a $Tb_{22}Fe_{70}Co_8$ film of 10 nm thickness, a $Gd_{23}Fe_{62}Co_{15}$ film of 20 nm thickness, an SiN film of 10 nm thickness and an Al film of 50 nm thickness are laminated successively in the mentioned order on a surface 2 of a transparent substrate 1 having a preformat pattern formed thereon and these films are covered with an ultraviolet-ray cured resin film.

The SiN film of 100 nm thickness forms a first dielectric layer 3, and the two SiN films of 10 nm thickness form second and third dielectric layers 5 and 7, respectively. The directly laminated $Tb_{32}Fe_{56}Co_{12}$ film and $(Te_{32}Fe_{56}Co_{12})_{92}$—$O_8$ film form a first recording layer 4. In the first recording layer 4, two recording states exist respectively in specified magnetic field regions. Also, the directly laminated $Tb_{22}Fe_{70}Co_8$ film and $Gd_{23}Fe_{62}Co_{15}$ film form a second recording layer 6. In the second recording layer 6, one recording state exists in a magnetic field region which is different from those for the first magnetic layer 4. Further, the Al film forms a reflecting layer 8 and the ultraviolet-ray cured resin film forms a protection film 9.

The transition region of the first recording layer 4 is shifted to the erasing side as compared with the magnetic field of zero, and the transition region of the second recording layer 6 is shifted to the recording side as compared with the magnetic field of zero. Accordingly, when two layers of the recording layers 4 and 6 are laminated, it is possible to allow the amplitude center of a modulated magnetic field at the time of recording to come near zero. In the present embodiment, the $(Tb_{32}Fe_{56}Co_{12})_{92}$—$O_8$ film is used as the auxiliary magnetic film for the first recording layer 4 with the thickness thereof set to 6 nm in order that the amount of incidence of a laser beam onto the second recording layer 6 is not reduced.

[Fourth Embodiment]

Figure 14:
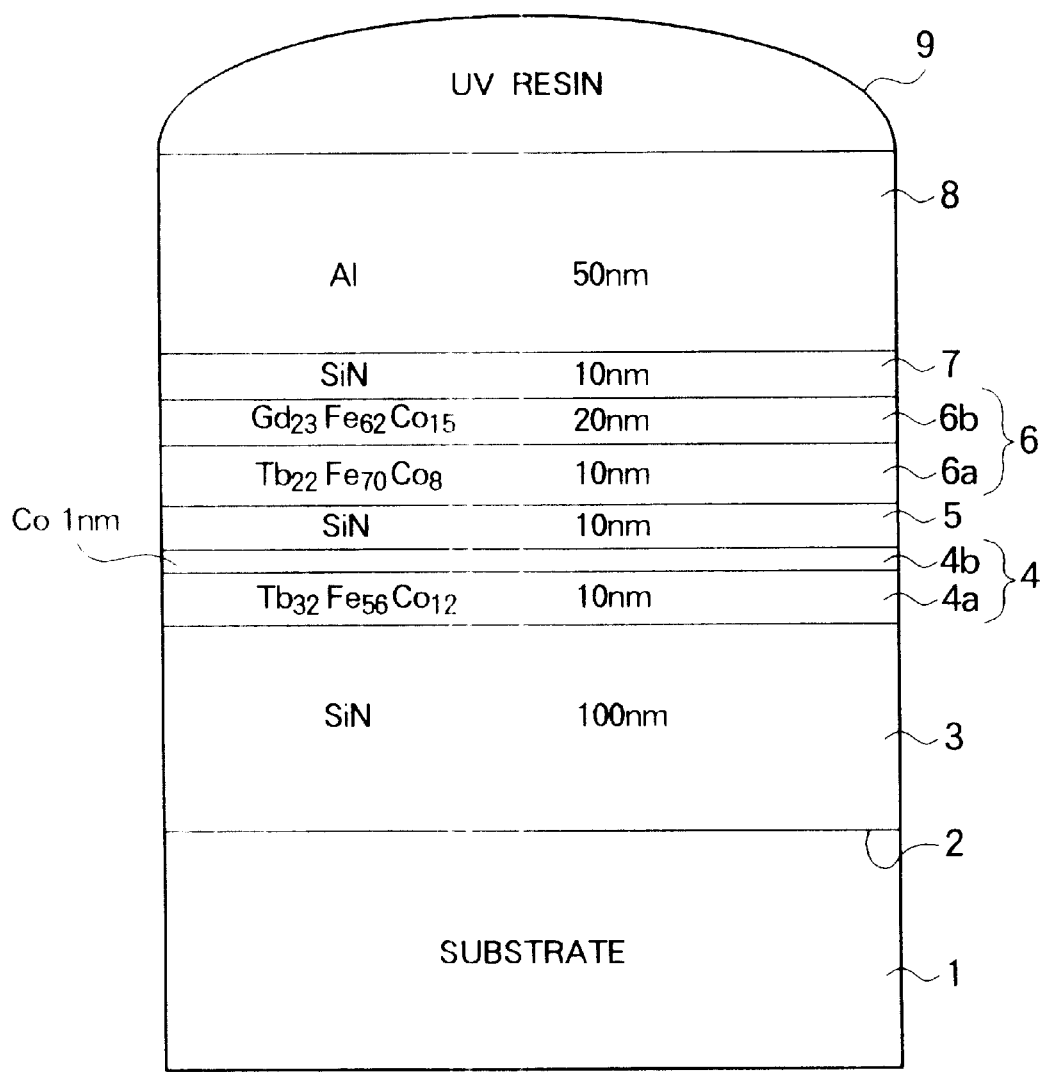
FIG. 14 is the cross section of a main part schematically showing an optomagnetic recording medium according to a fourth embodiment.

As shown in FIG. 14, an optomagnetic recording medium of the present embodiment has a structure in which an SiN film of 100 nm thickness, a $Tb_{22}Fe_{56}Co_{12}$ film of 10 nm thickness, a Co film of 1 nm thickness, an SiN film of 10 nm thickness, a $Tb_{22}Fe_{70}Co_8$ film of 10 nm thickness, a $Gd_{23}Fe_{62}Co_{15}$ film of 20 nm thickness, an SiN film of 10 nm thickness and an Al film of 50 nm thickness are laminated successively in the mentioned order on a surface 2 of a transparent substrate 1 having a preformat pattern formed thereon and these films are covered with an ultraviolet-ray cured resin film.

The SiN film of 100 nm thickness forms a first dielectric layer 3, and the two SiN films of 10 nm thickness form second and third dielectric layers 5 and 7, respectively. The directly laminated $Tb_{32}Fe_{56}Co_{12}$ film and Co film form a first recording layer 4. In the first recording layer 4, two recording states exist respectively in specified magnetic field regions. Also, the directly laminated $Tb_{22}Fe_{70}Co_8$ film and $Gd_23Fe_{62}Co_{15}$ film form a second recording layer 6. In the second recording layer 6, one recording state exists in a magnetic field region which is different from those for the first magnetic layer 4. Further, the Al film forms a reflecting layer 8 and the ultraviolet-ray cured resin film forms a protection film 9.

In the optomagnetic recording medium of the present embodiment too, the transition region of the first recording layer 4 is shifted to the erasing side as compared with the magnetic field of zero, and the transition region of the second recording layer 6 is shifted to the recording side as compared with the magnetic field of zero, as in the optomagnetic recording medium of the third embodiment. Therefore, it is possible to allow the amplitude center of a modulated magnetic field at the time of recording to come near zero. In the present embodiment, the very thin Co film is used as the auxiliary magnetic film for the first recording layer 4 in order that the amount of incidence of a laser beam onto the second recording layer 6 is not reduced. The thickness of the Co film can be adjusted in a range between 0.3 nm and 2 nm.

[Fifth Embodiment]

Figure 15:
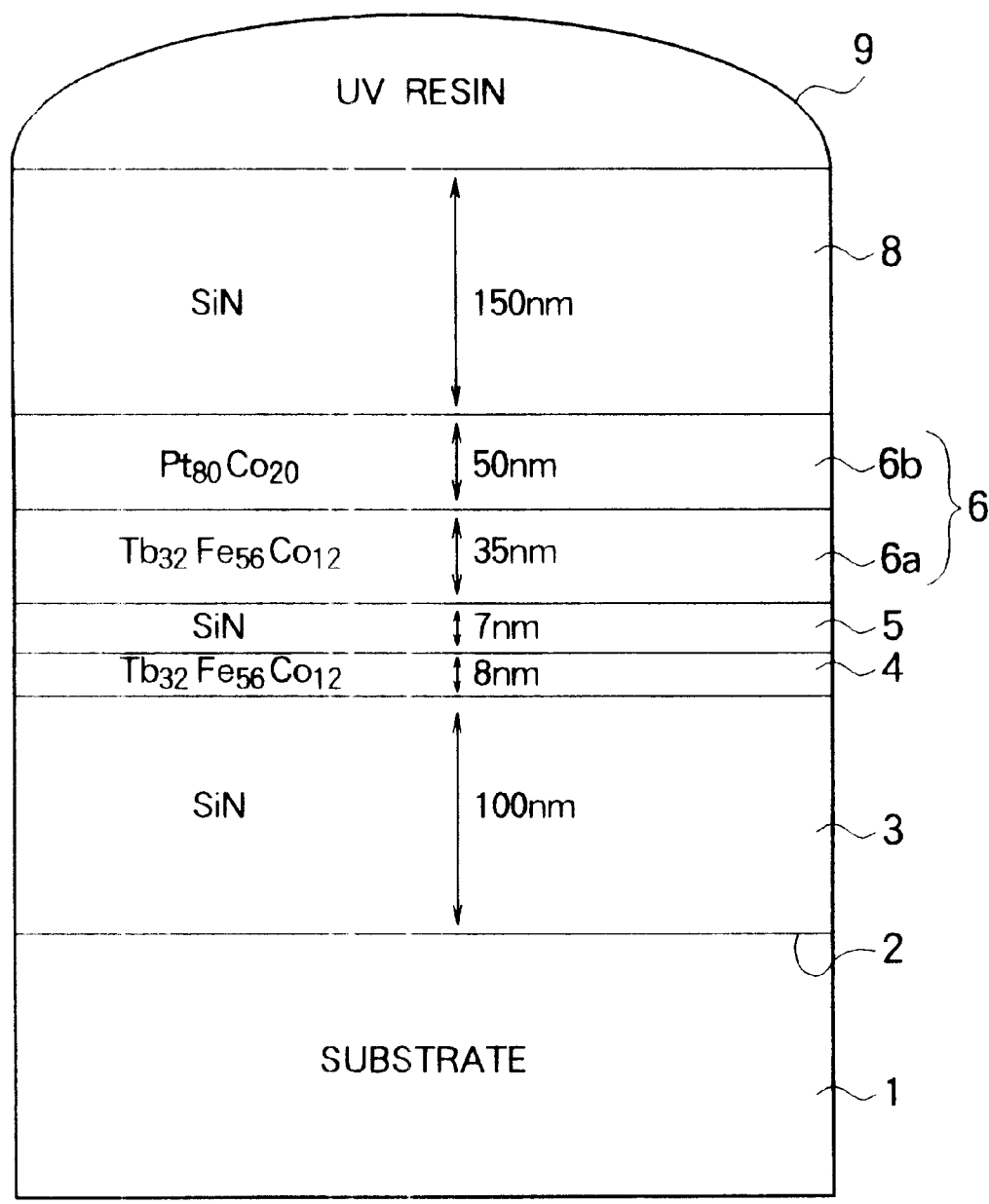
FIG. 15 is the cross section of a main part schematically showing an optomagnetic recording medium according to a fifth embodiment.

As shown in FIG. 15, an optomagnetic recording medium of the present embodiment has a structure in which an SiN film of 100 nm thickness, a $Tb_{32}Fe_{56}Co_{12}$ film of 8 nm thickness, an SiN film of 7 nm thickness, a $Tb_{32}Fe_{56}Co_{12}$ film of 35 nm thickness, a $Pt_{80}Co_{20}$ film of 50 nm thickness and an SiN film of 150 nm thickness are laminated successively in the mentioned order on a surface 2 of a transparent substrate 1 having a preformat pattern formed thereon and these films are covered with an ultraviolet-ray cured resin film.

The SiN film of 100 nm thickness forms a first dielectric layer 3, the SiN film of 7 nm thickness forms a second dielectric layer 5 and the SiN film of 150 nm thickness forms a third dielectric layer 7. The $Tb_{32}Fe_{56}Co_{12}$ film of 8 nm thickness forms a first recording layer 4. In the first recording layer 4, one recording state exists in a specified magnetic field region. Also, the directly laminated $Tb_{32}Fe_{56}Co_{12}$ film and $Pt_{80}Co_{20}$ film form a second recording layer 6. In the second recording layer 6, two recording states exist respectively in magnetic field regions which are different from that for the first magnetic layer 4. The ultraviolet-ray cured resin film forms a protection film 9.

Like other auxiliary magnetic film materials described in Claims 19 to 28, $Pt_{80}Co_{20}$ is a magnetic material in which the magnetization at the time of irradiation with a recording or reproducing laser beam is easy to rotate in the direction of an external magnetic field. This property is manifested (1) by selecting an auxiliary magnetic material the Curie temperature of which is at least equal to or lower than that of the vertically magnetized film or (2) by using as the auxiliary magnetic film a magnetic thin-film which assumes an in-plane magnetized film at least in the vicinity of the room temperature.

The auxiliary magnetic film $Pt_{80}Co_{20}$ is a typical material which has both of the properties (1) and (2). The vertically magnetized film $Tb_{32}Fe_{56}Co_{12}$ has a Curie temperature of 210° C., and the film $Pt_{80}Co_{20}$ also has a Curie temperature of 210° C. and is an in-plane magnetized film at the room temperature. Since the Curie temperature of the auxiliary magnetic film may be lower than 210° C., the composition of the PtCo alloy is effective when the content of Co is smaller than that in $Pt_{80}Co_{20}$. It is effective that a difference in Curie temperature between the vertically magnetized film and the auxiliary magnetic film is in the range of 0 to 170° C. In the case where the Curie temperature of the vertically magnetized film is in the range of 170 to 230° C., the effective content of Co in the PtCo alloy is in the range of 30 to 2 atomic %.

Also, the material of the auxiliary magnetic film having the above property can use the materials described in claim 26 as well as a CoZrNb alloy, a PtCoRe alloy, a PtCoRu alloy, a HoCo alloy, and so forth.

In order to control a magnetic coupling between the vertically magnetized film and the auxiliary magnetic film, an intermediate layer can be provided therebetween. The intermediate layer is formed by a material having a vertical magnetic anisotoropy and a Curie temperature which are lower than those of the vertically magnetized film. In the case where the material of the vertically magnetized film is TbFeCo, a material containing 20 or less atomic % of Al, Ti, Cr, Nb, Ta, Gd, O, N and so forth in TbFeCo is suitable as the material of the intermediate layer.

The optomagnetic recording medium of the present embodiment is characterized in that the $Pt_{80}Co_{20}$ film having a high reflection factor for an irradiation laser beam and an excellent corrosivity is used as the auxiliary magnetic film forming the second recording layer 6 and is laminated a thick film having a thickness of 35 nm. With such a construction, the reflection factor of the second recording layer 6 itself is enhanced and the Faraday rotation of a laser beam reaching the $Pt_{80}Co_{20}$ film through the $Tb_{32}Fe_{56}Co_{12}$ film forming the second recording layer 6 is contributed to a signal. Therefore, the independently provided reflecting layer 8 can be omitted, thereby making it possible to simplify the deposition structure of films.

[Sixth Embodiment]

Figure 16:
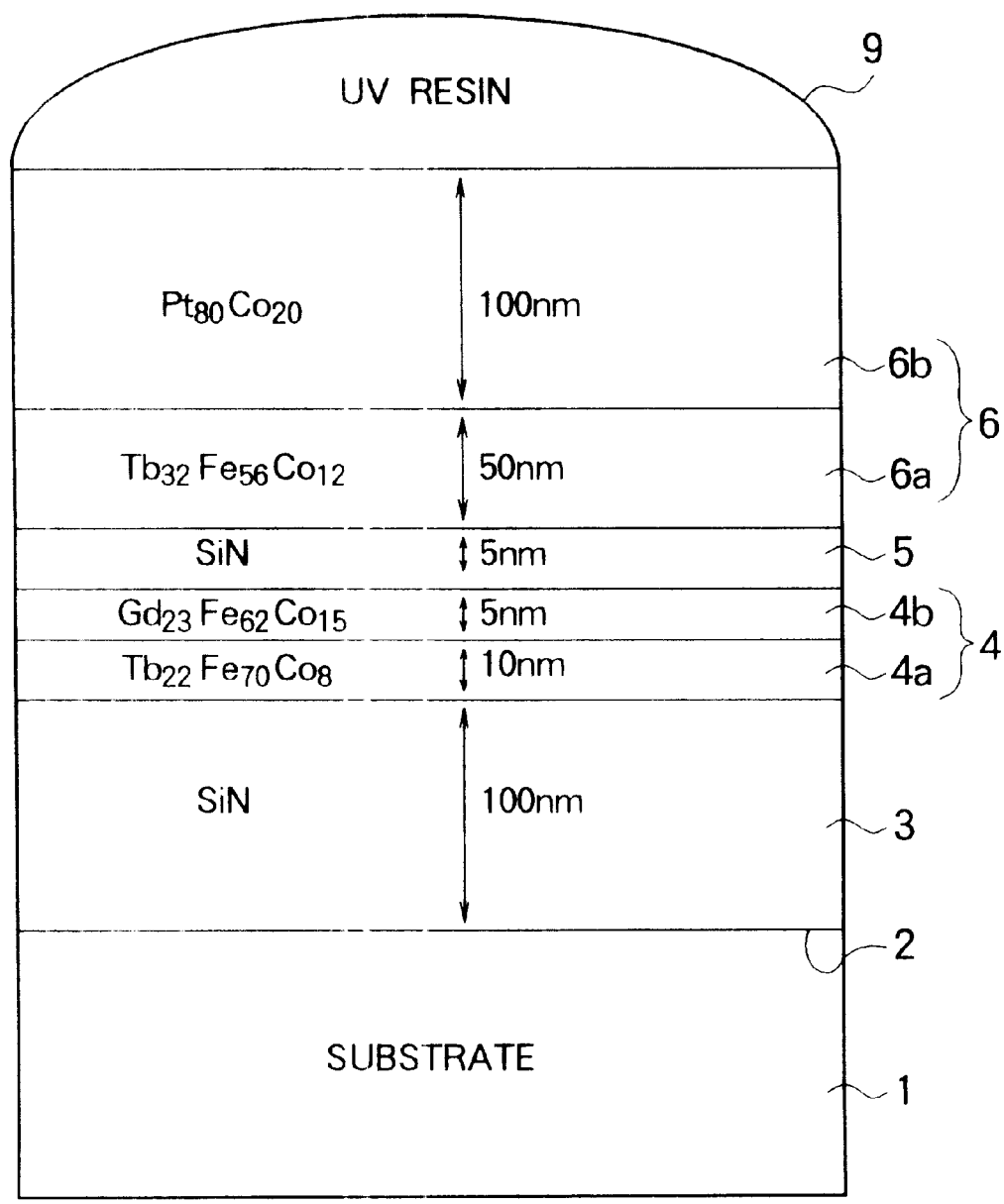
FIG. 16 is the cross section of a main part schematically showing an optomagnetic recording medium according to a sixth embodiment.

As shown in FIG. 16, an optomagnetic recording medium of the present embodiment has a structure in which an SiN film of 100 nm thickness, a $Tb_{22}Fe_{70}Co_8$ film of 10 nm thickness, a $Gd_{23}Fe_{62}Co_{15}$ film of 5 nm thickness, an SiN film of 10 nm thickness, a $Tb_{32}Fe_{56}Co_{12}$ film of 35 nm thickness and a $Pt_{80}Co_{20}$ film of 100 nm thickness are laminated successively in the mentioned order on a surface 2 of a transparent substrate 1 having a preformat pattern formed thereon and these films are covered with an ultraviolet-ray cured resin film.

The SiN film of 100 nm thickness forms a first dielectric layer 3, and the SiN film of 10 nm thickness forms a second dielectric layer 5. The directly laminated $Tb_{22}Fe_{70}Co_8$ film and $Gd_{23}Fe_{62}Co_{15}$ film form a first recording layer 4. In the first recording layer 4, one recording state exists in a specified magnetic field region. Also, the directly laminated $Tb_{32}Fe_{56}Co_{12}$ film and $Pt_{80}Co_{20}$ film form a second recording layer 6. In the second recording layer 6, two recording states exist respectively in magnetic field regions which are different from that for the first magnetic layer 4. The ultraviolet-ray cured resin film forms a protection film 9.

The optomagnetic recording medium of the present embodiment is characterized in that the $Pt_{80}Co_{20}$ film having a high reflection factor for an irradiation laser beam and an excellent corrosivity is used as the auxiliary magnetic film forming the second recording layer 6 and is laminated a very thick film having a thickness of 100 nm. With such a construction, the reflection factor of the second recording layer 6 itself is enhanced and the effect of protection of each film arranged inside of the $Pt_{80}Co_{20}$ film is improved. Therefore, both the third dielectric layer 7 and the reflecting layer 8 can be omitted, thereby making it possible to simplify the deposition structure of films.

In the present embodiment having the above construction, the auxiliary magnetic film is selected such that the vertical magnetic anisotoropy energy thereof becomes lower than that of the vertically magnetized film. In the case of the present embodiment, GdFeCo assumes a so-called in-plane magnetized film at the room temperature. Namely, the geometrical magnetic anisotoropy is more dominant than the vertical magnetic anisotoropy. However, when the GdFeCo film is irradiated with a recording laser beam so that the temperature thereof is raised, the relationship in dominance between the geometrical magnetic anisotoropy and the vertical magnetic anisotoropy is inverted so that the GdFeCo film assumes a so-called vertically magnetized film in which the vertical magnetic anisotoropy is more dominant. In a magnetic thin-film having such a property, when the temperature thereof is raised with an external magnetic field being applied, the magnetization is easy to rotate in the direction of the external magnetic field. Further, at the high temperature, an exchange coupling force can be applied surely in the vertical direction. Therefore, the operation of the auxiliary magnetic film of controlling a recording magnetic field region can be manifested effectively.

[Second Example Of Construction]

As shown in FIG. 17A, an optomagnetic recording medium according to the present example includes a transparent substrate 1 having a desired preformat pattern 2 formed on one surface thereof, a first dielectric layer 3 formed on the preformat pattern 2, a first recording layer 11 formed on the first dielectric layer 3, a second dielectric layer 5 formed on the first recording layer 11, as required, a second recording layer 12 formed on the second dielectric layer 5 or the first recording layer 11, a third dielectric layer 7 formed on the second recording layer 12, as required, a third recording layer 13 formed on the second recording layer 12 or the third dielectric layer 7, a fourth dielectric layer 14 formed on the third recording layer 13, as required, a reflecting layer 8 formed on the third recording layer 13 or the fourth dielectric layer 14, as required, and a protection layer 9 formed on the reflecting layer 8.

Since the transparent substrate 1, the first, second and third dielectric layers 3, 5 and 7, the reflecting layer 8 and the protection layer 9 are the same as those in the first example of construction, the explanation thereof will be omitted in order to avoid the repetition.

The first recording layer 11 is formed by a rare earth element-transition metal series amorphous alloy similar to the first magnetic recording layer 4 in the first example of construction. The thickness of the first recording layer 11 is adjusted to the range of 20 to 500 Å. Accordingly, that transition region of the first recording layer 11 in the change of a relative signal output for an external magnetic field, which extends from an unrecorded state to a recorded state, is almost positioned in the vicinity of the magnetic field of zero, as shown in FIG. 17B.

The second recording layer 12 is formed by a vertically magnetized amorphous film 12a of 50 to 500 Å thickness and an auxiliary magnetic film 12b of 5 to 100 Å thickness provided adjoining the vertically magnetized amorphous film 12a. The vertically magnetized amorphous film 12a is formed by a rare earth element-transition metal series vertically magnetized amorphous film similar to the vertically magnetized amorphous film 6a in the first example of construction, and the auxiliary magnetic film 12b is formed by a magnetized film similar to the auxiliary magnetic film 6b in the first example of construction. Accordingly, in the second recording layer 12, that transition region in the change of a relative signal output for an external magnetic field, which extends from an unrecorded state to a recorded state, is shifted from the vicinity of the magnetic field of zero to the direction of a recording magnetic field or the direction of an erasing magnetic field, as shown in FIG. 17B.

The third recording layer 13 is formed by a vertically magnetized amorphous film 13a of 50 to 500 Å thickness made of a rare earth element-transition metal series amorphous alloy in which the sub-lattice magnetic moment of the rare earth metal is dominant in a temperature range from the room temperature to a Curie temperature or a temperature range from the room temperature to the maximum reachable temperature at the time of recording or at the time of erasing and an auxiliary magnetic film 13b of 5 to 100 Å thickness which is provided adjoining the vertically magnetized amorphous film 13a.

It is particularly preferable that the composition of the rare earth element-transition metal series vertically magnetized amorphous film 13a is represented by the following general expression:

$$(Tb_{100-A}Q_A)_X Fe_{100-X-Y-Z} Co_Y M_Z \quad (2)$$

where X, Y, Z and A satisfy 20 atomic %≦X≦35 atomic %, 5 atomic %≦Y≦15 atomic %, 0 atomic %≦Z≦10 atomic %, and 0 atomic %≦A≦20 atomic %, Tb is terbium which is a rare earth element, Fe is iron which is a transition metal, Co is cobalt which is a transition metal, M is at least one kind of element selected from Nb, Cr, Pt, Ti and Al, and Q is at least one kind of element selected from Gd, Nd and Dy.

The auxiliary magnetic film 13b is formed by a magnetic substance which contains a transition metal element and has a small vertical magnetic anisotoropy. As specific examples of the auxiliary magnetic film 13b can be enumerated:

(1) a thin film of an alloy of at least one kind of element selected from a noble element group which includes Pt, Al, Ag, Au, Cu and Rh and at least one kind of element selected from a transition metal group which includes Fe, Co and Ni;

(2) a rare earth element-transition metal series alloy such as GdFeCo alloy, GdTbFeCo alloy, GdDyFeCo or NdFeCo alloy which contains Gd or Nd, thereby lowering the vertical magnetic anisotoropy;

(3) a rare earth element-transition metal series alloy which contains oxygen or nitrogen in a larger quantity than a usual one (for example, in a quantity equal to or larger than 5 atomic %), thereby lowering the vertical magnetic anisotoropy;

(4) a laminated film of 5 to 30 Å or several atomic layer thickness made of a simple substance of a transition metal such as Fe, Co or Ni or an alloy which contains such a transition metal in a large quantity; and so forth.

According to the composition, the auxiliary magnetic film 4b has a vertical magnetic anisotoropy energy equal to or lower than a shape magnetic anisotoropy. Therefore, the magnetization can be directed to an in-plane direction (that is, a direction parallel to the film surface of the auxiliary magnetic film 4b) before an external magnetic field is applied. When the thus adjusted auxiliary magnetic film 4b is temperature-raised up to the vicinity of a Curie temperature and is applied with the external magnetic field, the direction of the magnetization rises from the in-plane direction to generate a magnetic moment component in the direction of the external magnetic field so that the auxiliary magnetic film 4b exerts an exchange coupling force on the magnetic moment of the transition metal of the vertically magnetized amorphous film 4a laminated adjoining the auxiliary magnetic film 4b. Accordingly, in the first recording layer including the deposition of the vertically magnetized amorphous film 4a and the auxiliary magnetic film 4b, a change in carrier and noise level of a light modulated recording signal for an external magnetic field has two peaks, as shown in FIG. 17C.

Like the first, second and third dielectric layers 3, 5 and 7, the fourth dielectric layer 14 is provided for causing the multiple interference of a reproducing laser beam in the film to increase an apparent Kerr rotation angle and is formed by an inorganic dielectric having a refraction factor larger than that of the transparent substrate 1. The oxide or nitride of silicon, aluminum, zirconium, titanium or tantalum is particularly preferable as the dielectric layer material. The fourth dielectric layer is formed with a thickness of 0 to 500 Å, as required.

The deposition positions of the first recording layer 11, the second recording layer 12 and the third recording layer 13 can be interchanged. If the deposition positions of the recording layers 11, 12 and 13 are interchanged, the magnitude of the Kerr rotation angle of each recording state corresponding to the magnitude of an external magnetic field or the magnitude of an irradiation laser power at the time of recording changes but the multi-valued recording of a signal is possible or there is no change in a characteristic and an effect as an optomagnetic recording medium. Also, the multi-valued recording of higher order is possible by laminating the recording layers with the number thereof equal to or larger than 4. Corresponding thereto, the composition of each film may be changed properly.

In the following, a more specific embodiment of an optomagnetic recording medium belonging to the present example will be shown.

[Seventh Embodiment]

Figure 18:
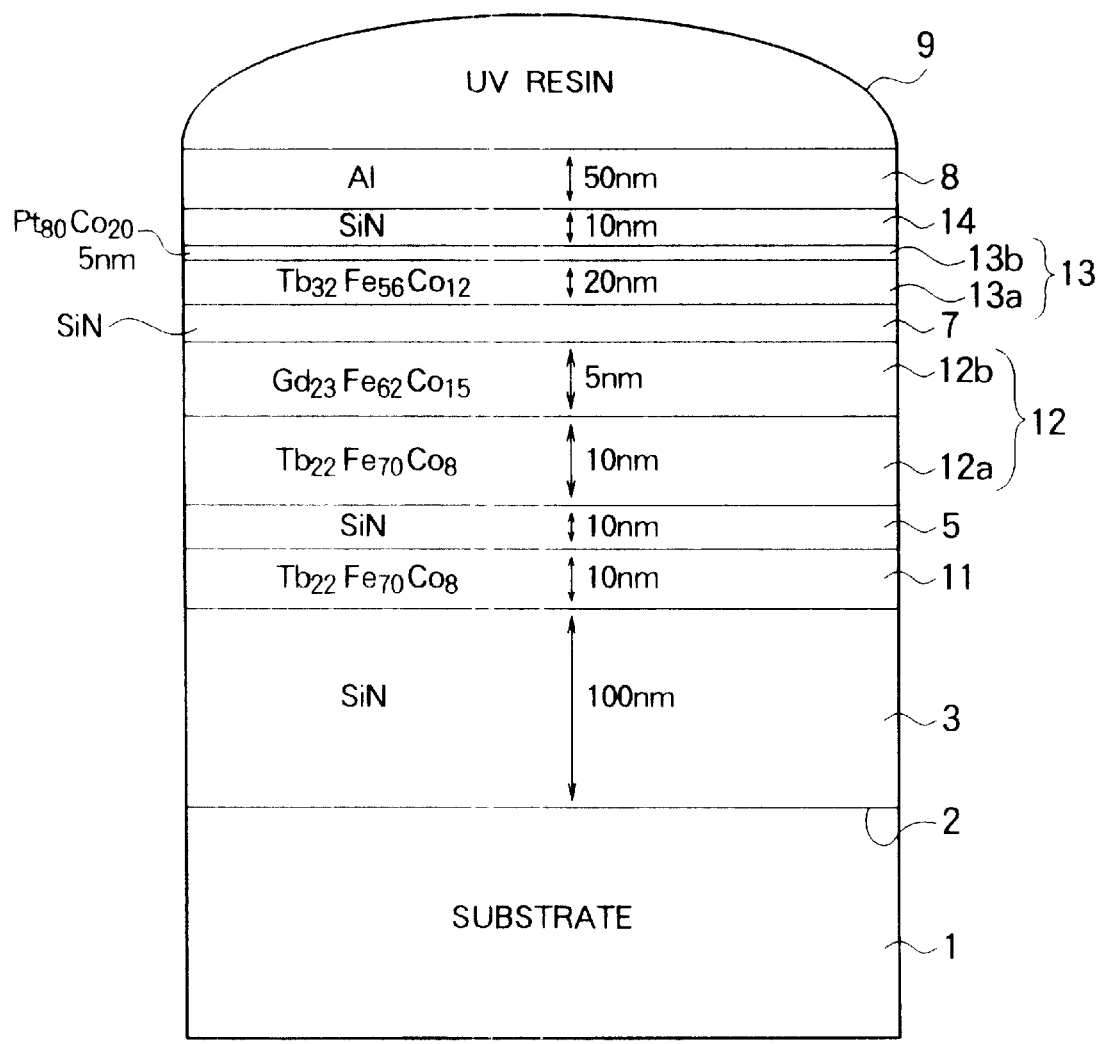
FIG. 18 is the cross section of a main part schematically showing an optomagnetic recording medium according to a seventh embodiment.

As shown in FIG. 18, an optomagnetic recording medium of the present embodiment includes an SiN film of 100 nm thickness, a $Tb_{22}Fe_{70}Co_8$ film of 10 nm thickness, an SiN film of 10 nm thickness, a $Tb_{22}Fe_{70}Co_8$ film of 10 nm thickness, a $Gd_{23}Fe_{62}Co_{15}$ film of 5 nm thickness, an SiN film of 10 nm thickness, a $Tb_{32}Fe_{56}Co_{12}$ film of 20 nm thickness, a $Pt_{80}Co_{20}$ film of 5 nm thickness, an SiN film of 10 nm thickness and an Al film of 50 nm thickness which are laminated successively in the mentioned order on a surface 2 of a transparent substrate 1 having a preformat pattern formed thereon. These films are covered with an ultraviolet-ray cured resin film.

The SiN film of 100 nm thickness forms a first dielectric layer 3, and the three SiN films of 10 nm thickness form second, third and fourth dielectric layers 5, 7 and 14, respectively. The $Tb_{22}Fe_{70}Co_8$ film forms a first recording layer 11 in the form of a single layer. In the first recording layer 11, one recording state exists in a specified magnetic field region. The directly laminated $Tb_{22}Fe_{70}Co_8$ film and $Gd_{23}Fe_{62}Co_{15}$ film form a second recording layer 12. In the second recording layer 12, one recording state exists in a magnetic field region which is different from that for the first recording layer 11. Also, the directly laminated $Tb_{32}Fe_{56}Co_{12}$ film and $Pt_{80}Co_{20}$ film form a third recording layer 13. In the third recording layer 13, two recording states exist respectively in magnetic field regions which are different from those for the first and second recording layers 11 and 12. Further, the Al film forms a reflecting layer 8 and the ultraviolet-ray cured resin film forms a protection film 9.

[Third Example Of Construction]

Figure 19B:
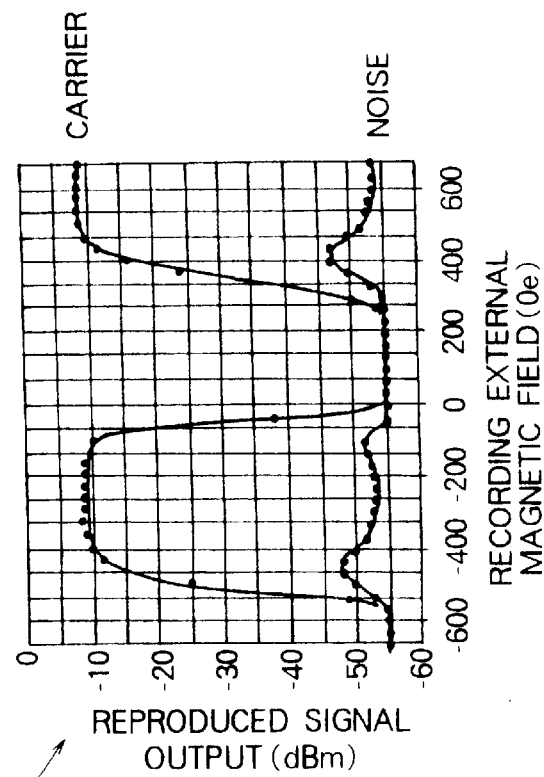
FIGS. 19A and 19B are diagrams for explaining an optomagnetic recording medium according to a third example of construction.
Figure 19A:
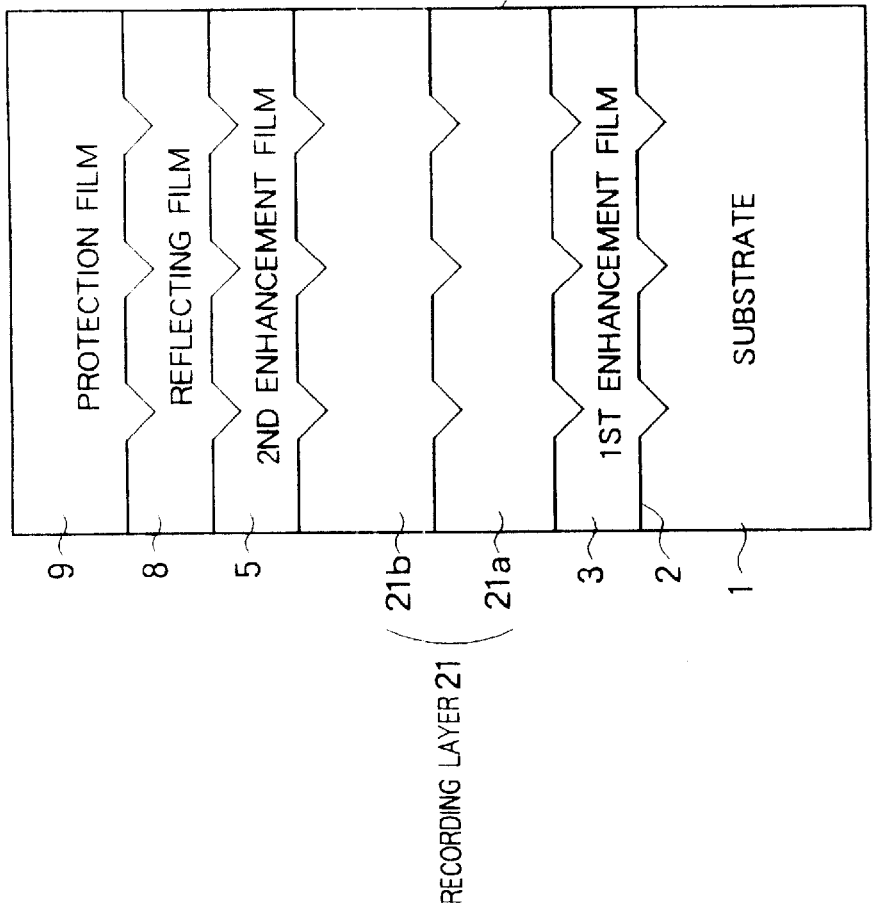

As shown in FIG. 19A, an optomagnetic recording medium according to the present example includes a transparent substrate 1 having a desired preformat pattern 2 formed on one surface thereof, a first dielectric layer 3 formed on the preformat pattern 2, a recording layer 21 formed on the first dielectric layer 3, a second dielectric layer 5 formed on the recording layer 21, as required, a reflecting layer 8 formed on the second dielectric layer 5 or the recording layer 21, as required, and a protection layer 9 formed on the reflecting layer 8.

Like the third recording layer 13 in the second example of construction, the recording layer 21 is formed by a vertically magnetized amorphous film 21a of 100 to 500 Å thickness made of a rare earth element-transition metal series amorphous alloy in which the sub-lattice magnetic moment of the rare earth metal is dominant in a temperature range from the room temperature to a Curie temperature or a temperature range from the room temperature to the maximum reachable temperature at the time of recording or at the time of erasing and an auxiliary magnetic film 13b of 5 to 100 Å thickness which is provided adjoining the vertically magnetized amorphous film 13a. The preferable composition of the vertically magnetized amorphous film 21a and the preferable material of the auxiliary magnetic film 21b are the same as those in the second example of construction. Since the construction of the other portions is the same as that in the second example of construction, the explanation thereof will be omitted. In the recording layer 21, a change in carrier and noise level of a light modulated recording signal for an external magnetic field has two peaks, as shown in FIG. 19B.

In the following, a more specific embodiment of an optomagnetic recording medium belonging to the present example will be shown.

[Eighth Embodiment]

Figure 20:
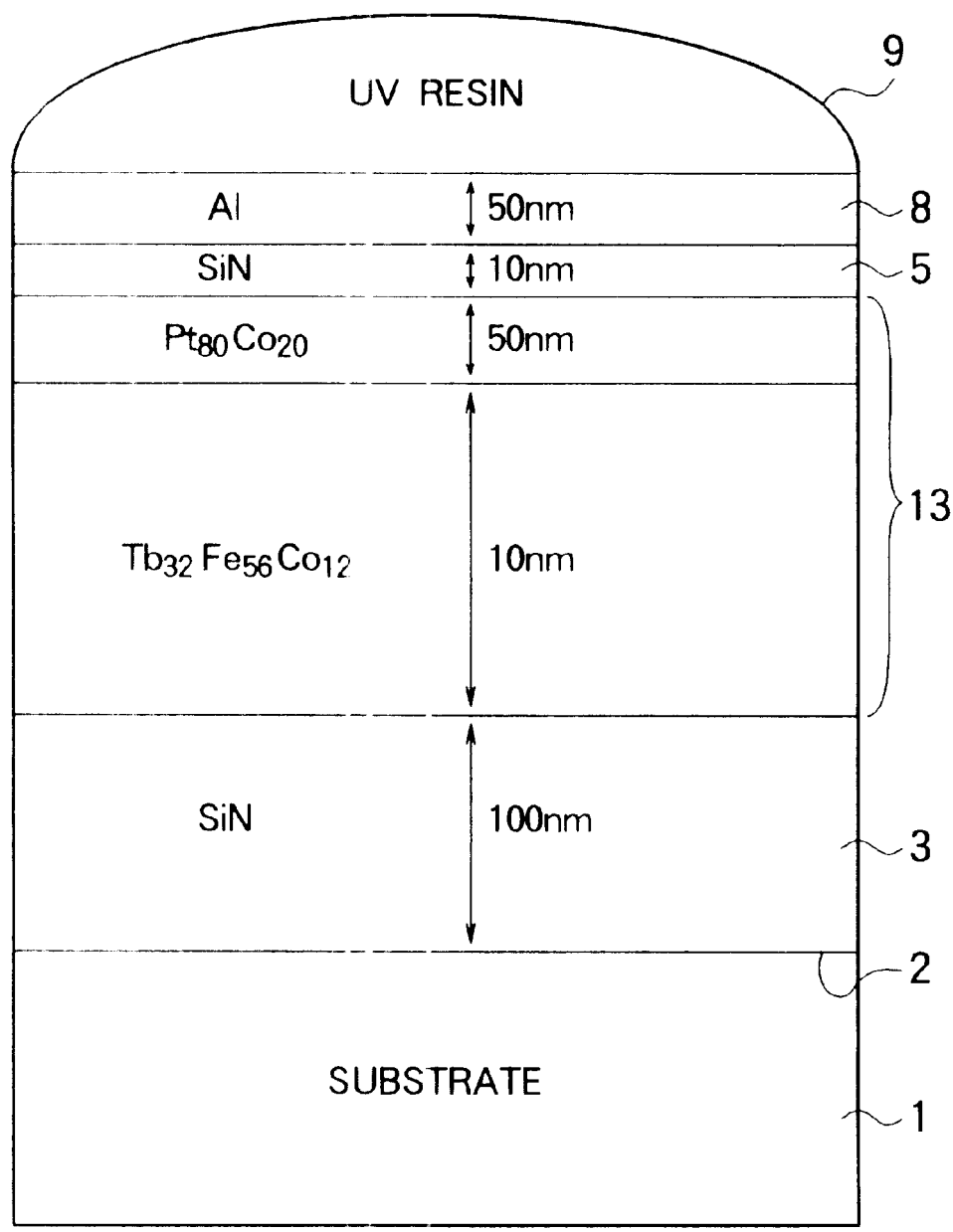
FIG. 20 is the cross section of a main part schematically showing an optomagnetic recording medium according to an eighth embodiment.

As shown in FIG. 20, an optomagnetic recording medium of the present embodiment includes an SiN film of 100 nm thickness, a $Tb_{32}Fe_{56}Co_{12}$ film of 30 nm thickness, a $Pt_{80}Co_{20}$ film of 20 nm thickness, an SiN film of 10 nm thickness and an Al film of 50 nm thickness which are laminated successively in the mentioned order on a surface 2 of a transparent substrate 1 having a preformat pattern formed thereon. These films are covered with an ultraviolet-ray cured resin film.

The SiN film of 100 nm thickness forms a first dielectric layer 3, and the SiN film of 10 nm thickness forms a second dielectric layer 5. The directly laminated $Tb_{36}Fe_{56}Co_{12}$ film and $Pt_{80}Co_{20}$ film form a recording layer 13. In this recording layer, two recording states exist respectively in different magnetic field regions. Also, the Al film forms a reflecting layer 8 and the ultraviolet-ray cured resin film forms a protection film 9.

[Fourth Example Of Construction]

As shown in FIG. 21A, an optomagnetic recording medium according to the present example includes a transparent substrate 1 having a desired preformat pattern 2 formed on one surface thereof, a first dielectric layer 3 formed on the preformat pattern 2, a first recording layer 31 formed on the first dielectric layer 3, a second dielectric layer 5 formed on the first recording layer 31, as required, a second recording layer 32 formed on the second dielectric layer 5 or the first recording layer 31, a third dielectric layer 7 formed on the second recording layer 32, as required, a reflecting layer 8 formed on the third dielectric layer 7 or the second recording layer 32, as required, and a protection layer 9 formed on the reflecting layer 8.

Like the second recording layer 6 in the first example of construction, the first recording layer 31 is formed by a rare earth element-transition metal series vertically magnetized film 31a and an auxiliary magnetic film 31b provided adjoining the vertically magnetized film 31a. In the first recording layer 31, that transition region in the change of a relative signal output for an external magnetic field, which extends from an unrecorded state to a recorded state, is shifted from the vicinity of the magnetic field of zero to the direction of a recording magnetic field or the direction of an erasing magnetic field, as shown in FIG. 21B.

Like the third recording layer 13 in the second example of construction, the second recording layer 32 is formed by a vertically magnetized amorphous film 21a of 100 to 500 Å thickness made of a rare earth element-transition metal series amorphous alloy in which the sub-lattice magnetic moment of the rare earth metal is dominant in a temperature range from the room temperature to a Curie temperature or a temperature range from the room temperature to the maximum reachable temperature at the time of recording or at the time of erasing and an auxiliary magnetic film 21b of 5 to 100 Å thickness which is provided adjoining the vertically magnetized amorphous film 32a. In this recording layer 32, a change in carrier and noise level of a light modulated recording signal for an external magnetic field has two peaks, as shown in FIG. 21C. The preferable composition of the vertically magnetized amorphous film 21a and the preferable material of the auxiliary magnetic film 21b are the same as those in the second example of construction. Since the construction of the other portions is the same as that in the second example of construction, the explanation thereof will be omitted.

In the following, a more specific embodiment of an optomagnetic recording medium belonging to the present example will be shown.

[Ninth Embodiment]

Figure 22:
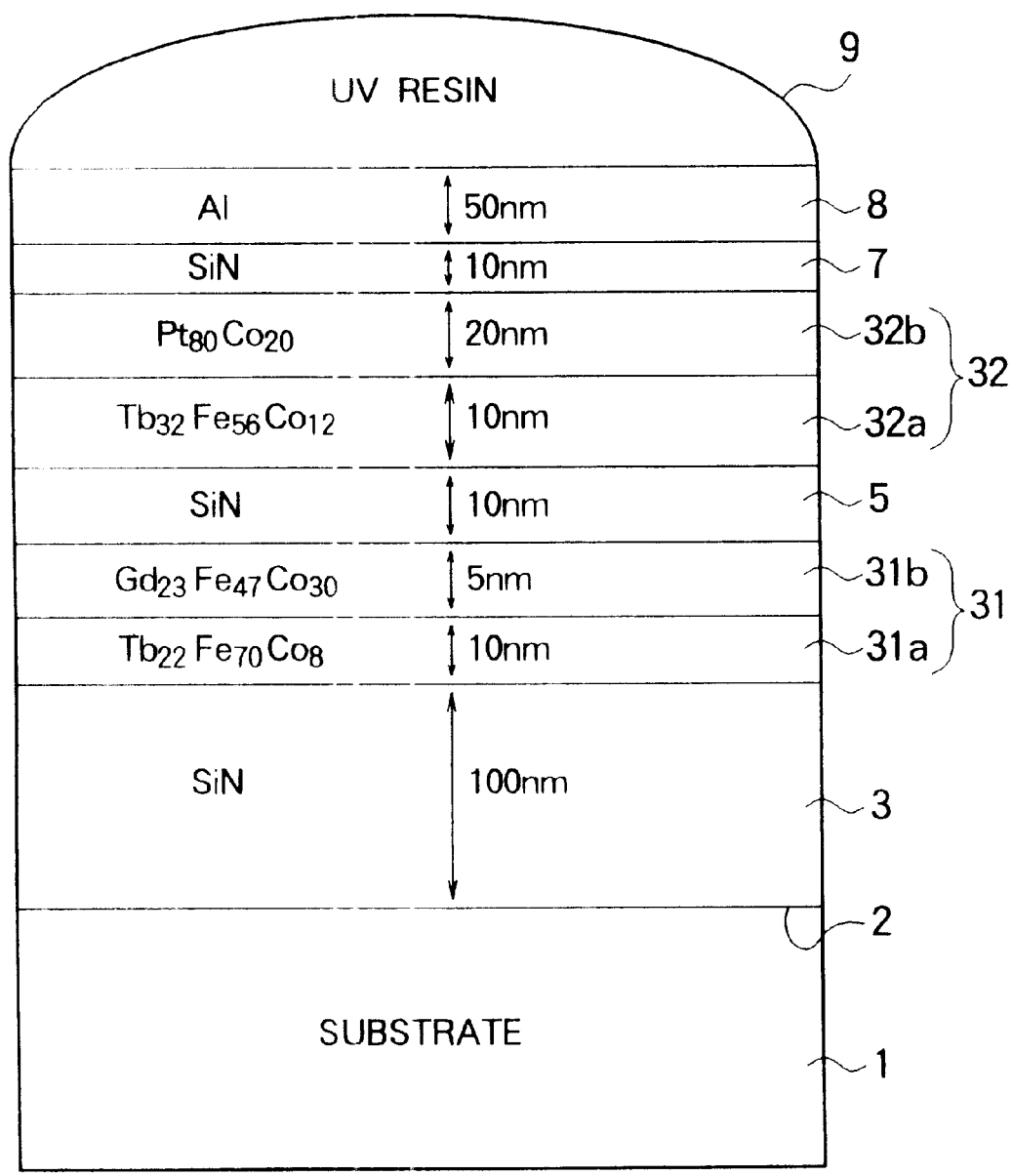
FIG. 22 is the cross section of a main part schematically showing an optomagnetic recording medium according to a ninth embodiment.

As shown in FIG. 22, an optomagnetic recording medium of the present embodiment includes an SiN film of 100 nm thickness, a $Tb_{22}Fe_{70}Co_8$ film of 10 nm thickness, a $Gd_{23}Fe_{47}Co_{30}$ film of 5 nm thickness, an SiN film of 10 nm thickness, a $Tb_{32}Fe_{56}Co_{12}$ film of 10 nm thickness, a $Pt_{80}Co_{20}$ film of 20 nm thickness, an SiN film of 10 nm thickness and an Al film of 50 nm thickness which are laminated successively in the mentioned order on a surface 2 of a transparent substrate 1 having a preformat pattern formed thereon. These films are covered with an ultraviolet-ray cured resin film.

The SiN film of 100 nm film thickness forms a first dielectric layer 3, and the two SiN films of 10 nm film thickness form second and third dielectric layers 5 and 7, respectively. The directly laminated $Tb_{22}Fe_{70}Co_8$ film and $Gd_{23}Fe_{47}Co_{30}$ film form a first recording layer 31. In the first recording layer 31, a recording state exists in a magnetic field region shifted from the magnetic field of zero. On the other hand, the directly laminated $Tb_{32}Fe_{56}Co_{12}$ film and $Pt_{80}Co_{20}$ film form a second recording layer 32. In the second recording layer 32, two recording states exist respectively in different magnetic field regions. Also, the Al film forms a reflecting layer 8 and the ultraviolet-ray cured resin film forms a protection film 9.

In the optomagnetic recording medium of the present example, the content of Co in the auxiliary magnetic film GdFeCo is increased as compared with that in the optomagnetic recording medium of the sixth embodiment. When the auxiliary magnetic film having such a composition is used, the Curie temperature of the auxiliary magnetic film is increased so that an exchange coupling force exerted on the vertically magnetized film is correspondingly increased, thereby increasing the amount of shift of a magnetic field region for a recording state.

[Fifth Example Of Construction]

Figure 23C:
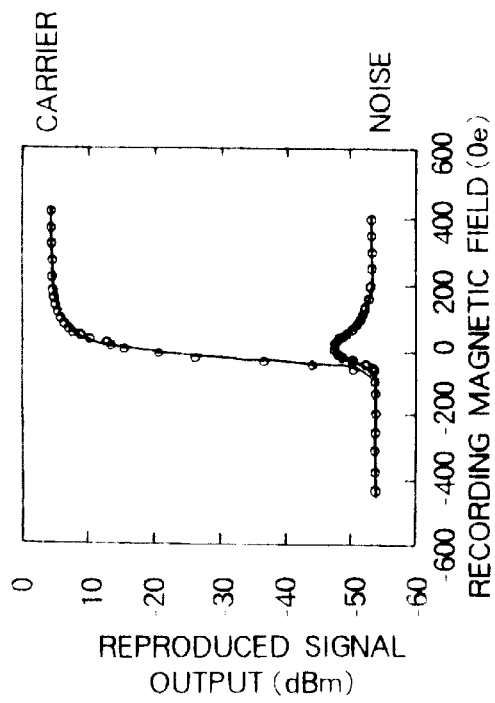
FIGS. 23A, 23B and 23C are diagrams for explaining an optomagnetic recording medium according to a fifth example of construction.
Figure 23B:
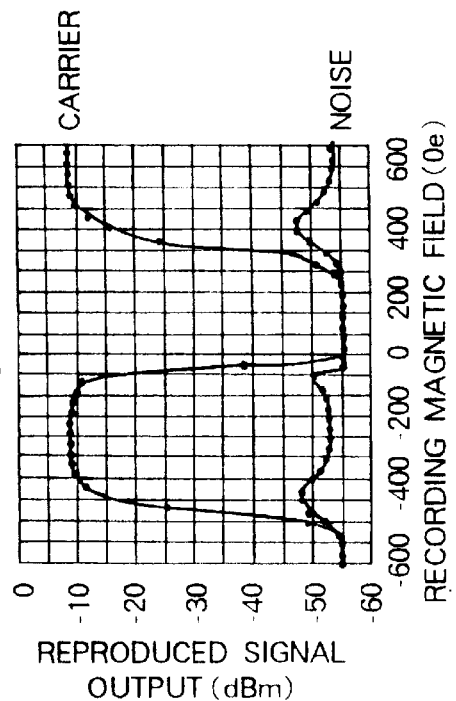
Figure 23A:
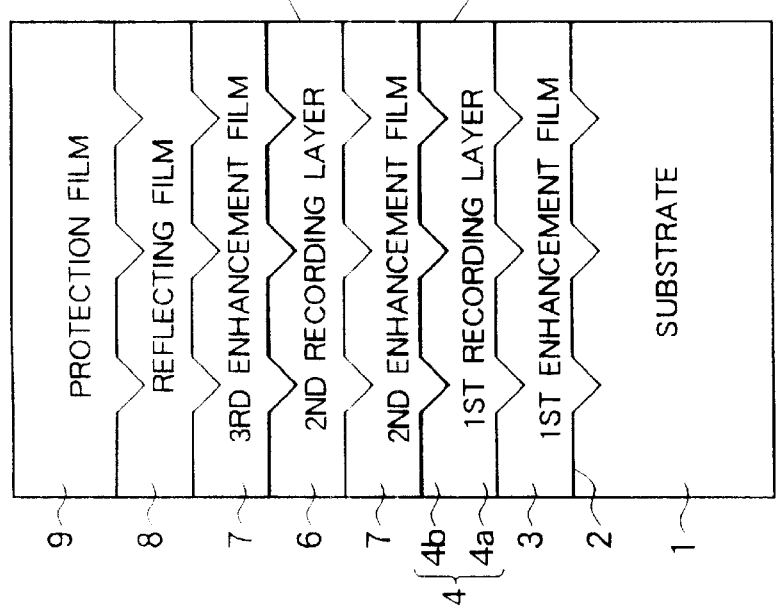

As shown in FIG. 23A, an optomagnetic recording medium according to the present example includes a transparent substrate 1 having a desired preformat pattern 2 formed on one surface thereof, a first dielectric layer 3 formed on the preformat pattern 2, a first recording layer 4 formed on the first dielectric layer 3, a second dielectric layer 5 formed on the first recording layer 4, as required, a second recording layer 6 formed on the second dielectric layer 5 or the first recording layer 4, a third dielectric layer 7 formed on the second recording layer 6, as required, a reflecting layer 8 formed on the third dielectric layer 7, as required, and a protection layer 9 formed on the reflecting layer 8.

The first recording layer 4 is formed by a vertically magnetized amorphous film 4a of 100 to 500 Å thickness made of a rare earth element-transition metal series amorphous alloy in which the sub-lattice magnetic moment of the rare earth metal is dominant in a temperature range from the room temperature to a Curie temperature or a temperature range from the room temperature to the maximum reachable temperature at the time of recording or at the time of erasing and an auxiliary magnetic film 4b of 5 to 100 Å thickness which is provided adjoining the vertically magnetized amorphous film 4a. It is particularly preferable that the composition of the rare earth element-transition metal series vertically magnetized amorphous film is represented by the above-mentioned general expression (2). Also, the auxiliary magnetic film 4b is constructed by a magnetic substance which contains a transition metal element and has a small vertical magnetic anisotoropy. Concretely, the materials of (1) to (4) shown in the column of the second example of construction can be used.

According to the composition, the auxiliary magnetic film 4b has a vertical magnetic anisotoropy energy equal to or lower than a shape magnetic anisotoropy. Therefore, the magnetization can be directed to an in-plane direction (that is, a direction parallel to the film surface of the auxiliary magnetic film 4b) before an external magnetic field is applied. When the thus adjusted auxiliary magnetic film 4b is temperature-raised up to the vicinity of a Curie temperature and is applied with the external magnetic field, the direction of the magnetization rises from the in-plane direction to generate a magnetic moment component in the direction of the external magnetic field so that the auxiliary magnetic film 4b exerts an exchange coupling force on the magnetic moment of the transition metal of the vertically magnetized amorphous film 4a laminated adjoining the auxiliary magnetic film 4b. Accordingly, in the first recording layer including the deposition of the vertically magnetized amorphous film 4a and the auxiliary magnetic film 4b, a change in carrier and noise level of a light modulated recording signal for an external magnetic field has two peaks, as shown in FIG. 23C.

The second recording layer 6 is formed by an optomagnetic recording film in which at least one recording state exists in a magnetic field region different from that for the first recording layer 4. Accordingly, the second recording layer 6 can use an optomagnetic recording film which includes the same kind of vertically magnetized amorphous film and auxiliary magnetic film as the first recording layer 4 and in which two recording states exist respectively in magnetic field regions different from that for the first recording layer 4, or an optomagnetic recording film which has a construction different from that of the first recording layer 4 and in which one recording state exists in a magnetic field region different from that for the first recording layer 4, as shown in FIG. 23C. Examples of the second recording layer 6 belonging to the latter may include (1) a layer composed of a rare earth element-transition metal series vertically magnetized amorphous film in which the sub-lattice magnetization of the transition metal is dominant in a temperature range from the room temperature to the maximum reachable temperature at the time of recording or erasing, (2) a layer composed of a rare earth element-transition metal series vertically magnetized amorphous film in which the sub-lattice magnetization of the rare earth metal is dominant in a temperature range similar to the above-mentioned temperature range, (3) a layer composed of a rare earth element-transition metal series vertically magnetized amorphous film for which a compensation temperature exists between the room temperature and a Curie temperature, and so forth. Concretely, it is particularly preferable that the composition of the second recording layer 6 is represented by the following general expression:

$$Tb_XFe_{100-X-Y-Z}Co_YM_Z \qquad (3)$$

where X, Y and Z satisfy 15 atomic % $\leq$ X $\leq$ 35 atomic %, 5 atomic % $\leq$ Y $\leq$ 15 atomic %, and 0 atomic % $\leq$ Z $\leq$ 10 atomic %, Tb is terbium which is a rare earth element, Fe is iron which is a transition metal, Co is cobalt which is a transition metal, M is at least one kind of element selected from Nb, Cr and Pt. It is preferable that the film thickness of the second recording layer 6 is in the range of 100 to 500 Å.

Since the other construction is the same as that in each example of construction mentioned above, the explanation thereof will be omitted in order to avoid the repetition. The layers 3 to 8 are successively laminated on the preformat pattern formation surface of the transparent substrate 1 by a vacuum film forming method such as sputtering or vacuum deposition. The thickness and optical constant of each of the layers 3 to 8 are selected such that when a signal is read from an optomagnetic recording medium subjected to multi-valued recording, a difference between relative output levels (or magnitudes of Kerr rotation angle) corresponding to the respective recording levels becomes as uniform as possible. In accordance with the selection in this case, the second and third enhancement films and/or the reflecting film can be omitted. Also, the deposition positions of the first recording layer 4 and the second recording layer 6 may be interchanged. If the deposition positions of those recording layers are interchanged, the magnitude of the Kerr rotation angle of each recording state corresponding to the magnitude of an external magnetic field or the magnitude of an irradiation laser power at the time of recording changes but the multi-valued recording of a signal is possible or there is no change in a characteristic and an effect as an optomagnetic recording medium. Further, the multi-valued recording of higher order is possible by laminating the recording layers with the number thereof equal to or larger than 3. Correspondingly thereto, the composition of each film may be changed properly.

In the following, embodiments of an optomagnetic recording medium belonging to the present example will be shown.

[Tenth Embodiment]

Figure 24:
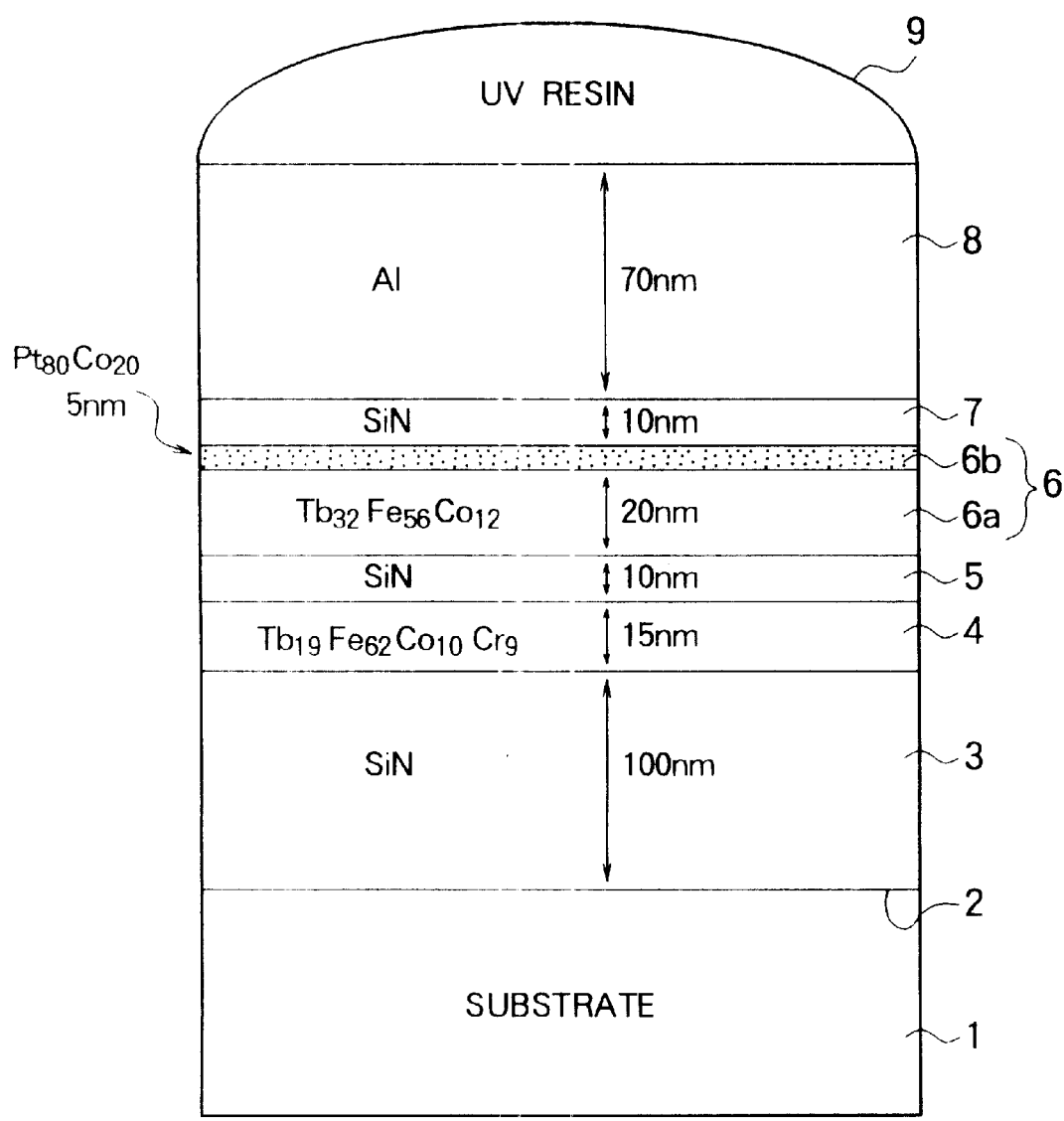
FIG. 24 is the cross section of a main part schematically showing an optomagnetic recording medium according to a tenth embodiment.

As shown in FIG. 24, an optomagnetic recording medium of the present embodiment includes an SiN film of 100 nm thickness, a $Tb_{19}Fe_{62}Co_{10}Cr_9$ film of 15 nm thickness, an SiN film of 10 nm thickness, a $Tb_{32}Fe_{56}Co_{12}$ film of 20 nm thickness, a $Pt_{80}Co_{20}$ film of 5 nm thickness, an SiN film of 10 nm thickness and an Al film of 70 nm thickness which are laminated successively in the mentioned order on a surface 2 of a transparent substrate 1 having a preformat pattern formed thereon. These films are covered with an ultraviolet-ray cured resin film.

The SiN film of 100 nm thickness forms a first dielectric layer 3, and the two SiN films of 10 nm thickness form second and third dielectric layers 5 and 7, respectively. The $Tb_{19}Fe_{62}Co_{10}$ film forms a first recording layer 4 in the form of a single layer. In the first recording layer 4, one recording state exists in a specified magnetic field region. The directly laminated $Tb_{32}Fe_{56}Co_{12}$ film and $Pt_{80}Co_{20}$ film form a second recording layer 6. In the second recording layer 6, two recording states exist respectively in magnetic field regions which are different from that for the first recording layer 4. Further, the Al film forms a reflecting layer 8 and the ultraviolet-ray cured resin film forms a protection film 9.

[Eleventh Embodiment]

Figure 25:
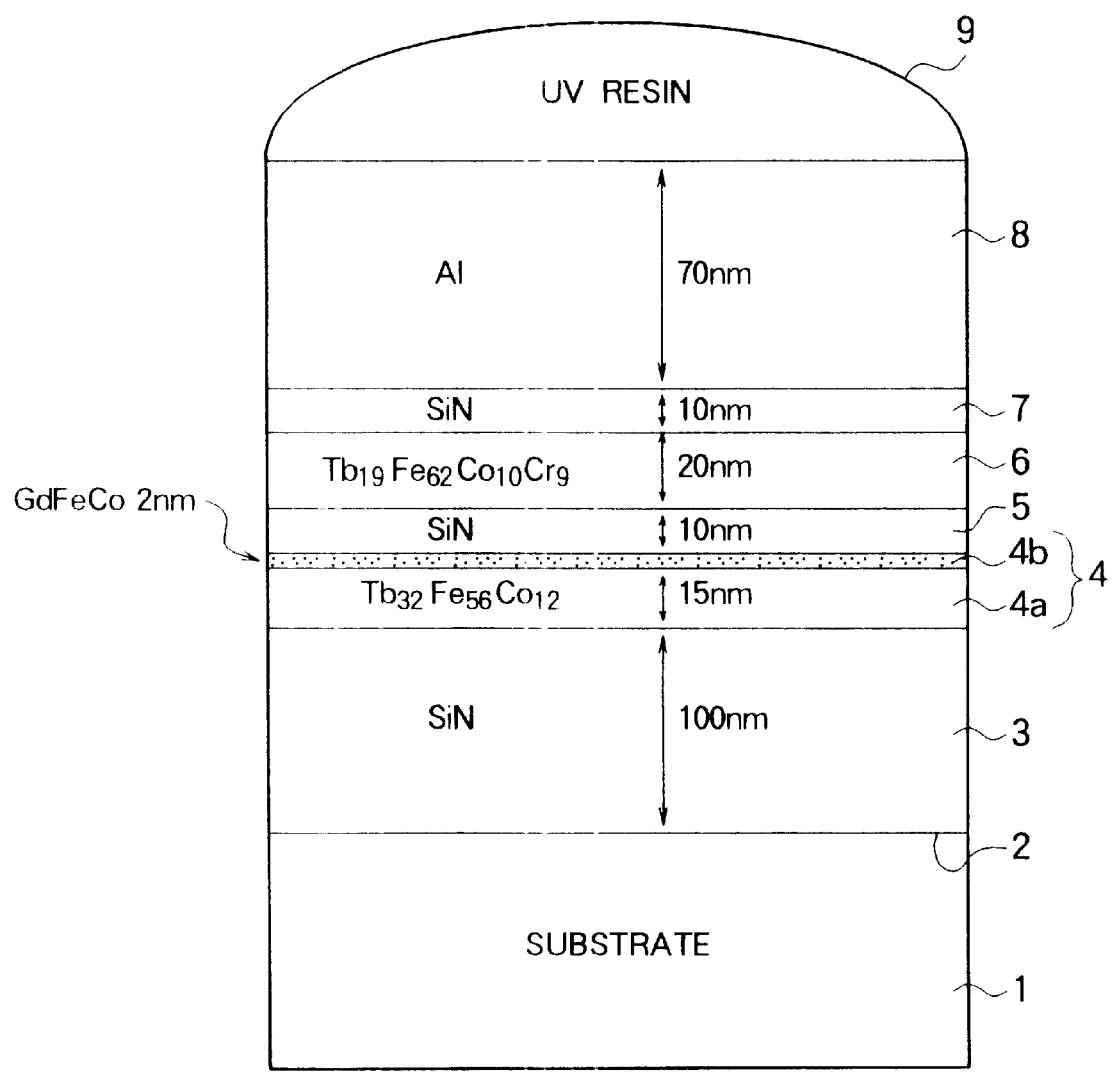
FIG. 25 is the cross section of a main part schematically showing an optomagnetic recording medium according to an eleventh embodiment.

As shown in FIG. 25, an optomagnetic recording medium of the present embodiment includes an SiN film of 100 nm thickness, a $Tb_{32}Fe_{56}Co_{12}$ film of 15 nm thickness, a $Gd_{18}Fe_{67}Co_{15}$ film of 2 nm thickness, an SiN film of 10 nm thickness, a $Tb_{19}Fe_{62}Co_{10}Cr_9$ film of 20 nm thickness, an SiN film of 10 nm thickness and an Al film of 70 nm thickness which are laminated successively in the mentioned order on a surface 2 of a transparent substrate 1 having a preformat pattern formed thereon. These films are covered with an ultraviolet-ray cured resin film.

The directly laminated $Tb_{32}Fe_{56}Co_{12}$ film and $Gd_{18}Fe_{67}Co_{15}$ film form a first recording layer 4. In the first recording layer 4, two recording states exist respectively in different magnetic field regions. The $Tb_{19}Fe_{62}Co_{10}$ film forms a second recording layer 6 in the form of a single layer. In the second recording layer 6, one recording state exists in a magnetic field region which is different from those for the first recording layer 4. Unlike the optomagnetic recording medium according to the first embodiment, the optomagnetic recording medium according to the present embodiment is characterized in that the first recording layer 4 provided on a side near to the substrate or on the recording/reproducing laser beam incidence side is constructed by the deposition of two magnetic films.

For the purpose of preventing the reduction of the amount of incidence of the laser beam onto the second recording layer 6, the GdFeCo film having a low rate of absorption of a laser beam is used as the auxiliary magnetic film forming the first recording layer 4 and is formed with a very thin film of 2 nm thickness.

Since the other portions are the same as those in the first embodiment, the explanation thereof will be omitted with the corresponding portions being denoted by the same reference numerals.

[Twelfth Embodiment]

Figure 26:
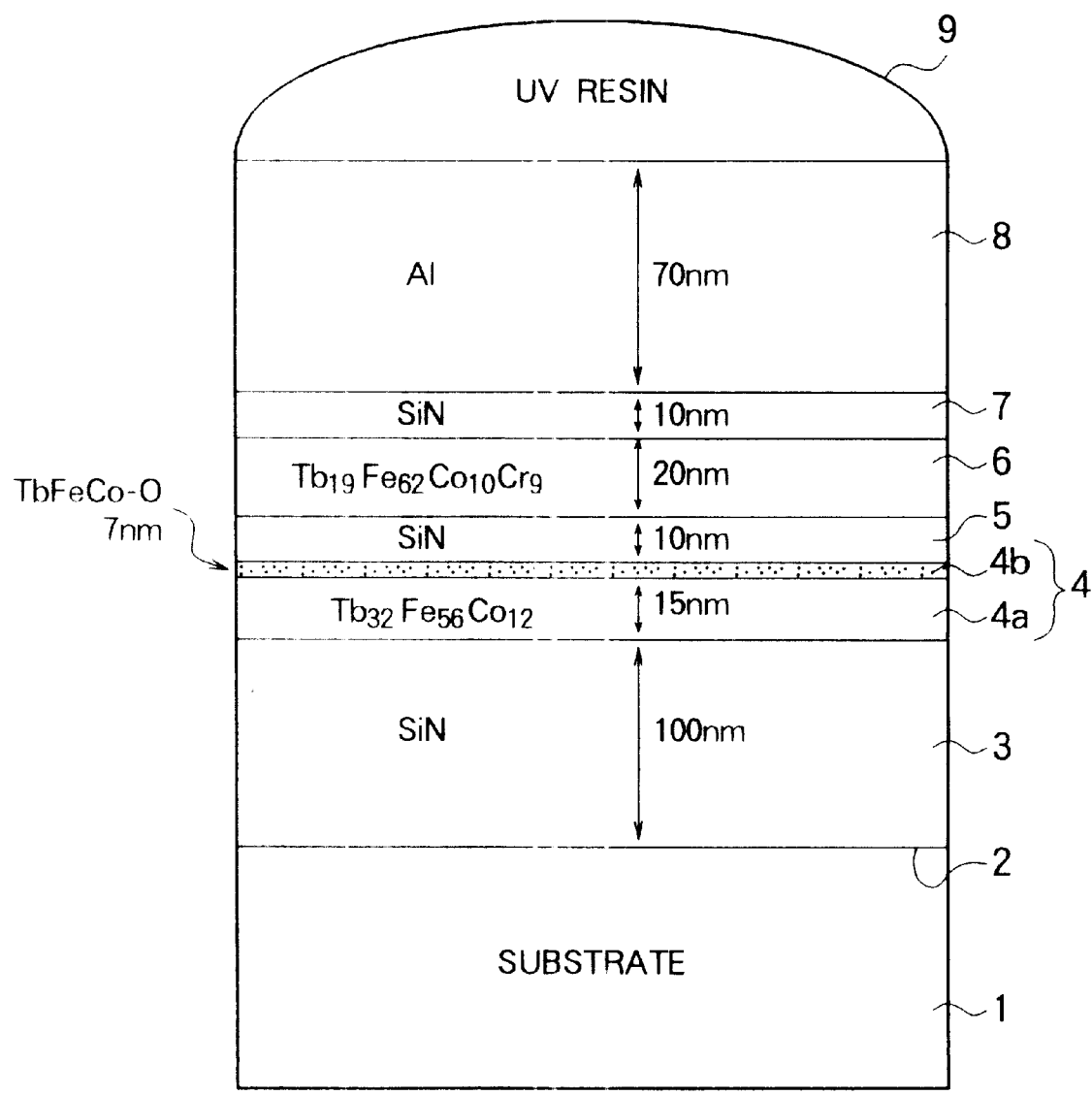
FIG. 26 is the cross section of a main part schematically showing an optomagnetic recording medium according to a twelfth embodiment.

As shown in FIG. 26, an optomagnetic recording medium of the present embodiment includes an SiN film of 100 nm thickness, a $Tb_{32}Fe_{56}Co_{12}$ film of 15 nm thickness, a $(Tb_{32}Fe_{56}Co_{12})_{92}O_8$ film of 7 nm thickness, an SiN film of 10 nm thickness, a $Tb_{19}Fe_{62}Co_{10}Cr_9$ film of 20 nm thickness, an SiN film of 10 nm thickness and an Al film of 70 nm thickness which are laminated successively in the mentioned order on a surface 2 of a transparent substrate 1 having a preformat pattern formed thereon. These films are covered with an ultraviolet-ray cured resin film.

The directly laminated $Tb_{32}Fe_{56}Co_{12}$ film and $(Tb_{32}Fe_{56}Co_{12})_{92}O_8$ film form a first recording layer 4. In the first recording layer 4, two recording states exist respectively in different magnetic field regions. The $Tb_{19}Fe_{62}Co_{10}$ film forms a second recording layer 6 in the form of a single layer. In the second recording layer 6, one recording state exists in a magnetic field region which is different from those for the first recording layer 4. In the optomagnetic recording medium according to the present embodiment, the $(Tb_{32}Fe_{56}Co_{12})_{92}O_8$ film having a low rate of absorption of a laser beam is used as the auxiliary magnetic film forming the first recording layer 4 and the thickness thereof is adjusted to 7 nm, in order that the amount of incidence of the laser beam onto the second recording layer 6 is not reduced.

Since the other portions are the same as those in the first embodiment, the explanation thereof will be omitted with the corresponding portions being denoted by the same reference numerals.

[Thirteenth Embodiment]

Figure 27:
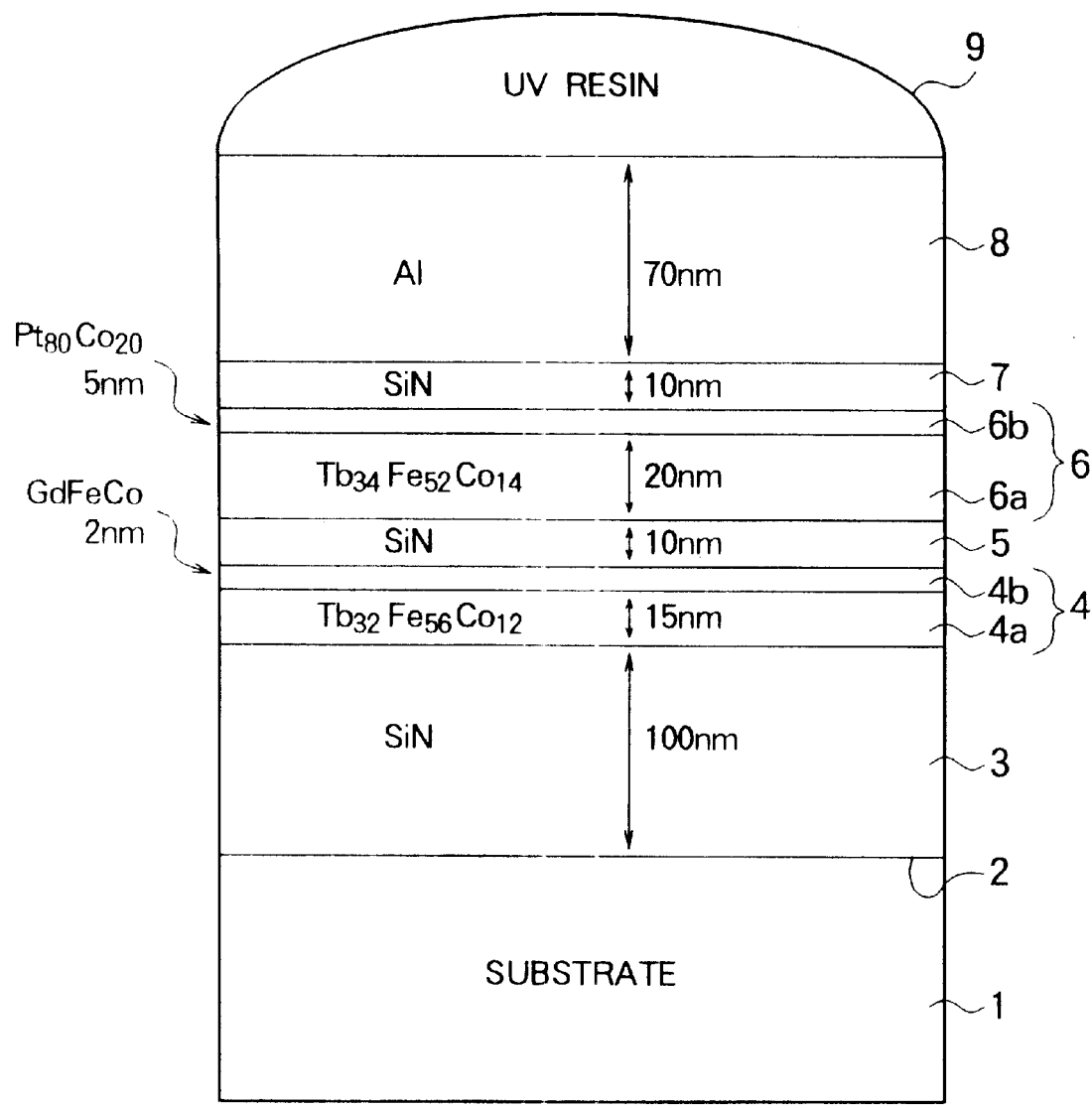
FIG. 27 is the cross section of a main part schematically showing an optomagnetic recording medium according to a thirteenth embodiment.

As shown in FIG. 27, an optomagnetic recording medium of the present embodiment includes an SiN film of 100 nm thickness, a $Tb_{32}Fe_{56}Co_{12}$ film of 15 nm thickness, a $Gd_{30}Fe_{48}Co_{22}$ film of 2 nm thickness, an SiN film of 10 nm thickness, a $Tb_{34}Fe_{52}Co_{14}$ film of 20 nm thickness, a $Pt_{94}Co_6$ film of 5 nm thickness, an SiN film of 10 nm thickness and an Al film of 70 nm thickness which are laminated successively in the mentioned order on a surface 2 of a transparent substrate 1 having a preformat pattern formed thereon. These films are covered with an ultraviolet-ray cured resin film.

The directly laminated $Tb_{32}Fe_{56}Co_{12}$ film and $Gd_{32}Fe_{48}Co_{22}$ film form a first recording layer 4. In the first recording layer 4, two recording states exist respectively in different magnetic field regions. Also, the directly laminated $Tb_{34}Fe_{52}Co_{14}$ film and $Pt_{94}Co_6$ film form a second recording layer 6. In the second recording layer 6, two recording states exist respectively in magnetic field regions which are different from those for the first recording layer 4. In the optomagnetic recording medium according to the present embodiment, the GdFeCo film having a low rate of absorption of a laser beam is used as the auxiliary magnetic film forming the first recording layer 4 and the thickness thereof is adjusted to 2 nm, in order that the amount of incidence of the laser beam onto the second recording layer 6 is not reduced.

Since the other portions are the same as those in the first embodiment, the explanation thereof will be omitted with the corresponding portions being denoted by the same reference numerals.

[Sixth Example Of Construction]

An optomagnetic recording medium according to the present example is characterized in that an auxiliary magnetic layer is managed so that the magnitude of a vertical magnetic anisotoropy energy and the magnitude of magnetization determining a shape magnetic anisotoropy energy can be controlled independently, thereby facilitating a control for the response of inversion of magnetization of a vertically magnetized film to an external magnetic field.

As auxiliary magnetic films belonging to the present example, the following can be enumerated: (1) a thin magnetic film containing as its main component at least one kind of metal element selected from Co, Fe, Ni, Cr and Mn and having a thickness adjusted to the range of 1 to 30 Å is provided adjoining the surface of a vertically magnetized film; (2) a thin magnetic film containing as its main component the alloy of at least one kind of metal element selected from Co, Fe, Ni, Cr and Mn and at least one kind of metal element selected from Pt, Al, Au, Rh, Pd, Cu, Ag, Re and Ru and having a thickness adjusted to the range of 1 to 30 Å is provided adjoining the surface of a vertically magnetized film; (3) a multi-layer film including the alternate two- or more-layer deposition of a thin metal film containing at least one kind of metal element selected from Co, Fe, Ni, Cr and Mn and a thin metal film containing at least one kind of metal element selected from Pt, Al, Au, Rh, Pd, Cu, Ag, Re and Ru is provided adjoining the surface of a vertically magnetized film; (4) the thickness of each thin metal film mentioned in (3) is adjusted to the range of 1 to 30 Å; and so forth.

In the case where there is used as the auxiliary magnetic layer a material in which a magnetic moment is easy to rotate in the direction of an external magnetic field in the vicinity of a recording temperature, a balance between its vertical magnetic anisotoropy energy and its shape magnetic anisotoropy energy becomes important. Namely, if the vertical magnetic anisotoropy energy is relatively too large, the magnetization is strongly fixed in the vertical direction and hence the magnetic moment becomes difficult to rotate in the external magnetic field direction. In the case where the magnetization is relatively too large, the shape magnetic anisotoropy energy becomes remarkably dominant so that the magnetic moment is fixed in an in-plane direction. In this case too, the magnetic moment becomes difficult to rotate in the external magnetic field direction.

If the magnitude of the vertical magnetic anisotoropy energy and the magnitude of magnetization determining the shape magnetic anisotoropy energy can be controlled independently, it is possible to easily form an auxiliary magnetic film which is preferable for a multi-valued recording medium. In the prior art, however, it has been acknowledged that the magnitude of the vertical magnetic anisotoropy energy and the magnitude of magnetization determining the shape magnetic anisotoropy energy are determined by a material. Therefore, the range of materials capable of being selected as the auxiliary magnetic layer material is small and it was difficult to obtain a sufficient recording characteristic.

When each of a thin magnetic film containing as its main component at least one kind of metal element selected from Co, Fe, Ni, Cr and Mn and a thin magnetic film containing as its main component the alloy of at least one kind of metal element selected from Co, Fe, Ni, Cr and Mn and at least one kind of metal element selected from Pt, Al, Au, Rh, Pd, Cu, Ag, Re and Ru is formed with a thickness in the range of about 1 to 30 Å, its magnetic characteristic changes due to the effect of two-dimensinalization, the contribution of a surface anisotoropy and so forth. This change of the magnetic characteristic includes the lowering of a Curie temperature and the manifestation of a vertical magnetic anisotoropy. Thereby, a change-over between a recorded state and an erased state by a small magnetic field becomes possible. Namely, the magnetic moment of a very thin magnetic film has a high response to an external magnetic field in a direction perpendicular to the film surface. Particularly, in the vicinity of a recording temperature, a relatively small external magnetic field causes the magnetic moment to be directed to the direction of application of the external magnetic field and this magnetic moment. Since this magnetic moment of the transition metal of a vertically magnetized film are exchange-coupled, the exchange coupling force gives a susceptible influence on the inversion of magnetization of the vertically magnetized film at the time of recording. Accordingly, the control of the region of response of magnetization inversion of the vertically magnetized film to the external magnetic field is facilitated.

Figure 28:
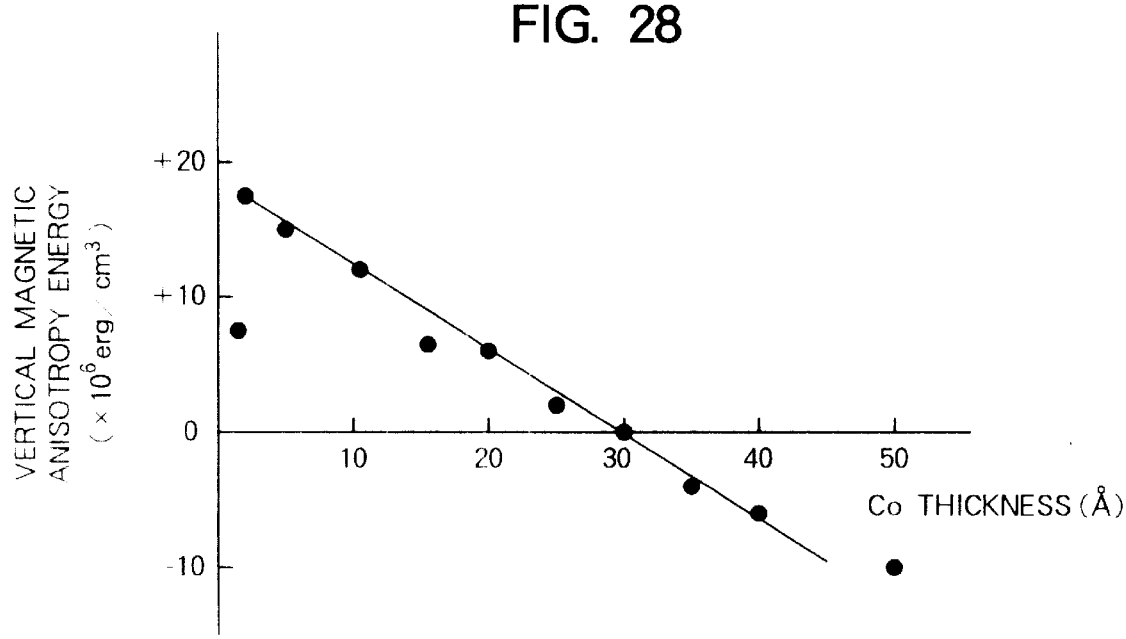
FIG. 28 is a graph showing a relationship between the film thickness of a Co film of an optomagnetic recording medium according to a sixth example of construction and a vertical magnetic anisotropy energy.

On the other hand, a multi-layer film including the alternate two- or more-layer deposition of a thin metal film of at least one kind of metal element selected from Co, Fe, Ni, Cr and Mn and a thin metal film of at least one kind of metal element selected from Pt, Al, Au, Rh, Pd, Cu, Ag, Re and Ru also exhibits a distinctive magnetic characteristic which includes the manifestation of a vertical magnetic anisotoropy. FIG. 28 is a graph showing the change of a vertical magnetic anisotoropy energy of a multi-layer film of a Pt film and a Co film when the thickness of the Co film is changed with the film thickness of the Pt film selected to 20 Å and with the total thickness selected to 200 Å. It is apparent from the figure that the vertical magnetic anisotoropy is manifested when the thickness of the Co film is in the range of 1 to 30 Å. Accordingly, if a thickness with which the vertical magnetic anisotoropy energy and the shape magnetic anisotoropy energy have approximately the same magnitude is selected from the thus obtained data, it is possible to provide an auxiliary magnetic layer in which a magnetic moment is easy to rotate in the direction of an external magnetic field in the vicinity of a recording temperature.

In the following, embodiments of an optomagnetic recording medium belonging to the present example will be shown.

[Fourteenth Embodiment]

Figure 29:
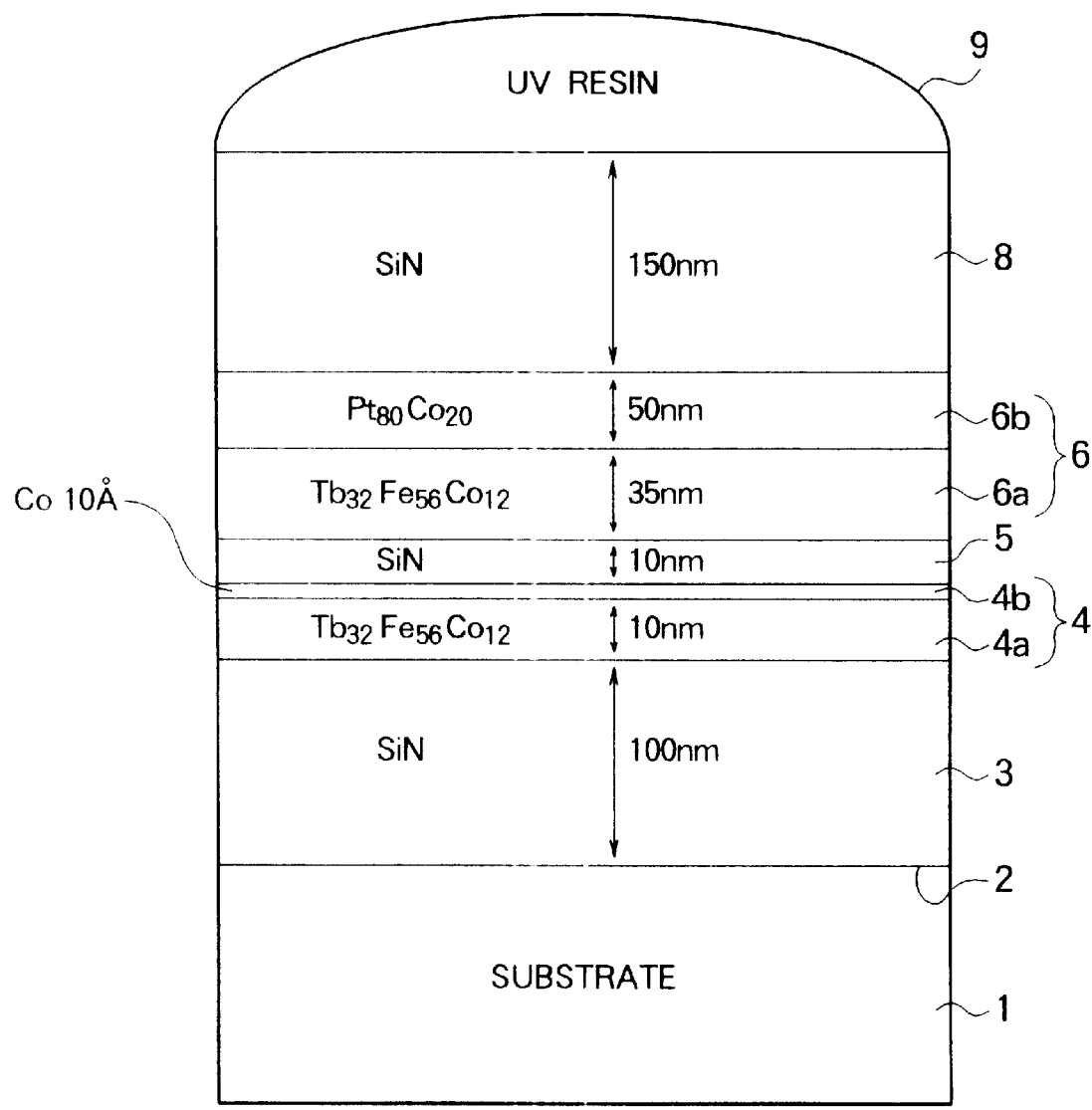
FIG. 29 is the cross section of a main part schematically showing an optomagnetic recording medium according to a fourteenth embodiment.

As shown in FIG. 29, an optomagnetic recording medium of the present embodiment includes an SiN film of 100 nm thickness, a $Tb_{32}Fe_{56}Co_{12}$ film of 10 nm thickness, a Co film of 10 Å thickness, an SiN film of 10 nm thickness, a $Tb_{32}Fe_{56}Co_{12}$ film of 35 nm thickness, a $Pt_{80}Co_{20}$ film of 50 nm thickness and an SiN film of 150 nm thickness which are laminated successively in the mentioned order on a surface 2 of a transparent substrate 1 having a preformat pattern formed thereon. These films are covered with an ultraviolet-ray cured resin film.

The SiN film of 100 nm thickness forms a first dielectric layer 3, the SiN film of 10 nm thickness forms a second dielectric layer 5 and the SiN film of 150 nm thickness forms a third dielectric layer 7. Also, the directly laminated $Tb_{32}Fe_{56}Co_{12}$ film and Co film form a first magnetic layer 4, and the directly laminated $Tb_{32}Fe_{56}Co_{12}$ film and $Pt_{80}Co_{20}$ film form a second magnetic layer 6. Further, the ultraviolet-ray cured resin film forms a protection film 9.

Figure 30:
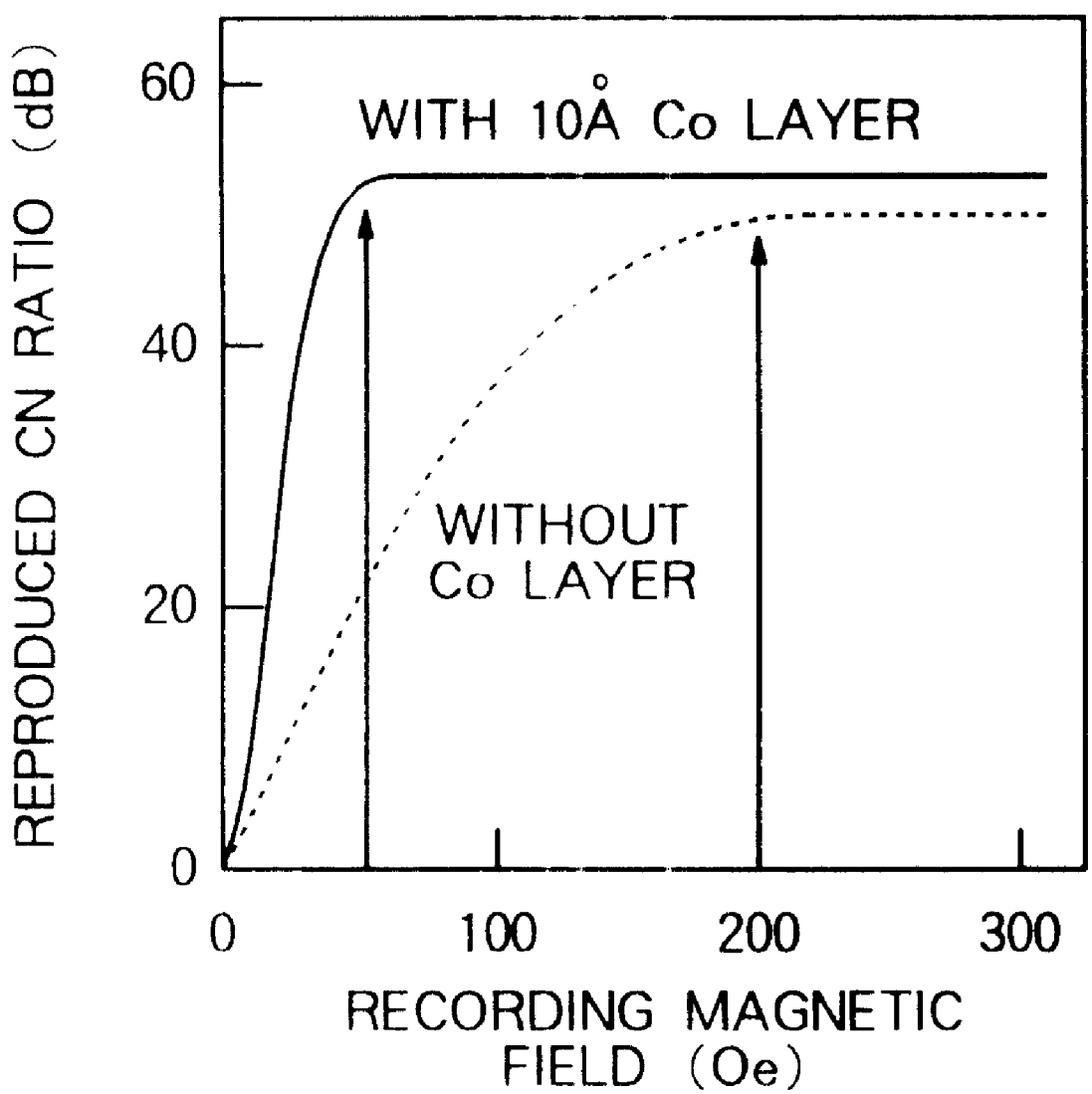
FIG. 30 is a diagram showing the change of reproduced CN ratio for a recording magnetic field in the fourteenth embodiment.

In accordance with an external magnetic field applied at the time of recording, the optomagnetic recording medium of the present embodiment has a reproduced signal output characteristic shown in FIG. 147 above referred to. Accordingly, in the optomagnetic recording medium of the present embodiment, a 4-valued signal can be recorded in accordance with the change of the external magnetic field. The change of a reproduced CN ratio (carrier-to-noise ratio) between a recording state "0" and a recording state "3" (magnetic field in a positive direction) in this optomagnetic recording medium for a recording magnetic field is shown in FIG. 30. It is apparent from the figure that the lowest external magnetic field (represented by arrow) necessary for obtaining a sufficient reproduced CN ratio is 200 (Oe) in the case of an optomagnetic recording medium having no Co layer whereas it is reduced to 50 (Oe) in the case of the optomagnetic recording medium of the present embodiment having the Co film of 10 Å thickness.

Figure 31:
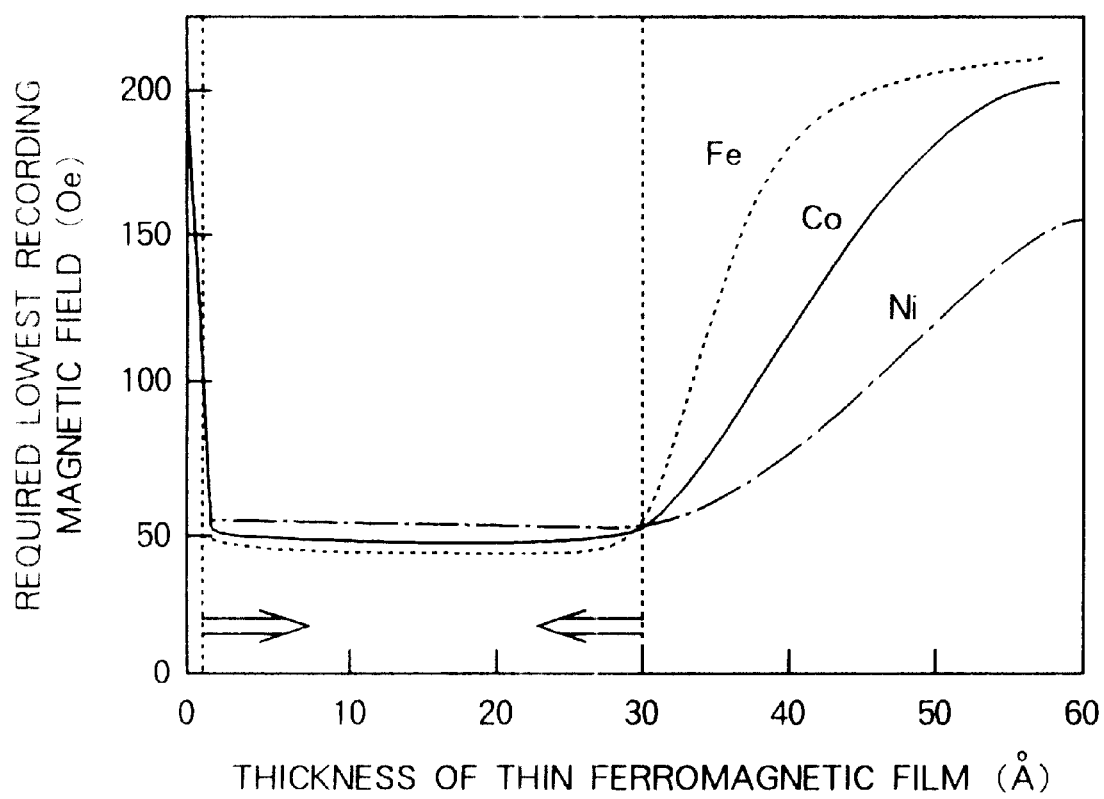
FIG. 31 is a graph showing a relationship between the kind and thickness of an auxiliary magnetic film of the optomagnetic recording medium according to the fourteenth embodiment and the required minimum magnitude of a recording magnetic field.

Also, a relationship between a thickness and the lowest external magnetic field necessary for obtaining a sufficient reproduced CN ratio was examined for each of a Co film, a Co film, a Ni film and a Mn film which are auxiliary magnetic films. The result of examination is shown in FIG. 31. As apparent from the figure, it was revealed that in the thickness range of 1 to 30 Å, the transitivity between a recorded state and an erased state for the external magnetic field is remarkably improved whichever material is used.

Figure 32:
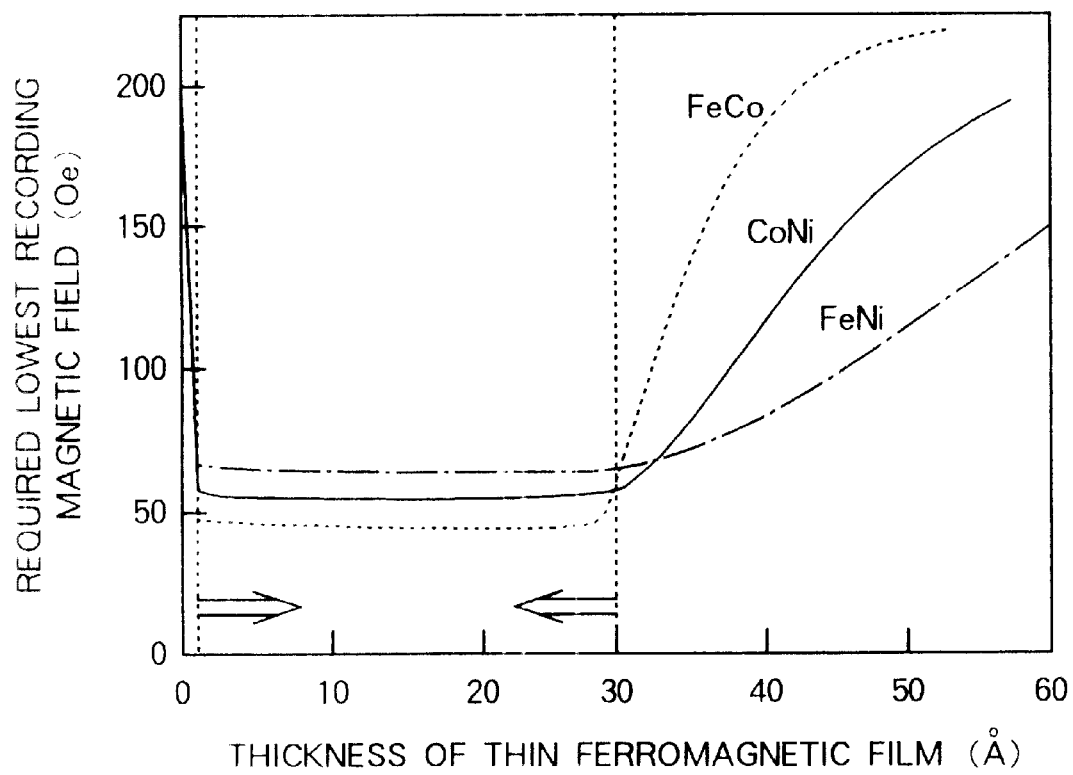
FIG. 32 is a graph showing a relationship between the kind and thickness of an auxiliary magnetic film of the optomagnetic recording medium according to the fourteenth embodiment and the required minimum magnitude of a recording magnetic field.

Further, for each of the cases where a FeCo alloy film, a CoNi alloy film and a FeNi alloy film are used as auxiliary magnetic films, respectively, there was examined a relationship between a thickness and the lowest external magnetic field necessary for obtaining a sufficient reproduced CN ratio. The result of examination is shown in FIG. 32. As apparent from the figure, it was revealed that in the thickness range of 1 to 30 Å, the transitivity between a recorded state and an erased state for the external magnetic field is remarkably improved whichever material is used. It was also revealed that when a thin magnetic film containing as its main component the alloy of at least one kind of metal element selected from Co, Fe, Ni, Cr and Mn and at least one kind of metal element selected from Pt, Al, Au, Rh, Pd, Cu, Ag, Re and Ru is used, a similar effect is obtained in any case.

[Fifteenth Embodiment]

Figure 33A:
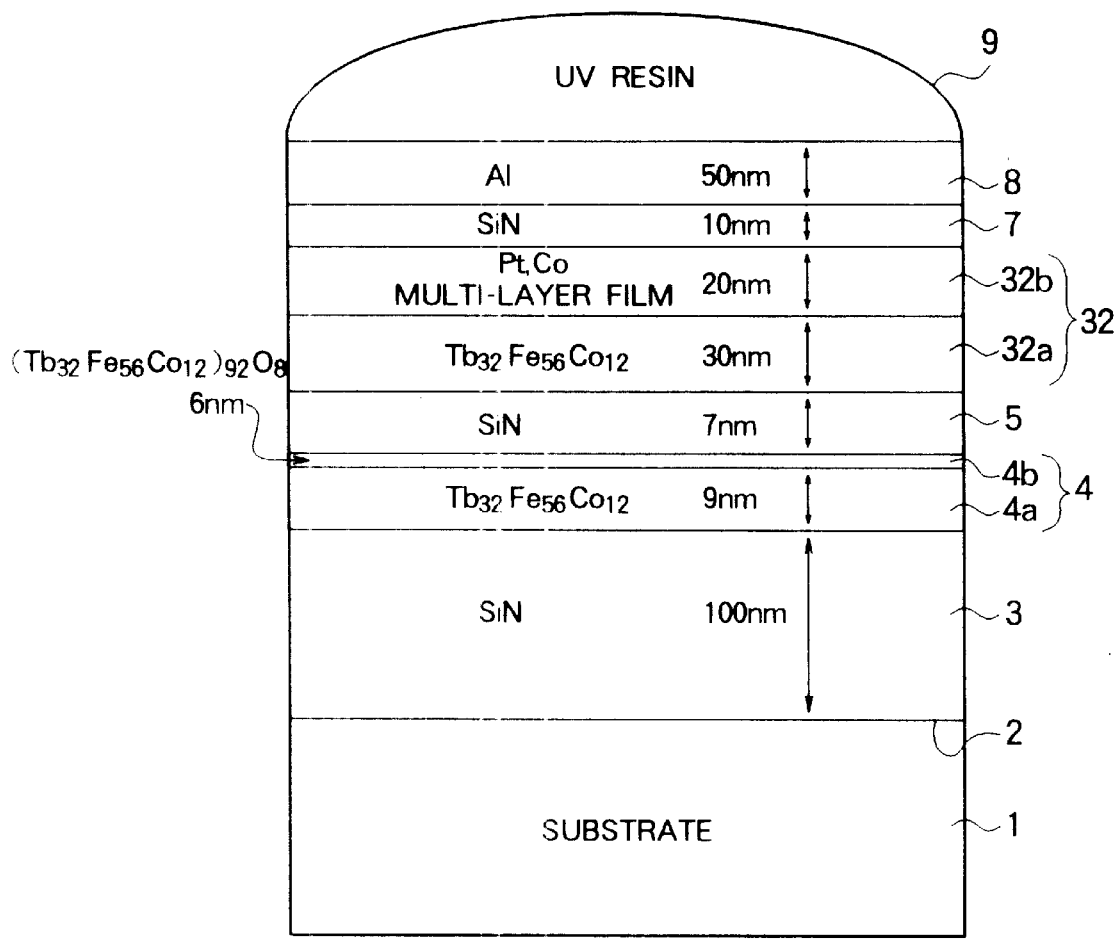
FIGS. 33A and 33B are the cross sections of a main part schematically showing an optomagnetic recording medium according to a fifteenth embodiment.
Figure 33B:
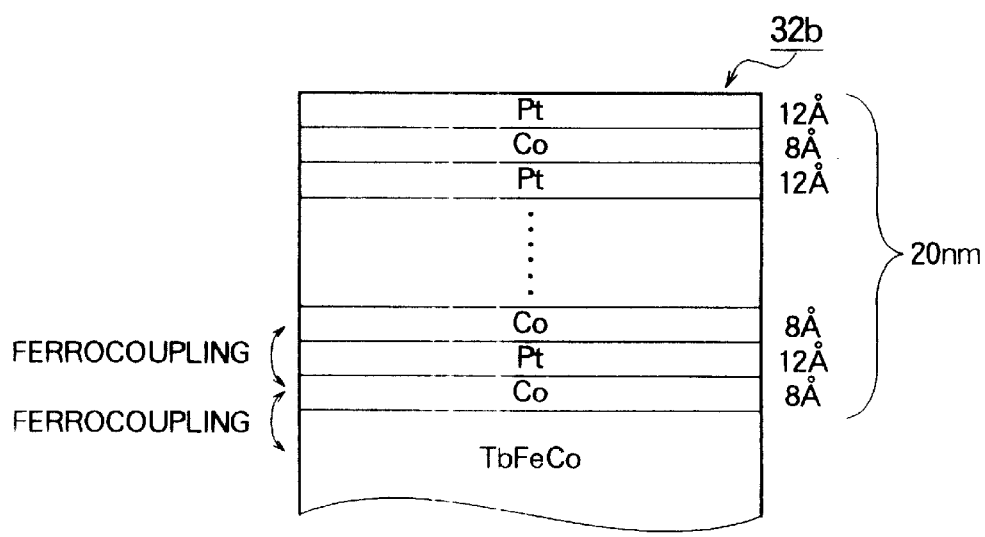

As shown in FIGS. 33A and 33B, an optomagnetic recording medium of the present embodiment includes an SiN film of 100 nm thickness, a $Tb_{32}Fe_{56}Co_{12}$ film of 9 nm thickness, a $(Tb_{32}Fe_{56}Co_{12})_{92}O_8$ film of 6 nm thickness, an SiN film of 7 nm thickness, a $Tb_{32}Fe_{56}Co_{12}$ film of 30 nm thickness, a multi-layer film inclusive of the deposition of a Co film of 8 Å thickness and a Pt film of 12 Å thickness with a total thickness adjusted to 200 nm, an SiN film of 10 nm thickness and an Al film of 50 nm thickness which are laminated successively in the mentioned order on a surface 2 of a transparent substrate 1 having a preformat pattern formed thereon. These films are covered with an ultraviolet-ray cured resin film.

The SiN film of 100 nm thickness forms a first dielectric layer 3, the SiN film of 7 nm thickness forms a second dielectric layer 5 and the SiN film of 10 nm thickness forms a third dielectric layer 7. Also, the directly laminated $Tb_{32}Fe_{56}Co_{12}$ film and $(Tb_{32}Fe_{56}Co_{12})_{92}O_8$ film form a first magnetic layer 4, and the directly laminated $Tb_{32}Fe_{56}Co_{12}$ film and PtCo multi-layer film form a second magnetic layer 32. Further, the Al film forms a reflecting film 8 and the ultraviolet-ray cured resin film forms a protection film 9.

The $Tb_{32}Fe_{56}Co_{12}$ film forming the second magnetic layer 32 has a rare earth rich composition. Therefore, the PtCo multi-layer film is coupled parallel to the magnetic moment of the transition metal of the $Tb_{32}FeCo_{12}$ film by virtue of exchange coupling. In accordance with an external magnetic field applied at the time of recording, the optomagnetic recording medium of the present embodiment has a reproduced signal output characteristic shown in FIG. 148 above referred to. Accordingly, in the optomagnetic recording medium of the present embodiment, a 4-valued signal can be recorded in accordance with the change of the external magnetic field.

[Sixteenth Embodiment]

Figure 34A:
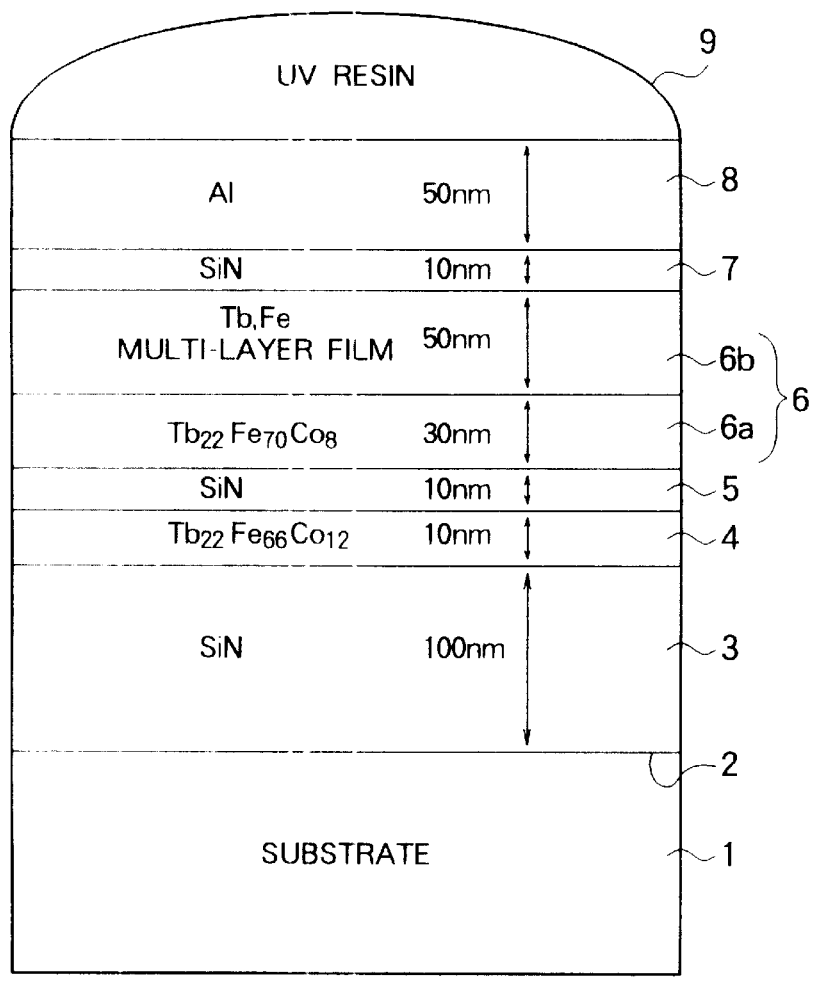
FIGS. 34A and 34B are the cross sections of main part schematically showing an optomagnetic recording medium according to a sixteenth embodiment.
Figure 34B:
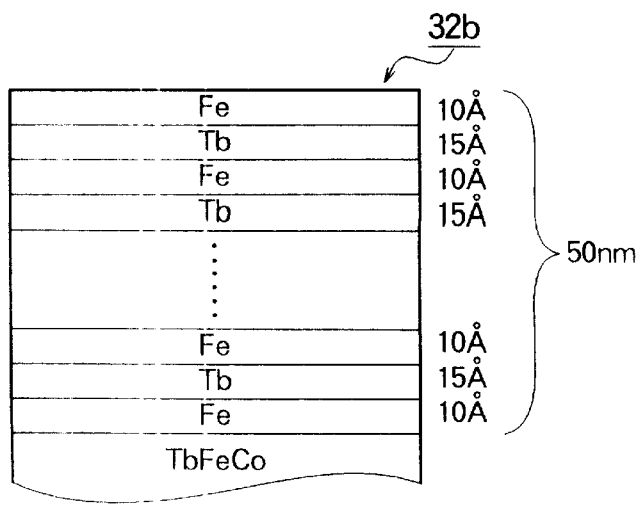

As shown in FIGS. 34A and 34B, an optomagnetic recording medium of the present embodiment includes an SiN film of 100 nm thickness, a $Tb_{22}Fe_{66}Co_{12}$ film of 10 nm thickness, an SiN film of 10 nm thickness, a $Tb_{22}Fe_{66}Co_{12}$ film of 30 nm thickness, a multi-layer film inclusive of the deposition of a Fe film of 10 Å thickness and a Tb film of 15 Å thickness with a total thickness adjusted to 50 nm, an SiN film of 10 nm thickness and an Al film of 50 nm thickness which are laminated successively in the mentioned order on a surface 2 of a transparent substrate 1 having a preformat pattern formed thereon. These films are covered with an ultraviolet-ray cured resin film.

The SiN film of 100 nm thickness forms a first dielectric layer 3, and the two SiN films of 10 nm thickness form second and third dielectric layers 5 and 7, respectively. Also, the $Tb_{22}Fe_{66}Co_{12}$ film of 10 nm thickness forms a first magnetic layer 4 by itself, and the directly laminated $Tb_{22}Fe_{66}Co_{12}$ film and TbFe multi-layer film form a second magnetic layer 6. Further, the Al film forms a reflecting film 8 and the ultraviolet-ray cured resin film forms a protection film 9.

The $Tb_{22}Fe_{66}Co_{12}$ film forming the second magnetic layer 6 has a transition metal rich composition. Therefore, the magnetic moment of the transition metal of the TbFe multi-layer film is coupled parallel to the magnetic moment of the transition metal of the $Tb_{22}Fe_{66}Co_{12}$ film by virtue of exchange coupling. In accordance with an external magnetic field applied at the time of recording, the optomagnetic recording medium of the present embodiment has a reproduced signal output characteristic shown in FIG. 35. Accordingly, in the optomagnetic recording medium of the present embodiment, a 4-valued signal can be recorded in accordance with the change of the external magnetic field.

[Seventeenth Embodiment]

Figure 36A:
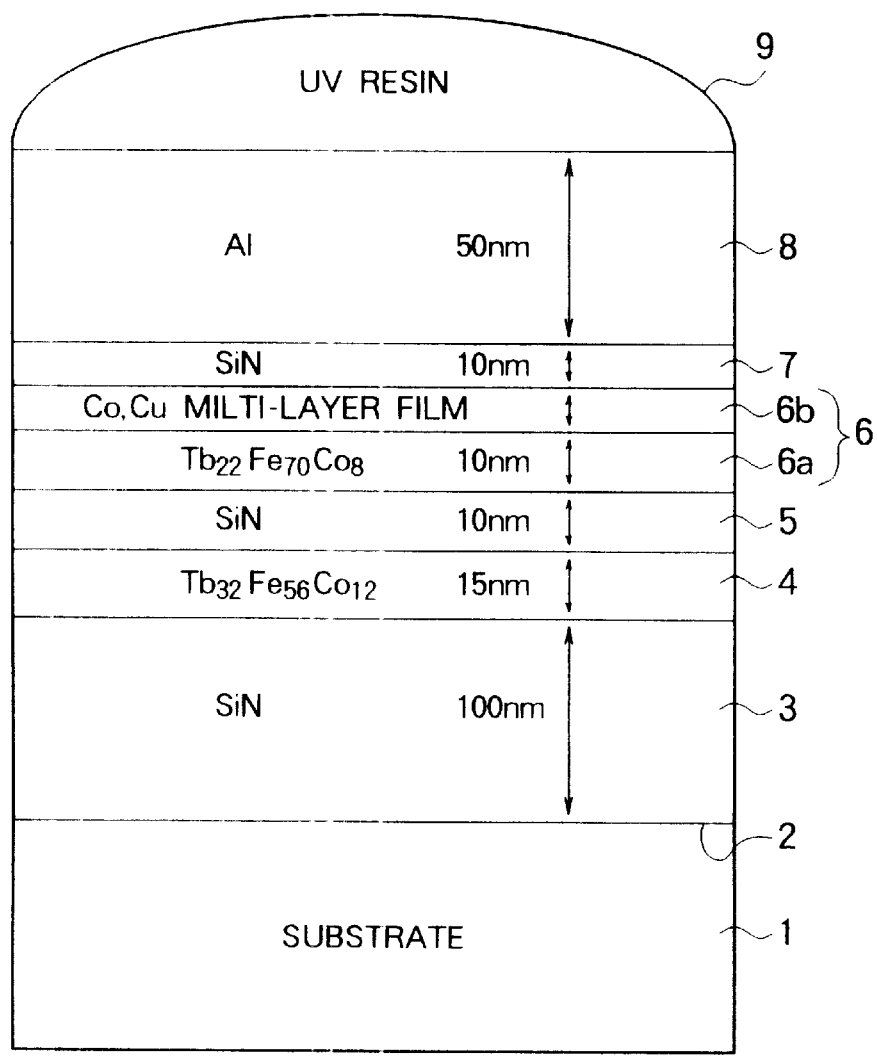
FIGS. 36A and 36B are the cross sections of main part schematically showing an optomagnetic recording medium according to a seventeenth embodiment.
Figure 36B:
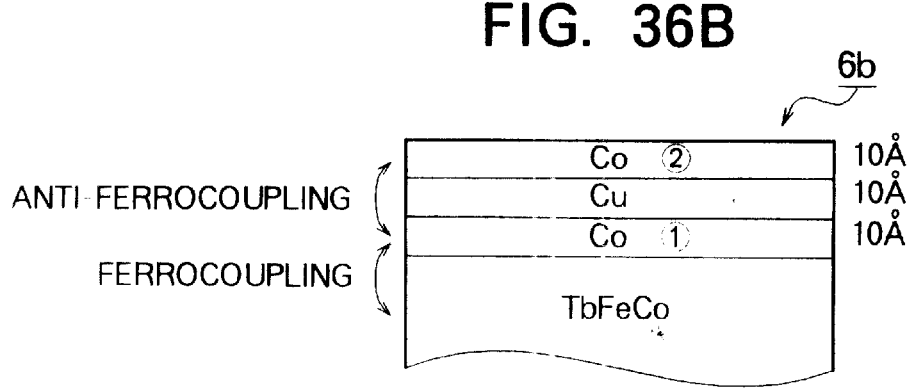

As shown in FIGS. 36A and 36B, an optomagnetic recording medium of the present embodiment includes an SiN film of 100 nm film thickness, a $Tb_{32}Fe_{56}Co_{12}$ film of 15 nm film thickness, an SiN film of 10 nm thickness, a $Tb_{22}Fe_{70}Co_8$ film of 10 nm thickness, a multi-layer film inclusive of the deposition of a Co film of 10 Å thickness and a Cu film of 10 Å thickness with a total thickness adjusted to 50 nm, an SiN film of 10 nm thickness and an Al film of 50 nm thickness which are laminated successively in the mentioned order on a surface 2 of a transparent substrate 1 having a preformat pattern formed thereon. These films are covered with an ultraviolet-ray cured resin film.

The SiN film of 100 nm thickness forms a first dielectric layer 3, and the two SiN films of 10 nm thickness form second and third dielectric layers 5 and 7, respectively. Also, the $Tb_{32}Fe_{56}Co_{12}$ film of 15 nm thickness forms a first magnetic layer 4 by itself, and the directly laminated $Tb_{22}Fe_{70}Co_8$ film and CoCu multi-layer film form a second magnetic layer 6. Further, the Al film forms a reflecting film 8 and the ultraviolet-ray cured resin film forms a protection film 9.

Figure 37:
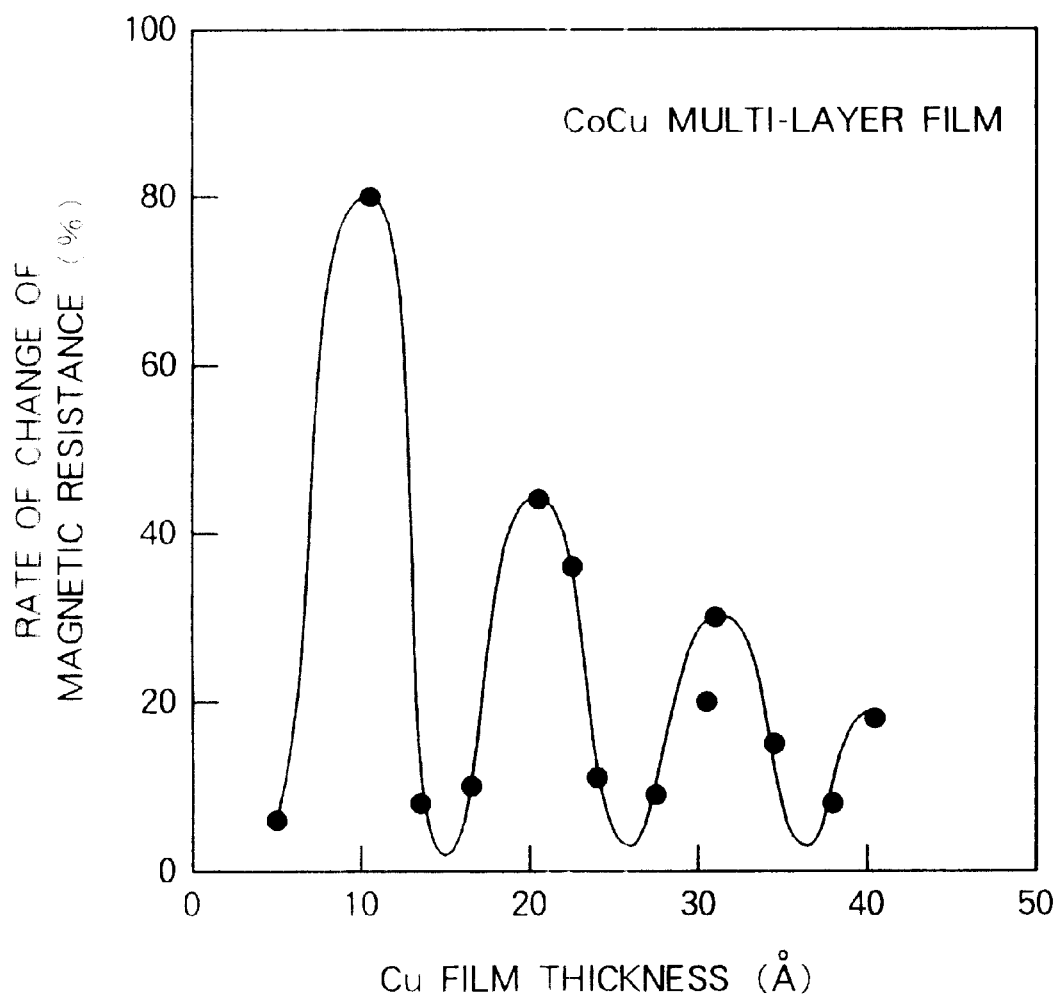
FIG. 37 is a graph showing a relationship between the thickness of a Cu film forming a CoCu multi-layer film of the optomagnetic recording medium according to the seventeenth embodiment and a magneto-resistance effect.

In a multi-layer film, an exchange coupling force may be exerted in parallel (ferrocoupling) or in anti-parallel (anti-ferrocoupling) in accordance with the thickness of each thin film. FIG. 37 shows the change of a magneto-resistance effect of a CoCu multi-layer film inclusive of Co and Cu films alternately laminated 20 times when the thickness of Co is selected to 10 Å and the thickness of Cu is changed. In the shown graph, a coupling between layers at a point showing a peak is anti-parallel and that at a bottom portion is parallel. In the optomagnetic recording medium of the present embodiment, the Co film of 10 Å thickness and the Cu film of 10 Å thickness are laminated in a multi-layer form and a coupling between layers is therefore anti-parallel.

Figure 38:
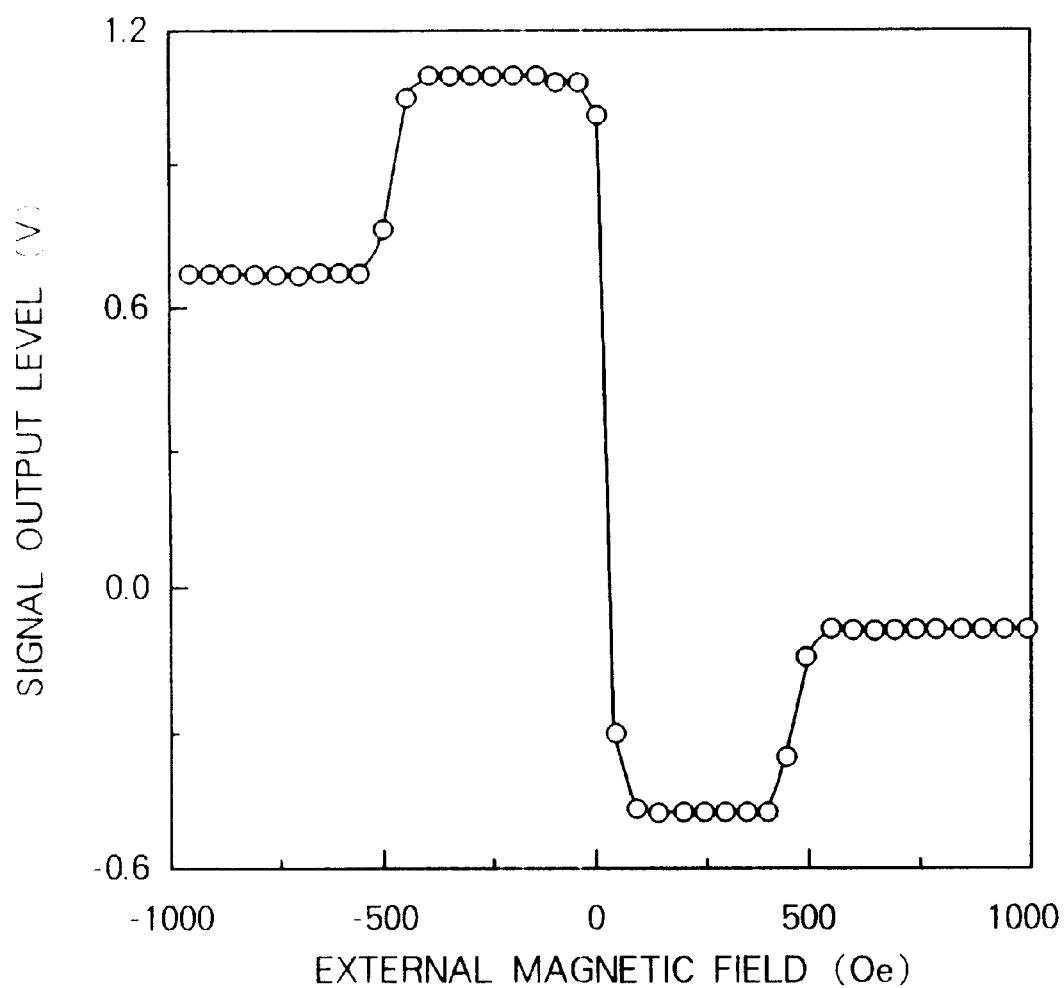
FIG. 38 is a diagram showing an external magnetic field versus reproduced signal output level characteristic in the seventeenth embodiment.

The $Tb_{22}Fe_{70}Co_8$ film forming the second magnetic layer 6 has a transition metal rich composition. Therefore, the magnetic moment of the transition metal of the $Tb_{22}Fe_{70}Co_8$ film is ferrocoupled with the Co film laminated just above the $Tb_{22}Fe_{70}Co_8$ film. This just above Co film and the second Co film laminated thereon through the Cu film is anti-ferrocoupled with each other. In accordance with an external magnetic field applied at the time of recording, the optomagnetic recording medium of the present embodiment has a reproduced signal output characteristic shown in FIG. 38. Accordingly, in the optomagnetic recording medium of the present embodiment, a 4-valued signal can be recorded in accordance with the change of the external magnetic field.

[Eighteenth Embodiment]

Figure 39A:
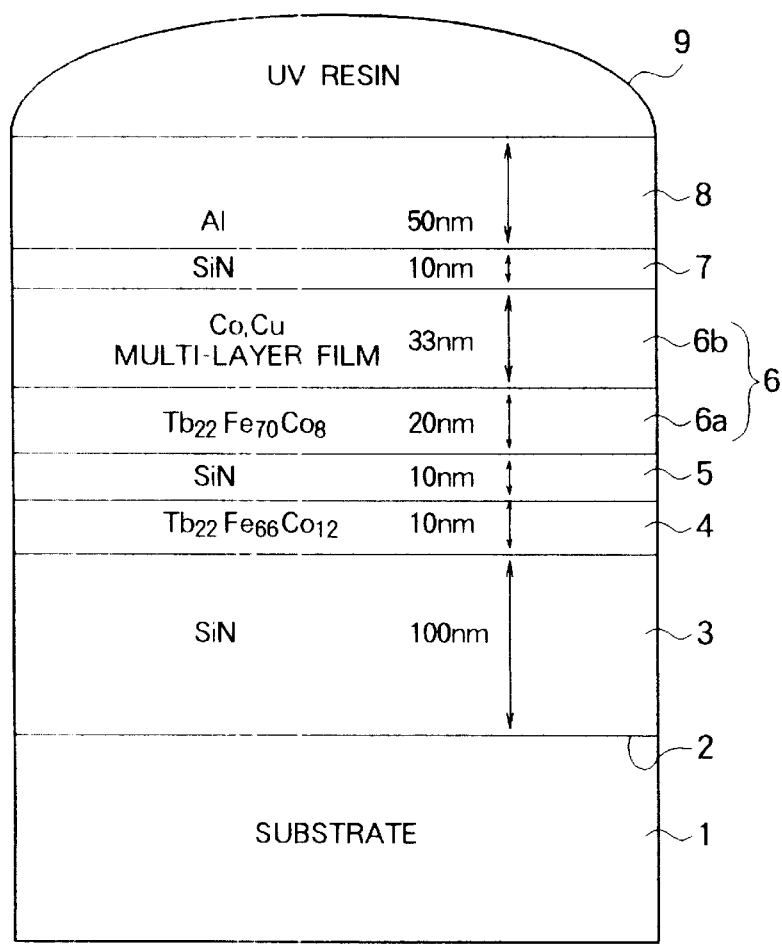
FIGS. 39A and 39B are the cross sections of a main part schematically showing an optomagnetic recording medium according to an eighteenth embodiment
Figure 39B:
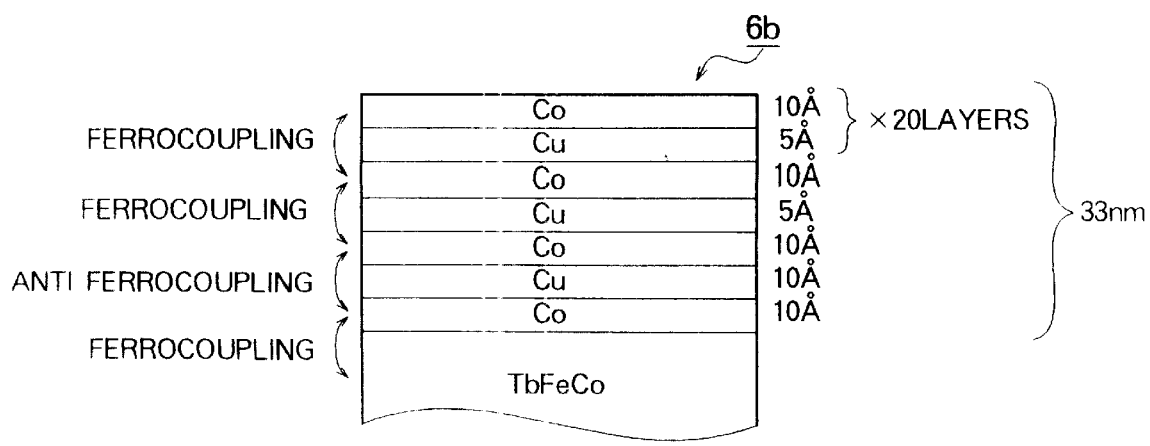

As shown in FIGS. 39A and 39B, an optomagnetic recording medium of the present embodiment includes an SiN film of 100 nm thickness, a $Tb_{22}Fe_{66}Co_{12}$ film of 10 nm thickness, an SiN film of 10 nm thickness, a $Tb_{22}Fe_{70}Co_8$ film of 20 nm thickness, a multi-layer film including the 3-layer deposition of a Co film of 10 Å thickness and a Cu film of 10 Å thickness and the 20-layer deposition of a Co film of 5 Å thickness and a Cu film of 10 Å thickness on the 3-layer deposition and having a total thickness adjusted to 33 nm, an SiN film of 10 nm thickness and an Al film of 50 nm thickness which are laminated successively in the mentioned order on a surface 2 of a transparent substrate 1 having a preformat pattern formed thereon. These films are covered with an ultraviolet-ray cured resin film.

The SiN film of 100 nm thickness forms a first dielectric layer 3, and the two SiN films of 10 nm thickness form second and third dielectric layers 5 and 7, respectively. Also, the $Tb_{22}Fe_{66}Co_{12}$ film of 10 nm thickness forms a first magnetic layer 4 by itself, and the directly laminated $Tb_{22}Fe_{70}Co_8$ film and CoCu multi-layer film form a second magnetic layer 6. Further, the Al film forms a reflecting film 8 and the ultraviolet-ray cured resin film forms a protection film 9.

The $Tb_{22}Fe_{70}Co_8$ film forming the second magnetic layer 6 has a transition metal rich composition. Therefore, the magnetic moment of the transition metal of the $Tb_{22}Fe_{70}Co_8$ film is ferrocoupled with the Co film laminated just above the $Tb_{22}Fe_{70}Co_8$ film. This just above Co film and the second Co film laminated thereon through the Cu film is anti-ferrocoupled with each other. Also, the second Co film and the third Co film laminated thereon through the Cu film is ferrocoupled with each other. In accordance with an external magnetic field applied at the time of recording, the optomagnetic recording medium of the present embodiment has a reproduced signal output characteristic shown in FIG. 35 above referred to. Accordingly, in the optomagnetic recording medium of the present embodiment, a 4-valued signal can be recorded in accordance with the change of the external magnetic field.

A similar effect was obtained for optomagnetic any recording medium having as an auxiliary magnetic film a multi-layer film in which a thin metal film containing at least one kind of metal element selected from Co, Fe, Ni, Cr and Mn and a thin metal film containing at least one kind of metal element selected from Pt, Al, Au, Rh, Pd, Cu, Ag, Re and Ru are alternately laminated with the number of layers equal to 2 or more than that.

The number of layers in the multi-layer film is properly adjusted in conjunction with the control of an exchange coupling force to the TbFeCo film which is a vertically magnetized film. In the optomagnetic recording medium having the CoCu multi-layer film as the auxiliary magnetic film, the first Co film adjoining the TbFeCo film can be omitted.

In the optomagnetic recording medium of the sixth example of construction, a rapid change-over between a recorded state and an erased state is enabled by a small magnetic field. Therefore, a signal recording can be performed immediately without performing an operation of aligning the direction of magnetization in an initial state.

[Seventh Example Of Construction]

An optomagnetic recording medium according to the present example is characterized in that a film structure for realizing a so-called super-resolution image is added to an optomagnetic recording medium for multi-valued recording as shown in the first to fifth examples of construction.

Figure 40:
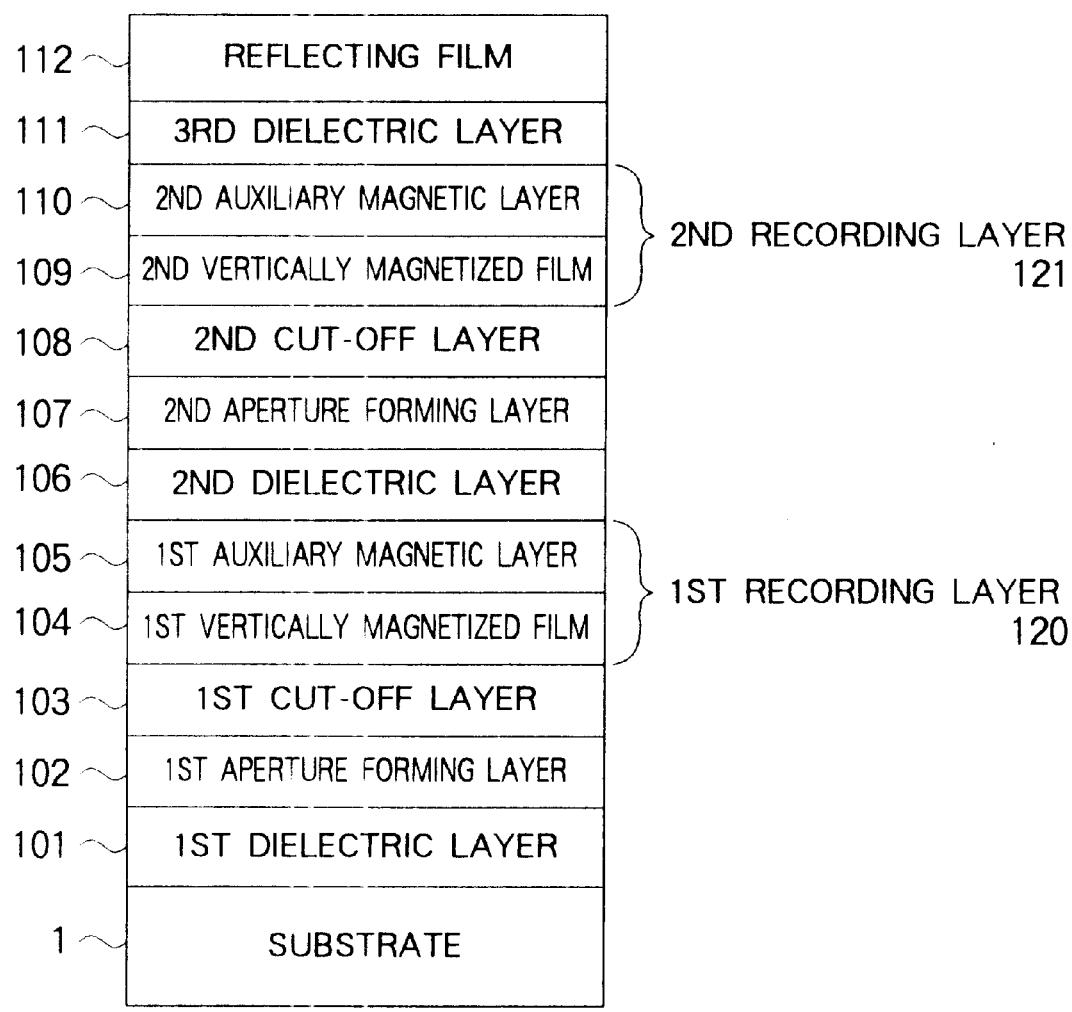
FIG. 40 is the cross section of a main part schematically showing an optomagnetic recording medium according to a seventh example of construction.

The construction of an example thereof is shown in FIG. 40. FIG. 40 shows the case where the present invention is applied to an optomagnetic recording medium for multi-valued recording which has two recording layers. As apparent from the figure, the optomagnetic recording medium of the present example is constructed in principle by a first dielectric layer 101, a first aperture forming layer 102, a first cut-off layer 103, a first vertically magnetized film layer 104, a first auxiliary magnetic layer 105, a second dielectric layer 106, a second aperture forming layer 107, a second cut-off layer 108, a second vertically magnetized film layer 109, a second auxiliary magnetic layer 110, a third dielectric layer 111 and a reflecting layer 112 which are formed on a transparent substrate 1. A first recording layer 120 is formed by the combination of the first vertically magnetized film layer 104 and the first auxiliary magnetic layer 105, and a second recording layer 121 is formed by the combination of the second vertically magnetized film layer 109 and the second auxiliary magnetic layer 110.

The first aperture forming layer 102, the first cut-off layer 103 and the first recording layer 120 are laminated in this order in the direction of incidence of a reproducing laser beam and are formed by magnetic films which magnetically exchange-couple with each other at the room temperature. Provided that the Curie temperature and the coercive force of the first aperture forming layer 102 are $Tc_1$ and $Hc_1$, the Curie temperature and the coercive force of the first cut-off layer 103 are $Tc_2$ and $Hc_2$, the Curie temperature and the coercive force of the first recording layer 120 are $Tc_3$ and $Hc_3$, the room temperature is $T_0$, an exchange magnetic field exerted on the first aperture forming layer 102, the first cut-off layer 103 and the first recording layer 120 is Hw and an external magnetic field applied at the time of reproduction (hereinafter referred to as reproducing magnetic field) is Hr, Curie temperatures and coercive forces of the magnetic films 102, 103 and 120 are adjusted so as to satisfy the following conditions:

(1) $T_0 < Tc_2 < Tc_1, Tc_3$;

(2) $Hc_1 + Hw < Hr$ (in a region where a temperature rise up to the Curie temperature $Tc_2$ of the first cut-off layer 103 or the vicinity thereof is caused at the time of reproduction);

(3) $Hc_3 > Hr$ (in a region where a temperature rise up to the Curie temperature $Tc_2$ of the first cut-off layer 103 or the vicinity thereof is caused at the time of reproduction); and (4) $Hc_1 < Hr$ (at the room temperature).

The second aperture forming layer 107, the second cut-off layer 108 and the second recording layer 121 are also constructed in a manner similar to that mentioned above.

Figure 41:
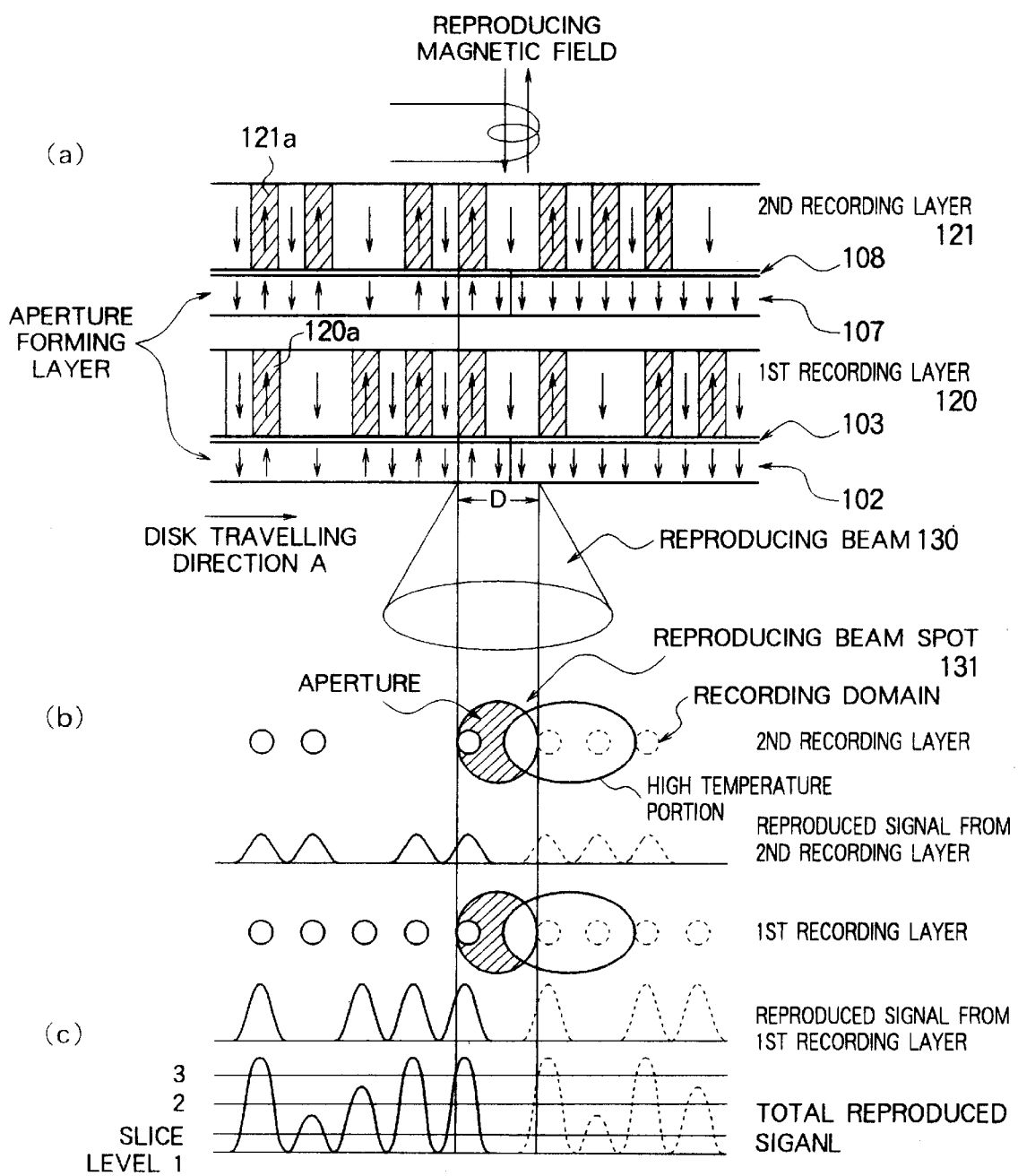
FIG. 41 is an explanatory diagram showing a first example of a magnetic super-resolution reproducing system using the optomagnetic recording medium according to the seventh example of construction.

In the following, the principle of reproduction of a signal from the optomagnetic recording medium having the above construction will be explained on the basis of FIG. 41. In the optomagnetic recording medium, recording marks 120a and 121a having a diameter smaller than the spot diameter D of a reproducing beam 130 are recorded along a recording track at a pitch smaller than the spot diameter D of the reproducing beam 130, as shown in FIG. 41(a).

When the optomagnetic recording medium is irradiated with the reproducing beam 130 while the optomagnetic recording medium is driven relative to an optical head and a magnetic head, the temperature of the first aperture forming layer 102, the first cut-off layer 103, the first recording layer 120, the second aperture forming layer 107, the second cut-off layer 108 and the second recording layer 121 is raised by the energy of the reproducing beam. When the recording track is irradiated therealong with the reproducing beam 130 while the optomagnetic recording medium is driven in a direction indicated by arrow A, a rear edge portion of a spot 131 takes the highest temperature by a temperature distribution in a portion with the relatively travelling reproducing beam 130, as shown in FIG. 41(b). Thus, if the intensity of the reproducing beam 130 is adjusted so that the temperature of the high temperature region becomes equal to or higher than the Curie temperature $Tc_2$ of the first and second cut-off layers 103 and 108 or the vicinity thereof, the exchange magnetic field Hw exerted by the cut-off layers 103 and 108 and the recording layers 120 and 121 on the aperture-formed layers 102 and 107 becomes zero or takes a very small value so that magnetic coupling between the aperture forming layers 102 and 107 and the recording layers 120 and 121 is cut off.

When a reproducing magnetic field Hr larger than $Hc_1$+Hw is applied to each magnetic film in the above-mentioned state, the magnetization of portions of the aperture forming layers 102 and 107 corresponding to the high temperature region 131a is aligned in the direction of an erasing magnetic field so that the recording marks 120a and 121a of the aperture forming layers 102 and 107 in that region are erased, as shown in FIG. 41(a). On the other hand, in portions other than the high temperature region 131a, since the exchange magnetic field Hw maintains a large value and the aperture forming layers 102 and 107 and the recording layers 120 and 121 are magnetically coupled, the recording marks 120a and 121a recorded in the aperture forming layers 102 and 107 are held as they are. Accordingly, when the recording beam 130 is operated along the recording track, the recording marks 120a and 121a in the high temperature region 131a are masked in connection with the reading of a signal and only a crescent-shaped portion of the spot 131 excepting the high temperature region 131a serves an aperture through which a signal from the recording marks 120a and 121a is read. Therefore, the reading of a signal from the optomagnetic recording medium with a pitch between magnetic domains adjusted to the order of ½ of the spot diameter D becomes possible, improving a reproduction resolving power.

The coercive force $Hc_3$ of the recording layers 120 and 121 is set to be larger than the reproducing magnetic field Hr. Therefore, no erasion of the recording marks 120a and 121a of the recording layers 120 and 121 is caused by the application of the reproducing magnetic field Hr. Also, a portion of the optomagnetic recording medium other than the portion with the reproducing beam 130 with the driving of the optomagnetic recording medium is successively cooled down to the room temperature so that the exchange magnetic field Hw revives again between the magnetic films at a stage of time when the temperature of the cut-off layers 103 and 108 is lowered to a value equal to or lower than $Tc_2$. Magnetization-inverted domains of the recording layers 120 and 121 are transferred to the aperture forming layers 102 and 107 by that exchange coupling force. Therefore, even if the operation of reproduction of a signal is repeated, the initial recorded state is not extinguished. Accordingly, it is possible to reproduce a multi-value recorded signal with a high resolving power by slicing a read total reproduction signal on the basis of a plurality of slice signals corresponding to respective signal levels, as shown in FIG. 41(c).

Figure 42:
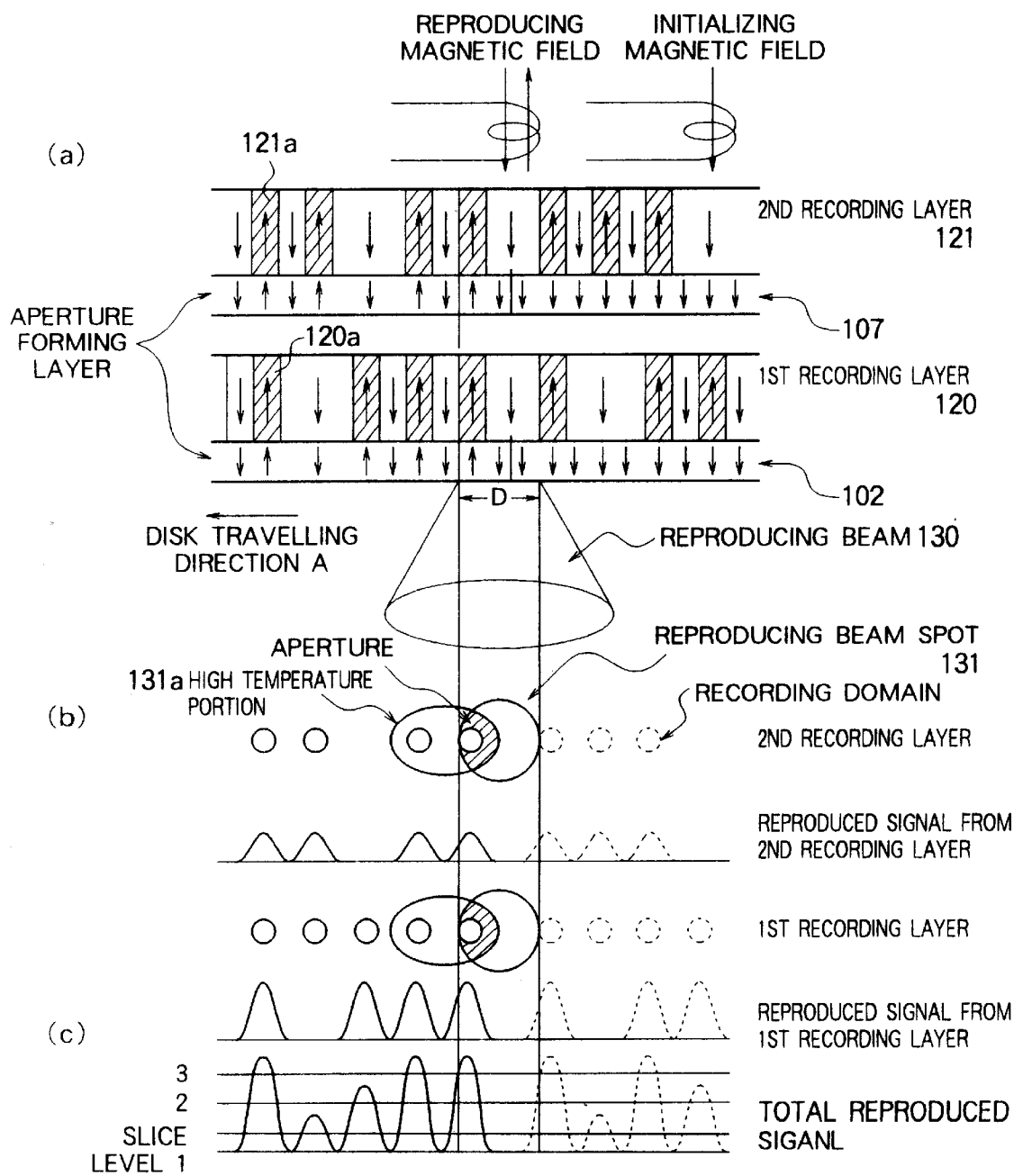
FIG. 42 is an explanatory diagram showing a second example of a magnetic super-resolution reproducing system using the optomagnetic recording medium according to the seventh example of construction.

FIG. 42 shows another example of a multi-value recorded signal reproducing method based on a magnetic super-resolution system. Unlike the method shown in FIG. 41, the reproducing system of the present example is characterized in that an initializing magnetic field is applied to aperture forming layers 102 and 107 on the upstream side of an optical head to form an aperture in a high temperature portion 131a.

Figure 43:
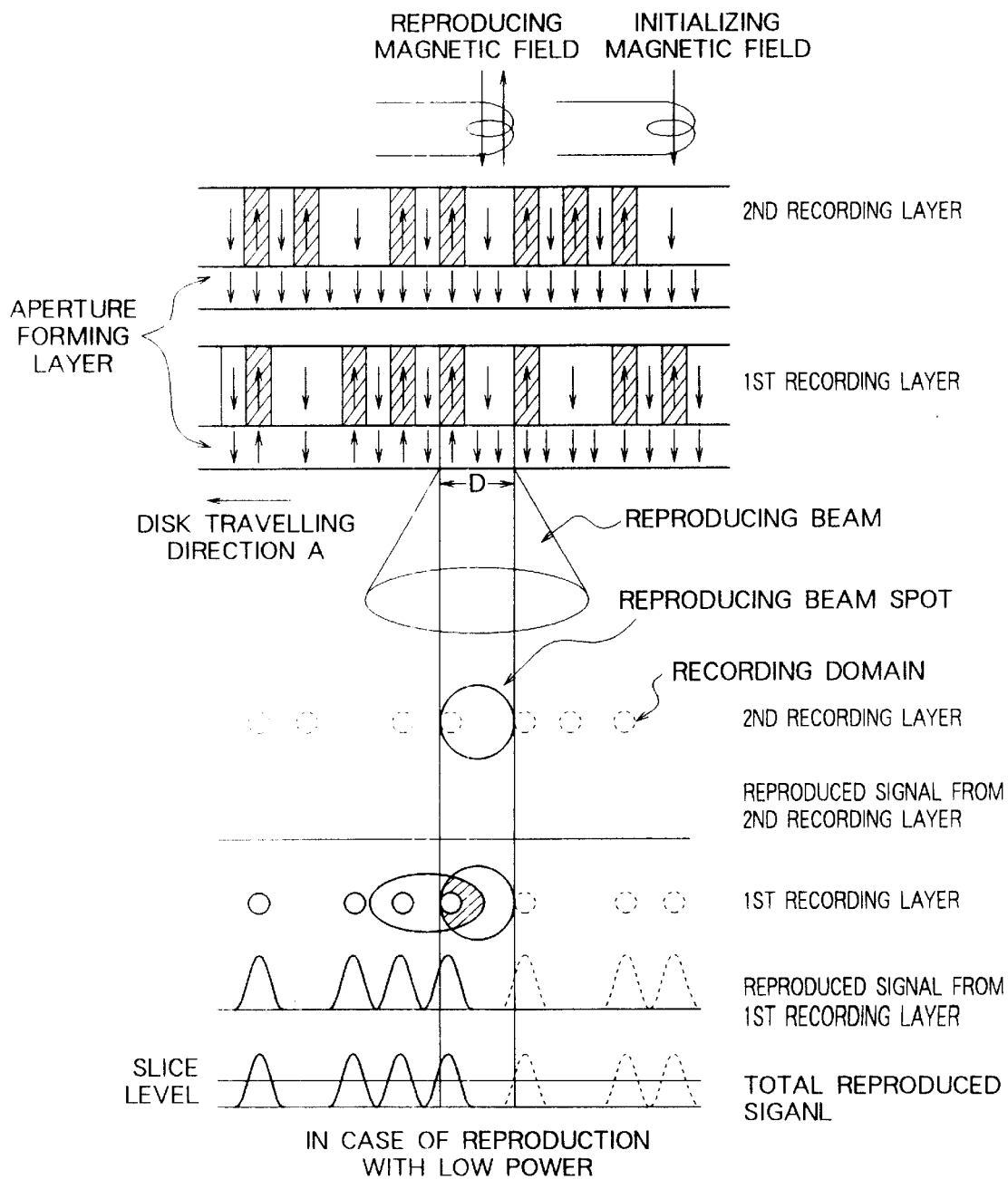
FIG. 43 is an explanatory diagram showing a third example of a magnetic super-resolution reproducing system using the optomagnetic recording medium according to the seventh example of construction.
Figure 44:
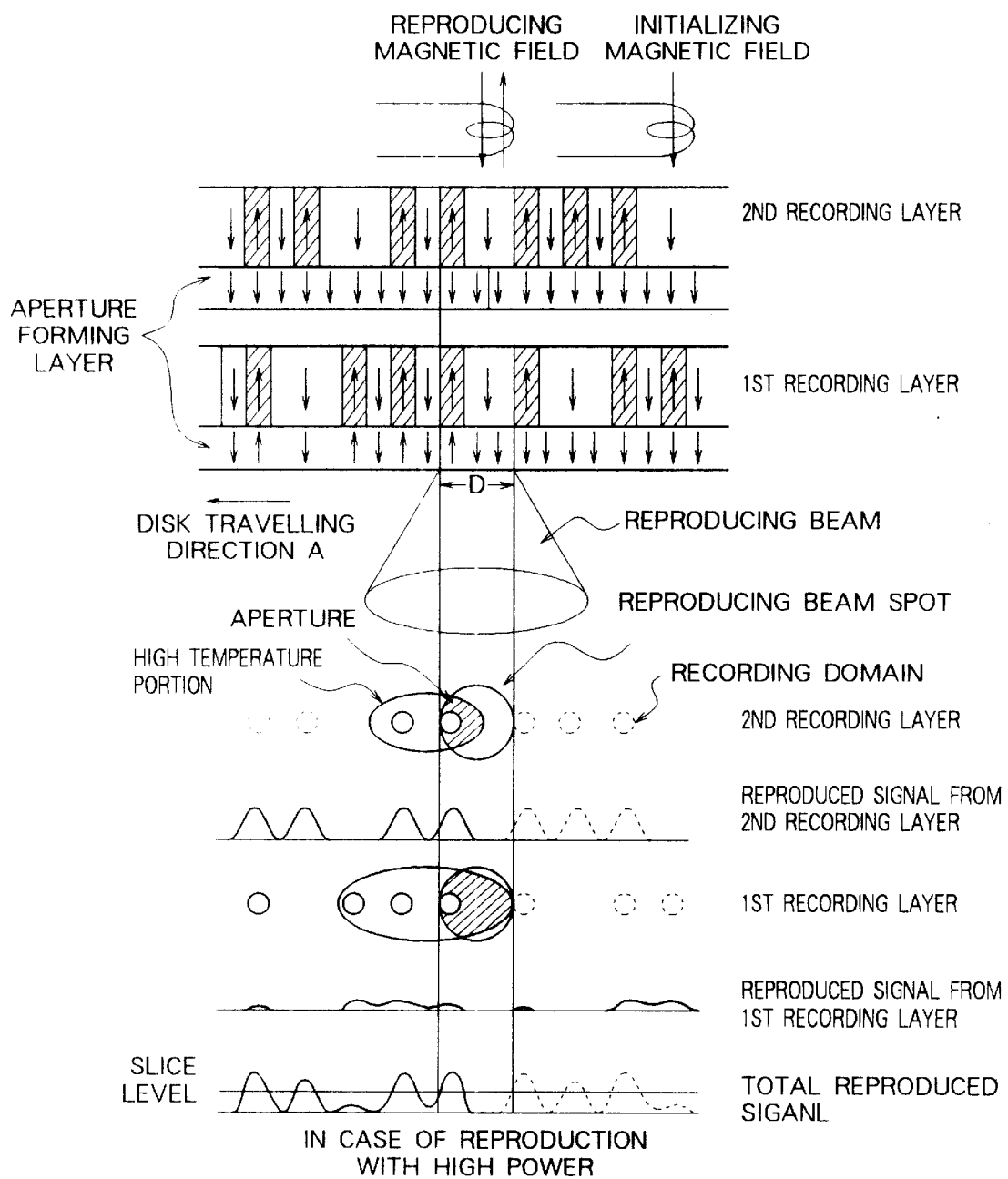
FIG. 44 is an explanatory diagram showing a fourth example of a magnetic super-resolution reproducing system using the optomagnetic recording medium according to the seventh example of construction.

As to an optomagnetic recording medium having a plurality of aperture forming layers, the respective exchange coupling forces exerted between the recording layers and the aperture forming layers or the respective Curie temperatures of the aperture forming layers can be made different in order to read a reproduced signal for each recording layer. Namely, an aperture at the time of irradiation with a reproducing beam is larger in the first recording layer near to the reproducing beam incidence side. Therefore, in an optomagnetic recording medium in which an aperture is formed in the high temperature portion 131a, it is possible to reproduce a signal from only the first recording layer by making an exchange coupling force exerted between the first recording layer 120 and the first aperture forming layer 102 stronger than an exchange coupling force exerted between the second recording layer 121 and the second aperture forming layer 107 or setting the Curie temperature of the first aperture forming layer 102 to be lower than the Curie of the second aperture forming layer 107 and selecting a proper two-power reproducing laser beam so that the optomagnetic recording medium is irradiated with a low-power reproducing laser beam with which no aperture is formed in the second recording layer, as shown in FIG. 43. Also, it is possible to reproduce a signal from only the second recording layer by irradiating the optomagnetic recording medium with a high-power reproducing laser beam with which an aperture in the first recording layer covers the substantially entire area of a reproducing spot, as shown in FIG. 44.

In an optomagnetic recording medium in which an aperture is formed in a high temperature portion of a reproducing spot, it is possible to selectively reproduce a signal from the first or second recording layer by making an exchange coupling force exerted between the first recording layer 120 and the first aperture forming layer 102 more weak than an exchange coupling force exerted between the second recording layer 121 and the second aperture forming layer 107 or setting the Curie temperature of the first aperture forming layer 102 to be higher than the Curie of the second aperture forming layer 107.

It does not necessarily follow that the optomagnetic recording medium for multi-valued recording based on the magnetic super-resolution system must be provided with all of the film members shown in FIG. 40. One or plural film members may be omitted, as required. Various film structures involved in the sixth example of construction are shown by FIG. 45 in a table form. A blank in the table shows that the corresponding film member is omitted.

In the first to seventh examples of construction, the SiN film is used as the dielectric layers 3, 5 and 7. However, other materials may be used. Namely, a non-magnetic material having a high thermal conductivity is preferable in order that the temperature distributions of the first and second recording layers 4 and 6 at the time of recording are made as equal as possible so that the sizes of magnetic domains formed in the first and second recording layers 4 and 6 become uniform. As a material suitable for such a purpose can be enumerated a metal element selected from a group of Si, Al, Ti, Zr, Au, Cu, Mo and W, an alloy containing as a main component at least one kind of metal element selected that group, or an oxide or nitride thereof. And, a particularly preferable material has a composition which is rich in a metal element as compared with a stoichiometric composition. The film thickness of each dielectric layer is properly adjusted to satisfy an optical condition.

The Curie temperatures of the respective vertically magnetized films in each of the first to seventh embodiments need to approximate to each other in order that the sizes of magnetic domains formed in order that the corresponding recording layers are made uniform. It is preferable that the Curie temperatures are set within ±50° C. at largest.

Besides, it is preferable that the respective vertically magnetized films in each of the first to seventh embodiments have the same composition in order to facilitate the formation of films. Also, it is preferable that a thin magnetic film assuming an in-plane magnetized film at least in the vicinity of the room temperature is used as the auxiliary magnetic film. Further, the auxiliary magnetic film can be provided on the laser beam incidence side or on a side opposite thereto or on both thereof.

As a high-density recording method for optomagnetic recording medium and a recording/reproducing method in which the reproduction from a high-density recorded medium having minute magnetic domains recorded therein is performed with less error, the following methods can be enumerated:

(1) Pulse Reproduction
   (a) an optomagnetic reproducing system in which the irradiation with a reproducing laser beam is performed periodically or pulsewise;
   (b) a system in which in the signal reproducing system of (a), the timing of emission of the reproducing laser beam is synchronized with a timing clock signal formed by pre-pits or a signal such as an optomagnetic signal reproduced from a medium;

(2) Waveform Equalization Of Pulse Reproduction
   (c) a method in which there is performed a signal processing represented by the following equation 1
   [Equation 1]
   where $D_0(t)$ is the waveform of a reproduced signal in the system of (a);
   (d) a method in which in the method of (c), there is performed a signal processing in the case where n=0, 1, 2, $a_n = a_{-n}$, and $-1 < a_n < 0$;

(3) Magnetic Field Modulated Reproduction
   (e) a system in which the reproduction with the magnitude or direction of an applied external magnetic field being modulated is performed for a medium in which magnetic super-resolution is possible;
   (f) the system of (e) in which in the system of (a), the magnitude or direction of the applied external magnetic field is modulated in synchronism with the timing of emission of the reproducing laser beam;

(4) Trial Reading
   (i) a reproducing system in which in the systems of (a) to (h), the reproduction is performed while changing the waveform of the reproducing laser beam (the respective values of a high power and a low power, the ratio of times for high and low powers to each other), a magnetic field applied at the time of reproduction, and so forth, thereby selecting a combination having the least error;
   (j) a system in which in the reproducing system of (i), a test pattern for trial of reproduction is recorded on the medium beforehand;
   (k) a system in which the optimum reproduction condition obtained in the system of (i) is recorded on the medium and this condition is read at the next and subsequent times of reproduction to perform the reproduction; and (5) Other Combinations
   (l) systems in which the systems of (a) to (k) are performed by an optomagnetic head having a plurality of converged irradiation laser beam emitting portions.

Next, explanation will be made of the format construction of an optomagnetic recording medium according to the present invention.

[First Example Of Format Construction]

Figure 46:
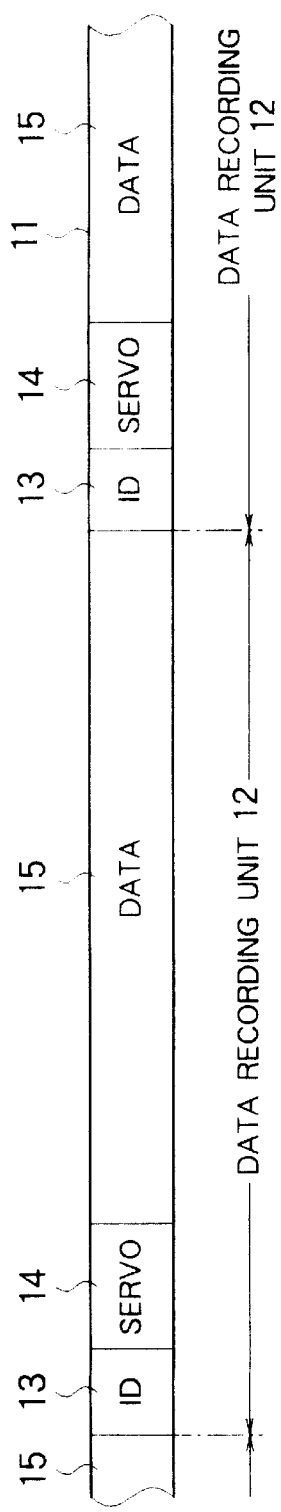
FIG. 46 is a diagram for explaining a preformat pattern formed in an optomagnetic recording medium based on a sample servo system.

FIG. 46 shows an example of a preformat pattern formed for an optomagnetic recording medium based on a sample servo system. The preformat pattern 2 defines a recording track and data recording units obtained by dividing the recording track. The preformat pattern may be recorded in an uneven form on the surface of the transparent substrate 1 or may be recorded as an optomagnetic signal in the magnetic layers 4, 6, - - - .

Figure 47:
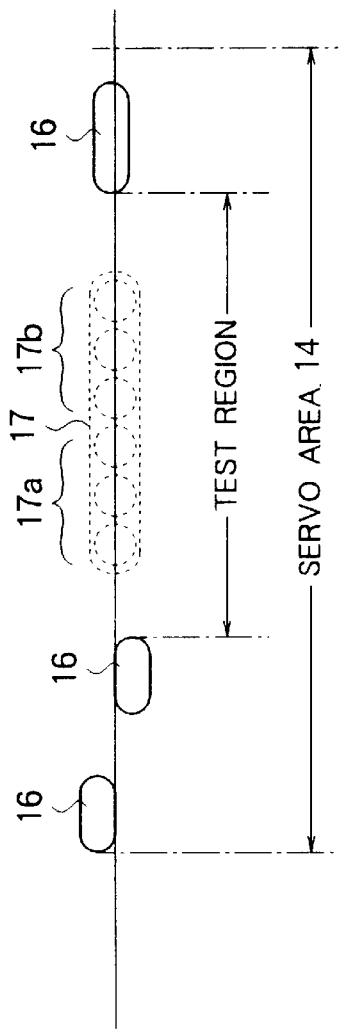
FIG. 47 is a diagram showing an example of construction of a servo area.

In the present example, a recording track 11 is divided into a multiplicity of data recording units 12 and each data recording unit 12 is divided into an ID area 13, a servo area 14 and a data area 15. In the ID area 13 are formed a mark indicating the boundary of each data recording unit 12, an address of the data recording unit, an error detecting code, and so forth. As shown in FIG. 47, the servo area 14 is formed with tracking pits 16 for scanning a recording or reproducing laser beam along the recording track 11, a test region 17 for performing the optimum recording/reproduction and a buried clock pit 18 necessary for pulling in reference clocks required for the recording/reproduction of a signal. A test signal (or level detecting pits) 17a for setting a slice level for each signal of a multi-valued recording signal recorded in the recording area 14 and/or a test signal (or timing detecting pits) 17b for generating a timing signal providing a reference timing for detection of the edge of the multi-valued recording signal are recorded in the test region 17, as required.

In lieu of the construction in which the servo area 14 is provided with the tracking pits 16, a guide groove for guiding the recording or reproducing laser beam along the recording track 11 may be formed on the transparent substrate 1.

Also, pre-pits (or phase pits) formed in a form such as unevenness on the surface of the transparent substrate can be recorded in a multi-valued form corresponding to the medium. The digitization of a pre-pit into multi values can be realized by the modulation of the length, width and/or depth of a pre-pit, the amount of deviation of the position of a pre-pit to a direction perpendicular to the track direction, or the combination thereof.

[Second Example Of Format Construction]

Figure 48:
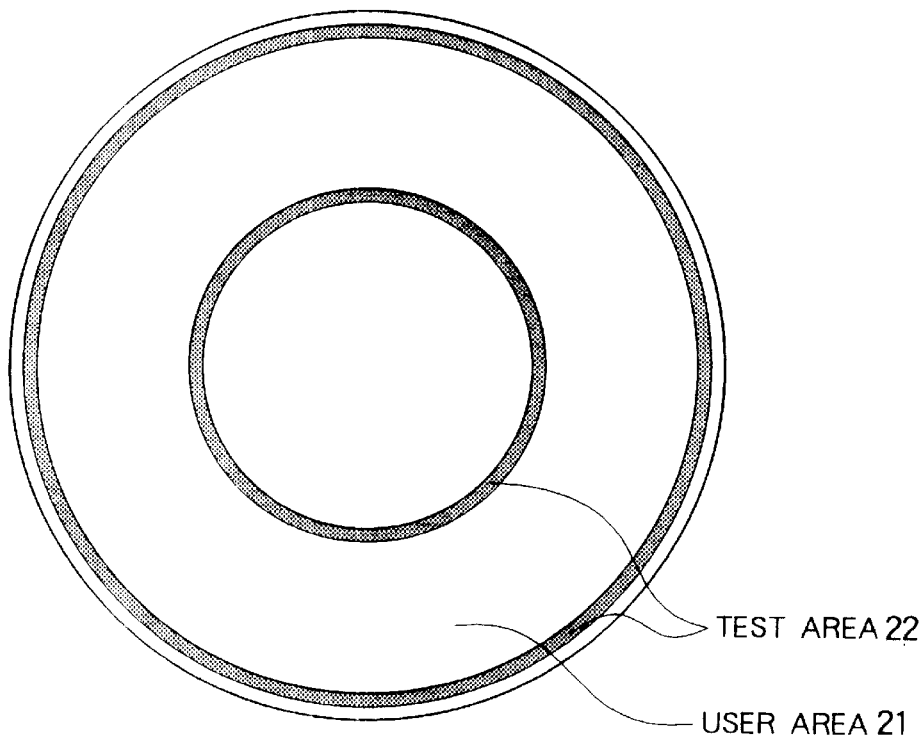
FIG. 48 is a diagram showing an embodiment in the case where a format construction according to an embodiment is applied to an optical disk based on a CAV system.
Figure 49:
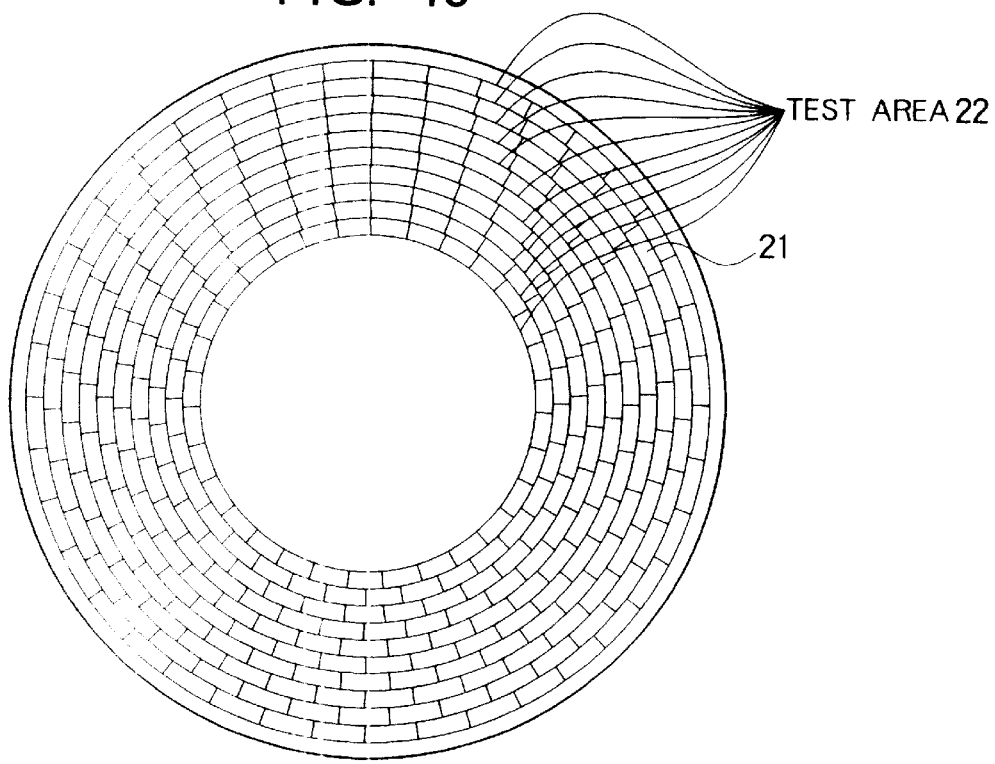
FIG. 49 is a diagram showing an embodiment in the case where a format construction according to an embodiment is applied to an optical disk based on a ZCAV system.

A format construction of the present example is characterized in that a test area for detecting the optimum recording condition is provided in an area other than a user area in which the recording, reproduction, erasion, et cetera of a signal are performed through access from a user. FIG. 48 is a diagram showing an embodiment in the case where the application is made to an optical disk based on a CAV (Constant Angular Velocity) system. Referring to FIG. 48, test areas 22 are provided at the innermost and outermost circumference portions of the disk with a user area 21 being interposed therebetween. The test area 22 may be provided at only one of the innermost and outermost circumference portions of the disk. FIG. 49 is a diagram showing an embodiment in the case where the application is made to an optical disk based on a ZCAV (Zoned-CAV) system. Referring to FIG. 49, test areas 22 are provided in the vicinity of boundary portions of zones.

In the case of ZCAV, the test areas 22 may be provided at the innermost and outermost circumference portions of the disk, as shown in FIG. 48.

Since the format construction of each data recording unit in the user area is the same as that explained in conjunction with the first example, the explanation thereof will be omitted in order to avoid the repetition.

In the following, explanation will be made of a multi-valued signal recording method using an optomagnetic recording medium according to the present invention.

[First Example Of Multi-Valued Recording Method]

A multi-valued recording method of the present example is characterized in that an external magnetic field is modulated three-stepwise in accordance with a recording signal while a recording laser beam is modulated pulsewise. As an optomagnetic recording medium is used any one of the optomagnetic recording media according to the first example of construction (or the media shown in FIGS. 9 and 10 and having the concrete construction as shown in FIGS. 11 to 16, - - - ).

First, the optomagnetic recording medium is mounted to a medium driver such as a turn table and an optical head and a magnetic head are disposed on the transparent substrate side of the recording medium and on the protection film side, respectively. The medium driver is activated to drive the optomagnetic recording medium and the optical and magnetic heads relative to each other at a predetermined linear velocity so that the optical head and the magnetic head are positioned on a predetermined track.

Thereafter, an external magnetic field synchronized with a recording clock signal and having an intensity signal-modulated into three values of H0 to H2 in accordance with a recording signal is applied from the magnetic head to the optical information recording medium, as shown in FIG. 50(*a*). After the external magnetic field is changed over to a predetermined value, the irradiation with optical pulses shown in FIG. 50(*b*) is made by the optical head so that each recording layer in a portion irradiated with the optical pulse is heated up to a temperature at which the inversion of magnetization can be made by the external magnetic field. Thereby, a magnetic domain shown in FIG. 50(*c*) corresponding to the magnitude of the external magnetic field is formed at the portion irradiated with each optical pulse.

In FIG. 50(*b*), longitudinal lines, cross lines and white ground depicted in the domain represent the individual states of magnetization distinctively. In this embodiment, the representation by white ground shows the state of magnetization in which the combination of directions of magnetization in the vertically magnetized films 1 and 2 of the medium according to the first example of construction is (down, down), the representation by longitudinal lines shows the state of magnetization in which the combination is (up, down) and the representation by cross lines shows the state of magnetization in which the combination is (up, up).

[Second Example Of Multi-Valued Recording Method]

A multi-valued recording method of the present example is characterized in that an external magnetic field is applied at a fixed period while a recording laser beam is modulated three-stepwise in accordance with a recording signal. As an optomagnetic recording medium is used the optomagnetic recording medium according to the fourth embodiment (see FIG. 14).

Figure 51:
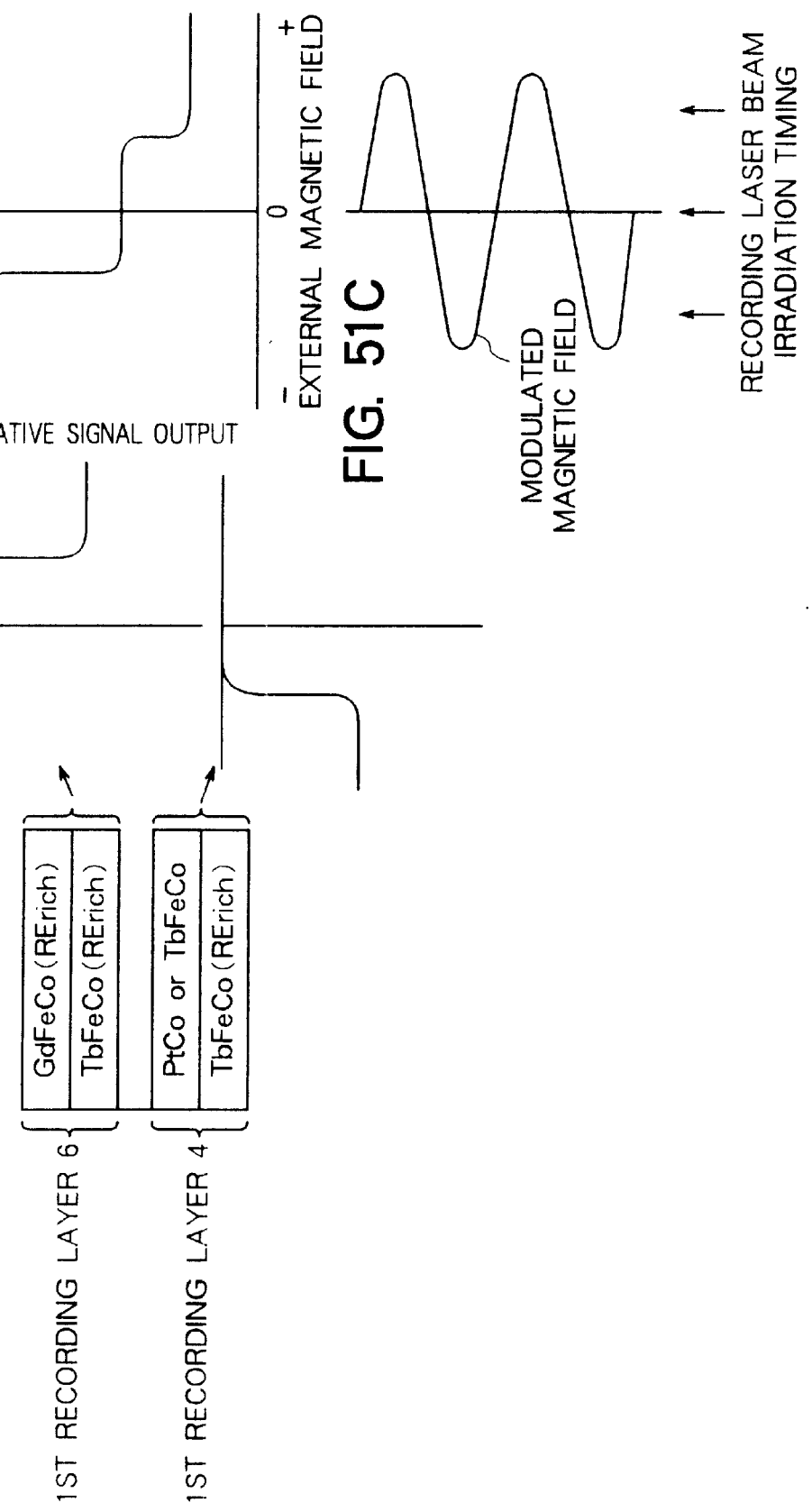
FIGS. 51A, 51B, 51C and 51D are explanatory diagrams showing a second example of a multi-valued recording/reproducing system according to the present invention.

After the optomagnetic recording medium is driven in a manner similar to that in the first example to position an optical head and a magnetic head on a predetermined track, an external magnetic field is applied periodically from the magnetic head. As shown in FIGS. 51A, 51B and 51C, the applied magnetic field is set such that a center magnetic field is zero and an amplitude becomes equal to or larger than the magnetic field intensity for a recording state. After the external magnetic field is changed over to a predetermined value, the irradiation with three-stepped optical pulses shown in FIG. 51D modulated in accordance with a recording signal is made by the optical head so that each recording layer in a portion irradiated with the optical pulse is heated up to a temperature at which the inversion of magnetization can be made by the external magnetic field. Thereby, a magnetic domain corresponding to the magnitude of the external magnetic field is formed at the portion irradiated with each optical pulse.

For those ones of the optomagnetic recording media according to the first example of construction in which the center of the magnetic field intensity for a recorded state is shifted from zero to the recording direction or the erasing direction, as shown in FIGS. 10B to 10V, a bias magnetic field corresponding to the amount of shift is added to the external magnetic field.

[Third Example Of Multi-Valued Recording Method]

A multi-valued recording method of the present example is characterized in that a multi-valued recording signal based on a so-called partial response system (PRML) is recorded. As an optomagnetic recording medium can be used any one of the optomagnetic recording media according to the first example of construction (or the media shown in FIGS. 9 and 10 and having the concrete construction shown in FIGS. 11 to 16, - - - ) and the optomagnetic recording media according to the second example of construction (see FIGS. 17 and 18).

Figure 52:
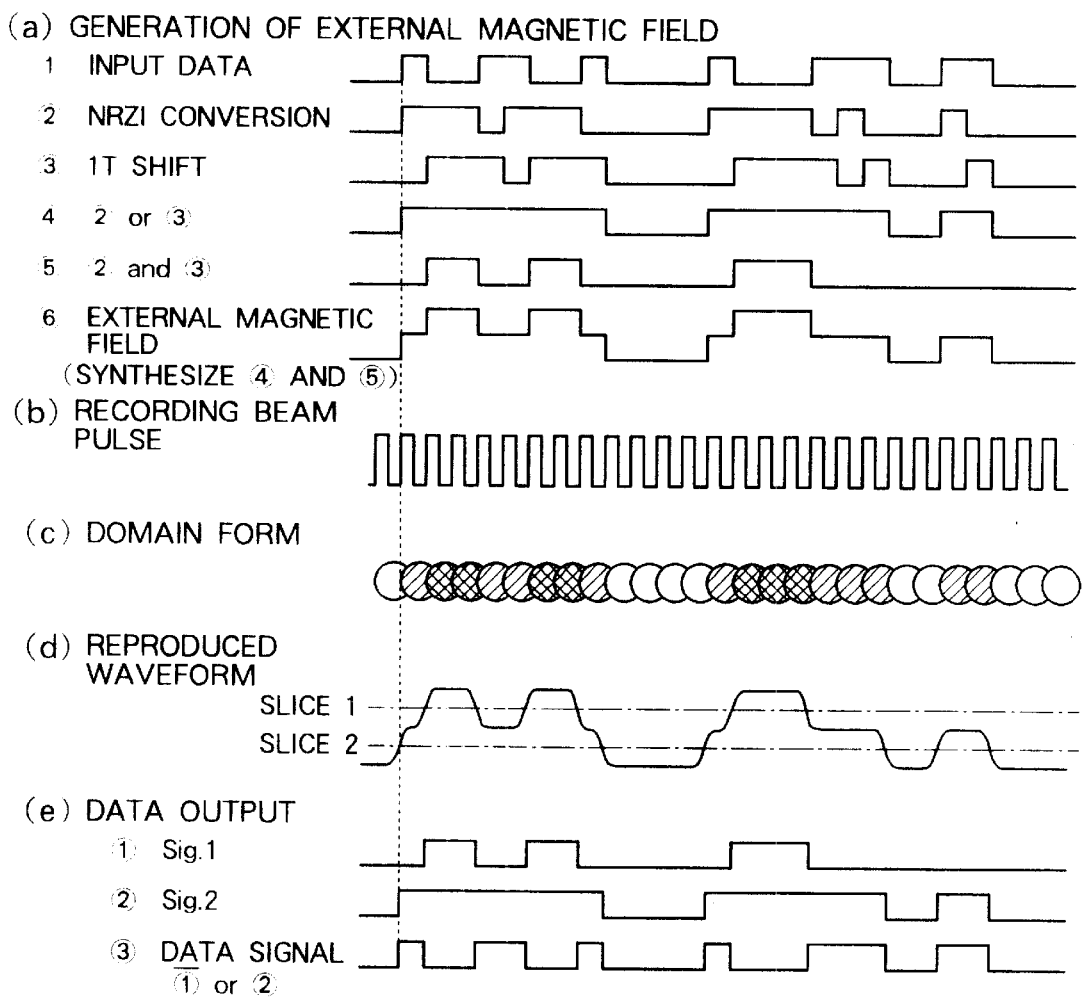
FIG. 52 is an explanatory diagram showing a third example of a multi-valued recording/reproducing system according to the present invention.

In a manner similar to that in the first example, the optomagnetic recording medium is driven to position an optical head and a magnetic head on a predetermined track. Thereafter, in order to perform a 3-valued recording corresponding to PRML recording, an NRZI conversion for giving 1-bit (1T) inter-code interference as a precoder to a data signal ① is made, as shown in FIG. 52(*a*). The NRZI converted signal ② is delayed by one bit (1T) by use of a shift register to generate a signal ③. The logical sum of the signal ② and the signal ③ is produced to obtain a signal ④ and the logical product of the signal ② and the signal ③ is produced to obtain a signal ⑤. Further, an external magnetic field ⑥ is generated from the signal ④ and the signal ⑤ by use of a magnetic head driving circuit shown in FIG. 79. Concretely, the signal ④ is inputted to Pulse1-P and the logically inverted version of the signal ④ is inputted to Pulse1-N. On the other hand, the signal ⑤ is inputted to Pulse2-P and the logically inverted version of the signal ⑤ is inputted to Pulse2-N. Voltages are applied to $Vi_1$ and $Vi_2$ so that an external magnetic field synchronized with a recording clock signal and modulated into three values of $H_0$ to $H_2$ is applied to an optical information recording medium. After the external magnetic field is changed over to a predetermined value, the irradiation with optical pulses shown in FIG. 52(*b*) is made by the optical head so that each recording layer in a portion irradiated with the optical pulse is heated up to a temperature at which the inversion of magnetization can be made by the external magnetic field. Thereby, a magnetic domain shown in FIG. 52(*c*) corresponding to the magnitude of the external magnetic field is formed at the portion irradiated with each optical pulse. Alternatively, the irradiation with the beam may be made continuously with the external magnetic field being modulated.

The recording states of magnetic domains of the optomagnetic recording medium of the second example of construction corresponding to the respective magnitudes of the external magnetic field are also similar to that shown in FIGS. 10B to 10Y above referred to. Accordingly, a reproduced signal read from a series of magnetic domains is as shown in FIG. 52(*d*). By slicing this reproduced signal on the basis of two slice levels set to predetermined values in accordance with a reproduced signal output from each recording state, two 2-value digitized signals Sig1 and Sig2 are obtained, as shown by a timing chart of FIG. 52(*e*). The digitization into two values can be made by performing a logical operation of the two signals Sig1 and Sig2.

Figure 53:
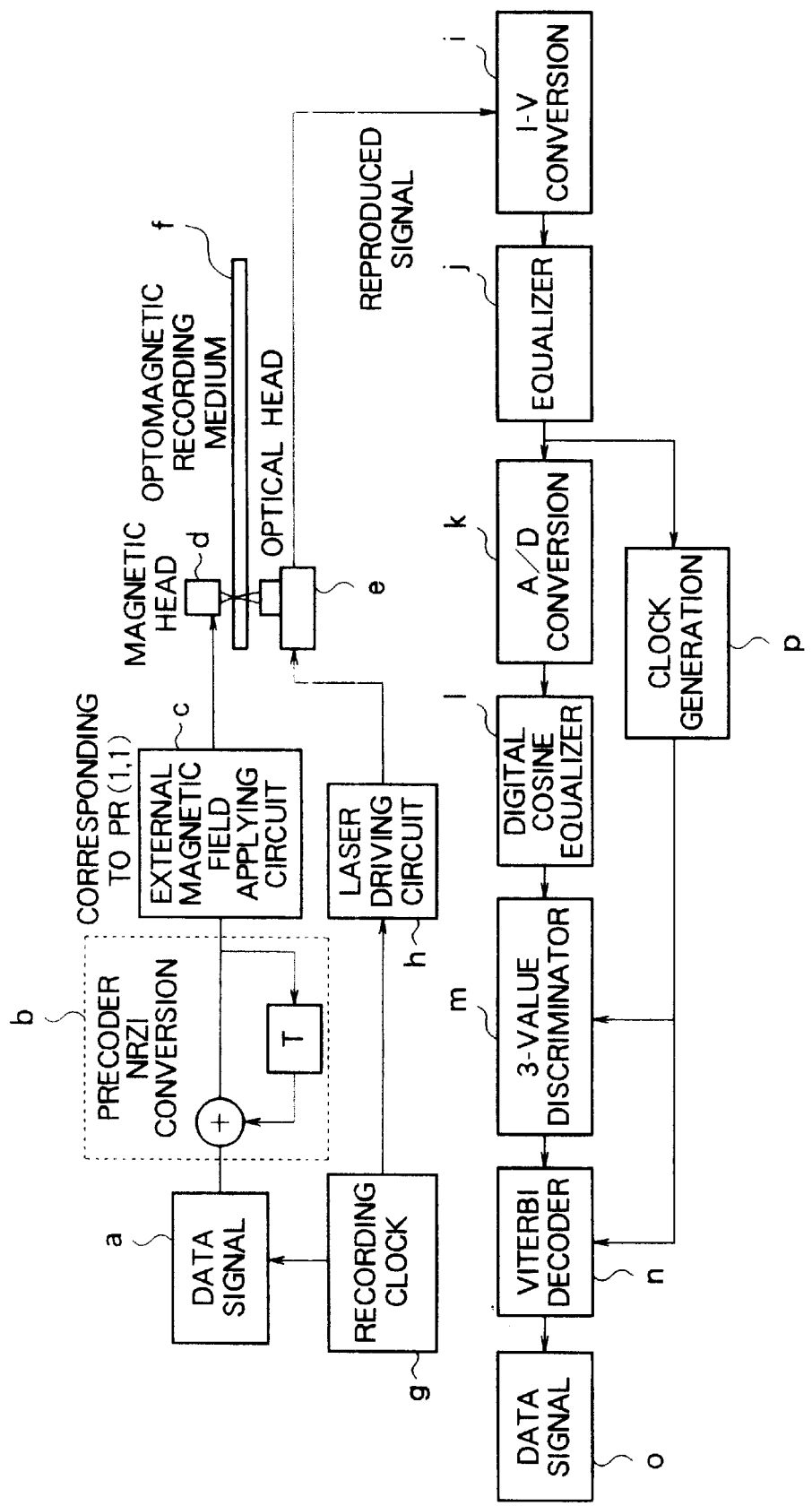
FIG. 53 is a block diagram of a multi-valued recording/reproducing apparatus which performs the multi-valued recording/reproducing system according to the third example.

FIG. 53 is a block diagram of a recording/reproducing system in the present embodiment. In the present embodiment, the recording for an optomagnetic recording medium f is performed by reproducing a signal for external magnetic field application through the above-mentioned method to generate an external magnetic field from a magnetic head d by use of an external magnetic field applying circuit c and generating laser beam pulses synchronous with a clock signal q by a laser driving circuit h. Magnetic domains recorded in the optomagnetic recording medium f are reproduced by an optical head e and are photoelectrically converted by an I–V conversion circuit i. Thereafter, the suppression of optical interference between codes by use of an equalization circuit and the A/D conversion using an A/D converter k are made. The data is subjected to the discrimination of three values by a 3-value discriminator m through a digital cosine equalizer l for absorbing a difference in linear velocity of the optomagnetic recording medium (or a difference in linear velocity between the inner circumference and the outer circumference). An output of the 3-value discriminator m is supplied to a Viterbi decoder n for digitization into two values to obtain a reproduced data signal o. On the other hand, a reproducing clock signal is generated by digitizing an output of the equalizer j into two values by use of a clock generating circuit P. This clock signal is supplied to the 3-value discriminator m and the Viterbi docoder n.

[Fourth Example Of Multi-Valued Recording Method]

A multi-valued recording method of the present example too is characterized in that a multi-valued recording signal based on the so-called partial response system (PRML) is recorded. As an optomagnetic recording medium can be used any one of the optomagnetic recording media according to the first example of construction (or the media shown in FIGS. 9 and 10 and having the concrete construction shown in FIGS. 11 to 16, - - - ) and the optomagnetic recording media according to the second example of construction (see FIGS. 17 and 18).

Figure 54:
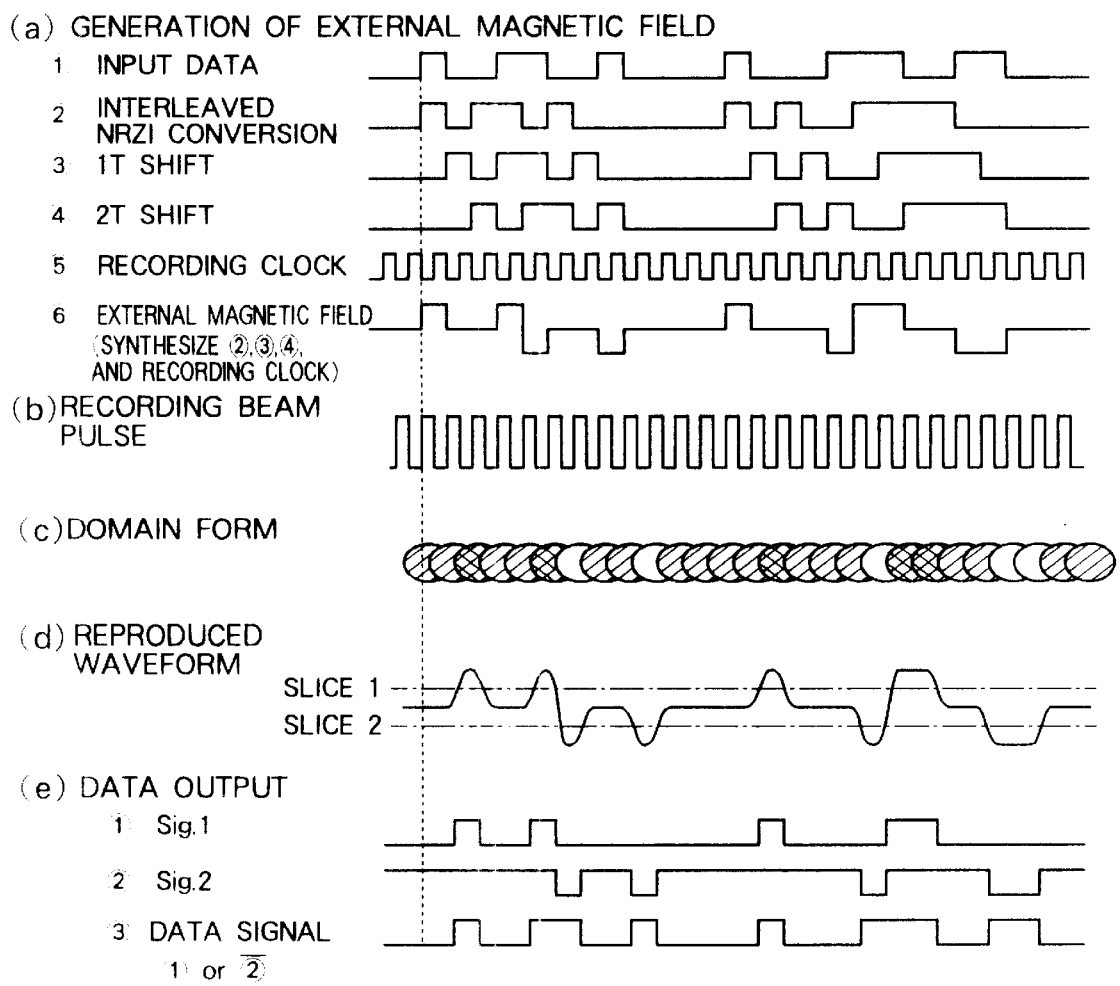
FIG. 54 is an explanatory diagram showing a fourth example of a multi-valued recording/reproducing system according to the present invention.

In a manner similar to that in the first example, the optomagnetic recording medium is driven to position an optical head and a magnetic head on a predetermined track. Thereafter, in order to perform a 3-valued recording corresponding to PRML recording, an interleaved NRZI conversion for giving 2-bit (2T) inter-code interference as a precoder to a data signal is made, as shown in FIG. 54(a). In order that a recording signal corresponding to PR(1, 0, −1) is obtained, an external magnetic field synchronized with a recording clock signal and having an applied magnetic field intensity signal-modulated into three values of $H_0$ to $H_2$ is applied from the magnetic head to the optical information recording medium. After the external magnetic field is changed over to a predetermined value, the irradiation with optical pulses shown in FIG. 54(b) is made by the optical head so that each recording layer in a portion irradiated with the optical pulse is heated up to a temperature at which the inversion of magnetization can be made by the external magnetic field. Thereby, a magnetic domain shown in FIG. 54(c) corresponding to the magnitude of the external magnetic field is formed at the portion irradiated with each optical pulse. Alternatively, the irradiation with the beam may be made continuously with the external magnetic field being modulated.

The recording states of magnetic domains corresponding to the respective magnitudes of the external magnetic field are as shown in FIG. 10 above referred to. Accordingly, a reproduced signal read from a series of magnetic domains is as shown in FIG. 54(d). By slicing this reproduced signal on the basis of two slice levels set to predetermined values in accordance with a reproduced signal output from each recording state, two 2-value digitized signals Sig1 and Sig2 are obtained, as shown by a timing chart of FIG. 54(e). The digitization into two values can be made by performing a logical operation of the two signals Sig1 and Sig2.

Figure 55:
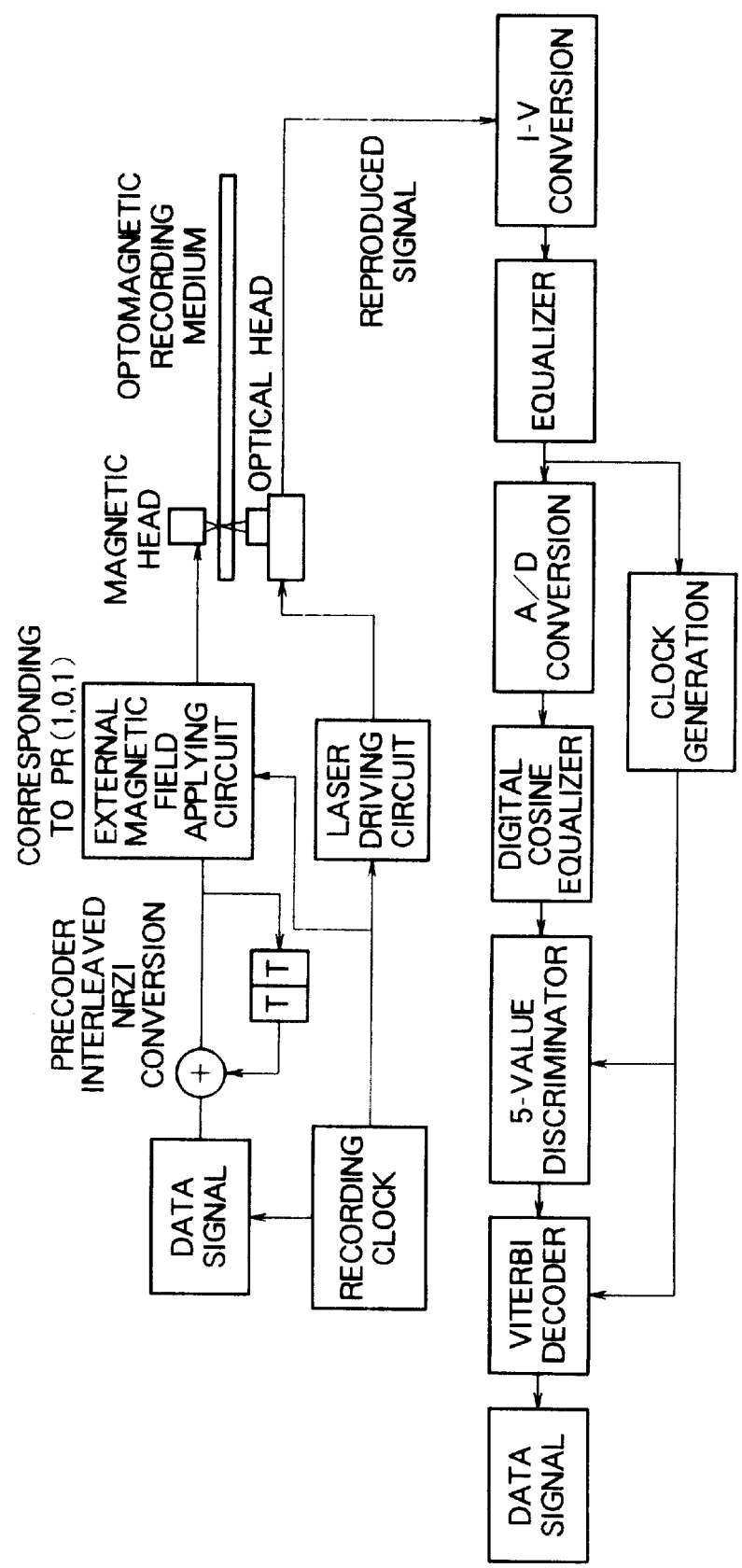
FIG. 55 is a block diagram of a multi-valued recording/reproducing apparatus which performs the multi-valued recording/reproducing system according to the fourth example.

FIG. 55 shows an example of the construction of a recording/reproducing system in the present embodiment. In the present embodiment, reproduced light is I–V converted and is thereafter passed through an analog waveform equalizer to eliminate optical interference between codes, thereby obtaining a PR characteristic. The analog signal is subjected to A/D conversion. Thereafter, a difference in characteristic between the inner and outer circumferences is absorbed by a digital transversal filter to discriminate three values. The signal is supplied to a Viterbi decoder for digitization into two values. A reproducing clock signal is generated from the signal after A/D conversion.

[Fifth Example Of Multi-Valued Recording Method]

A multi-valued recording method of the present example too is characterized in that a multi-valued recording signal based on the so-called partial response system (PRML) is recorded. As an optomagnetic recording medium can be used any one of the optomagnetic recording media according to the first example of construction (or the media shown in FIGS. 9 and 10 and having the concrete construction shown in FIGS. 11 to 16, - - - ) and the optomagnetic recording media according to the second example of construction (see FIGS. 17 and 18).

In a manner similar to that in the first example, the optomagnetic recording medium is driven to position an optical head and a magnetic head on a predetermined track. Thereafter, in order to perform a 3-valued recording corresponding to PRML recording, an interleaved NRZI conversion for giving 2-bit (2T) inter-code interference as a precoder to a data signal is made, as shown in FIG. 56(a). This 2-valued data is shifted by one bit and the shifted data is added to the original signal to produce 3-valued data (or the characteristic of (1+T) is added). An external magnetic field synchronized with a recording clock signal and having an applied magnetic field intensity signal-modulated into three values of $H_0$ to $H_2$ corresponding to the 3-valued data is applied from the magnetic head to the optical information recording medium. After the external magnetic field is changed over to a predetermined value, the irradiation with optical pulses shown in FIG. 56(b) is made by the optical head so that each recording layer in a portion irradiated with the optical pulse is heated up to a temperature at which the inversion of magnetization can be made by the external magnetic field. Thereby, a magnetic domain shown in FIG. 56(c) corresponding to the magnitude of the external magnetic field is formed at the portion irradiated with each optical pulse. Alternatively, the irradiation with the beam may be made continuously with the external magnetic field being modulated.

The recording states of magnetic domains corresponding to the respective magnitudes of the external magnetic field are as shown in FIG. 10 above referred to. Accordingly, a reproduced signal read from a series of magnetic domains takes an original waveform as shown in FIG. 56(d). By slicing this reproduced signal on the basis of two slice levels set to predetermined values in accordance with a reproduced signal output from each recording state, two 2-value digitized signals Sig1 and Sig2 are obtained, as shown by a timing chart of FIG. 56(e). The digitization into two values can be made by performing a logical operation of the two signals Sig1 and Sig2.

Figure 57:
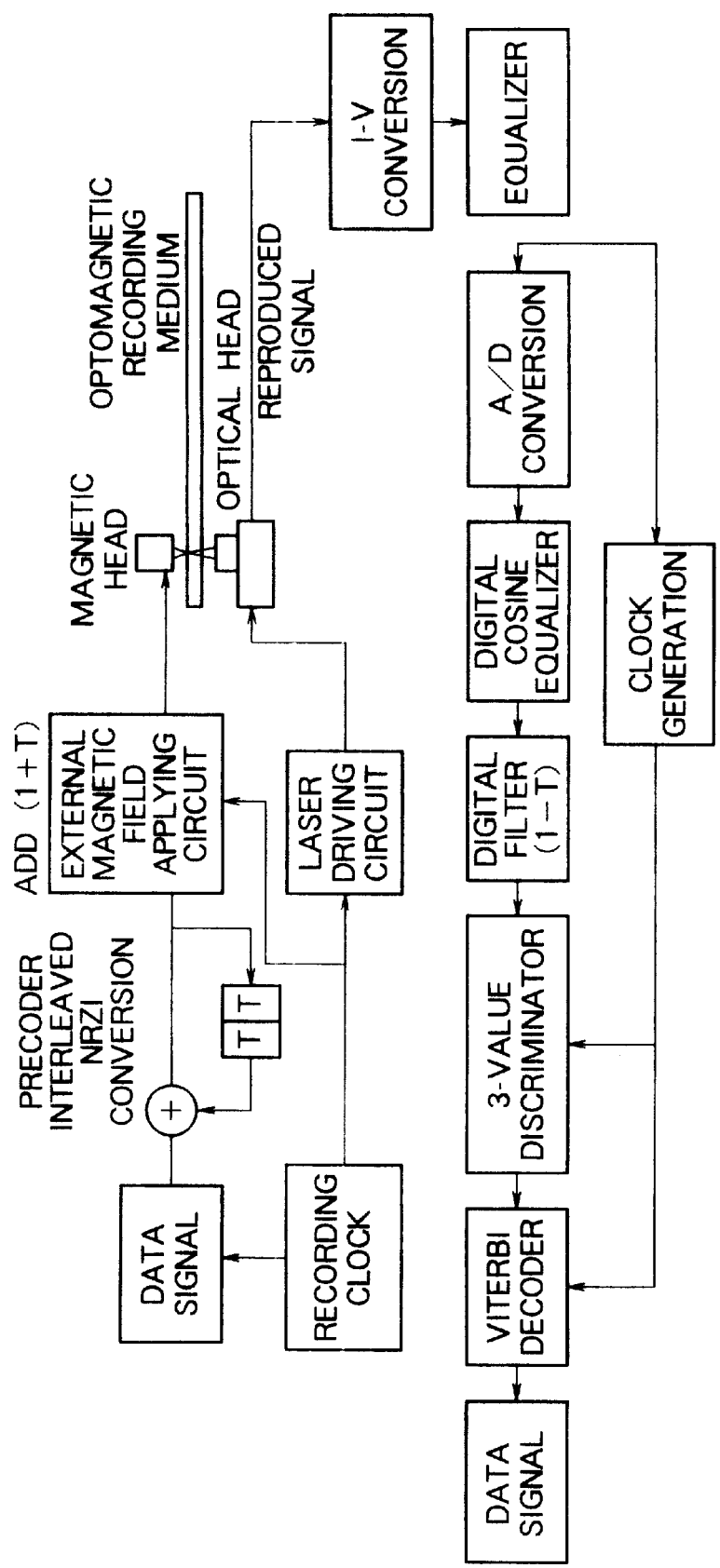
FIG. 57 is a block diagram of a multi-valued recording/reproducing apparatus which performs the multi-valued recording/reproducing system according to the fifth example.

FIG. 57 shows an example of the construction of a recording/reproducing system in the present embodiment. In the present embodiment as shown in FIG. 57, reproduced light is I–V converted and is thereafter passed through an analog waveform equalizer to eliminate optical interference between codes, thereby obtaining a PR characteristic. The analog signal is subjected to A/D conversion. After the discrimination of three values is made for a signal subjected to the absorption of a difference in characteristic between the inner and outer circumferences by a digital transversal filter and the differentiation by a digital filter (or the addition of the characteristic of (1−T), the signal is supplied to a Viterbi decoder for digitization into two values. A reproducing clock signal is generated from the signal after A/D conversion.

Figure 56:
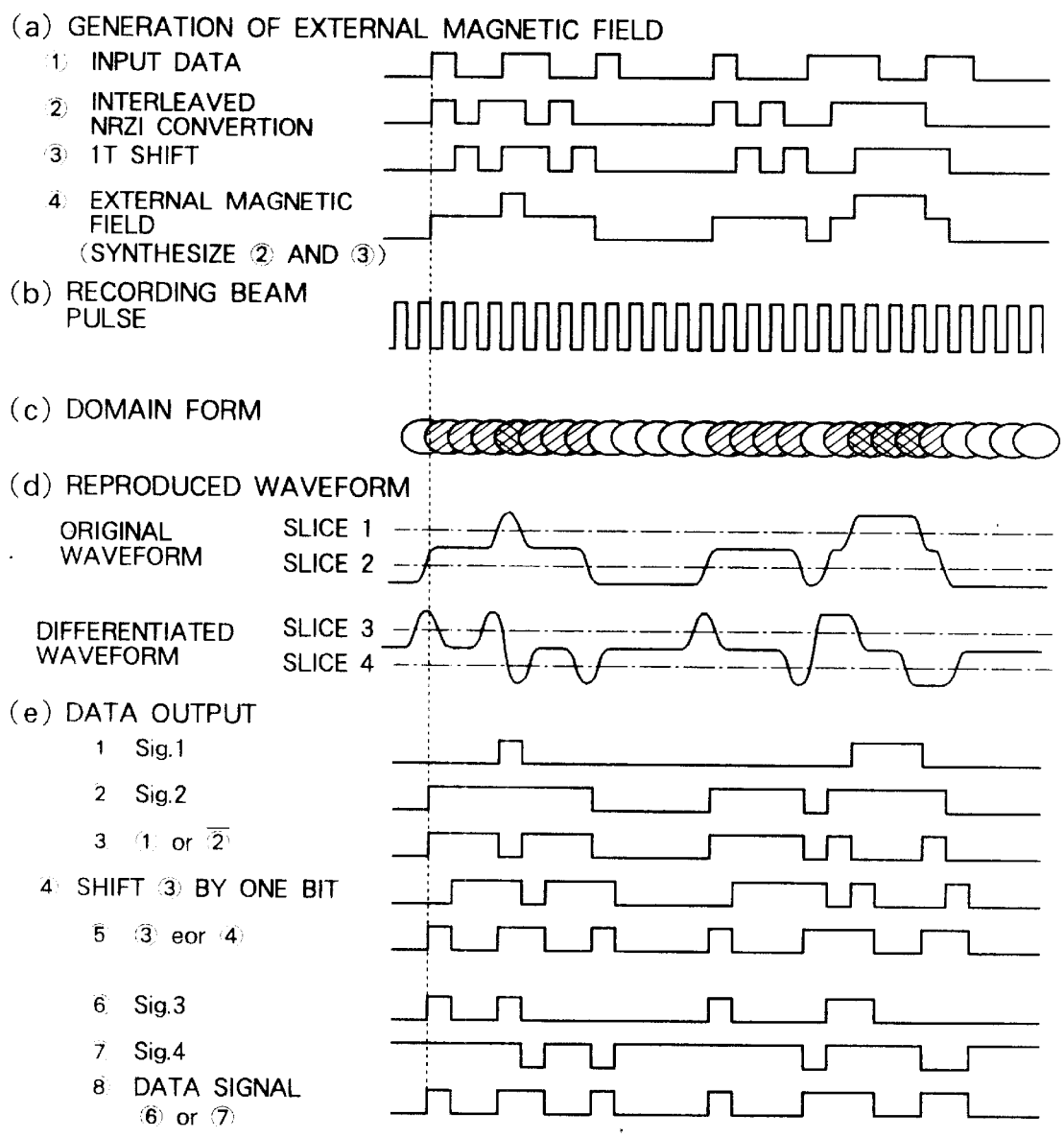
FIG. 56 is an explanatory diagram showing a fifth example of a multi-valued recording/reproducing system according to the present invention.
Figure 58:
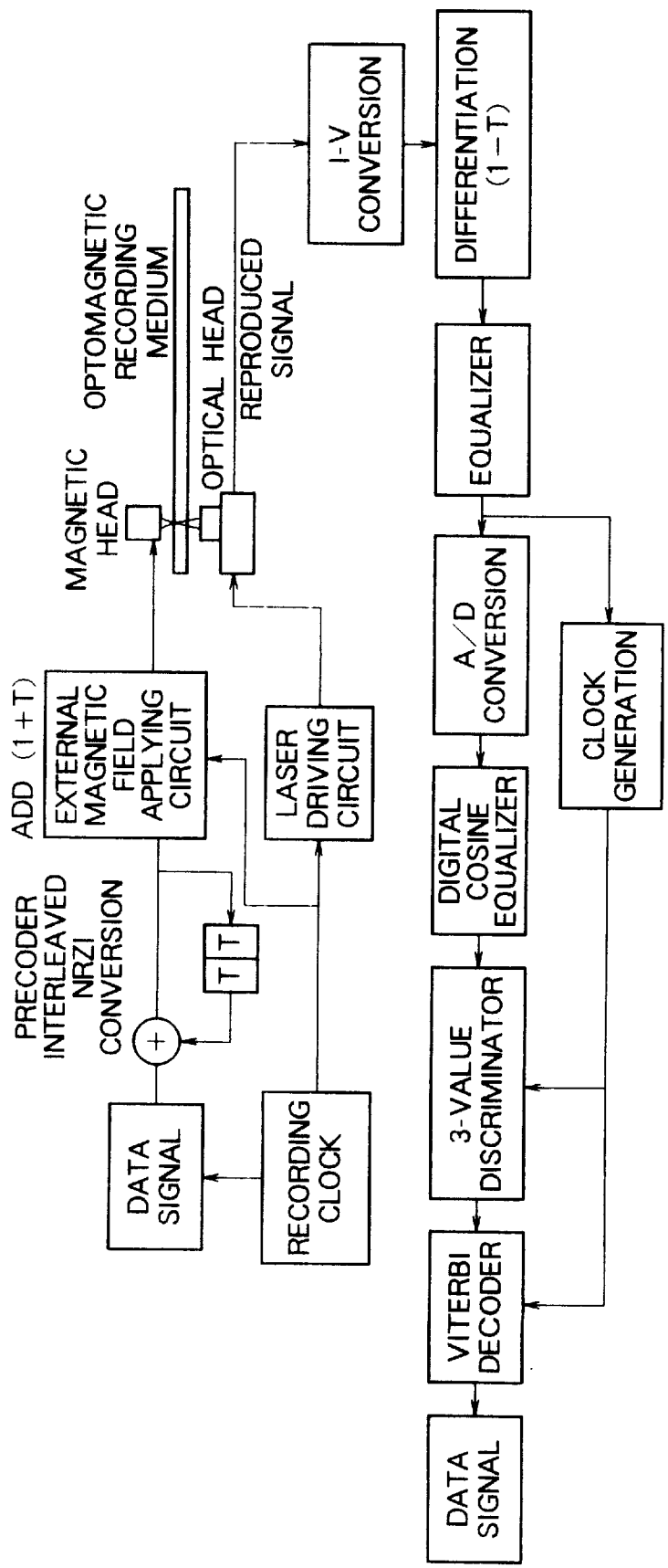
FIG. 58 is a block diagram showing another example of a multi-valued recording/reproducing apparatus which performs the multi-valued recording/reproducing system according to the fifth example.

The original waveform shown in FIG. 56(*d*) may be differentiated. The slicing of the differentiated waveform provides two 2-value digitized signals Sig3 and Sig4 shown in FIG. 56(*e*) and the digitization into two values can be made by performing a logical operation of the two binary signals. In this example, as shown in FIG. 58, an I–V converted analog signal is subjected to the differentiation or a difference with shift by one bit (or the addition of the characteristic of (1−T)) and is thereafter passed through an analog waveform equalizer to eliminate optical interference between codes, thereby obtaining a PR characteristic. Further, the analog signal is subjected to A/D conversion. After the discrimination of three values is made for a signal subjected to the absorption of a difference in characteristic between the inner and outer circumferences by a digital transversal filter, the signal is supplied to a Viterbi decoder for digitization into two values. A reproducing clock signal is generated from the signal after A/D conversion.

[Sixth Example Of Multi-Valued Recording Method]

A multi-valued recording method of the present example is characterized in that in recording a multi-valued recording signal based on the so-called partial response system (PRML), a 5- or more-valued recording is performed for the optomagnetic recording media according to the second example of construction (see FIGS. 17 and 18) by making the domain length equal to or smaller than one half of a laser beam spot diameter.

Figure 59:
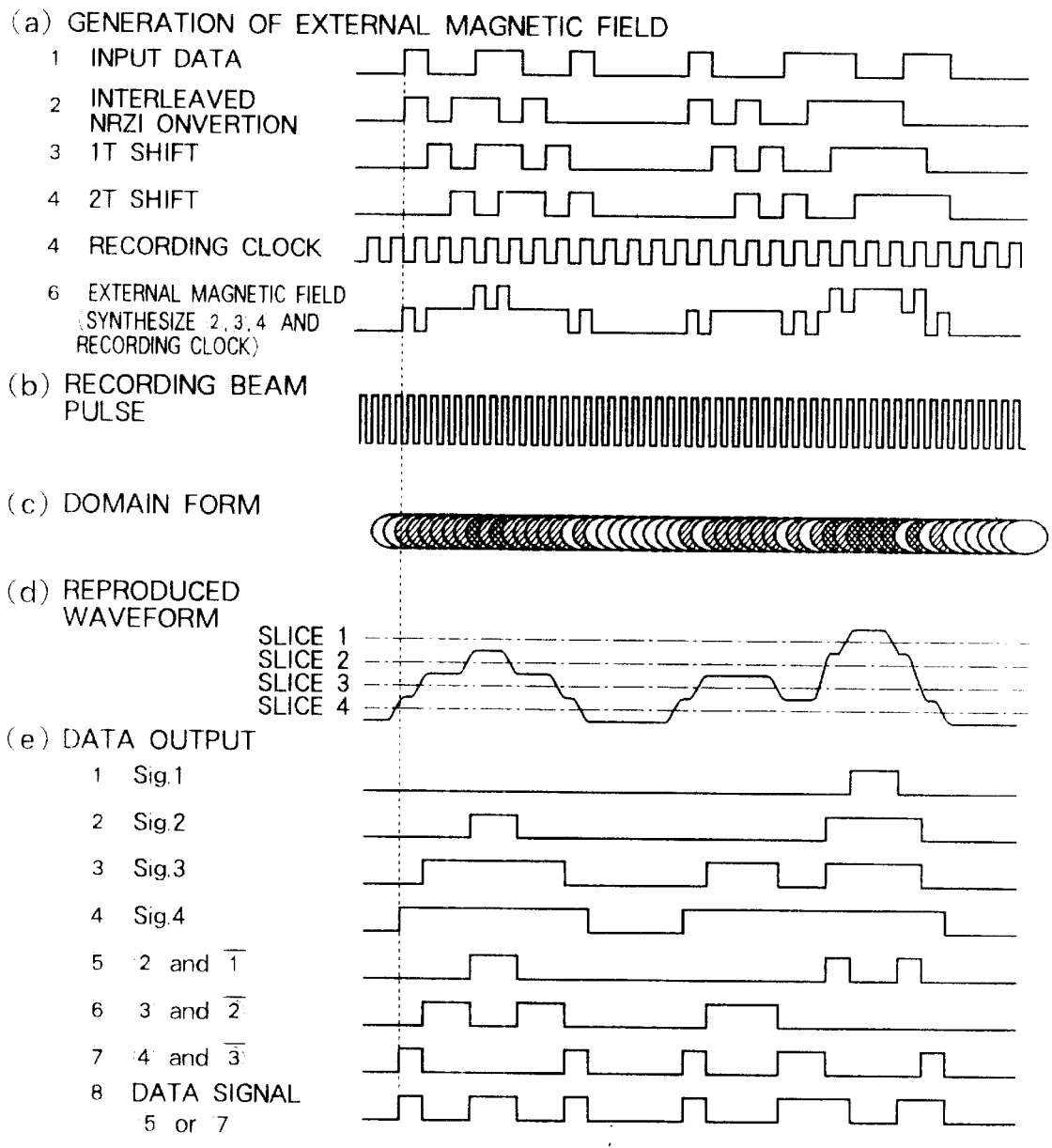
FIG. 59 is an explanatory diagram showing a sixth example of a multi-valued recording/reproducing system according to the present invention.

In a manner similar to that in the first example, the optomagnetic recording medium is driven to position an optical head and a magnetic head on a predetermined track. Thereafter, in order to perform a 5-valued recording corresponding to PRML recording, an NRZI conversion for giving 1-bit (1T) inter-code interference to a data signal is made, as shown in FIG. 59(*a*). In order that a recording signal corresponding to PR(1, 2, 1) equalization is obtained, an external magnetic field synchronized with a recording clock signal and having an applied magnetic field intensity modulated into three values of $H_0$ to $H_2$ is applied from the magnetic head to the optical information recording medium. After the external magnetic field is changed over to a predetermined value, the irradiation with optical pulses shown in FIG. 59(*b*) is made by the optical head so that each recording layer in a portion irradiated with the optical pulse is heated up to a temperature at which the inversion of magnetization can be made by the external magnetic field. Thereby, a magnetic domain shown in FIG. 59(*c*) corresponding to the magnitude of the external magnetic field is formed at the portion irradiated with each optical pulse.

Figure 60:
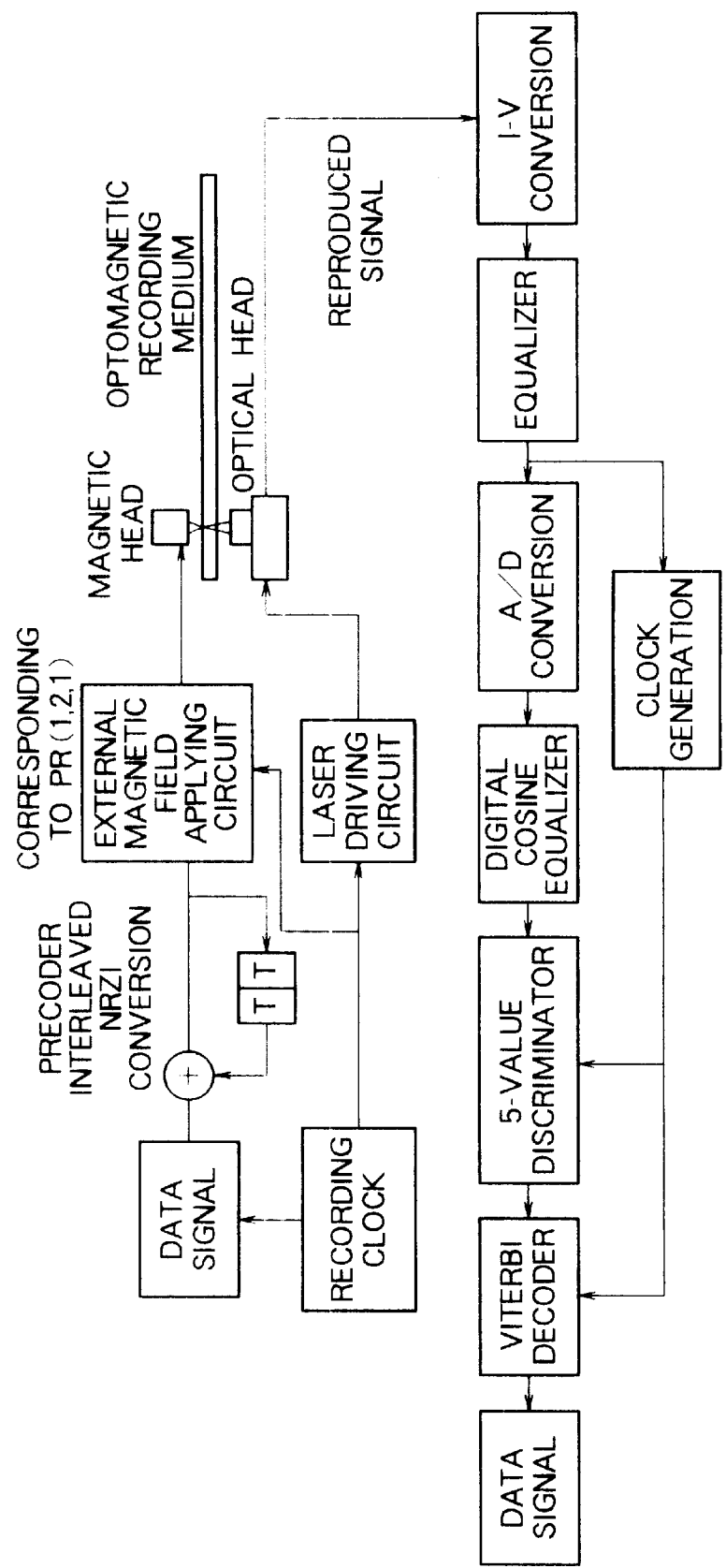
FIG. 60 is a block diagram of a multi-valued recording/reproducing apparatus which performs the multi-valued recording/reproducing system according to the sixth example.

The recording states of magnetic domains corresponding to the respective magnitudes of the external magnetic field are as shown in FIG. 10 above referred to. Accordingly, a reproduced signal read from a series of magnetic domains is as shown in FIG. 59(*d*). By slicing this reproduced signal on the basis of two slice levels set to predetermined values in accordance with a reproduced signal output from each recording state, four 2-value digitized signals Sig1 to Sig4 are obtained, as shown by a timing chart of FIG. 59(*e*). The digitization into two values can be made by performing a logical operation of the four signals. FIG. 60 shows an example of a recording/reproducing system in the present embodiment. In the present embodiment, reproduced light is I–V converted and is thereafter passed through an analog waveform equalizer to eliminate optical interference between codes, thereby obtaining a PR characteristic. The analog signal is subjected to A/D conversion. Thereafter, a difference in characteristic between the inner and outer circumferences is absorbed by a digital transversal filter to discriminate five values. The signal is supplied to a Viterbi decoder for digitization into two values. A reproducing clock signal is generated from the signal after A/D conversion.

[Seventh Example Of Multi-Valued Recording Method]

Figure 17:
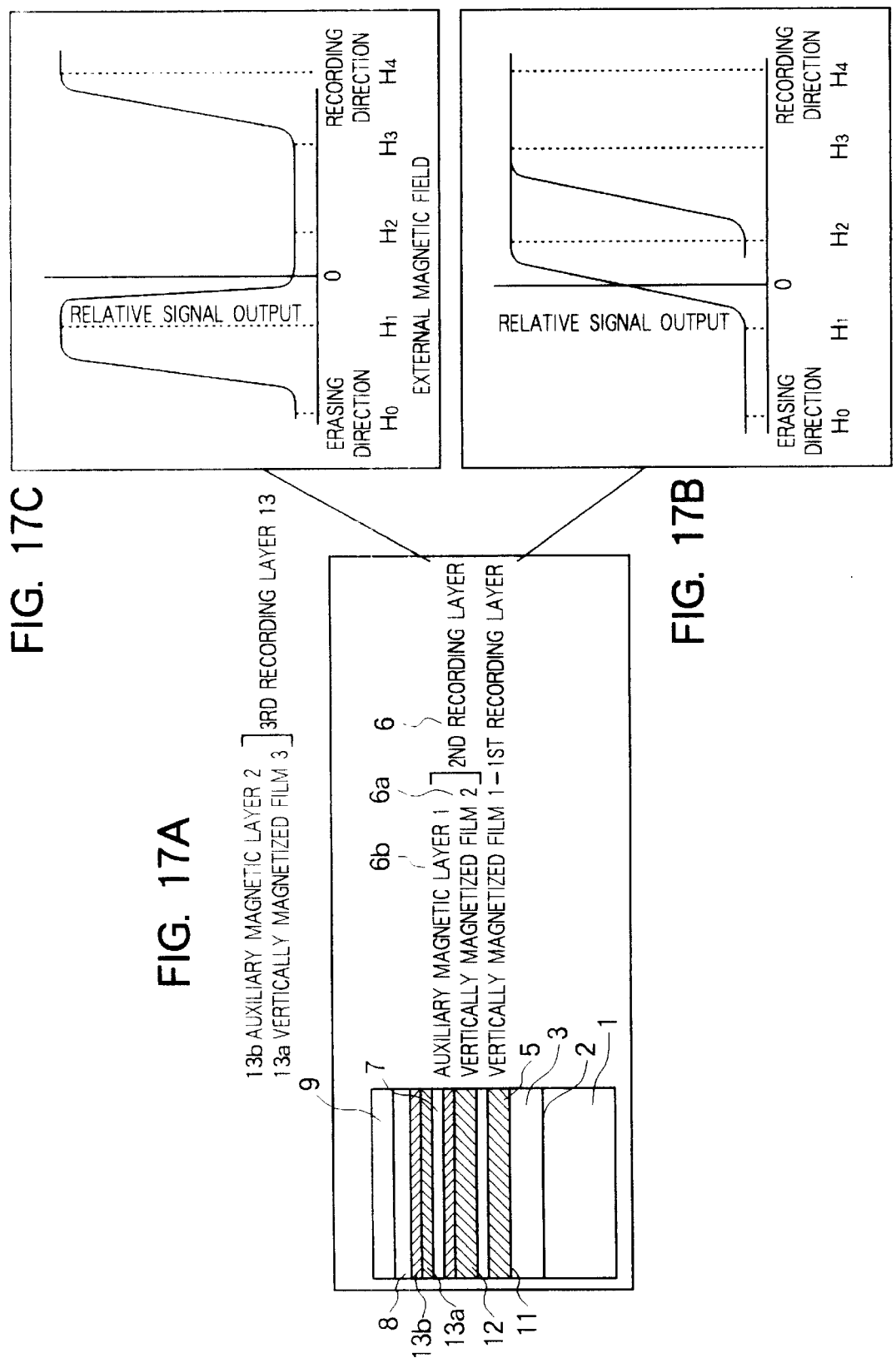
FIGS. 17A, 17B and 17C are diagrams for explaining an optomagnetic recording medium according to a second example of construction.

A multi-valued recording method of the present example too is characterized in that in recording a multi-valued recording signal based on the so-called partial response system (PRML), a 5- or more-valued recording is performed using the optomagnetic recording media according to the second example of construction (see FIGS. 17 and 18).

Figure 61:
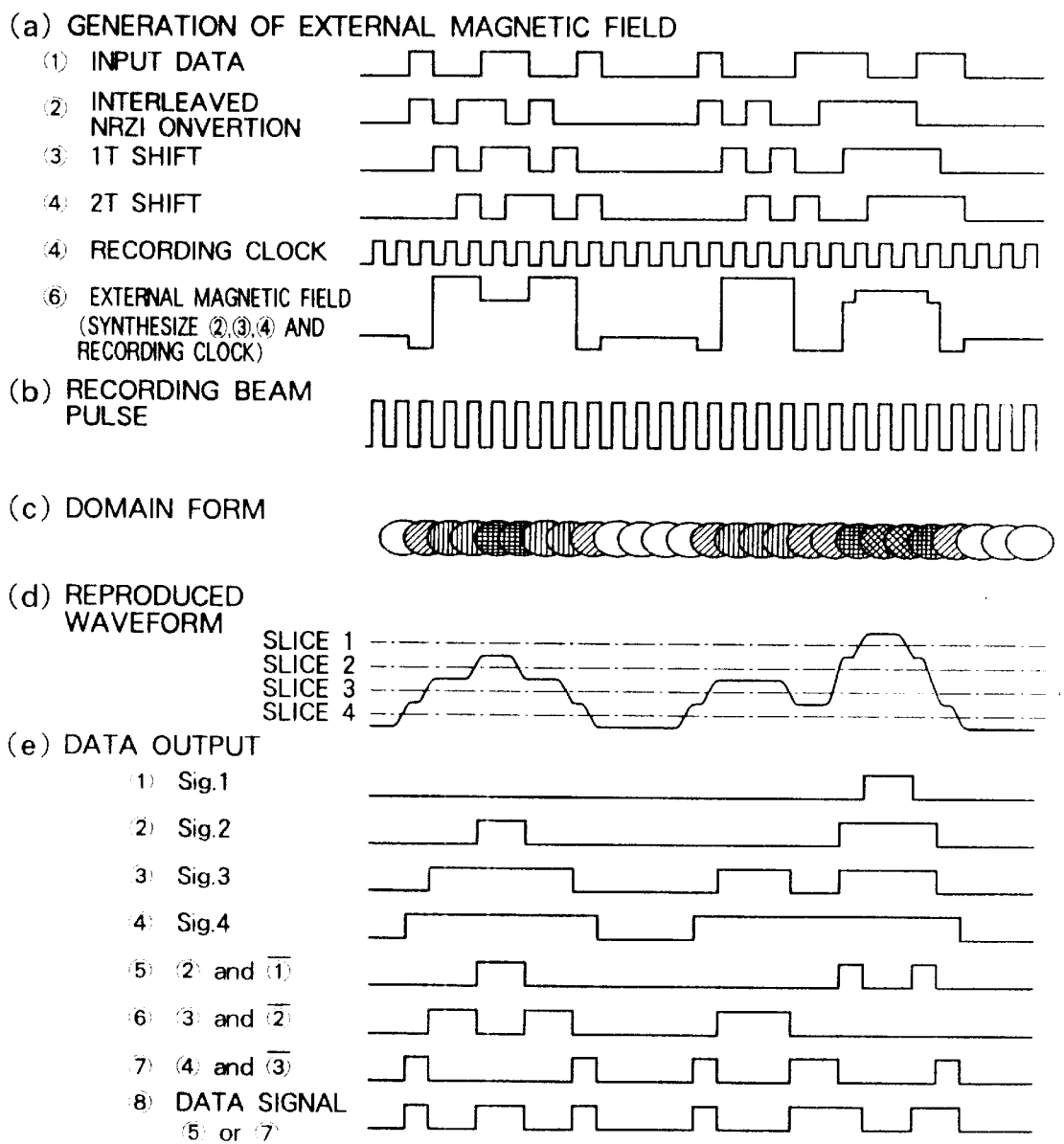
FIG. 61 is an explanatory diagram showing a seventh example of a multi-valued recording/reproducing system according to the present invention.

In a manner similar to that in the first example, the optomagnetic recording medium is driven to position an optical head and a magnetic head on a predetermined track. Thereafter, in order to perform a 5-valued recording corresponding to PRML recording, an interleaved NRZI conversion for giving 2-bit (2T) inter-code interference to a data signal is made, as shown in FIG. 61(*a*). In order that a recording signal corresponding to PR(1, 2, 1) equalization is obtained, an external magnetic field synchronized with a recording clock signal and having an applied magnetic field intensity signal-modulated into five values of $H_0$ to $H_4$ is applied from the magnetic head to the optical information recording medium. After the external magnetic field is changed over to a predetermined value, the irradiation with optical pulses shown in FIG. 61(*b*) is made by the optical head so that each recording layer in a portion irradiated with the optical pulse is heated up to a temperature at which the inversion of magnetization can be made by the external magnetic field. Thereby, a magnetic domain shown in FIG. 61(*c*) corresponding to the magnitude of the external magnetic field is formed at the portion irradiated with each optical pulse.

The recorded stating of magnetic domains corresponding to the respective magnitudes of the external magnetic field are as shown in FIG. 10 above referred to. Accordingly, a reproduced signal read from a series of magnetic domains is as shown in FIG. 61(*d*). By slicing this reproduced signal on the basis of two slice levels set to predetermined values in accordance with a reproduced signal output from each recording state, four 2-value digitized signals Sig1 to Sig4 are obtained, as shown by a timing chart of FIG. 61(*e*). The digitization into two values can be made by performing a logical operation of the four signals.

Figure 62:
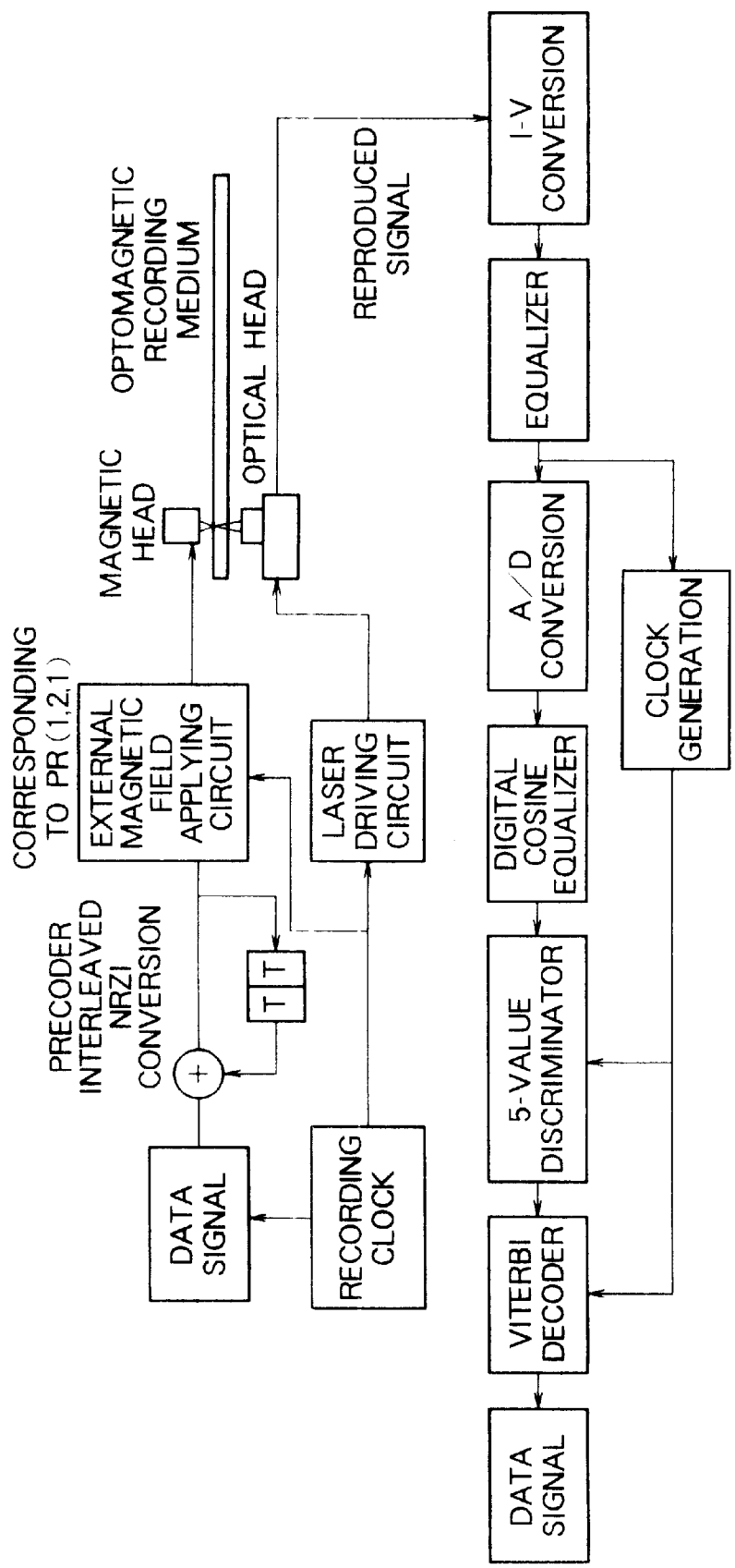
FIG. 62 is a block diagram of a multi-valued recording/reproducing apparatus which performs the multi-valued recording/reproducing system according to the seventh example.

FIG. 62 shows an example of a recording/reproducing system in the present embodiment. In the present embodiment, reproduced light is I–V converted and is thereafter passed through an analog waveform equalizer to eliminate optical interference between codes, thereby obtaining a PR characteristic. The analog signal is subjected to A/D conversion. Thereafter, a difference in characteristic between the inner and outer circumferences is absorbed by a digital transversal filter to discriminate five values. The signal is supplied to a Viterbi decoder for digitization into two values. A reproducing clock signal is generated from the signal after A/D conversion.

[Eighth Example Of Multi-Valued Recording Method]

A multi-valued recording method of the present example is characterized in that a multi-valued recording signal encoded by use of a so-called Trellis encoding modulation system is recorded. As an optomagnetic recording medium can be used the optomagnetic recording medium according to the first example of construction (as shown in FIG. 15) or the optomagnetic recording media according to the fifth example of construction (including the media as shown in FIGS. 23 to 27, - - - ) (and also including the media shown in FIGS. 29, 33, 34, 39, - - - ).

Figure 63:
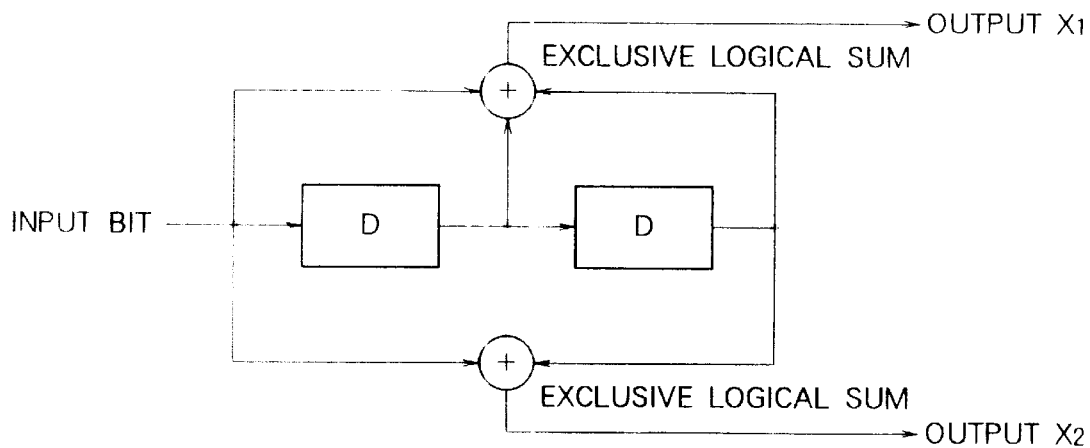
FIG. 63 is a block diagram of a convolution encoder used in performing the multi-valued recording/reproducing system according to an eighth seventh example.
Figure 64A:
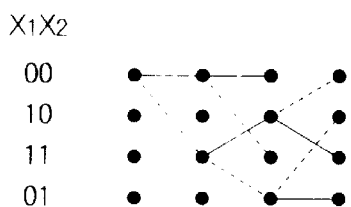
FIGS. 64A and 64B are explanatory diagrams showing the state transition of an output of the convolution encoder shown in FIG. 63.
Figure 64B:
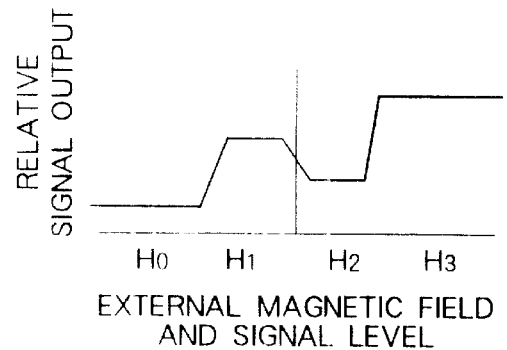

In a manner similar to that in the first example, the optomagnetic recording medium is driven to position an optical head and a magnetic head on a predetermined track. Thereafter, in order to performing a 4-valued recording corresponding to 4-phase orthogonal modulating Trellis codes, the encoding is performed by a convolution encoder shown in FIG. 63. FIG. 64($a$) shows the states of outputs $X_1$ and $X_2$ when data is inputted to the convolution encoder shown in FIG. 63. On the other hand, the optomagnetic recording medium shown in FIG. 15 has an external magnetic field versus signal characteristic as shown in FIG. 64($b$). This has already been mentioned. Accordingly, the intensity of an external magnetic field is modulated into four values of $H_0$ to $H_3$ by using $X_1$ and $X_2$ so that a signal amplitude is assigned in the order of $X_1$ and $X_2$ shown in FIG. 64($a$). This 4-valued external magnetic field having the modulated intensity is applied to the optical information recording medium in synchronism with a recording clock signal. After the external magnetic field is changed over to a predetermined value, the irradiation with optical pulses shown in FIG. 54($b$) is made by the optical head so that each recording layer in a portion irradiated with the optical pulse is heated up to a temperature at which the inversion of magnetization can be made by the external magnetic field. Thereby, a magnetic domain corresponding to the magnitude of the external magnetic field is formed at the portion irradiated with each optical pulse. In this case, the irradiation with a laser beam having a fixed intensity may be made continuously with the external magnetic field being modulated.

Figure 65:
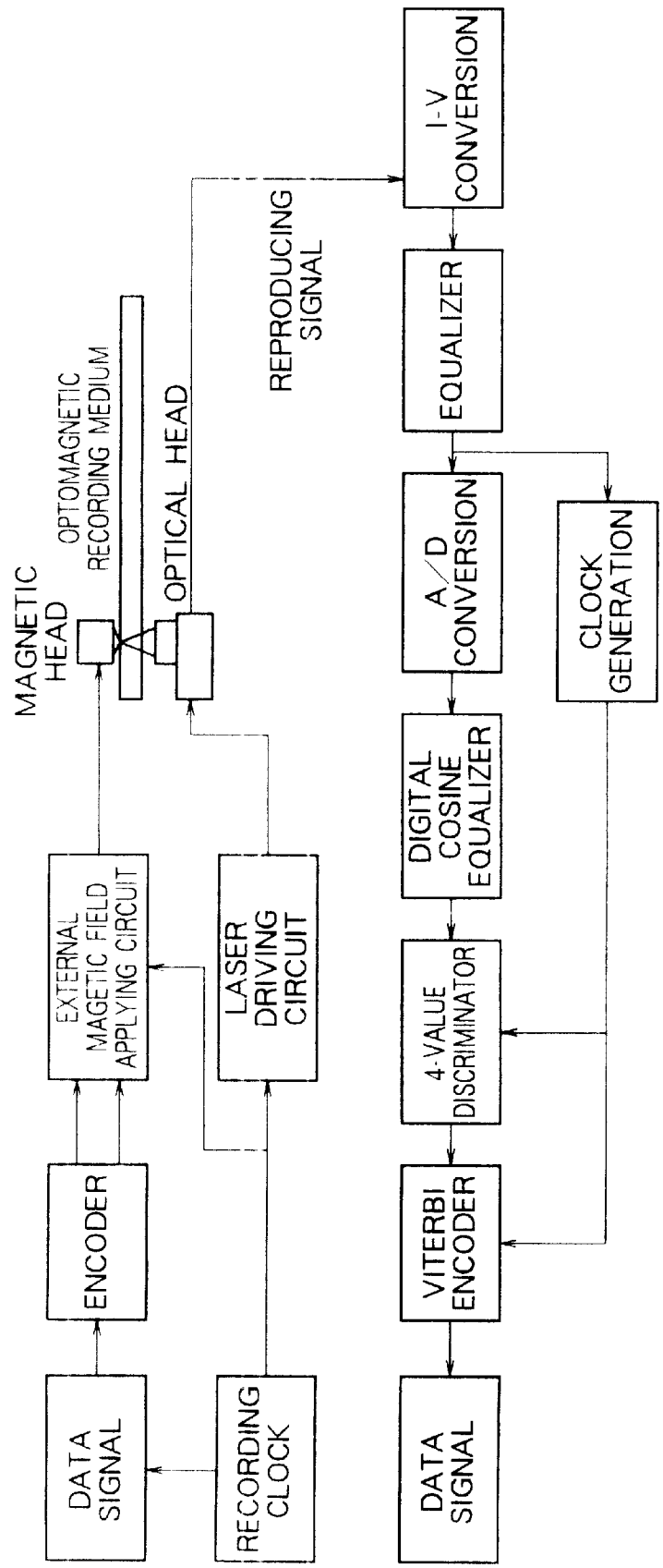
FIG. 65 is a block diagram of a multi-valued recording/reproducing apparatus which performs the multi-valued recording/reproducing system according to the eighth example.

FIG. 65 shows an example of the construction of a recording/reproducing system in the present embodiment. In the present embodiment, reproduced light is I–V converted and is thereafter passed through an analog waveform equalizer to eliminate optical interference between codes. The analog signal is subjected to A/D conversion. Thereafter, a difference in characteristic between the inner and outer circumferences is absorbed by a digital transversal filter to discriminate four values. The signal is supplied to a Viterbi decoder for digitization into two values. A reproducing clock signal is generated from the signal after A/D conversion.

[Ninth Example Of Multi-Valued Recording Method]

A multi-valued recording method of the present example is characterized in that the recording of a signal is performed using the optomagnetic recording medium according to the third example of construction (see FIGS. 19 and 20). The signal recording in the present example uses a magnetic head having two windings which can be driven independently from each other.

Figure 66:
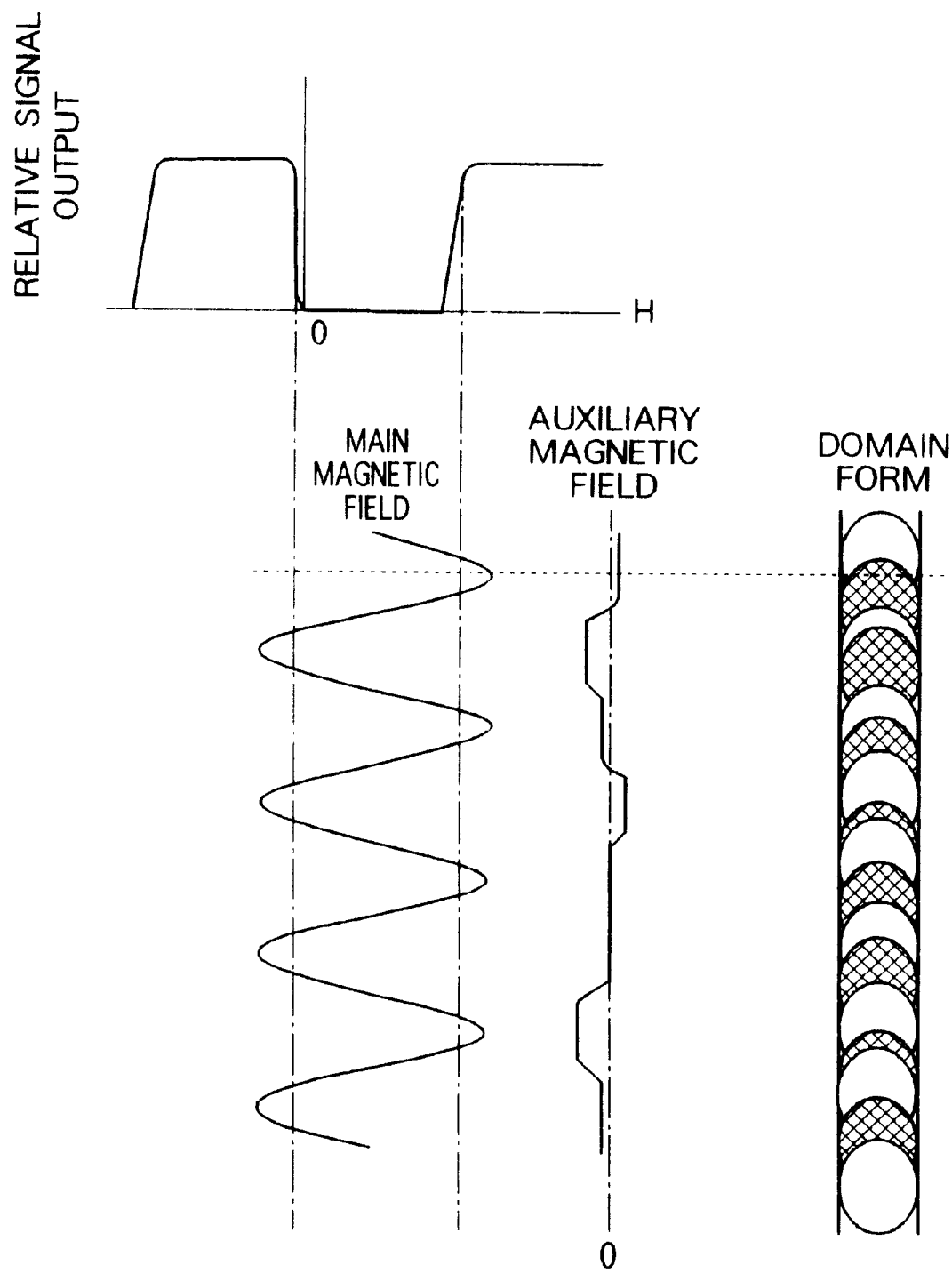
FIG. 66 is an explanatory diagram showing a ninth example of a multi-valued recording/reproducing system according to the present invention.

In a manner similar to that in the first example, the optomagnetic recording medium is driven to position an optical head and a magnetic head on a predetermined track and the irradiation with a laser beam is thereafter made by the optical head so that a recording layer in a portion irradiated with the laser beam is heated up to a temperature at which the inversion of magnetization can be made by the external magnetic field. In this state, a main magnetic field having an amplitude extending over two recording states of the recording medium is applied at a fixed frequency while the intensity of an auxiliary magnetic field is changed in accordance with recording data and in synchronism with the main magnetic field (see FIG. 66), so that a magnetic domain having a domain length corresponding to the intensity of the auxiliary external magnetic field is formed. Thereby, a so-called pit edge recording can be realized.

[Tenth Example Of Multi-Valued Recording Method]

A multi-valued recording method of the present example too is characterized in that the recording of a signal is performed using the optomagnetic recording medium according to the third example of construction (see FIGS. 19 and 20). In the signal recording in the present example, an optical head and a magnetic head with the optomagnetic recording medium interposed therebetween are disposed on the transparent substrate side of the optomagnetic recording medium and the protection film side thereof, respectively.

Figure 67:
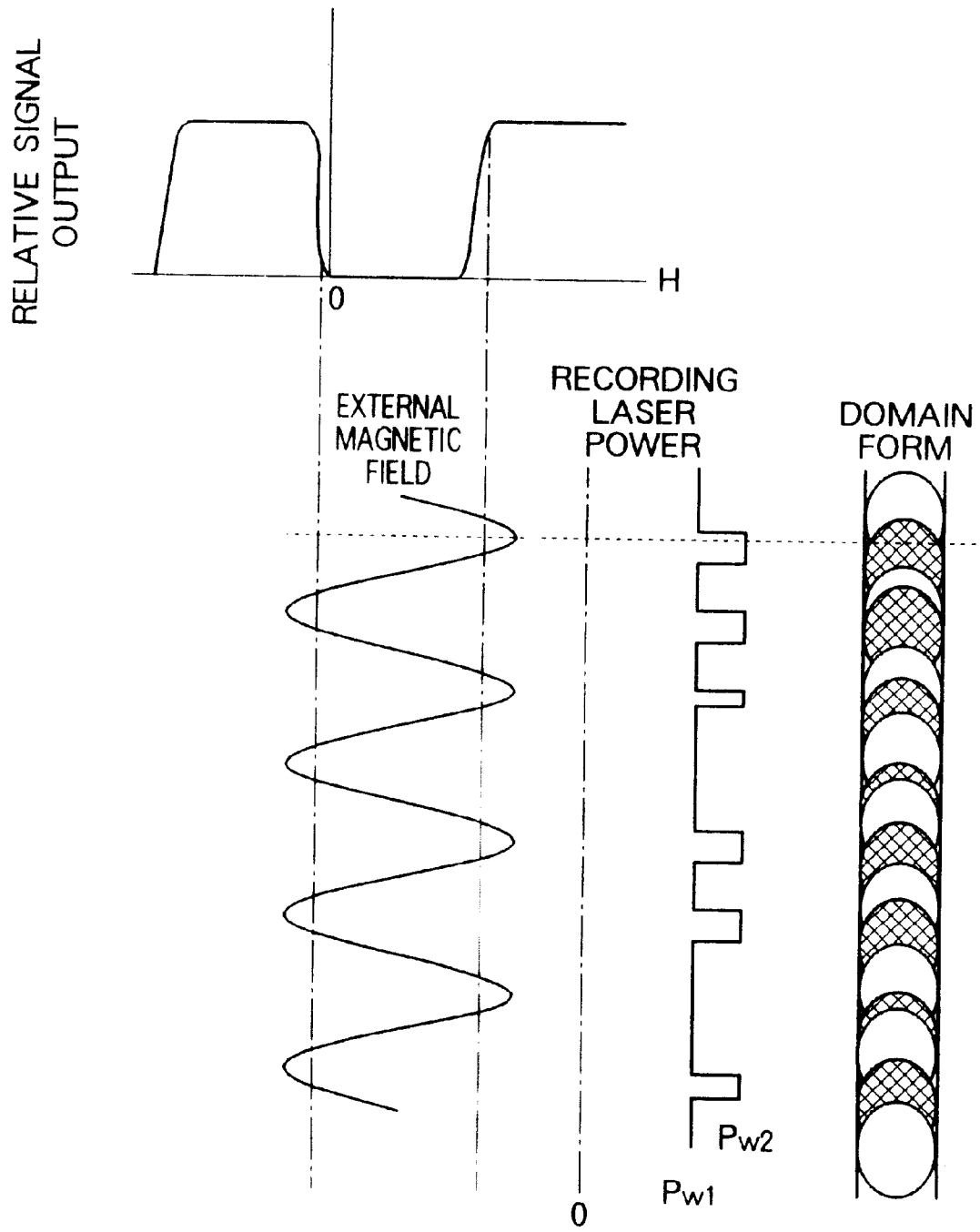
FIG. 67 is an explanatory diagram showing a tenth example of a multi-valued recording/reproducing system according to the present invention.

In a manner similar to that in the first example, the optomagnetic recording medium is driven to position an optical head and a magnetic head on a predetermined track and the irradiation with a laser beam is thereafter made by the optical head so that a recording layer in a portion irradiated with the laser beam is heated up to a temperature at which the inversion of magnetization can be made by an external magnetic field. In this state, an external magnetic field having an amplitude extending over two recording states of the recording medium is applied at a fixed frequency while the intensity of an irradiation laser beam from the optical head is changed to $Pw_1$ and $Pw_2$ in accordance with recording data and in synchronism with the external magnetic field (see FIG. 67), SO that a magnetic domain having a domain length corresponding to the time of change of the laser beam intensity is formed. Thereby, a so-called pit edge recording can be realized.

[Eleventh Example Of Multi-Valued Recording Method]

A multi-valued recording method of the present example too is characterized in that the recording of a signal is performed using the optomagnetic recording medium according to the third example of construction (see FIGS. 19 and 20). In the signal recording in the present example, an optical head and a magnetic head with the optomagnetic recording medium interposed therebetween are disposed on the transparent substrate side of the optomagnetic recording medium and the protection film side thereof, respectively.

Figure 68:
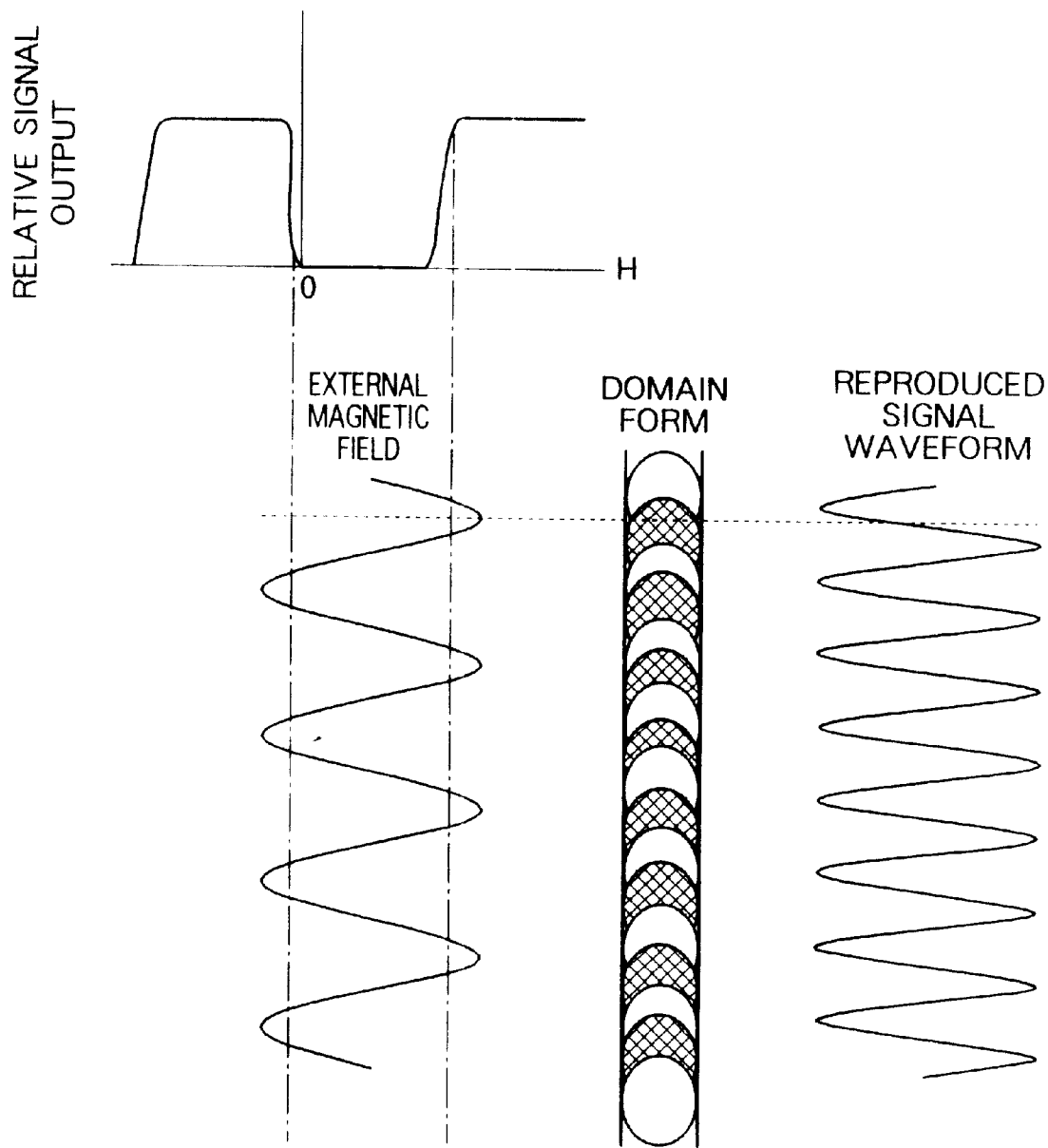
FIG. 68 is an explanatory diagram showing an eleventh example of a multi-valued recording/reproducing system according to the present invention.

In a manner similar to that in the first example, the optomagnetic recording medium is driven to position an optical head and a magnetic head on a predetermined track and the irradiation with a laser beam is thereafter made by the optical head so that a recording layer in a portion irradiated with the laser beam is heated up to a temperature at which the inversion of magnetization can be made by an external magnetic field. In this state, an external magnetic field having an amplitude extending over two recording states of the recording medium is applied at a fixed frequency while the frequency of the external magnetic field is frequency-modulated in accordance with recording data (see FIG. 68), so that a frequency-modulated magnetic domain having a frequency two times as high as the driving frequency of the magnetic head is formed. Thereby, a so-called pit position recording can be realized. Analog recording is also possible by performing the frequency modulation by an analog signal such as a video signal.

[Twelfth Example Of Multi-Valued Recording Method]

A multi-valued recording method of the present example too is characterized in that the recording of a signal is performed using the optomagnetic recording medium according to the third example of construction (see FIGS. 19 and 20). In the signal recording in the present example, an optical head and a magnetic head with the optomagnetic recording medium interposed therebetween are disposed on the transparent substrate side of the optomagnetic recording medium and the protection film side thereof, respectively.

Figure 69:
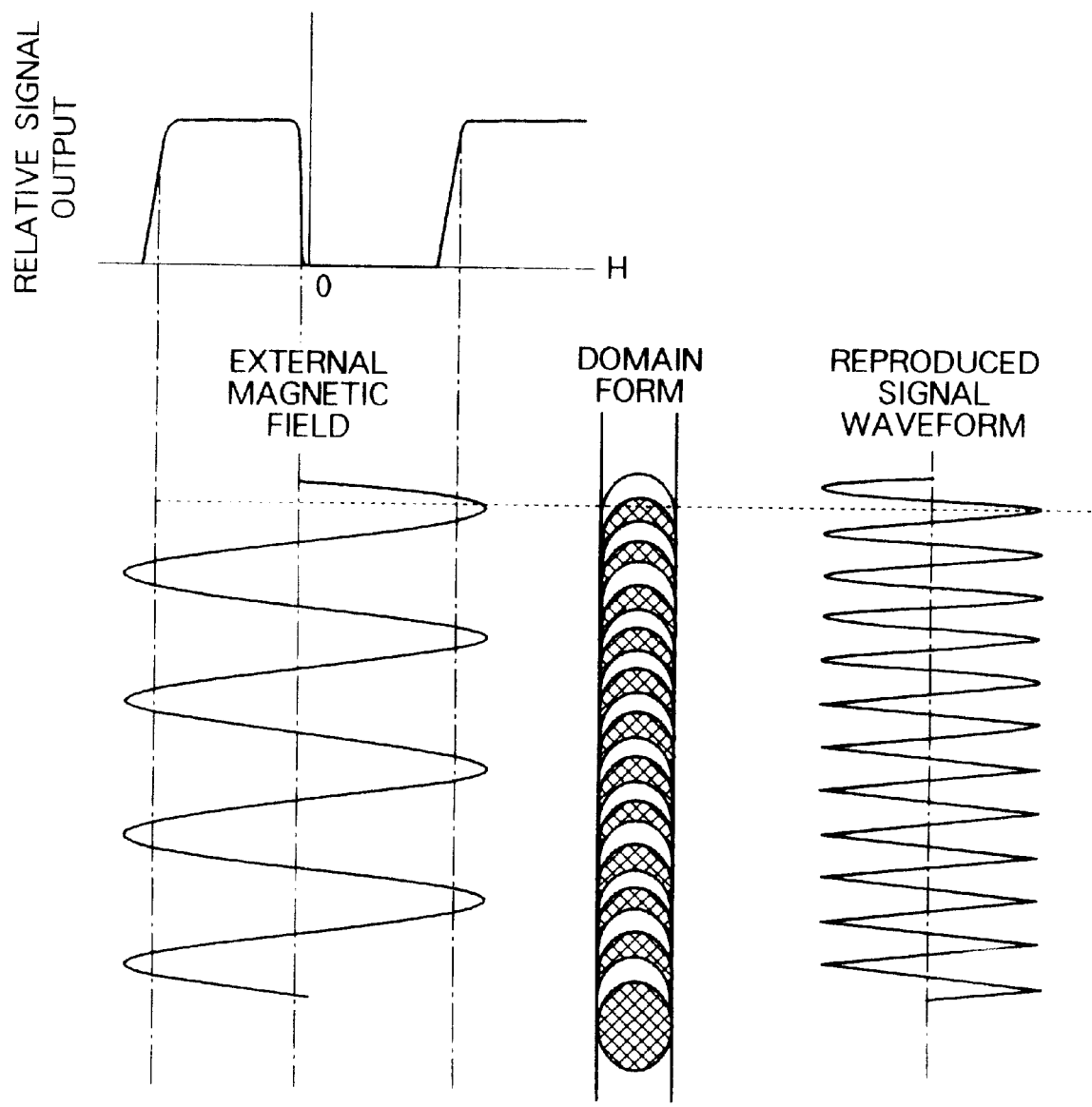
FIG. 69 is an explanatory diagram showing a twelfth example of a multi-valued recording/reproducing system according to the present invention.

In a manner similar to that in the first example, the optomagnetic recording medium is driven to position an optical head and a magnetic head on a predetermined track and the irradiation with a laser beam is thereafter made by the optical head so that a recording layer in a portion irradiated with the laser beam is heated up to a temperature at which the inversion of magnetization can be made by an external magnetic field. In this state, an external magnetic field having an amplitude extending over two recording states and two erased states of the recording medium is applied at a fixed frequency while the frequency of the external magnetic field is frequency-modulated in accordance with recording data (see FIG. 69), so that a frequency-modulated magnetic domain having a frequency three times as high as the driving frequency of the magnetic head is formed. Thereby, a so-called pit position recording can be realized. Analog recording is also possible by performing the frequency modulation by an analog signal such as a video signal.

[Thirteenth Example Of Multi-Valued Recording Method]

A multi-valued recording method of the present example is characterized in that the recording of a signal is performed using the optomagnetic recording medium according to the fourth example of construction (see FIGS. 21 and 22). In the signal recording in the present example, an optical head and a magnetic head with the optomagnetic recording medium interposed therebetween are disposed on the transparet substrate side of the optomagnetic recording medium and the protection film side thereof, respectively.

Figure 70:
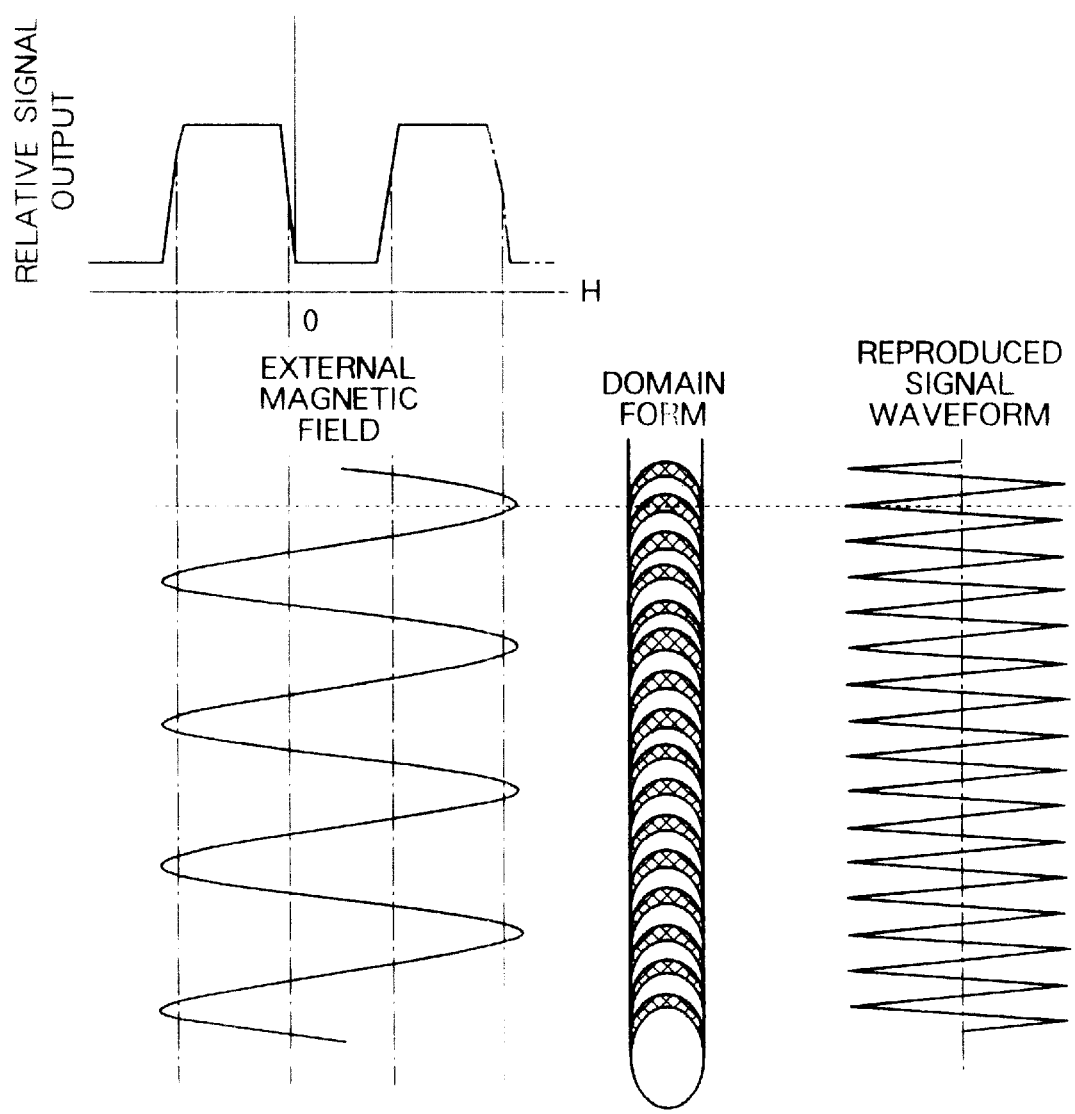
FIG. 70 is an explanatory diagram showing a thirteenth example of a multi-valued recording/reproducing system according to the present invention.

In a manner similar to that in the first example, the optomagnetic recording medium is driven to position an optical head and a magnetic head on a predetermined track and the irradiation with a laser beam is thereafter made by the optical head so that a recording layer in a portion irradiated with the laser beam is heated up to a temperature at which the inversion of magnetization can be made by an external magnetic field. In this state, an external magnetic field having an amplitude extending over two recording states and two erasing states of the recording medium is applied at a fixed frequency while the frequency of the external magnetic field is frequency-modulated in accordance with recording data (see FIG. 70), so that a frequency-modulated magnetic domain having a frequency four times as high as the driving frequency of the magnetic head is formed. Thereby, a so-called pit position recording can be realized. Analog recording is also possible by performing the frequency modulation by an analog signal such as a video signal.

[Fourteenth Example Of Multi-Valued Recording Method]

A multi-valued recording method of the present example is characterized in that the recording of a signal is performed using the optomagnetic recording medium according to the first example of construction (or the media shown in FIG. 9 and having the concrete construction shown in FIGS. 11 to 16, - - -). The signal recording in the present example uses a magnetic head having two windings which can be driven independently from each other.

Figure 71:
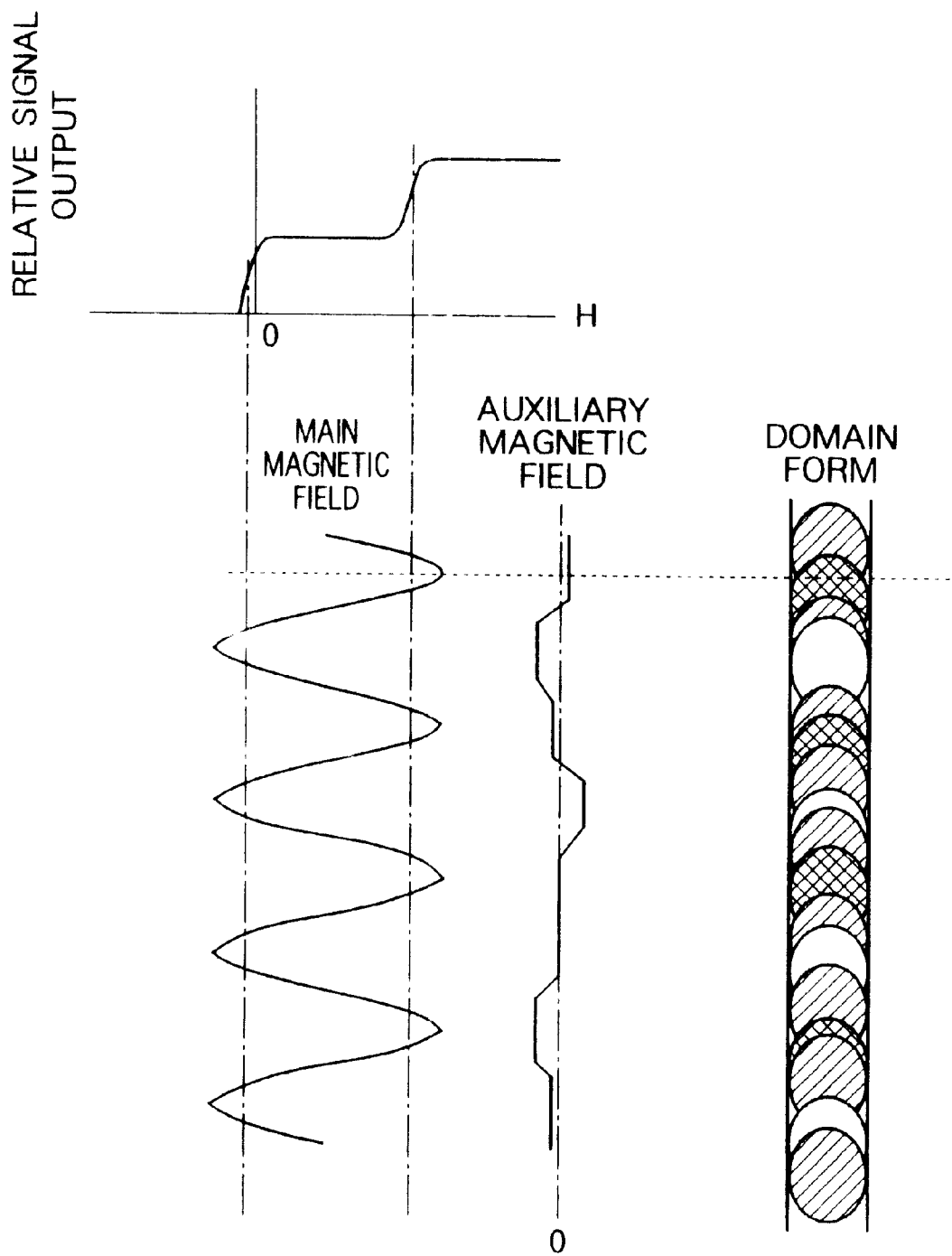
FIG. 71 is an explanatory diagram showing a fourteenth example of a multi-valued recording/reproducing system according to the present invention.

In a manner similar to that in the first example, the optomagnetic recording medium is driven to position an optical head and a magnetic head on a predetermined track and the irradiation with a laser beam is thereafter made by the optical head so that a recording layer in a portion irradiated with the laser beam is heated up to a temperature at which the inversion of magnetization can be made by the external magnetic field. In this state, a main magnetic field having an amplitude extending over two recording states of the recording medium is applied at a fixed frequency while the intensity of an auxiliary magnetic field is changed in accordance with recording data and in synchronism with the main magnetic field (see FIG. 71), so that a magnetic domain having a domain length corresponding to the intensity of the auxiliary external magnetic field is formed. Thereby, a so-called pit edge recording can be realized.

[Fifteenth Example Of Multi-Valued Recording Method]

A multi-valued recording method of the present example is characterized in that the recording of a signal is performed using the optomagnetic recording medium according to the first example of construction (or the media shown in FIG. 9 and having the concrete construction shown in FIGS. 11 to 16, - - -). In the signal recording in the present example, an optical head and a magnetic head with the optomagnetic recording medium interposed therebetween are disposed on the transparent substrate side of the optomagnetic recording medium and the protection film side thereof, respectively.

Figure 72:
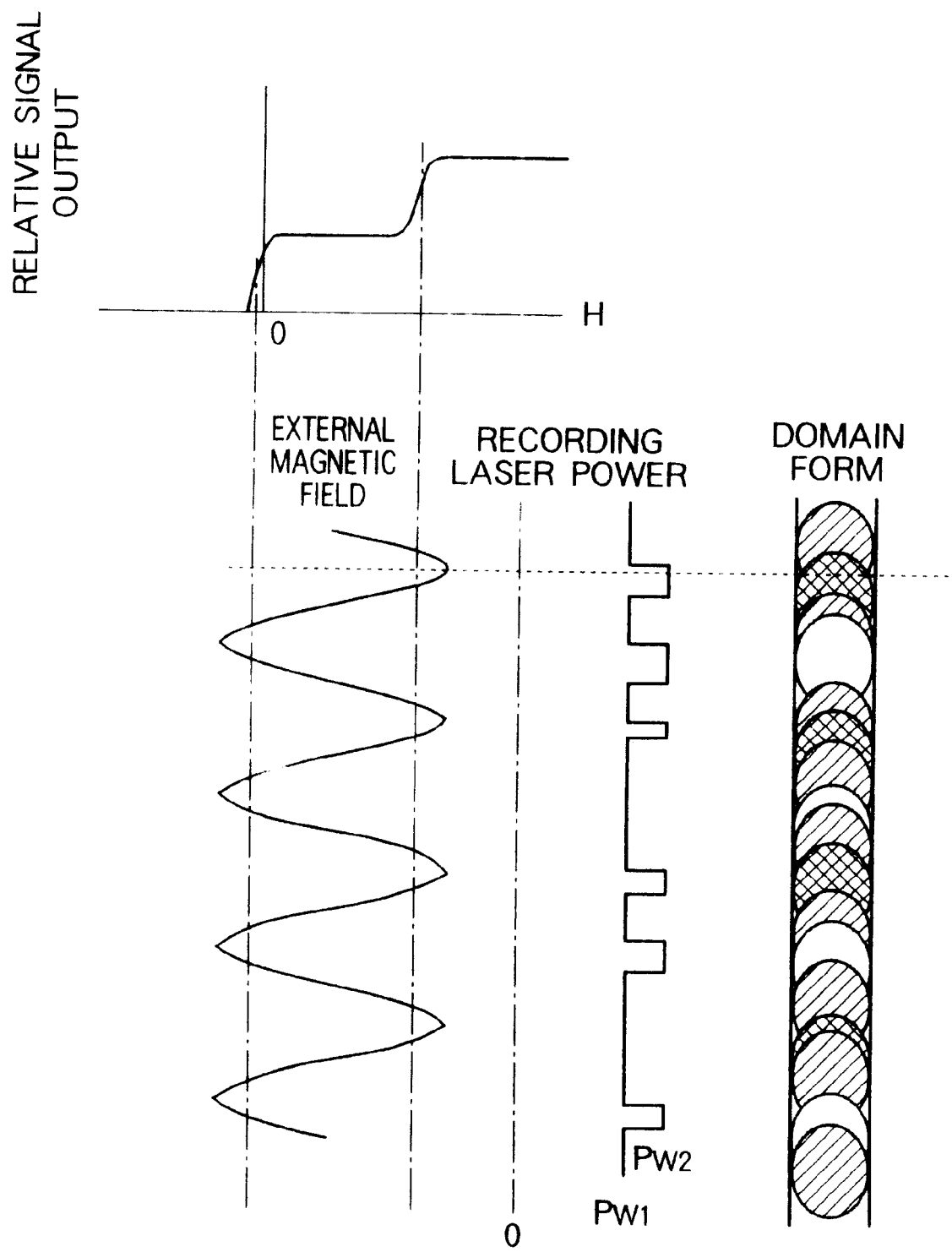
FIG. 72 is an explanatory diagram showing a fifteenth example of a multi-valued recording/reproducing system according to the present invention.

In a manner similar to that in the first example, the optomagnetic recording medium is driven to position an optical head and a magnetic head on a predetermined track and the irradiation with a laser beam is thereafter made by the optical head so that a recording layer in a portion irradiated with the laser beam is heated up to a temperature at which the inversion of magnetization can be made by an external magnetic field. In this state, an external magnetic field having an amplitude extending over two recording states of the recording medium is applied at a fixed frequency while the intensity of an irradiation laser beam from the optical head is changed to $Pw_1$, and $Pw_2$ in accordance with recording data and in synchronism with the external magnetic field (see FIG. 72), so that a magnetic domain having a domain length corresponding to the time of change of the laser beam intensity is formed. Thereby, a so-called pit edge recording can be realized.

[Sixteenth Example Of Multi-Valued Recording Method]

A multi-valued recording method of the present example too is characterized in that the recording of a signal is performed using the optomagnetic recording medium according to the first example of construction (or the media shown in FIG. 9 and having the concrete construction shown in FIGS. 11 to 16, - - -). In the signal recording in the present example, an optical head and a magnetic head with the optomagnetic recording medium interposed therebetween are disposed on the transparent substrate side of the optomagnetic recording medium and the protection film side thereof, respectively.

Figure 73:
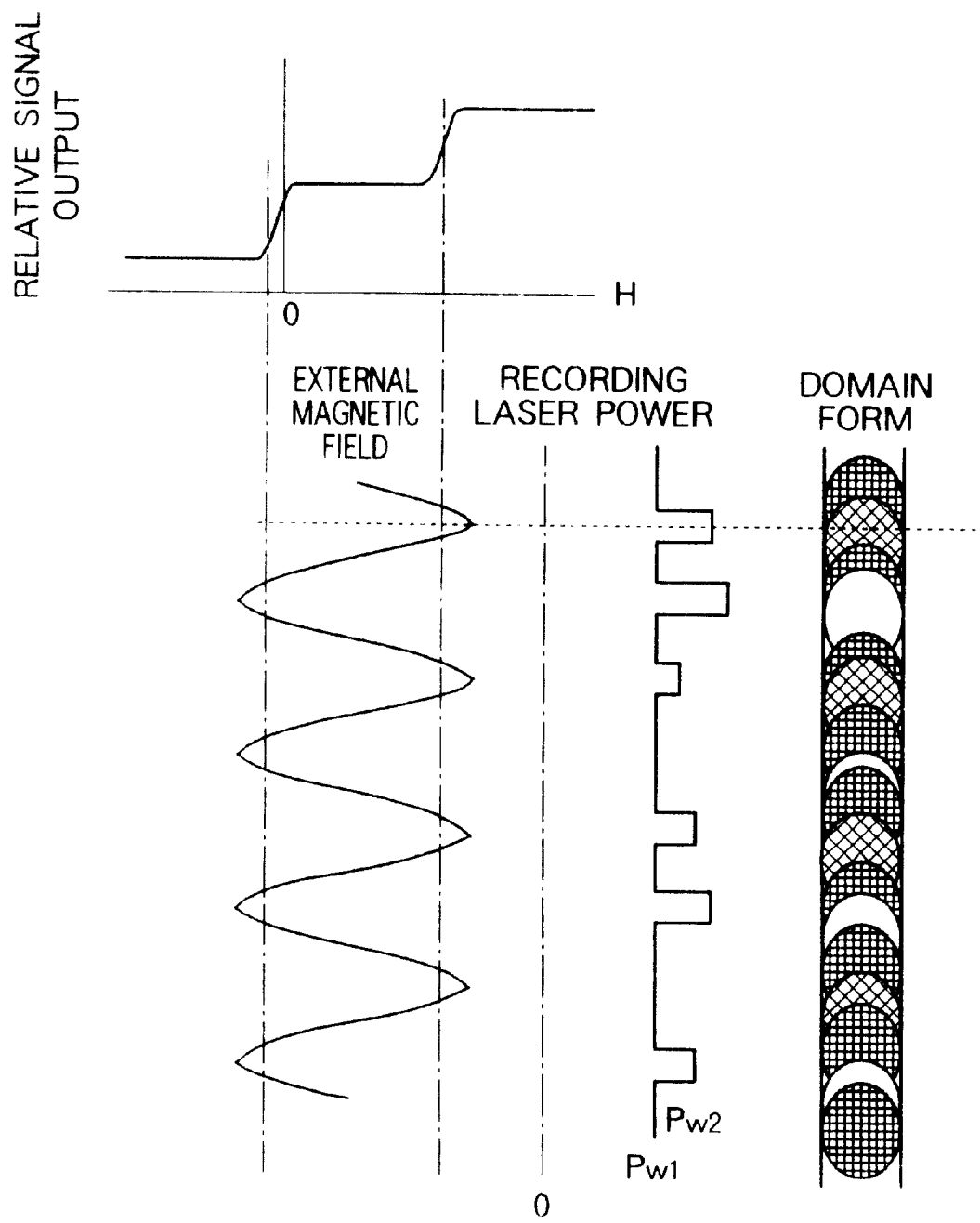
FIG. 73 is an explanatory diagram showing a sixteenth example of a multi-valued recording/reproducing system according to the present invention.

In a manner similar to that in the first example, the optomagnetic recording medium is driven to position an optical head and a magnetic head on a predetermined track and the irradiation with a laser beam is thereafter made by the optical head so that a recording layer in a portion irradiated with the laser beam is heated up to a temperature at which the inversion of magnetization can be made by an external magnetic field. In this state, an external magnetic field having an amplitude extending over all recording states of the recording medium is applied at a fixed frequency while the intensity of an irradiation laser beam from the optical head is changed from $Pw_1$ in accordance with recording data and in synchronism with the external magnetic field (see FIG. 73), so that a magnetic domain having a domain length corresponding the laser beam intensity ($Pw_2$) is formed. Thereby, a so-called pit edge recording can be realized.

[Seventeenth Example Of Multi-Valued Recording Method]

A multi-valued recording method of the present example too is characterized in that the recording of a signal is performed using the optomagnetic recording medium according to the fourth example of construction (see FIGS. 21 and 22). In the signal recording in the present example, an optical head and a magnetic head with the optomagnetic recording medium interposed therebetween are disposed on the transparent substrate side of the optomagnetic recording medium and the protection film side thereof, respectively.

Figure 74:
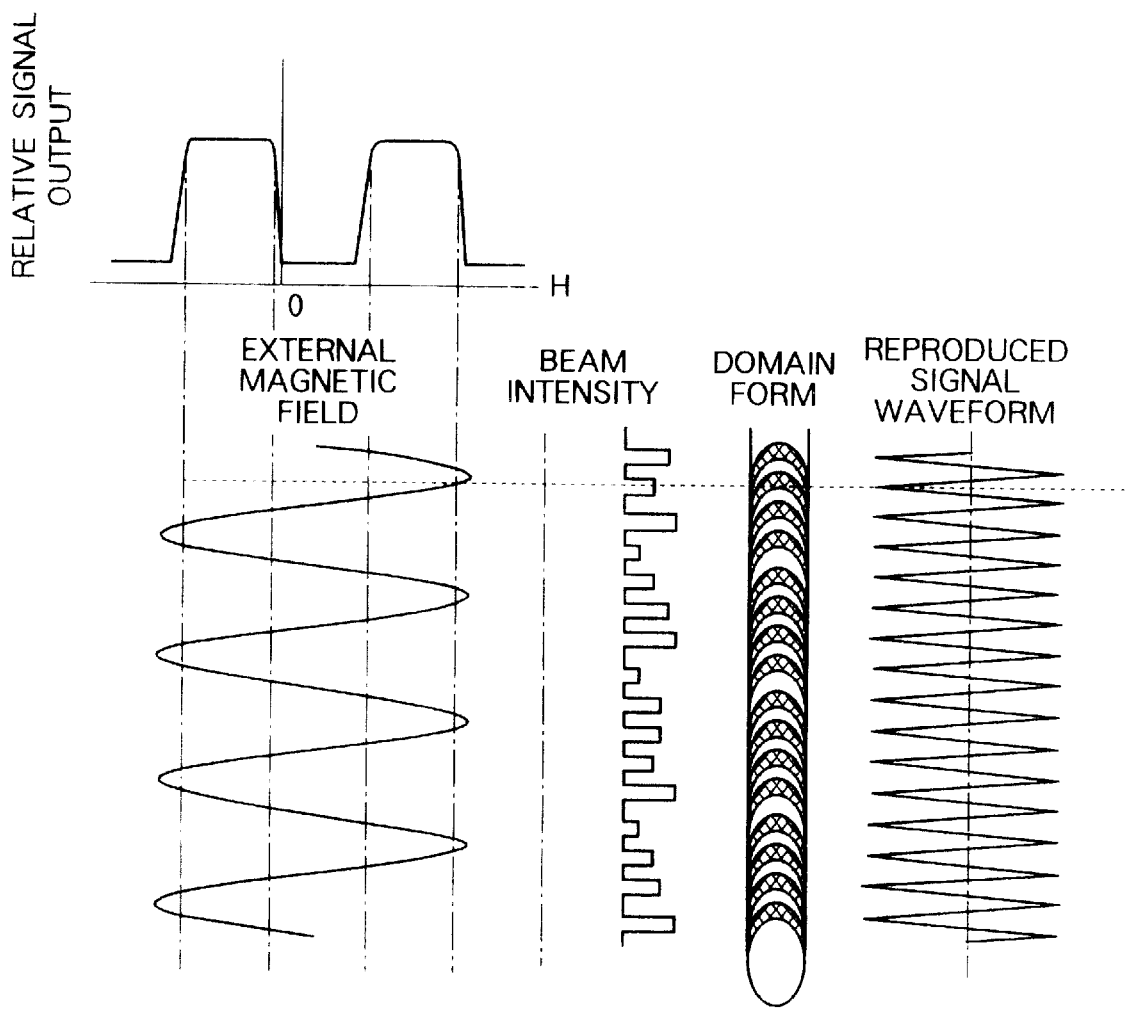
FIG. 74 is an explanatory diagram showing a seventeenth example of a multi-valued recording/reproducing system according to the present invention.

In a manner similar to that in the first example, the optomagnetic recording medium is driven to position an optical head and a magnetic head on a predetermined track and the irradiation with a laser beam is thereafter made by the optical head so that a recording layer in a portion irradiated with the laser beam is heated up to a temperature at which the inversion of magnetization can be made by an external magnetic field. In this state, an external magnetic field having an amplitude extending over two recording states of the recording medium is applied at a fixed frequency while the frequency of the external magnetic field is frequency-modulated in accordance with recording data (see FIG. 74). And, the intensity of an irradiation laser beam is modulated in synchronism with the external magnetic field to control the length of a magnetic domain.

[Eighteenth Example Of Multi-Valued Recording Method]

A multi-valued recording method of the present example is characterized in that an external magnetic field is modulated four-stepwise in accordance with a recording signal while a recording laser beam is modulated pulse-wise. As an optomagnetic recording medium is used any one of the optomagnetic recording media according to the fifth example of construction, that is, the media shown in FIG. 23 and having the concrete construction as shown in FIGS. 24 to 27, - - - (and also FIGS. 29, 33, 34, 36, 39, - - - ).

First, the optomagnetic recording medium is mounted to a medium driver such as a turn table and an optical head and a magnetic head are disposed on the transparent substrate side of the recording medium and on the protection film side thereof, respectively. The medium driver is activated to drive the optomagnetic recording medium and the optical and magnetic heads relative to each other at a predetermined linear velocity so that the optical head and the magnetic head are positioned on a predetermined track.

Thereafter, an external magnetic field synchronized with a recording clock signal and having an intensity signal-modulated into four values of H0 H3 in accordance with a recording signal is applied from the magnetic head to the optical information recording medium, as shown in FIG. 75(a). After the external magnetic field is changed over to a predetermined value, the irradiation with optical pulses shown in FIG. 75(b) is made by the optical head so that each recording layer in a portion irradiated with the optical pulse is heated up to a temperature at which the inversion of magnetization can be made by the external magnetic field. Thereby, a magnetic domain shown in FIG. 75(c) corresponding to the magnitude of the external magnetic field is formed at the portion irradiated with each optical pulse.

In FIG. 75(b), oblique lines, longitudinal lines and white ground depicted in the domain represent the individual states of magnetization distinctively. In this embodiment, the representation by leftward descending oblique lines shows the state of magnetization in which the combination of the directions of magnetization in the vertically magnetized films 1 and 2 of the medium according to the fifth example of construction takes the state "1" shown in FIG. 79(a), the representation by white ground shows the state of magnetization in which the combination takes "0", the representation by longitudinal lines shows the state of magnetization in which the combination is "3" and the representation by rightward descending oblique lines shows a magnetized state in which the combination is "2".

Figure 77:
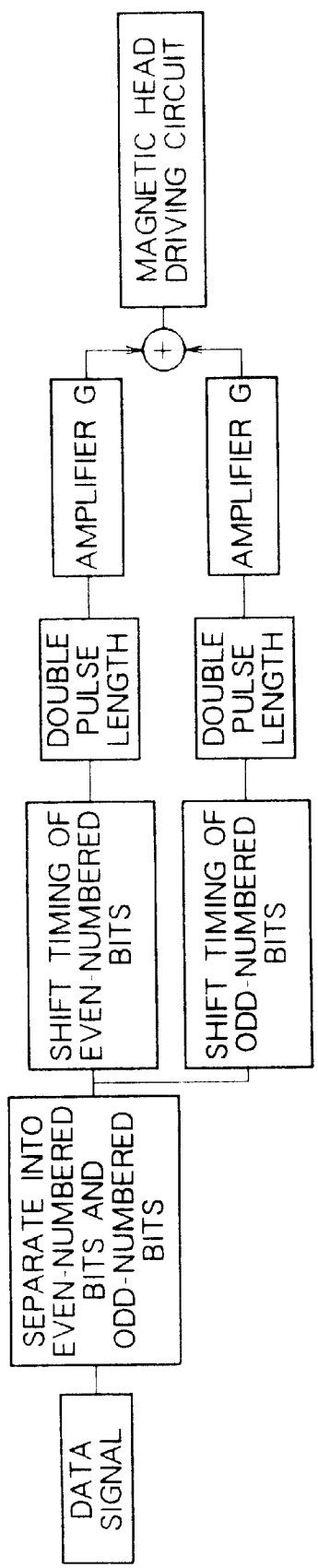
FIG. 77 is a block diagram showing a first example of an external magnetic field intensity modulating circuit in the eighteenth example of the multi-valued recording/reproducing system.
Figure 78:
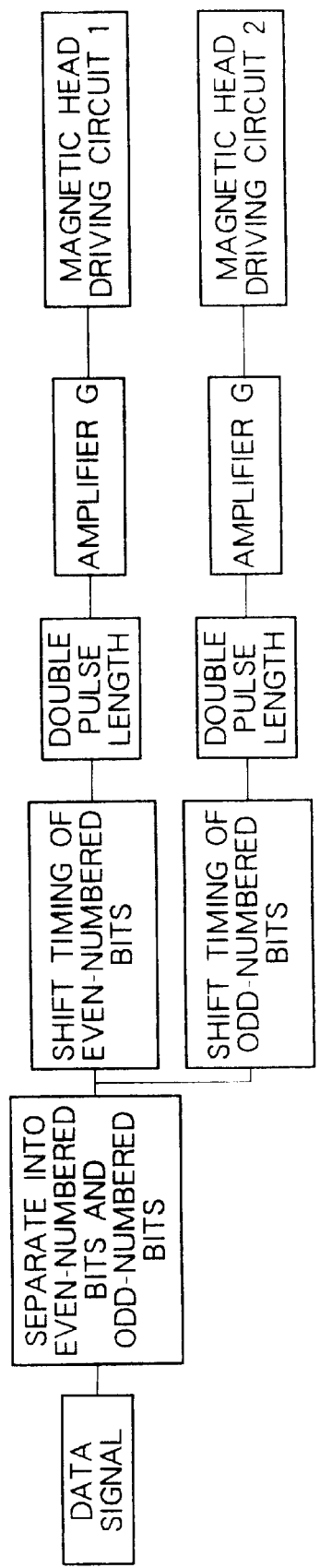
FIG. 78 is a block diagram showing a second example of the external magnetic field intensity modulating circuit in the eighteenth example of the multi-valued recording/reproducing system.
Figure 79:
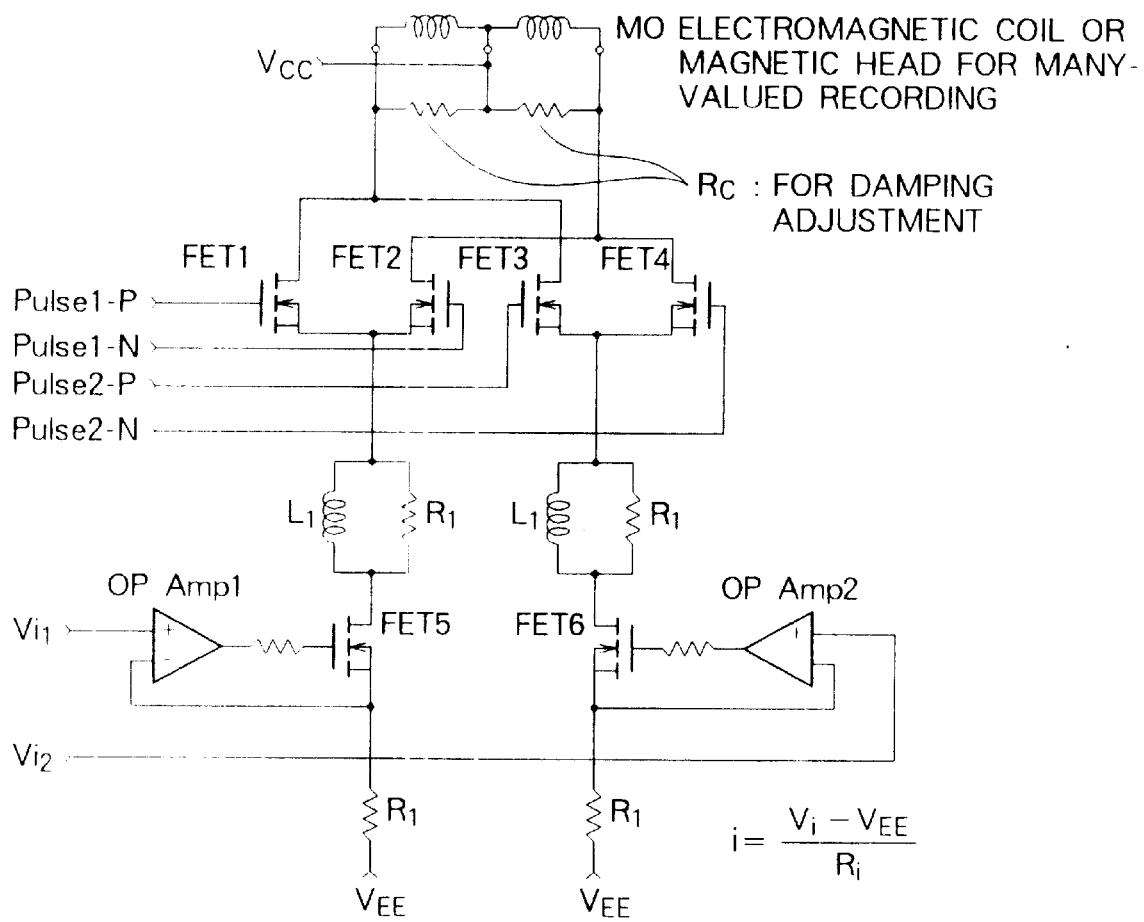
FIG. 79 shows an example of a current driving circuit shown in FIG. 77.

The signal modulation of the magnetic field intensity can be made by a system shown in FIG. 76 and a signal modulating circuit shown in FIG. 77 or 78. FIG. 79 shows an example of a current driving circuit shown in FIG. 77. Explaining concretely in reference FIG. 75, the logical product of a recording clock signal ① and a data signal ② is produced to generate an odd-numbered data signal ③. Also, the logical product of the inverted version of the recording clock signal ① and the data signal ② is produced to generate an even-numbered data signal ④. The logical sum of a signal obtained by delaying the odd-numbered data signal ③ by ½ clock by use of a shift register and the original odd-numbered data signal ③ is produced to generate a signal ⑤ in which the length of the odd-numbered data signal is doubled. Similarly, a signal ⑤ is generated from the even-numbered data signal ④. These signals ⑤ and ⑥ are amplified by amplifiers $G_1$ and $G_2$ having different gains and the amplified signals are added. Next, a signal resulting from the addition is subjected to voltage-to-current conversion by a magnetic head driving circuit so that an external magnetic field shown in FIG. 76(b) is applied from a magnetic head. In the case of the circuit shown in FIG. 78, the recording signal is separated into even-numbered bits and odd-numbered bits which are subjected to waveform processing inclusive of timing and adjustment of pulse length and are thereafter amplified by amplifiers G having the same gain. Next, the respective amplified signals are subjected to voltage-to-current conversion by separate magnetic head driving circuits so that the external magnetic field shown in FIG. 76(b) is applied from a magnetic head having a plurality of windings. It is of course that another magnetic field generating device such as an electromagnetic coil can be used in place of the magnetic head. Also, two magnetic heads each having one winding may be disposed in proximity to each other so that the external magnetic field shown in FIG. 76(b) is applied from the magnetic heads.

Figure 80A:
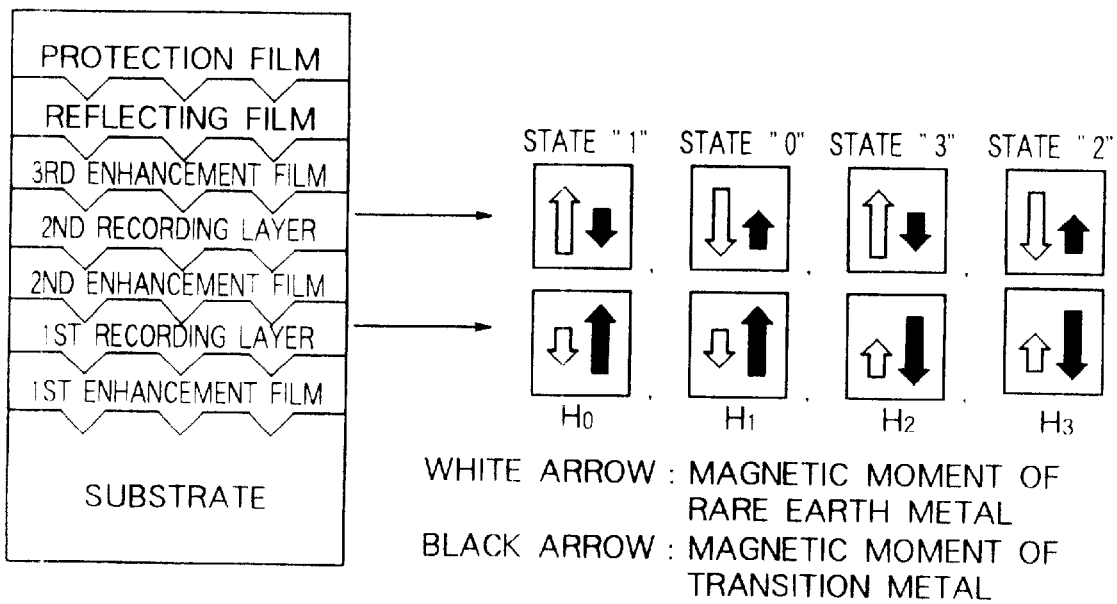
FIGS. 80A and 80B are diagrams showing the recorded states of magnetic domains.
Figure 80B:
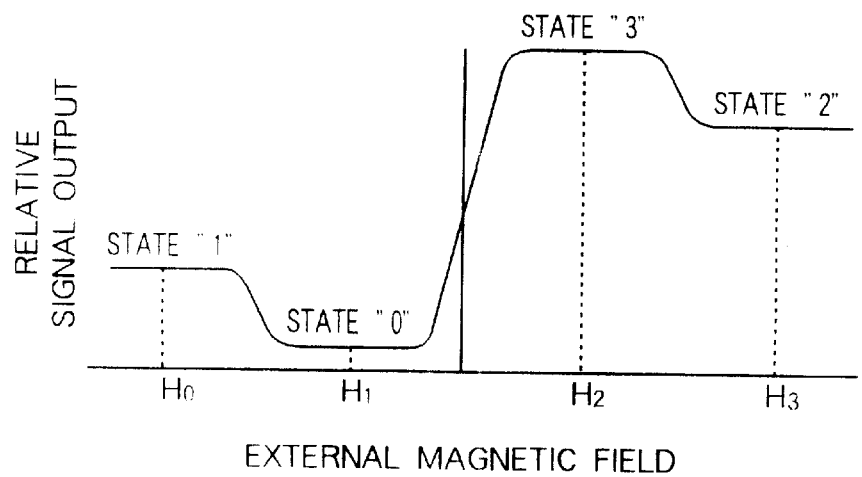
Figure 81:
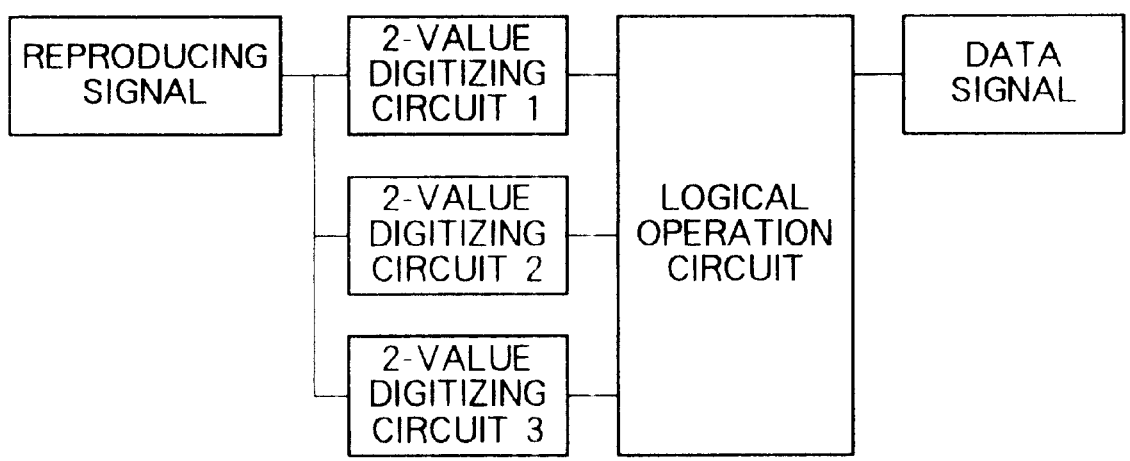
FIG. 81 is a block diagram of a signal reproducing circuit in the eighteenth example.

The recording states of magnetic domains corresponding to the respective magnitudes of the external magnetic field are shown in FIGS. 80A and 80B. Accordingly, a reproduced signal read from a series of magnetic domains is as shown in FIG. 75(d). By slicing this reproduced signal on the basis of three slice levels set to predetermined values in accordance with a reproduced signal output from each recording state, a recording signal can be demodulated, as shown by a timing chart of FIG. 75(e). More particularly, the analog reproduced signal shown in FIG. 75(d) is digitized into two values in accordance with a slice level 1 to obtain Sig1 shown by ② in FIG. 75(d). Similarly, Sig2 shown by ③ is obtained from a slice level 2 and Sig3 shown by ④ is obtained from a slice level 3. An odd-numbered data signal ⑤ shown in FIG. 76(a) is obtained by producing the logical product of the inverted version of Sig2 and Sig3, thereafter producing the logical sum of the resultant signal and Sig1, and further producing the logical product of the resultant signal and a clock signal ① for synchronization with clocks. On the other hand, an even-numbered data signal ⑥ is obtained by producing the logical product of the clock signal ① and Sig3. The logical product of a signal ⑦ obtained by delaying the even-numbered data signal ⑥ by ½ clock and the odd-numbered data signal ⑤ is produced, thereby, making it possible to demodulate the data signal. FIG. 81 shows a block diagram of a signal reproducing circuit.

Figure 82:
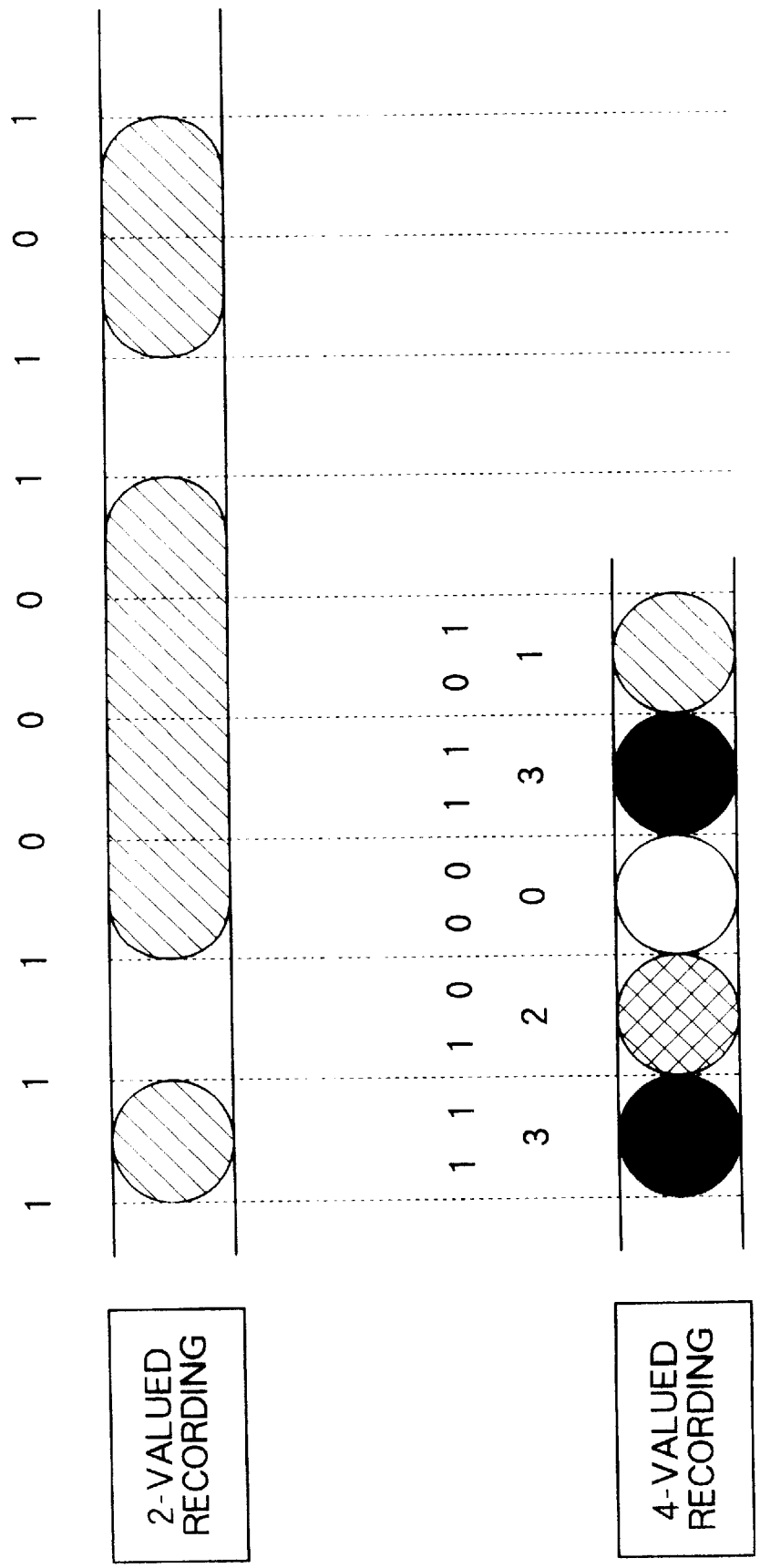
FIG. 82 is an explanatory diagram showing the effect of the multi-valued recording/reproducing system according to the eighteenth example.

By performing the 4-valued recording in accordance with the above system, it is possible to make a recording line density two times as high as that in the case where a pit edge recording is performed on an ordinary 2-valued recording medium. FIG. 82 is a schematic diagram which comparatively shows the state of the pit edge recording in the 2-valued recording and the state of the 4-valued recording when the same information is recorded with the same minimum recording domain size. As shown In the figure, the recording line density in the 4-valued recording can be made two times as high as that in the 2-valued pit edge recording.

[Nineteenth Example Of Multi-Valued Recording Method]

Figure 83:
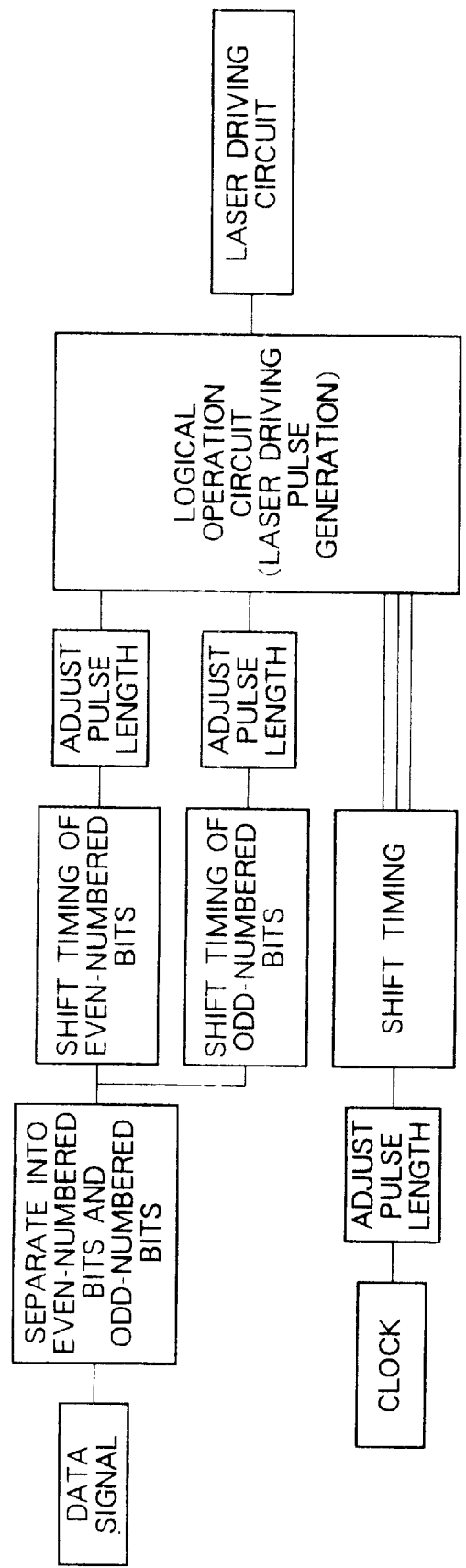
FIG. 83 is a block diagram of a laser irradiation timing modulating circuit which is applied to a multi-valued recording/reproducing system according to a nineteenth example.
Figure 84:
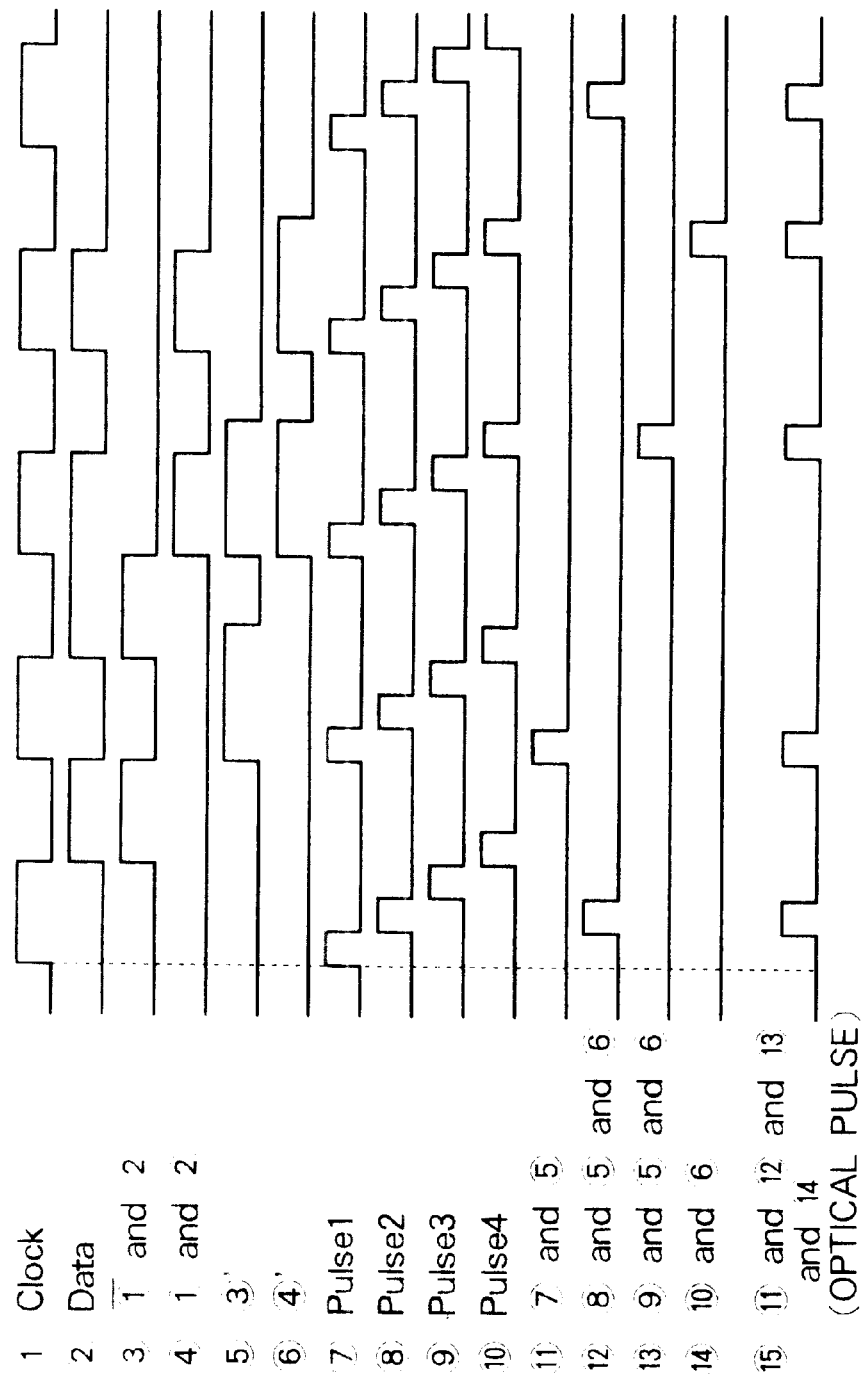
FIG. 84 is a timing chart showing the operation of the circuit shown in FIG. 83.

A multi-valued recording method of the present example is characterized in that a magnetic head (or electromagnetic coil) is driven at a fixed frequency equal to a detection window width T or integral times as high as T to apply an external magnetic field to an optomagnetic recording medium with the timing of irradiation with a laser beam being modulated. FIG. 83 is a block diagram of a laser irradiation timing modulating circuit applied to the multi-valued recording of the present example, and FIG. 84 is a timing chart of signals handled at various portions of the circuit. As an optomagnetic recording medium is used any one of the optomagnetic recording medium according to the fifth example of construction, that is, the medium shown in FIG. 23 and having the concrete construction as shown in FIGS. 24 to 27, - - - (and also FIGS. 29, 33, 34, 36, 39, - - -).

In the multi-valued recording method of the present example, the irradiation with a recording laser pulse is made in synchronism with the change of an external magnetic field and once in one period of the change so that each recording layer is heated up to a temperature at which a coercive force becomes sufficiently small. At the time of cooling, both of the magnetization of the first recording layer and the magnetization of the second recording layer are inverted or one thereof is selectively inverted. The distinction between states for inversion of magnetization is made by shifting the timing of irradiation with the recording laser pulses. Namely, as shown in FIG. 84, four pulse trains Pulse1, Pulse2, Pulse3 and Pulse4 shifted in timing from each other are generated and are subjected to logical operation with even-numbered bits and odd-numbered bits separated from a recording signal Data, thereby generating recording laser driving pulses corresponding to the respective recording states.

Figure 85:
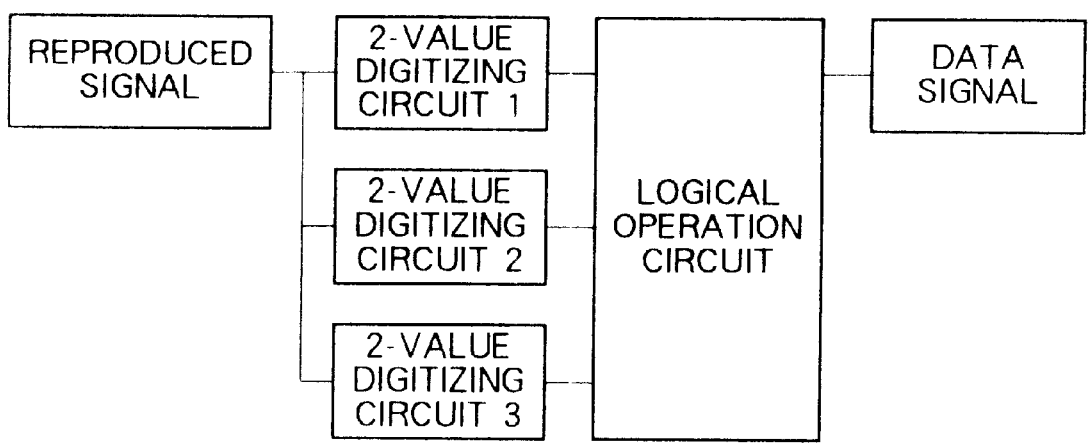
FIG. 85 is a block diagram of a signal reproducing circuit which is applied to the multi-valued recording/reproducing system according to the nineteenth example.

FIG. 85 shows a block diagram of a signal reproducing circuit, and FIG. 86 shows a signal reproducing system. A reproduced signal read from a series of magnetic domains is sliced in accordance with three slice levels set to predetermined values, thereby obtaining three two-value digitized signals Sig1, Sig2 and Sig3 from which the recording signal can be reproduced in accordance with a procedure similar to that in the case of the first example.

[Twentieth Example Of Multi-Valued Recording Method]

Figure 87:
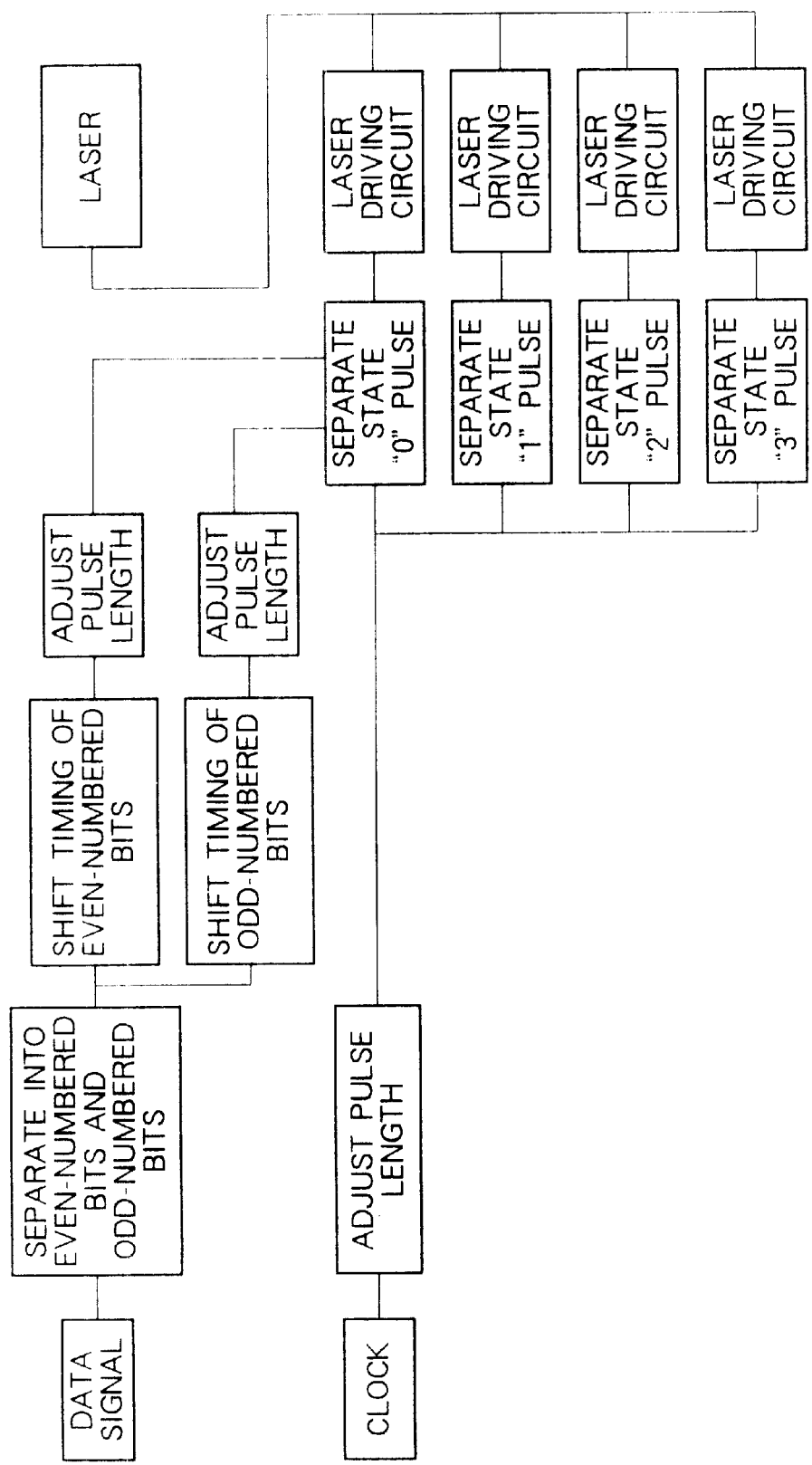
FIG. 87 is a block diagram of a laser intensity modulating circuit which is applied to a multi-valued recording/reproducing system according to a twentieth example.
Figure 88:
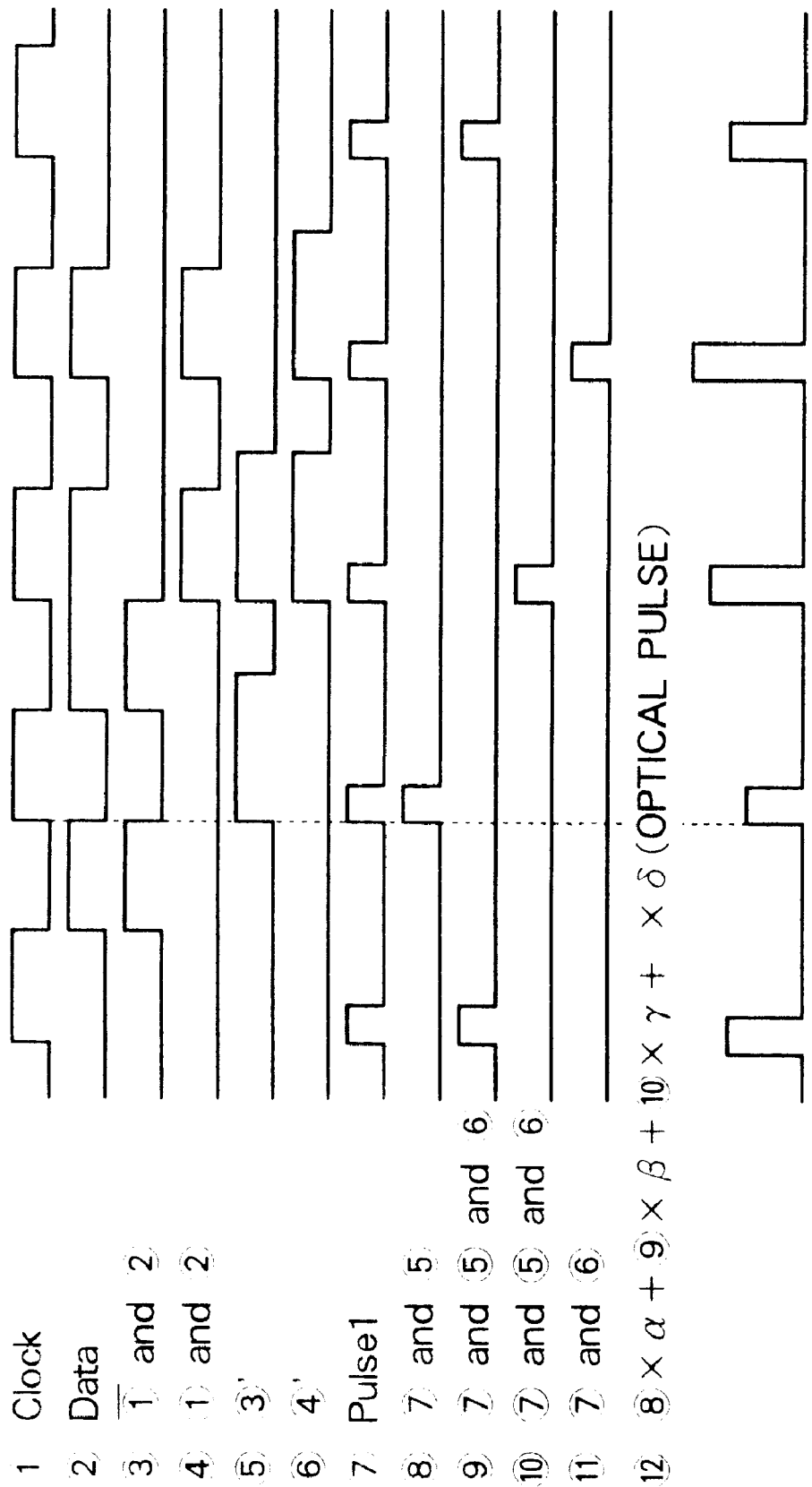
FIG. 88 is a timing chart showing the operation of the circuit shown in FIG. 87.

A multi-valued recording method of the present example is characterized in that a magnetic head (or electromagnetic coil) is driven at a fixed frequency equal to a detection window width T or integral times as high as T to apply an external magnetic field to an optomagnetic recording medium with the intensity of an irradiation laser beam being modulated. FIG. 87 shows a block diagram of a laser intensity modulating circuit applied to the multi-valued recording of the present example, and FIG. 88 shows a timing chart of signals handled at various portions of the circuit.

Figure 89:
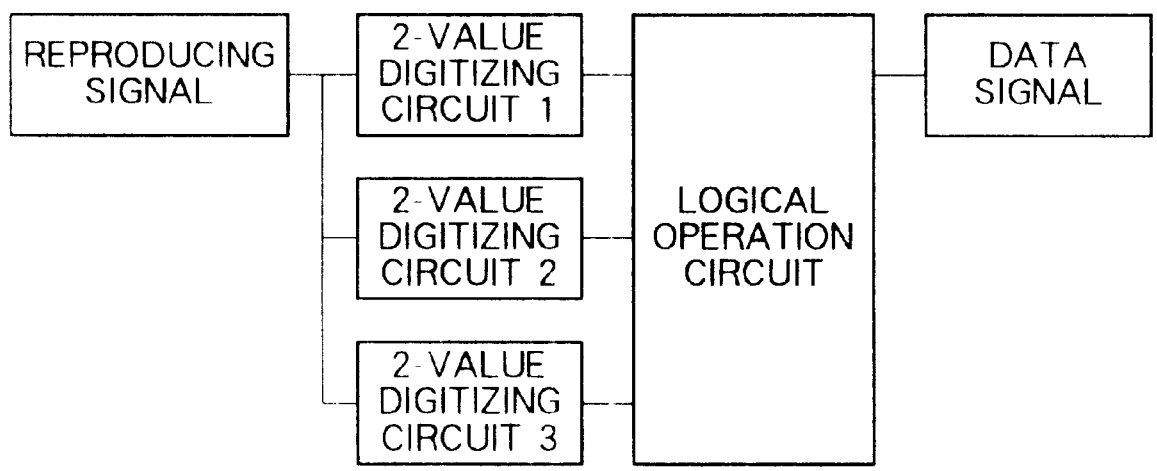
FIG. 89 is a block diagram of a signal reproducing circuit which is applied to the multi-valued recording/reproducing system according to the twentieth example.

FIG. 89 shows a block diagram of a signal reproducing circuit, and FIG. 90 shows a signal reproducing system. A reproduced signal read from a series of magnetic domains is sliced on the basis of three slice levels set to predetermined values, thereby obtaining three 2-value digitized signals Sig1, Sig2 and Sig3 from which a recording signal can be reproduced in accordance with a procedure similar to that in the case of the second example.

[Twenty-First Example Of Multi-Valued Recording Method]

A multi-valued recording method of the present example is characterized in that an external magnetic field having an applied magnetic field intensity signal-modulated multi-stepwise in accordance with a recording signal is applied to an optomagnetic recording medium while a desired track of the optomagnetic recording medium is irradiated with a laser beam having an intensity signal-modulated multi-stepwise in accordance with the recording signal, thereby performing the multi-valued recording of a signal on the optomagnetic recording medium. As the optomagnetic recording medium can be applied any one of the recording media according to the first to sixth examples of construction.

Even in the case where a specified signal is recorded on an optomagnetic recording medium having a specified magnetization characteristic, a variety of combinations of an applied magnetic field intensity H and an irradiation laser intensity P may be considered. For example, in the case where a train of magnetic domains shown in FIG. 91B($d$) is to be recorded in an optomagnetic recording medium having a magnetization characteristic shown in FIG. 91A, the magnetic domain train can be recorded by changing over the external magnetic field H into four steps including $H_0$, $H_1$, $H_2$ and $H_3$ in the successive order from the lowest-level external magnetic field intensity, as shown in FIG. 91B($b$) while changing over the irradiation laser intensity P into four steps including $P_0$, $P_1$, $P_2$ and $P_3$ in the successive order from the lowest-level irradiation laser intensity, as shown in FIG. 91B($c$), assigning the combinations of ($H_0$, $P_0$), ($H_1$, $P_1$), ($H_2$, $P_2$) and ($H_3$, $P_3$) to signals "0", "1", "2" and "3", respectively, and driving the applied magnetic field intensity H and the irradiation laser intensity P in patterns shown in FIGS. 91B($b$) and 91B($c$).

As shown in FIG. 92B($d$), the same magnetic domain train as that shown in FIG. 91B($d$) can also be recorded by changing over the external magnetic field H into four steps including $-H_1$, $-H_0$, $H_0$ and $H_1$ in the successive order from the lowest-level magnetic field intensity, as shown in FIG. 92B($b$) while changing over the irradiation laser intensity P into two steps including a low-level irradiation laser intensity $P_1$ and a high-level irradiation laser intensity $P_0$, as shown in FIG. 92B($c$), assigning the combinations of ($-H_1$, $P_1$), ($-H_0$, $P_0$), ($H_0$, $P_0$) and ($H_1$, $P_1$) to signals "0", "1", "2" and "3", respectively, and driving the applied magnetic field intensity H and the irradiation laser intensity P in patterns shown in FIGS. 92B($b$) and 92B($c$).

As shown in FIG. 93B($d$), the same magnetic domain train as that shown in FIG. 91B($d$) can also be recorded by changing over the external magnetic field H into two steps including a low-level external magnetic field intensity $-H_0$ and a high-level external magnetic field intensity $H_0$, as shown in FIG. 93B($b$) while changing over the irradiation laser intensity P into two steps including a low-level irradiation laser intensity $P_1$ and a high-level irradiation laser intensity $P_0$, as shown in FIG. 93B($c$), assigning the combinations of ($-H_0$, $P_1$), ($-H_0$, $P_0$), ($H_0$, $P_0$) and ($H_0$, $P_1$) to signals "0", "1", "2" and "3", respectively, and driving the applied magnetic field intensity H and the irradiation laser intensity P in patterns shown in FIGS. 93B($b$) and 93B($c$).

[Twenty-Second Example Of Multi-Valued Recording Method]

A multi-valued recording method of the present example is characterized in that a multi-valt recording signal is not recorded on an optomagnetic recording medium in the order of signals but the multi-valued recording signal is divided into a plurality of combinations of magnetic field and irradiation laser for recording specified magnetization states in the optomagnetic recording medium so that signals are successively recorded for the respective combinations. The magnitude, modulation amplitude range or modulation frequency of a magnetic field or the combination thereof can be used as the variable of magnetic field, and a laser intensity, modulation frequency or pulse width or the combination thereof can be used as the variable of irradiation laser. As the optomagnetic recording medium can be applied any one of the recording media according to the first to sixth examples of construction.

Figure 94:
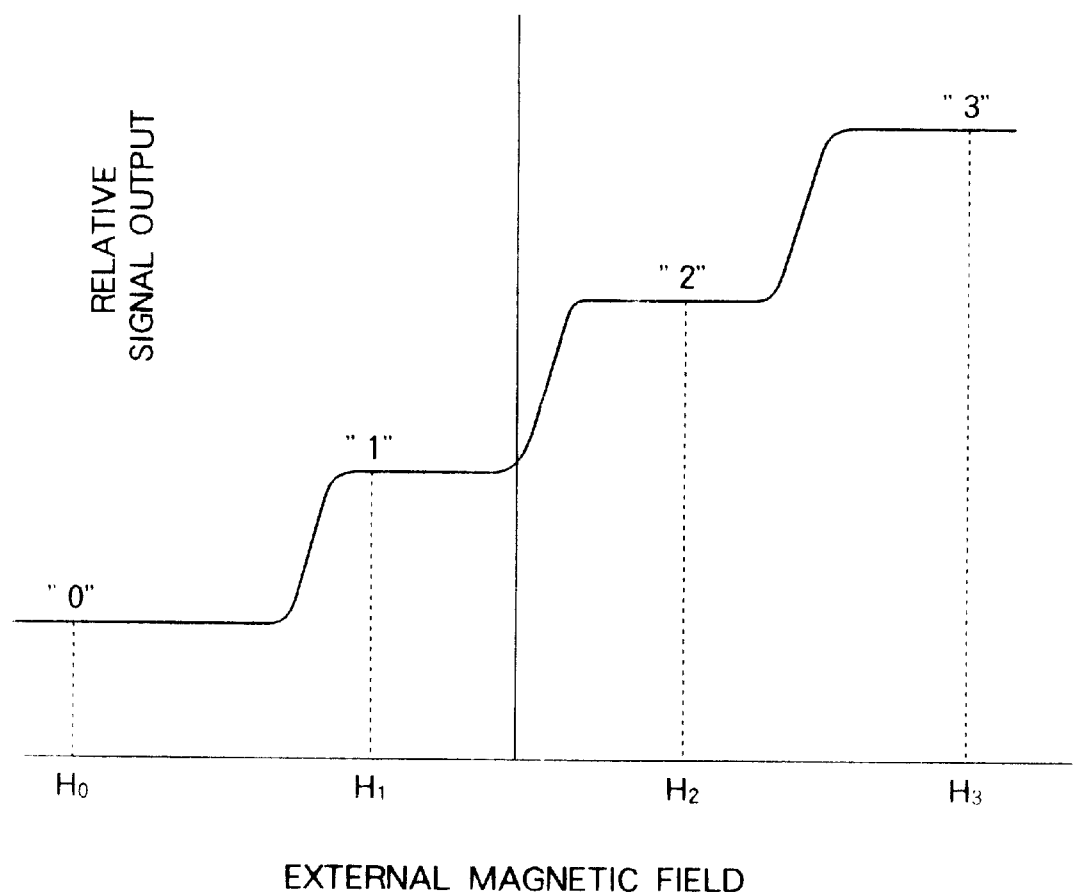
FIG. 94 is a graph showing the reproduced signal output characteristic of an optomagnetic recording medium which is applied to a twenty-second example of a multi-valued recording/reproducing system.

The multi-valued recording method of the present example will be explained in conjunction with the case where an optomagnetic recording medium having a magnetization characteristic shown in FIGS. 94 is taken as an example.

Figure 95:
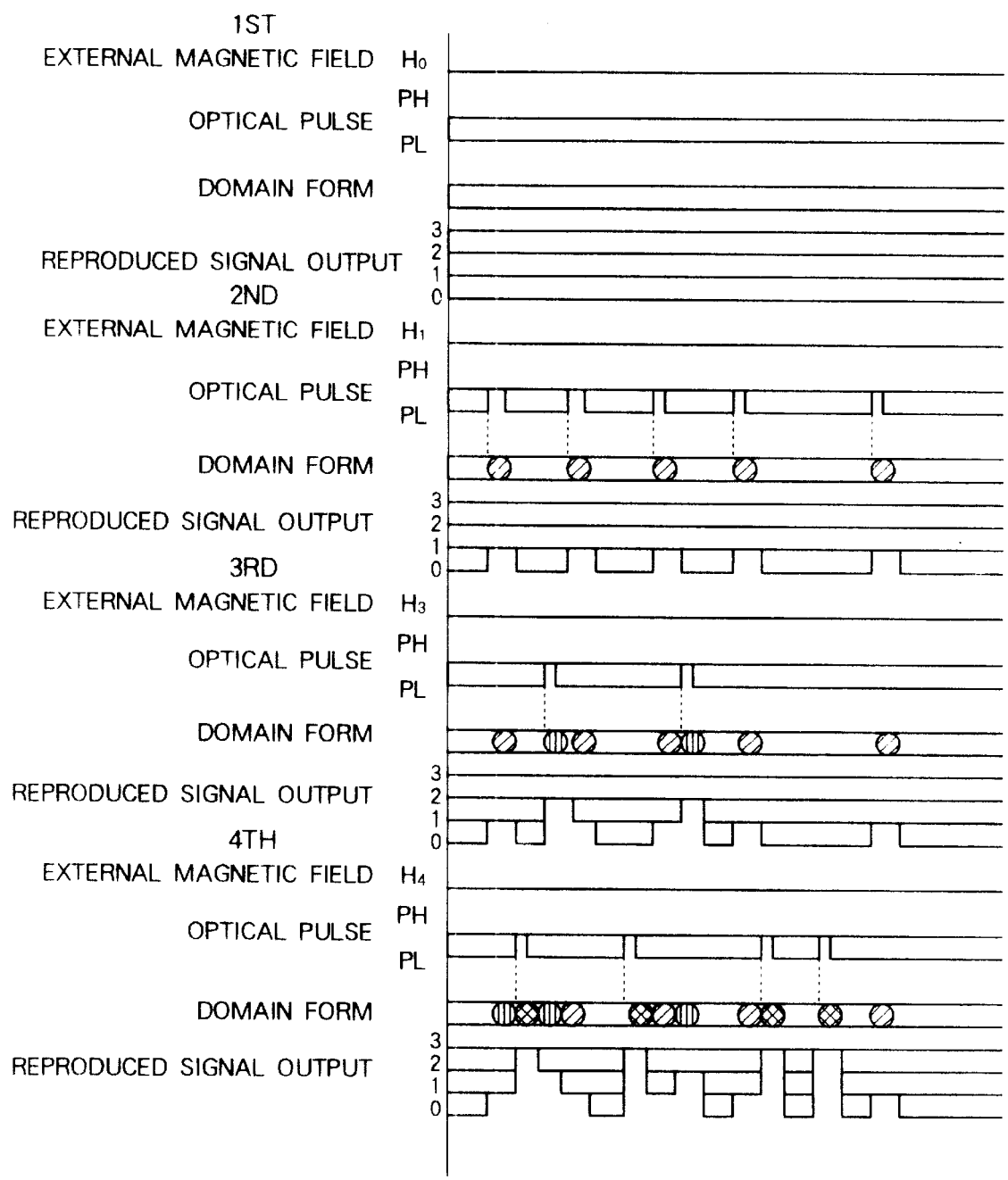
FIG. 95 is a diagram for explaining a multi-valued recording/reproducing system which belongs to the twenty-second example.

A first example is shown in FIG. 95. In the first recording, an optical head is positioned on a desired track and the irradiation with a laser beam having a fixed intensity is made under the magnetic field of $H_0$, thereby turning the whole of the track into a state "0". Next, the optical head is position again on the track subjected to the first recording and a position corresponding to data "1" is irradiated pulsewise with a laser beam under the magnetic field of $H_1$, thereby forming a recording magnetic domain in the state "0". In the third recording, the optical head is positioned again on the track subjected to the first and second recordings and a position corresponding to data "2" is irradiated pulsewise with a laser beam under the magnetic field of $H_2$, thereby forming a recording magnetic domain of a state "2" in the states "0" and "1". In this case, the signal is modulated beforehand in order that the recording magnetic domain of the state "2" is not formed on the recording magnetic domain of the state "1". Similarly, in the fourth recording, the optical head is positioned again on the track subjected to the first to third recordings and a position corresponding to data "3" is irradiated pulsewise with a laser beam under the magnetic field of $H_3$, thereby forming a recorded magnetic domain of a state "3" in the states "0", "1" and "2". According to this system, it is not necessary to change over the external magnetic field into four values at a high speed. Therefore, it is possible to lighten a load on a recording/reproducing apparatus.

Figure 96:
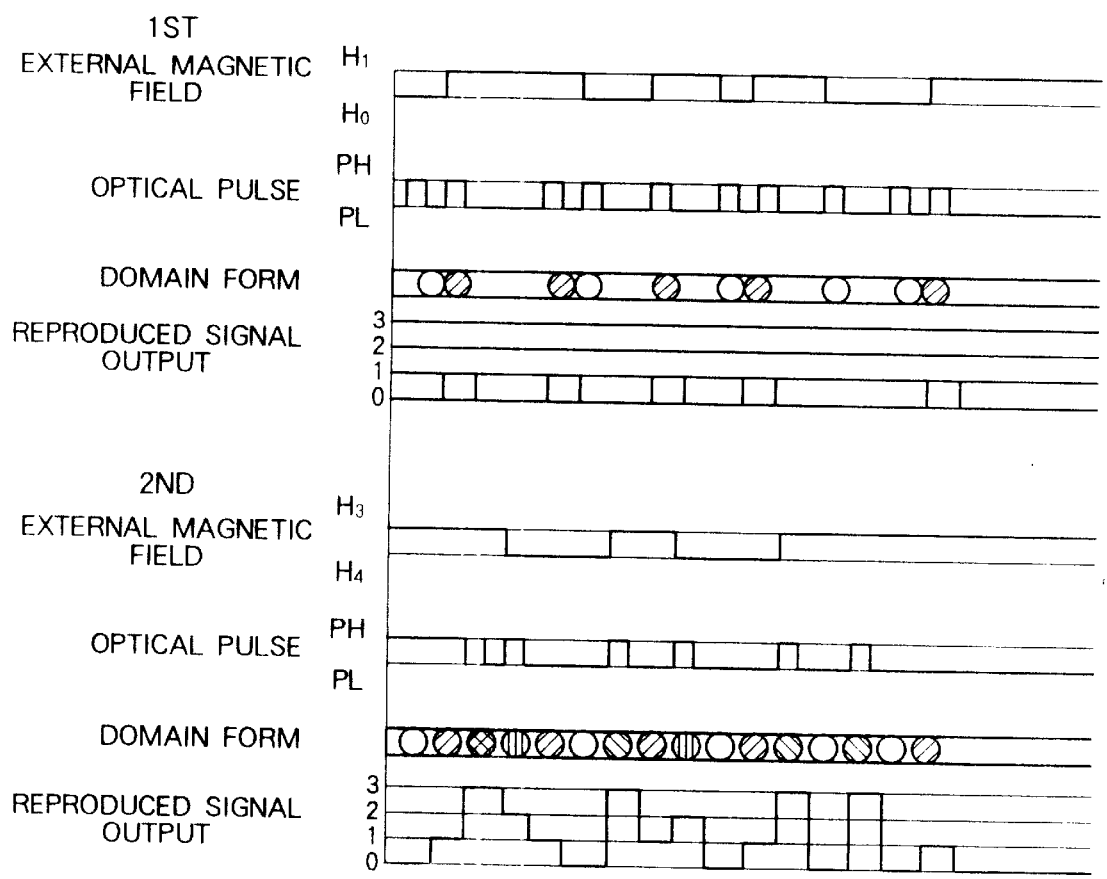
FIG. 96 is a diagram for explaining another multi-valued recording/reproducing system which belongs to the twenty-second example.

FIG. 96 shows a first example of the signal recording of the present system. The first recording is performed in such a manner that after an optical head is positioned on a desired track, an external magnetic field to be applied is changed over into two values of $H_0$ and $H_1$ while positions corresponding to data "0" and "1 are pulsewise irradiated with a laser beam. Next, the optical head is positioned again on the track subjected to the first recording and the external magnetic field to be applied is changed over into two values of $H_2$ and $H_3$ while positions corresponding to data "2" and "3" are pulsewise irradiated with a laser beam. Thereby, the 4-valued recording is completed. According to this system, the change-over of the external magnetic field at a large amplitude between $H_0$ and $H_3$ at a high speed is not required and the change-over at a small amplitude between $H_0$ and $H_1$ and at a small amplitude between $H_2$ and $H_3$ suffices. Therefore, it is also possible to lighten a load on a recording/reproducing apparatus.

In the foregoing example, each recording is repeated for each track. However, a similar recording system can be applied for each zone or over the whole of the disk.

In the case where $H_2$ and $H_3$ are equal to $-H_1$ and $-H_0$, respectively, there can be used, for example, a double-coil head in which one coil generates a magnetic field corresponding to a modulated amplitude between $H_0$ and $H_1$ or between $H_2$ and $H_3$ while the other coil generates a fixed magnetic field of $(H_0-H_1)/2$ as a bias and the bias magnetic field is superimposed with the + and − signs thereof being changed over, thereby making it possible to apply a modulated magnetic field between $H_0$ and $H_1$ or between $H_2$ and $H_3$.

[Twenty-Third Example Of Multi-Valued Recording Method]

A multi-valued recording method of the present example is characterized in that in order to accurately determine the signal levels of multi values, a test signal for setting slice levels discriminating the signals is recorded on an optomagnetic recording medium. As the optomagnetic recording medium is used a medium having a format shown in FIGS. 46 and 47 above referred to.

Namely, in a manner similar to that in the first example of the multi-valued recording method, the optomagnetic recording medium is driven and an optical head is positioned on a track having a desired address while a magnetic head is positioned in the vicinity of the track having the desired address. Thereafter, an external magnetic field is applied from the magnetic head in accordance with recording data while the irradiation with a laser beam is made by the optical head, thereby recording a multi-valued signal corresponding to the external magnetic field. At this time, a test signal for setting slice levels discriminating the recorded multi-valued signal is recorded into the test region 17 shown in FIG. 47, in order that the slice levels can be set by reproducing the recorded test signal.

Figure 97:
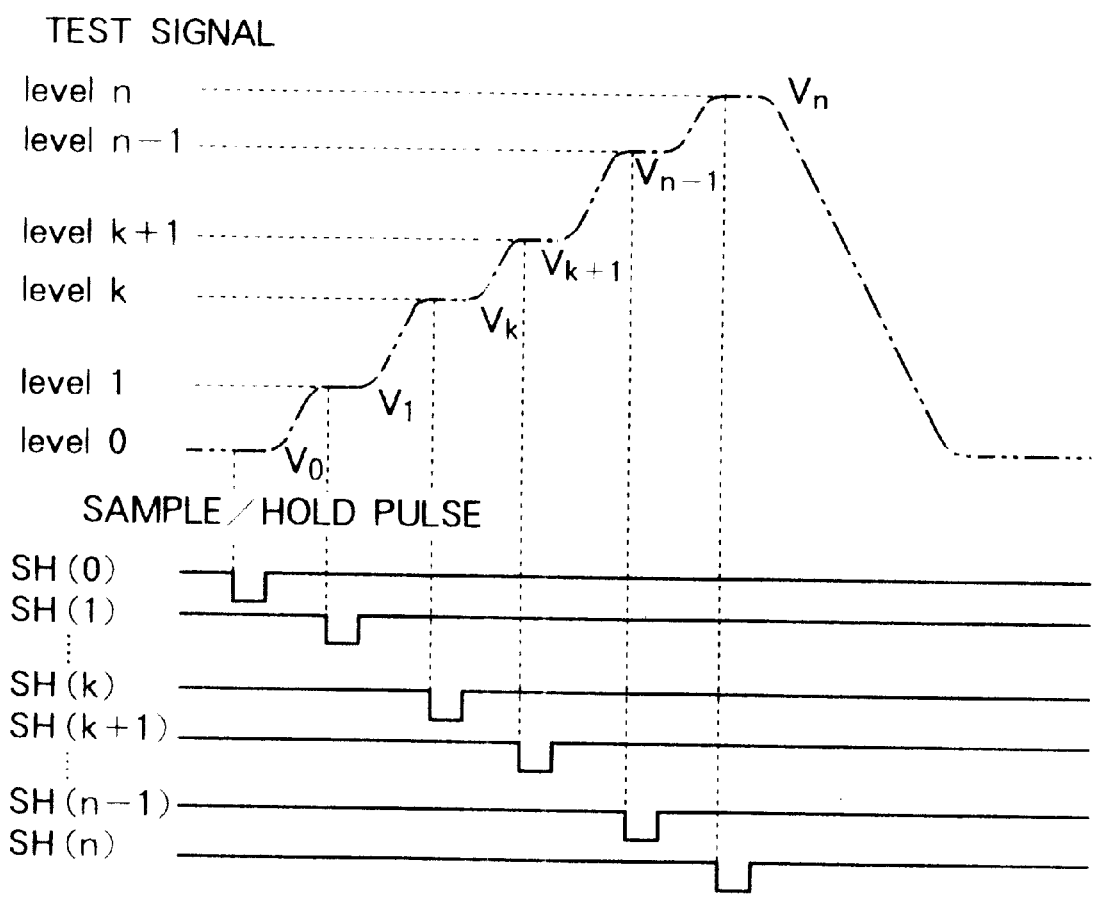
FIG. 97 is a diagram for explaining a test signal in a twenty-third example of a multi-valued recording/reproducing system.

A data pattern of the test signal is such that each of all the signal levels of multi values is provided at least one location, as shown in FIG. 97. The signal length can be set arbitrarily, as required. However, in order to accurately determine the signal levels of multi values, it is particularly preferable that the signal length is larger than the spot diameter of a reproducing laser beam. The term "signal level of multi values" is herein used to include both a signal level defined by the state of magnetization, for example, a relative signal output indicated by a state "0", "1" or "2" shown in FIGS. 130, 131 or 132 and a signal level defined by the continuation of minute magnetic domains smaller than the spot diameter, for example, a relative signal output indicated by a state ("0", "2"), ("1", "2"), or ("0", "1") shown in FIGS. 130, 131 or 132. Also, the term "signal length" is herein used to indicate the length of a recorded magnetic domain in the case of the multi-valued signal level defined by the state of magnetization, as exemplified by the state "0", "1" or "2" shown in FIGS. 130, 131 or 132 and to indicate the length of continuation of a magnetic domain pattern in the case of the multi-valued signal level defined by the continuation of minute magnetic domains smaller than the spot diameter, as exemplified by the state ("0", "2"), ("1", "2") or ("0", "1").

With the construction in which the signal length is made larger than the spot diameter of the reproducing laser beam, each level of the test signal for setting the slice level of each signal can be provided with a region where a level shift caused by the optical interference of that signal level with signal levels before and after that signal level is not generated. Also, if a magnetic super-resolution type of optomagnetic recording medium is taken into consideration, it is more preferable that each level signal of the test signal is caused to have a region where a level shift caused by the optical interference of that signal level with signal levels before and after that signal level is not generated.

Figure 98:
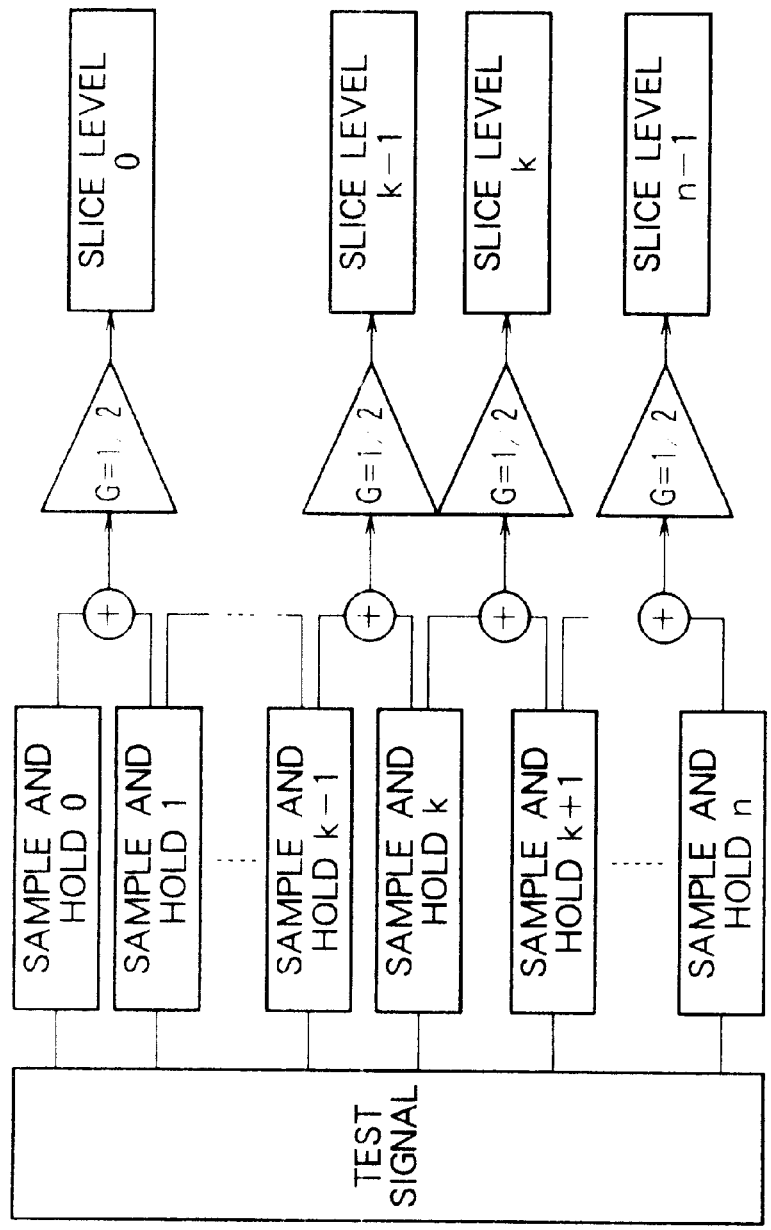
FIG. 98 is a block diagram of a test signal reproducing circuit in the twenty-third example of the multi-valued recording/reproducing system.

When the multi-valued recording signal is to be reproduced, each of multi-valued signal levels 1 to n is sampled and held at the time of reproduction of the test signal so that a slice level $(V_k+V_k+1)/2$ for discriminating signal levels k and k+1 from each other is generated from the sampled and held levels $V_k$ and $V_k+1$ of the signal levels k and k+1 (see FIG. 98).

The test signal can be recorded at the head portion of the above-mentioned data recording unit or the test signals may be provided at fixed intervals in the data recording unit. Also, the data recording unit may be the whole of a sector in the case of a medium having a sector structure or may be a region sandwiched between signals for clock synchronization. Further, the data recording unit may be a block for modulation/demodulation of data or may be inserted at every any given number of bytes.

[Twenty-Fourth Example Of Multi-Valued Recording Method]

A multi-valued recording method of the present example is characterized in that a test signal for accurately determining the timing of detection of the edge of a multi-valued recording signal is recorded on an optomagnetic recording medium. In the present example too, the used optomagnetic recording medium is a medium having a format shown in FIGS. 46 and 47 above referred to.

Namely, in a manner similar to that in the first example of the multi-valued recording method, the optomagnetic recording medium is driven and an optical head is positioned on a track having a desired address while a magnetic head is positioned in the vicinity of the track having the desired address. Thereafter, an external magnetic field is applied from the magnetic head in accordance with recording data while the irradiation with a laser beam is made by the optical head, thereby recording a multi-valued signal corresponding to the external magnetic field. At this time, a test signal for generating a reference signal for the timing of reproduction of the edge of the recorded multi-valued signal is recorded into the test region 17 shown in FIG. 47, in order that the reference timing of edge detection can be generated by reproducing the recorded test signal.

Figure 99:
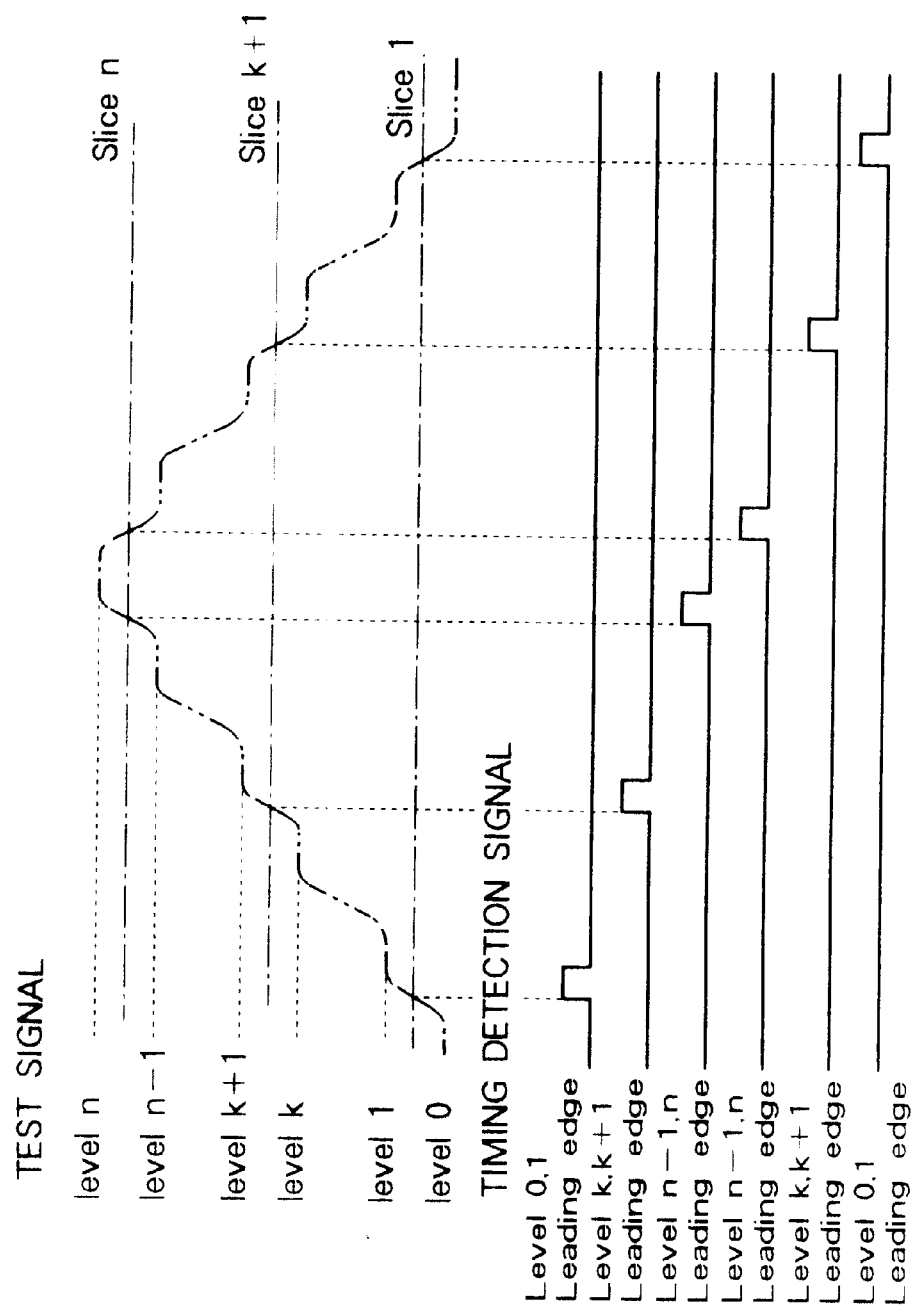
FIG. 99 is a diagram for explaining a test signal in a twenty-fourth example of a multi-valued recording/reproducing system.

A data pattern of the test signal is such that each of all edges between the signal levels of multi values is provided at least one location, as shown in FIG. 99. The signal length can be set arbitrarily, as required. However, in order to prevent an optical phase shift of the length of each multi-valued level, it is particularly preferable that the signal length is larger than ½ of the spot diameter of a reproducing laser beam. Also, if a magnetic super-resolution type of optomagnetic recording medium is taken into consideration, it is more preferable that each edge signal of the test signal is set with an edge interval larger than a length with which a level shift caused by optical interference of that edge signal with the signals of edges before and after that edge is not generated. The term "signal levels of multi values" is herein used to include both a signal level defined by the state of magnetization, for example, a relative signal output indicated by a state "0", "1" or "2" shown in FIGS. 130, 131 or 132 and a signal level defined by the continuation of minute magnetic domains smaller than the spot diameter, for example, a relative signal output indicated by a state ("0", "2"), ("1", "2") or ("0", "1") shown in FIGS. 130, 131 or 132. Also, the term "signal length" is herein used to indicate the length of a recorded magnetic domain in the case of the multi-valued signal level defined by the state of magnetization, as exemplified by the state "0", "1", or "2" shown in FIGS. 130, 131 or 132 and to indicate the length of continuation of a magnetic domain pattern in the case of the multi-valued signal level defined by the continuation of minute magnetic domains smaller than the spot diameter, as exemplified by the state ("0", "2"), ("1", "2") or ("0", "1").

With the construction in which the signal length is made larger than ½ of the spot diameter of the reproducing laser beam, each edge signal of the test signal for generating a timing signal providing a reference for the timing of detection of the edge of the multi-valued recording signal causes no edge shift by optical interference of that edge signal with the signals of edges before and after that edge.

Figure 100:
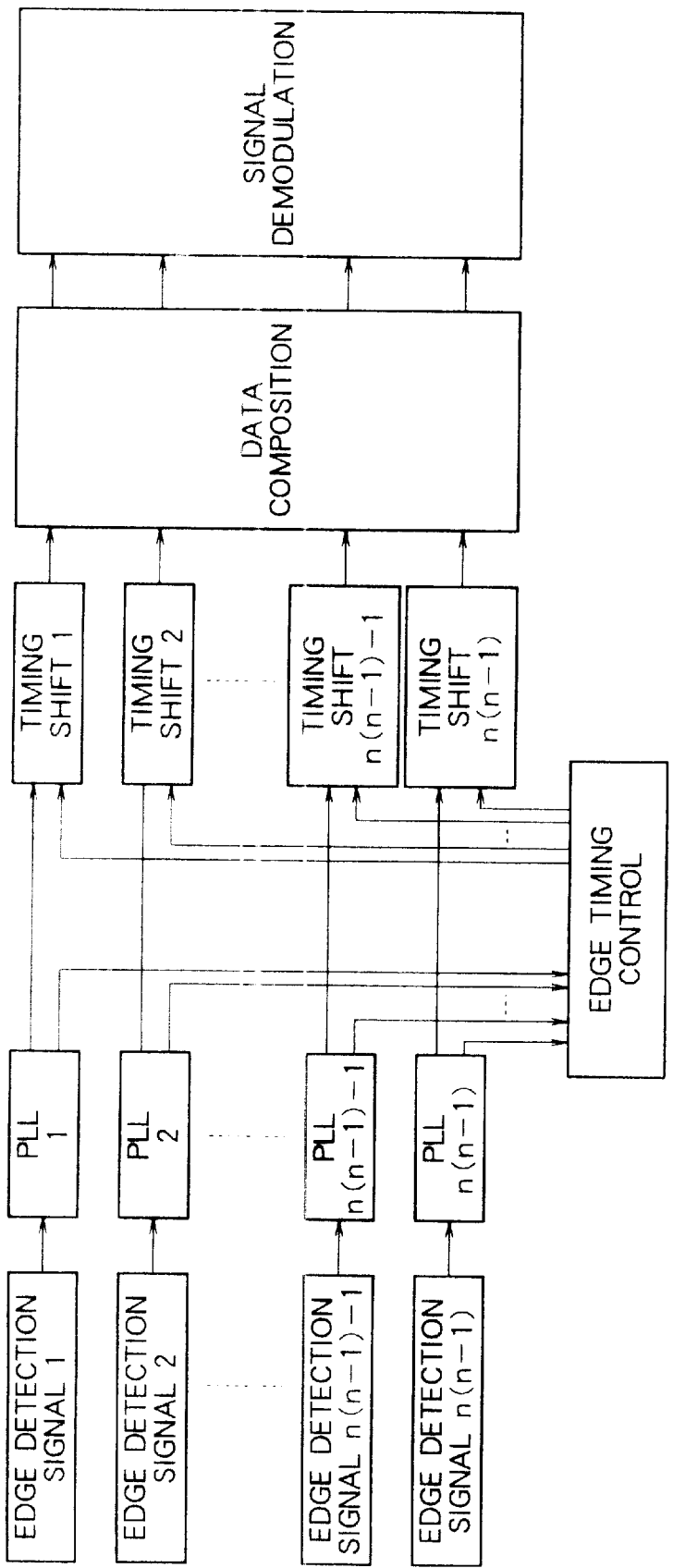
FIG. 100 is a block diagram of a test signal reproducing circuit in the twenty-fourth example of the multi-valued recording/reproducing system.

When the multi-valued recording signal is to be reproduced, the respective edges are detected independently at the time of reproduction of the test signal to generate reference timings for an edge detection signal. At the time of reproduction of the data signal, the respective edges are detected independently so that each edge detection signal is composed in reference to the edge detection timing of the test signal, as shown in FIG. 100.

In the case of the present example too, the test signal can be recorded at the head portion of the above-mentioned data recording unit or the test signals may be provided at fixed intervals in the data recording unit. Also, the data recording unit may be the whole of a sector in the case of a medium having a sector structure or may be a region sandwiched between signals for clock synchronization. Further, the data recording unit may be a block for modulation/demodulation of data or may be inserted at every any given number of bytes.

[Twenty-Fifth Example Of Multi-Valued Recording Method]

A multi-valued recording method of the present example is characterized in that a test signal for setting slice levels discriminative of signals in order to accurately determine multi-valued signal levels is recorded in an optomagnetic recording medium and a test signal for accurately determining the timing of detection of the edge of a multi-valued recording signal is recorded in the optomagnetic recording medium. In the present example too, the used optomagnetic recording medium is a medium having a format shown in FIGS. 46 and 47 above referred to.

Namely, in a manner similar to that in the first example of the multi-valued recording method, the optomagnetic recording medium is driven and an optical head is positioned on a track having a desired address while a magnetic head is positioned in the vicinity of the track having the desired address. Thereafter, an external magnetic field is applied from the magnetic head in accordance with recording data while the irradiation with a laser beam is made by the optical head, thereby recording a multi-valued signal corresponding to the external magnetic field. At this time, a test signal for setting slice levels discriminating the recorded multi-valued signal and a test signal for generating a reference signal for the timing of reproduction of the edge of the recorded multi-valued signal are recorded into the test region 17 shown in FIG. 47, in order that the setting of slice levels and the generation of the reference timing of edge detection can be made by reproducing the recorded test signals.

A data pattern of each of the above-mentioned test signals and a reproducing method for the multi-valued recording signal are the same as those in the twenty-third example and the twenty-fourth example, the explanation thereof will be omitted in order to avoid the repetition.

In the case of the present example too, the test signal can be recorded at the head portion of the above-mentioned data recording unit or the test signals may be provided at fixed intervals in the data recording unit. Also, the data recording unit may be the whole of a sector in the case of a medium having a sector structure or may be a region sandwiched between signals for clock synchronization. Further, the data recording unit may be a block for modulation/demodulation of data or may be inserted at every any given number of bytes.

[Twenty-Sixth Example Of Multi-Valued Recording Method]

Figure 101:
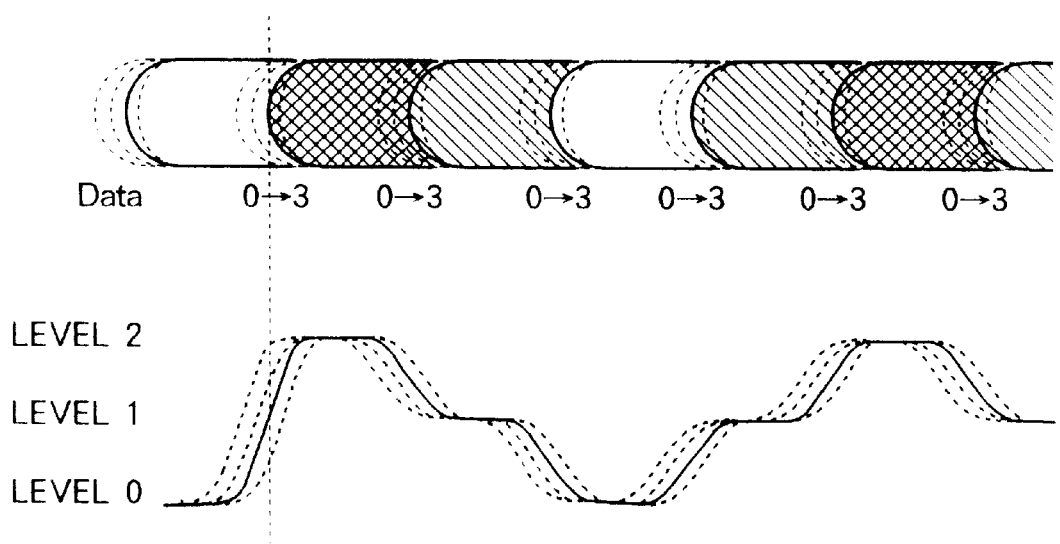
FIG. 101 is an explanatory diagram showing a twenty-sixth example of a multi-valued recording/reproducing system.

As means for performing a mark edge recording on an optomagnetic recording medium, there is used a system, as shown in FIG. 101, in which recording magnetic domains are formed at a fixed period and the edge position of the recording magnetic domain is modulated stepwise with two or more steps in accordance with an information signal and within a range sufficiently smaller than the period of the recording magnetic domains. By combining this system with an optomagnetic recording medium of the present invention, it is possible to realize a two-dimensional multi-valued recording in a time direction (or track direction) and an amplitude direction. It is more preferable that the magnetic domain forming period is a domain length and a domain interval larger than a length with which an edge shift caused by the optical interference of the signal of any edge with the signals of edges before and after that edge is not generated.

As a recording method is employed a system in which the recording is performed with a recording laser beam and an external magnetic field being modulated simultaneously in such a manner that the irradiation intensity, irradiation time or irradiation timing of the recording laser beam and the intensity or change-over timing of the applied external magnetic field are modulated in accordance with recording information.

Figure 102:
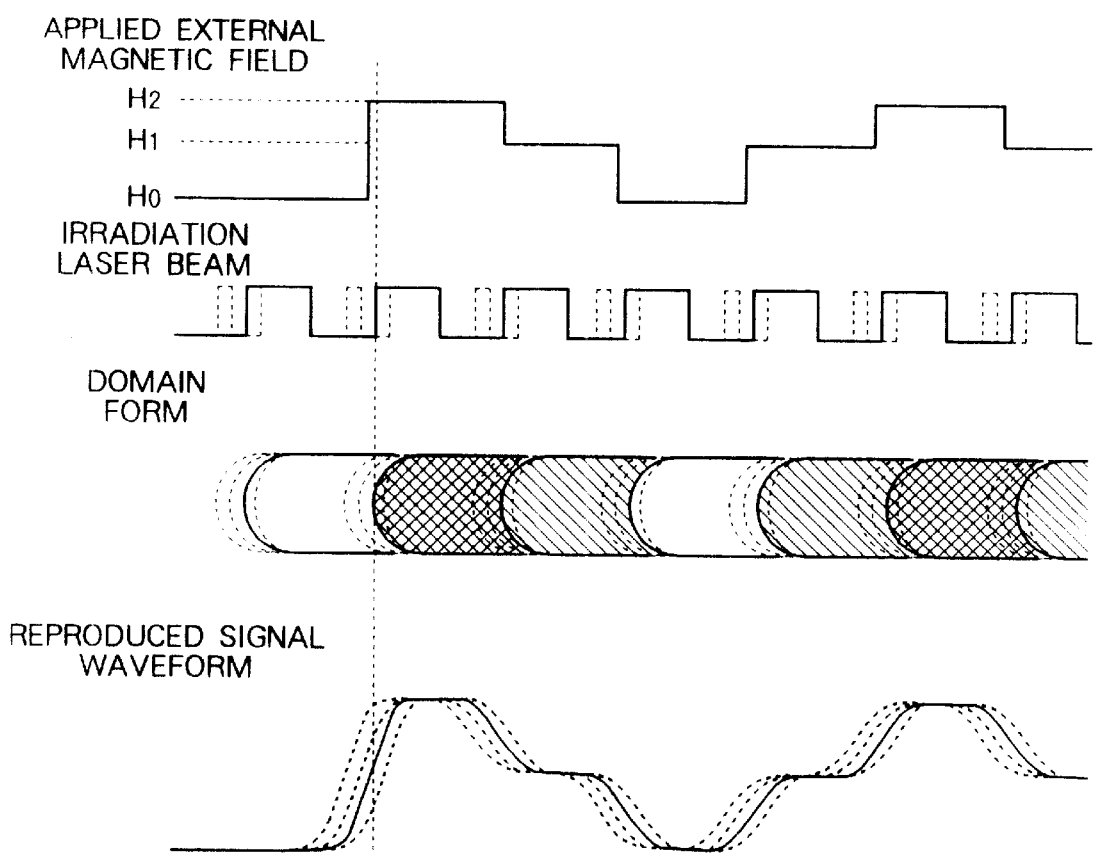
FIG. 102 is an explanatory diagram showing a first example of a mark edge recording method which belongs to the twenty-sixth example of the multi-valued recording/reproducing system.
Figure 103:
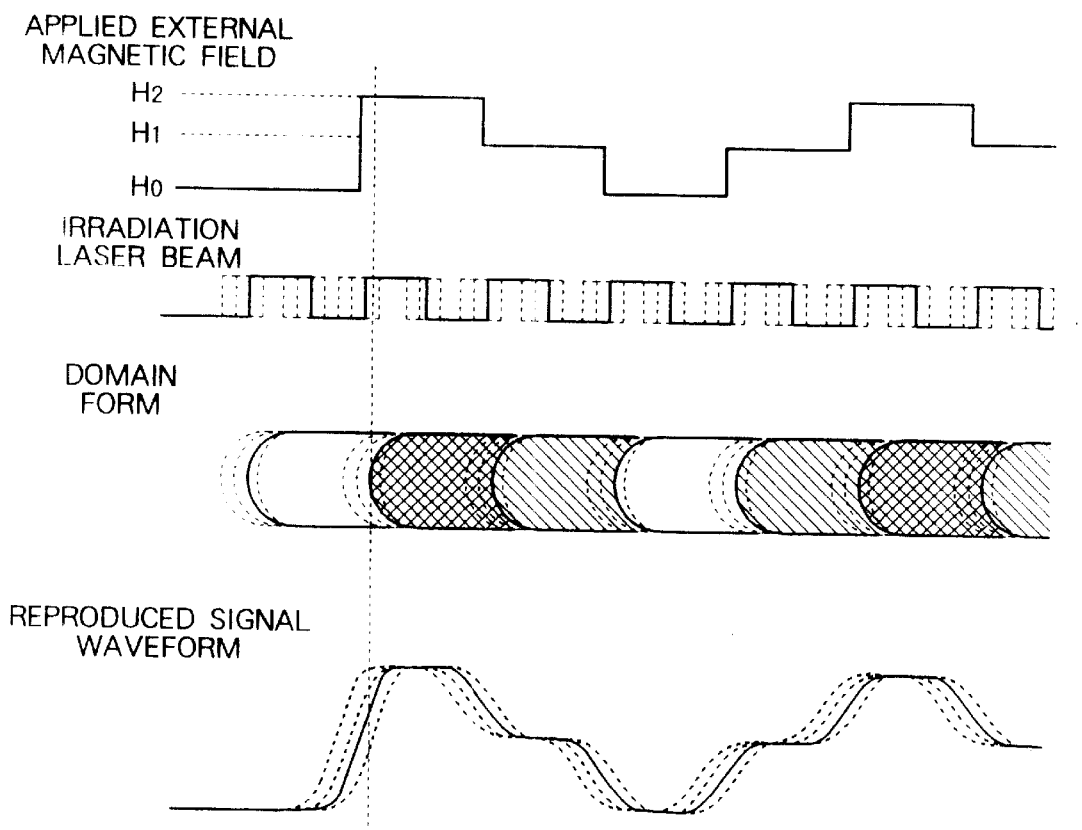
FIG. 103 is an explanatory diagram showing a second example of a mark edge recording method which belongs to the twenty-sixth example of the multi-valued recording/reproducing system.
Figure 104:
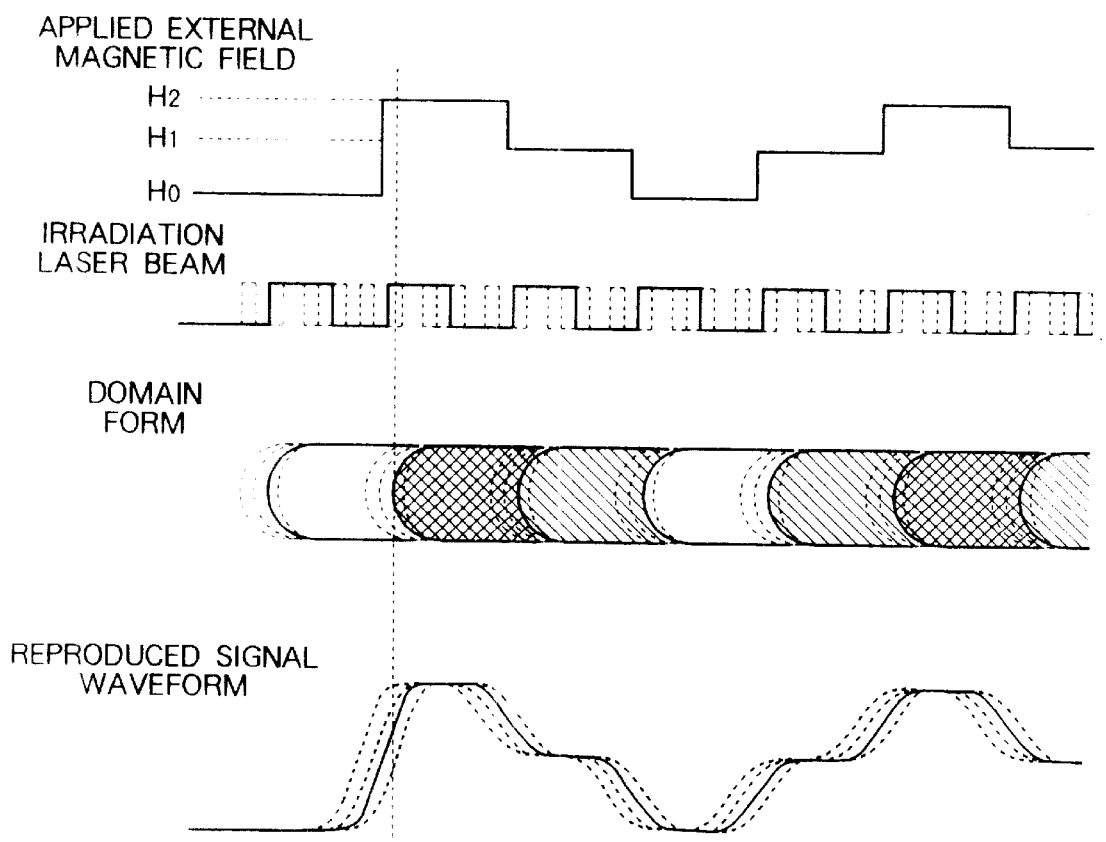
FIG. 104 is an explanatory diagram showing a third example of a mark edge recording method which belongs to the twenty-sixth example of the multi-valued recording/reproducing system.

FIG. 102 shows an example in which the irradiation pulse width of a recording laser beam is modulated stepwise in accordance with a recording information signal. In an optomagnetic modulated recording, the extent of a portion of an optomagnetic recording medium subjected to temperature rise up to a temperature at which the recording is possible, turns into a magnetic domain corresponding to an external magnetic field when the medium is cooled. Therefore, the edge position of the magnetic domain greatly depends upon the irradiation start timing of a recording laser beam. Accordingly, it is also possible to modulate the irradiation timing stepwise in accordance with a recording information signal with the width of an optical pulse being fixed, as shown in FIG. 103. Further, in order to prevent edge shift caused by the remaining of thermal hysteresis, the leading and tailing edges of a beam irradiation pulse may be modulated stepwise in accordance with a corresponding recording information signal and the next recording information signal, respectively, as shown in FIG. 104.

Figure 105:
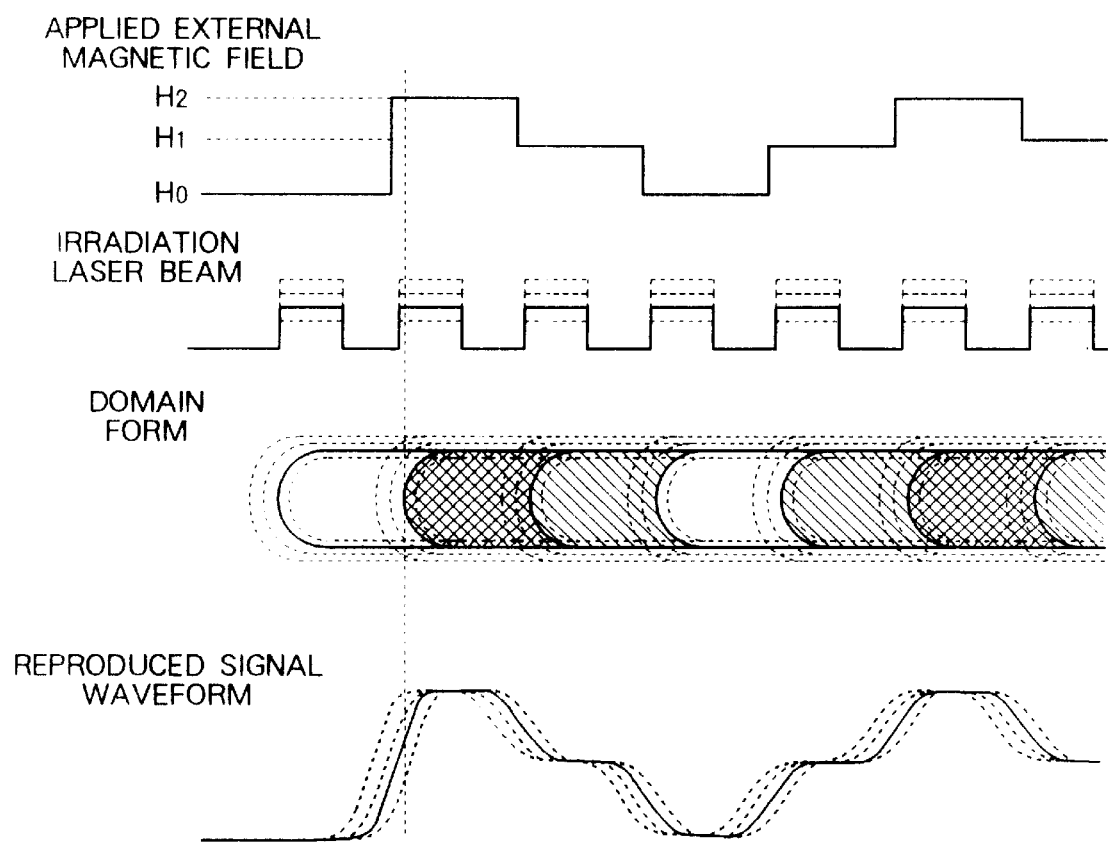
FIG. 105 is an explanatory diagram showing a fourth example of a mark edge recording method which belongs to the twenty-sixth example of the multi-valued recording/reproducing system.

FIG. 105 shows an example in which the irradiation intensity of a recording laser beam is modulated stepwise in accordance with a recording information signal. In the case where the irradiation intensity of the recording laser beam is modulated, the size of a recording magnetic domain, that is, the state of magnetization of the recording magnetic domain and the length thereof are modulated in accordance with the beam intensity and it is therefore possible to control the edge position of the magnetic domain as in the case where the beam irradiation timing is modulated. Without being limited to the use of only the beam intensity control, it is also possible to use the beam intensity control in combination with the beam irradiation timing control and/or the beam irradiation pulse width control.

Figure 106:
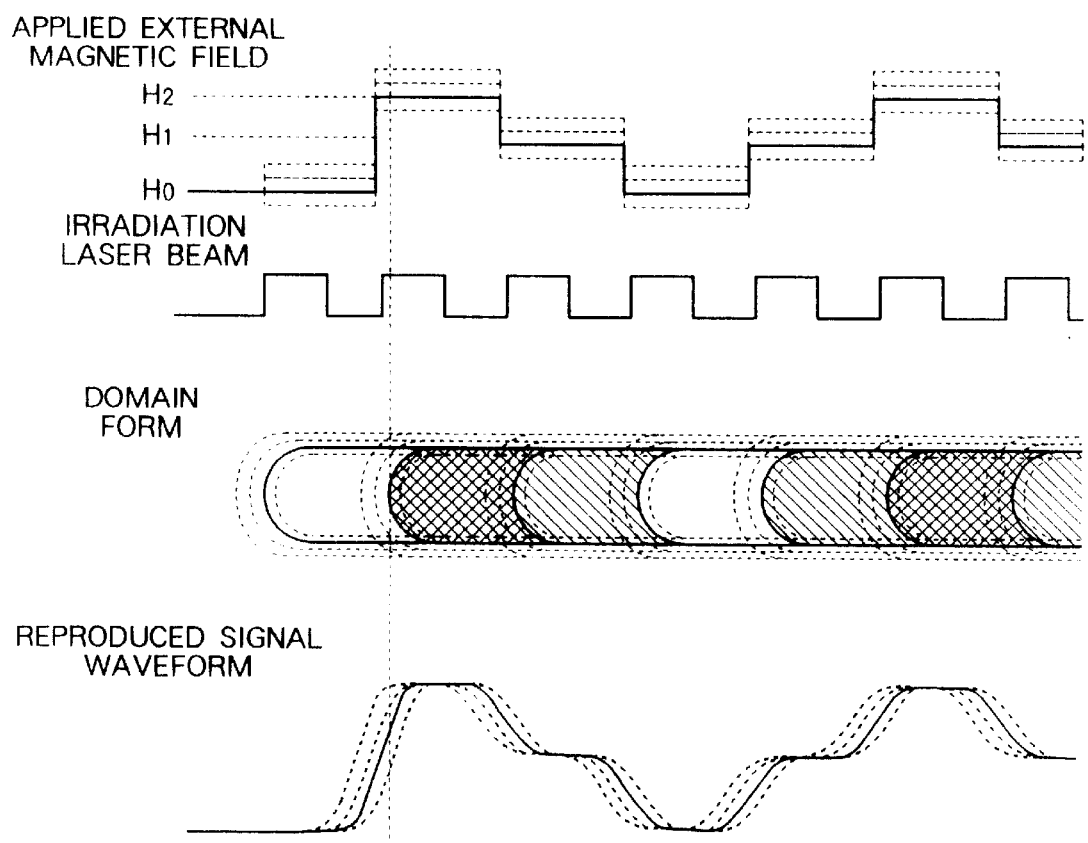
FIG. 106 is an explanatory diagram showing a fifth example of a mark edge recording method which belongs to the twenty-sixth example of the multi-valued recording/reproducing system.

FIG. 106 shows an example in which the edge position is controlled by modulating the intensity of an external magnetic field. In the case where the intensity of an external magnetic field applied to an optomagnetic recording medium is modulated, the size of a recording magnetic domain is changed and it is therefore possible to control the edge position of the magnetic domain as in the case where the irradiation intensity or the like of a recording laser beam is modulated. Of course, it is also possible to use the external magnetic field intensity control in combination with the beam intensity control, the beam irradiation timing control and/or the beam irradiation pulse width control.

Figure 107:
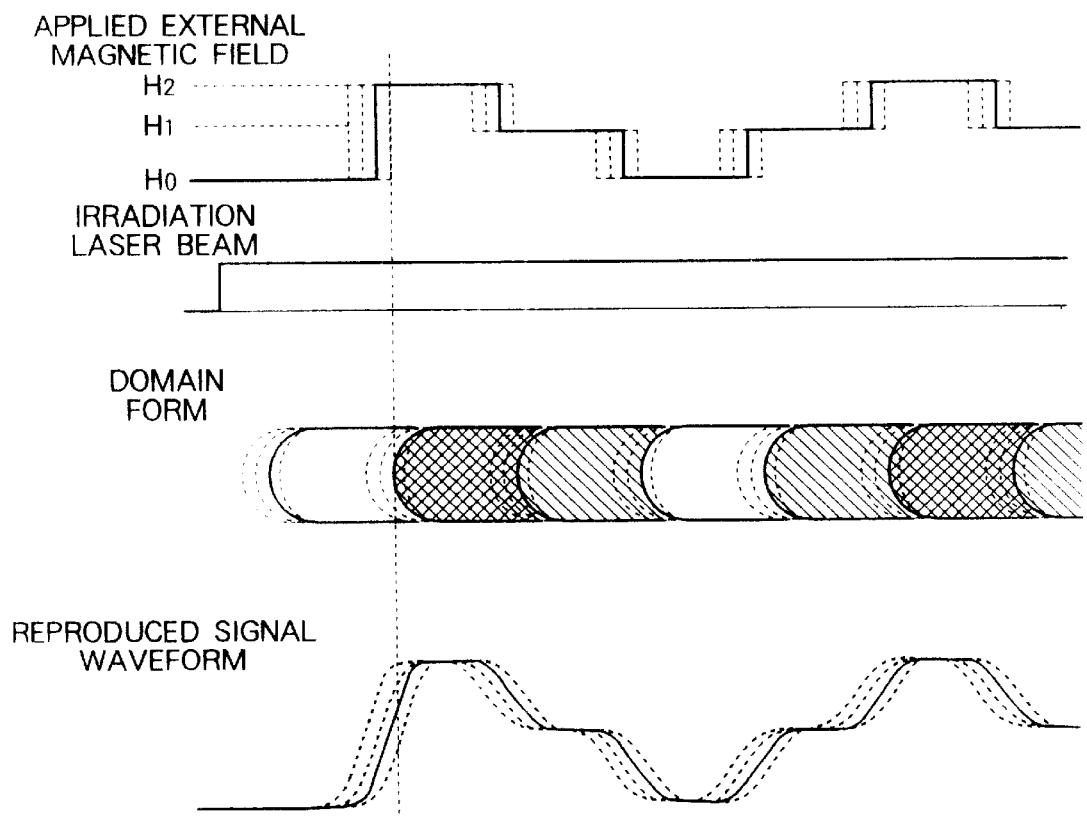
FIG. 107 is an explanatory diagram showing a sixth example of a mark edge recording method which belongs to the twenty-sixth example of the multi-valued recording/reproducing system.

FIG. 107 shows an example in which the edge position is controlled by modulating the timing of application of an external magnetic field. In this case, the edge position of a recording magnetic domain corresponds to the change-over position of the applied magnetic field. Therefore, a recording laser beam may be not only pulses but also DC light.

[Twenty-Seventh Example Of Multi-Valued Recording Method]

Figure 108:
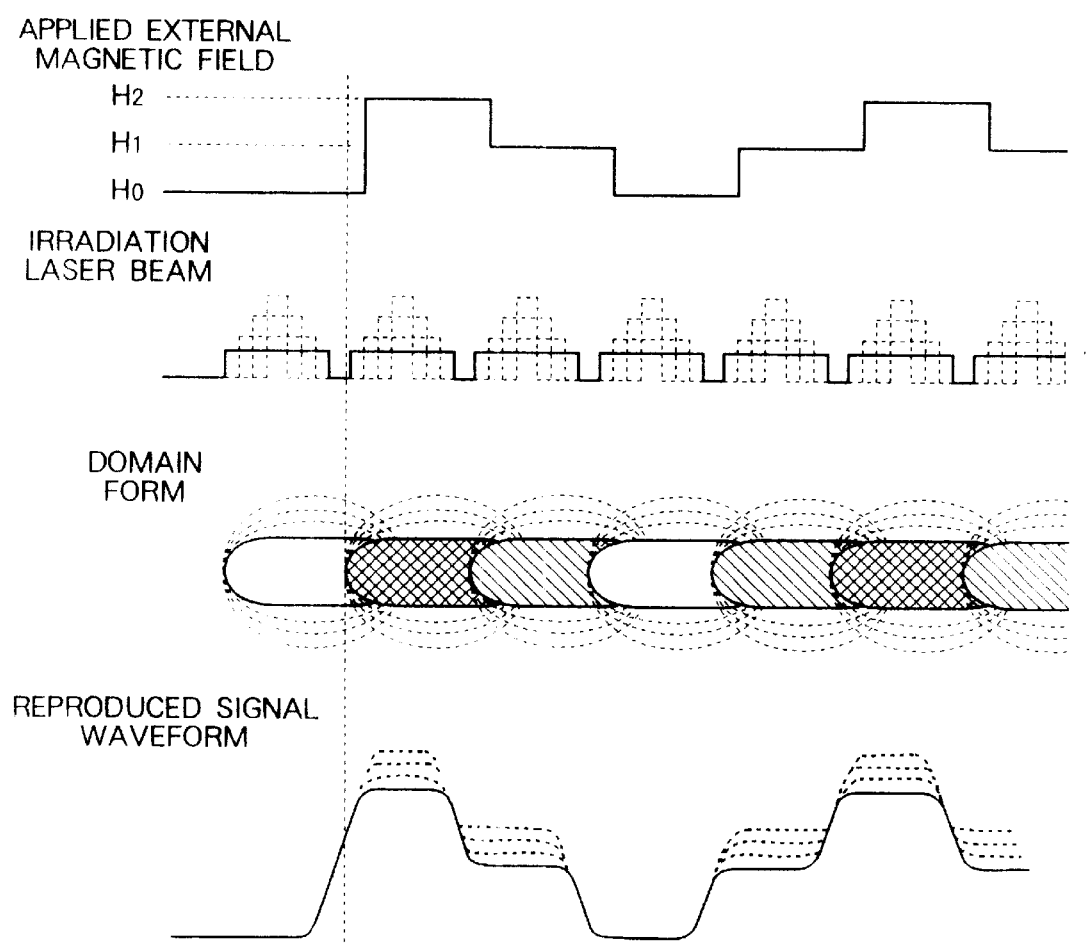
FIG. 108 is an explanatory diagram showing a twenty-seventh example of a multi-valued recording/reproducing system.

In a light and magnetic field modulated recording, the basic form of a magnetic domain is determined by a beam intensity and a beam pulse width. By simultaneously controlling the intensity of a recording laser beam and a recording pulse width, as shown in FIG. 108, it is possible to change the width of a recording magnetic domain while keeping the length thereof constant. Thereby, each recording level can be changed minutely. Therefore, a multi-valued recording can be realized by performing fine modulation corresponding to an information signal. If this system is combined with the twenty-fifth example of the multi-valued recording method, there can be realized a three-dimensional multi-valued recording based on three parameters which include the edge position of a recording magnetic domain, a level position corresponding to the state of magnetization and a level position corresponding to the width of the magnetic domain.

[Twenty-Eighth Example Of Multi-Valued Recording Method]

A multi-valued recording method of the present example is characterized in that a sample servo system is used as a tracking control system for optical head. As the format of an optomagnetic recording medium is used a format which is shown in FIG. 47 above referred to and FIG. 109(a).

Figure 109:
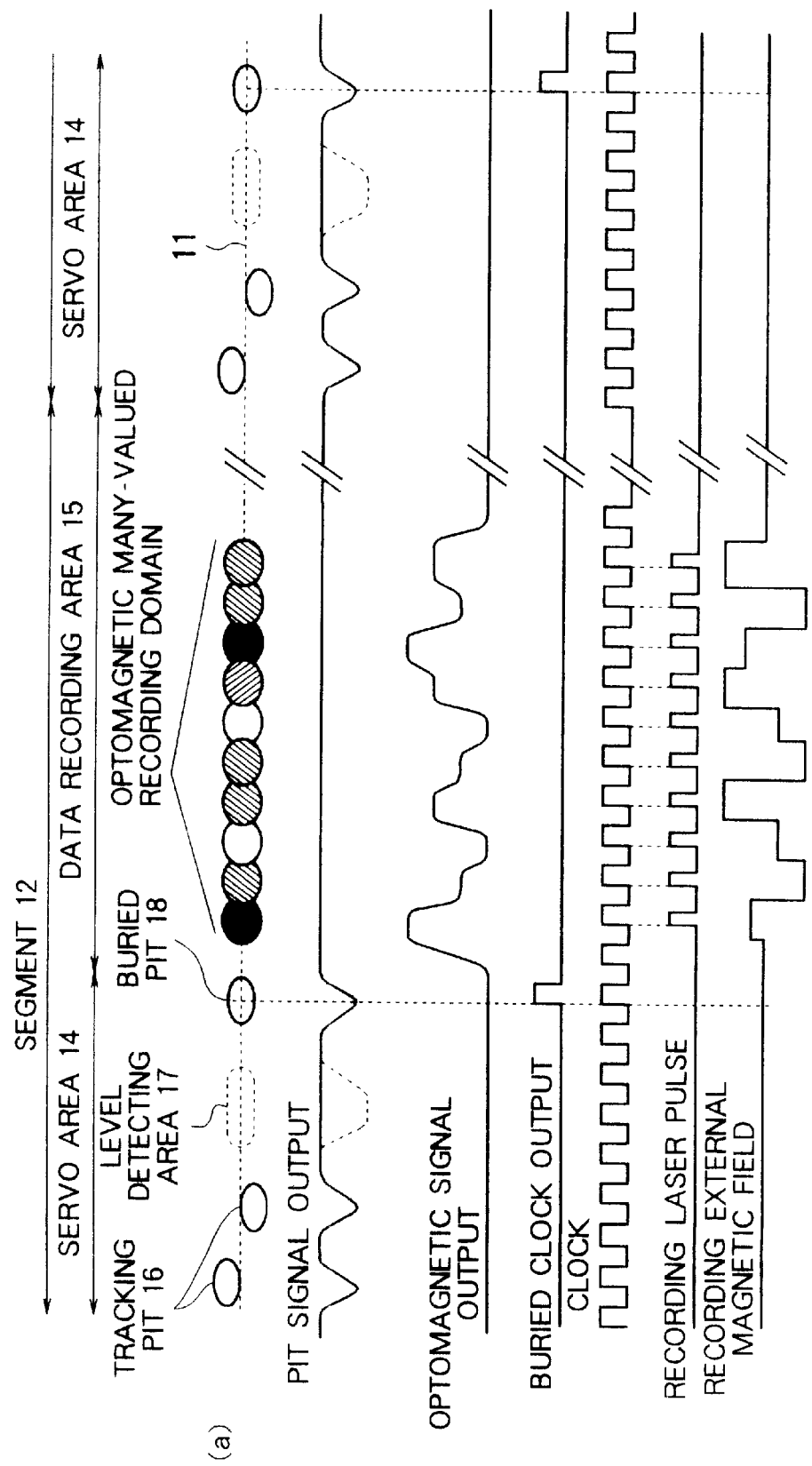
FIG. 109 is an explanatory diagram showing a twenty-eighth example of a multi-valued recording/reproducing system.

As shown in FIGS. 47 and 109(a), the optomagnetic recording medium in the present example includes a recording track 11 divided into a multiplicity of data recording units (or segments) 12 each of which is provided with a servo area 14 and a data recording area 15. Tracking pits 16 and a buried pit 18 are provided in the servo area 14 beforehand.

Figure 110:
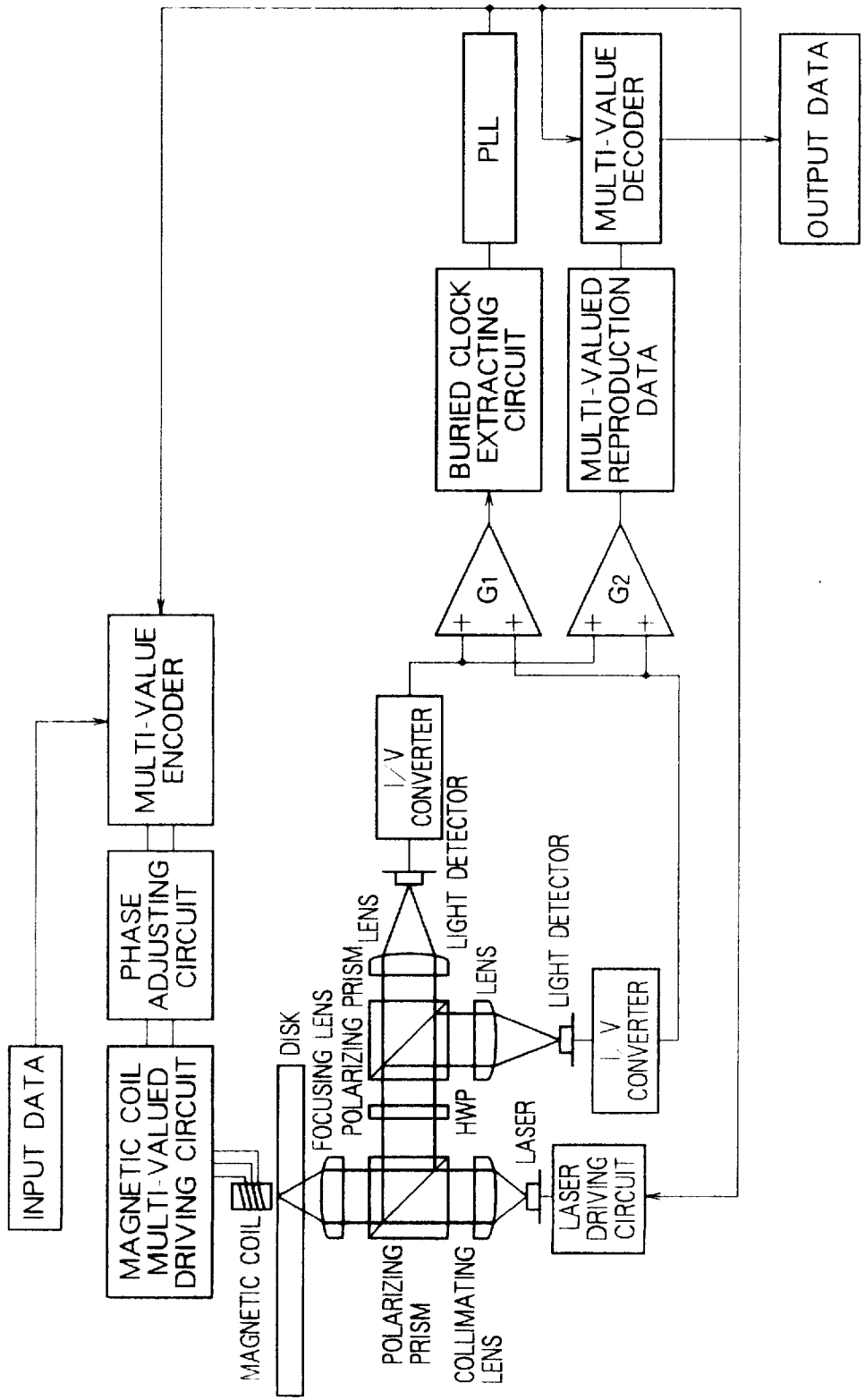
FIG. 110 is a block diagram of a recording/reproducing apparatus which is suitable for an optomagnetic recording medium based on a sample servo system.

FIG. 110 is a block diagram of a recording/reproducing apparatus suitable for such an optomagnetic recording medium based on sample servo system. A laser beam emitted from a laser is focused as a spot on a recording layer by a focusing lens. On the other hand a magnetic coil (or magnetic head) is provided in the vicinity of the laser spot so that a magnetic field intensity-modulated by a multi-valued signal can be applied to the recording layer. The irradiation with the laser beam emitted from the laser is made along the recording track 11 and the tracking of the laser beam is performed by detecting the tracking pits 16 provided in the servo area 14. On the other hand, the recording/reproduction of a signal is performed by generating a channel clock signal by a PPL circuit from the buried pit 18 provided in the servo area 14 and controlling a laser driving circuit, a multi-value encoder and a multi-value decoder by the channel clock signal.

Figure 111:
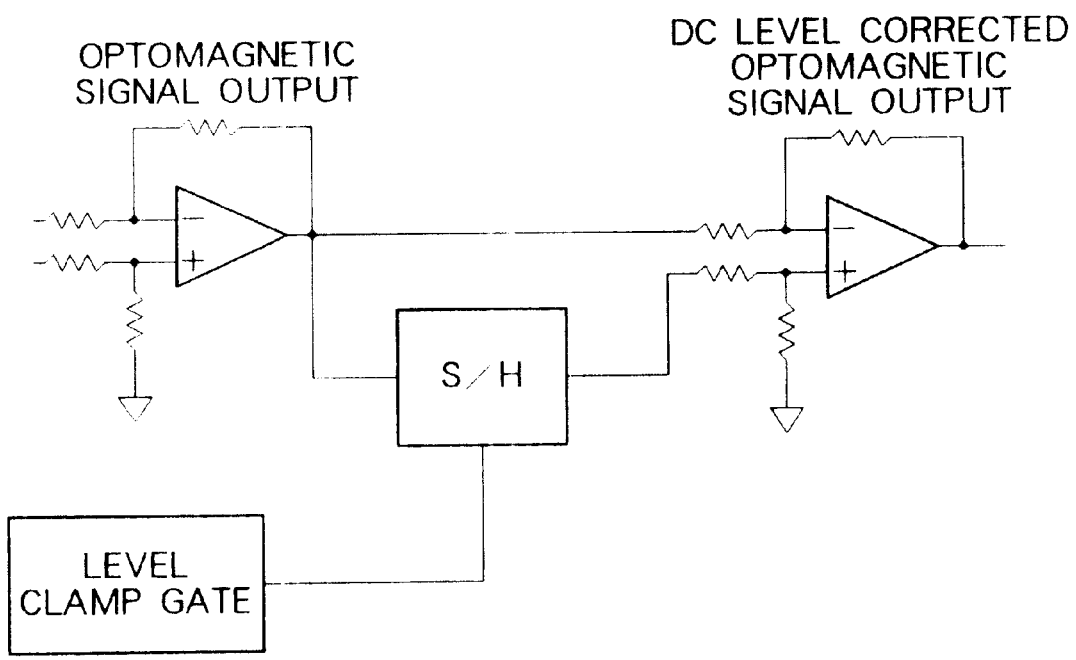
FIG. 111 is a circuit diagram of a DC level correcting circuit which is applied to the recording/reproducing apparatus shown in FIG. 110.

In an optomagnetic disk, it is general that the DC level of a reproduced signal changes due to a minute change in double-refraction factor of a substrate. On the other hand, the optomagnetic disk based on sample servo system has 1000 or more segments per one track and the DC level of a reproduced signal can be regarded as being constant in that range. Therefore, with a construction in which an unrecorded area subjected to no signal recording is provided in a part of each segment (for example, a test region 17), the change in DC level can be corrected in reference to the reflection factor of the unrecorded area, thereby making it possible to facilitate the discrimination for a multi-valued recording signal. FIG. 111 shows an example of a DC level correcting circuit applied to the recording/reproducing apparatus shown in FIG. 110. A level clamp gate controls a sample/hold circuit (S/H circuit) for a holding operation thereof at the point of time when a reproduced signal from the unrecorded area is detected.

[Twenty-Ninth Example Of Multi-Valued Recording Method]

A multi-valued recording method of the present example is characterized in that a test signal for controlling the amplitude of a multi-valued recording signal (or the width of a multi-valued recording magnetic domain) to be constant irrespective of the temperature of a driving device, the environmental temperature, the variations of driving devices and/or the variations of optomagnetic recording media is recorded in a test area provided outside of a user area of an optomagnetic recording medium and a recording laser power and/or a recording laser pulse width is controlled by comparing a reproduced signal of the test signal with a reference signal. As an optomagnetic recording medium is used a medium having a format shown in FIGS. 48 and 49 above referred to.

First, the optomagnetic recording medium is mounted to a recording/reproducing apparatus to position an optical head at a desired address in a test area 22. Also, a magnetic head is positioned in the vicinity of the desired track. Thereafter, the optical head and the magnetic head are driven so that a fixed test pattern including the combination of multi-valued recording signals to be recorded on the optomagnetic recording medium is recorded into the test area. Next, the test signal is reproduced and the amplitude of the reproduced signal is compared with a reference signal amplitude to control a recording temperature on the optomagnetic recording medium so that it becomes constant.

The recording of the test signal can be performed at a proper timing, as required, so long as it is performed after the mounting of the optomagnetic recording medium to the recording/reproducing apparatus. For example, it may be performed at the point of time when the optomagnetic recording medium is mounted to the recording/reproducing apparatus or may be performed at the point of time of start of the operation of the recording/reproducing apparatus. Also, it can be performed immediately before a signal recording operation for the optomagnetic recording medium. Further, it can be performed at fixed intervals of time after the mounting of the optomagnetic recording medium to the recording/reproducing apparatus.

Figure 112:
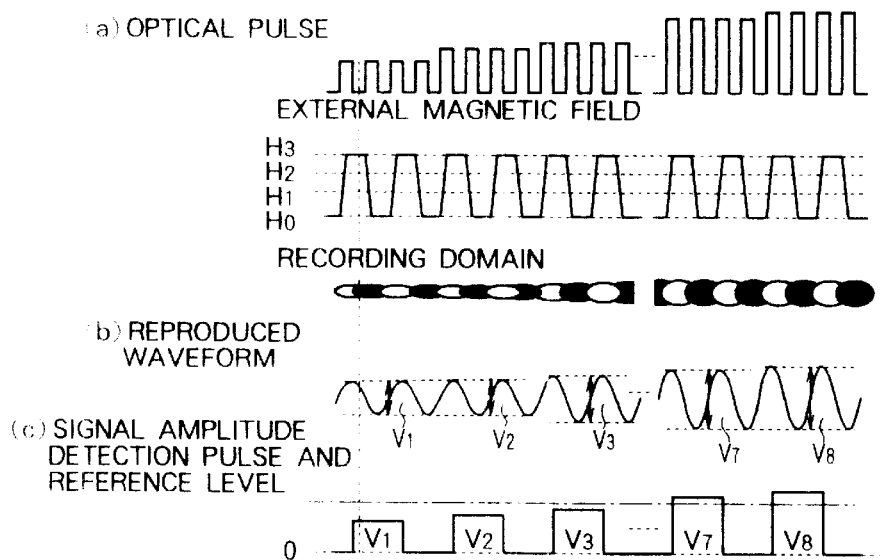
FIG. 112 is an explanatory diagram showing a twenty-ninth example of a multi-valued recording/reproducing system.

The recording of the test pattern is made at a single frequency with an external magnetic field of a fixed level being applied pulsewise and with a laser power being changed continuously or stepwise, as shown in FIG. 112(*a*), so that an approximate reproduced signal is obtained between two adjacent signal levels of the multi-valued recording signal. In the present example, the recording of the test pattern was made with the laser power being changed over eight-stepwise 0.1 mW by 0.1 mW for each multi-valued recording level A reproduced signal waveform in this case is shown in FIG. 112(*b*). The minimum and maximum values of a reproduced signal at each recording power are peak-held to determine a signal amplitude. As the optimum recording condition is taken a condition that a difference between the determined signal amplitude and a reference signal amplitude becomes smallest and the difference becomes equal to or smaller than a fixed value. In the case where the optimum condition is not found out, the recording of the test pattern is repeated with the laser power increased. In the case where the optimum condition is not found out not-withstanding that the laser power exceeds the maximum power of the recording/reproducing apparatus, the operation is completed making the judgement as an error.

Figure 113:
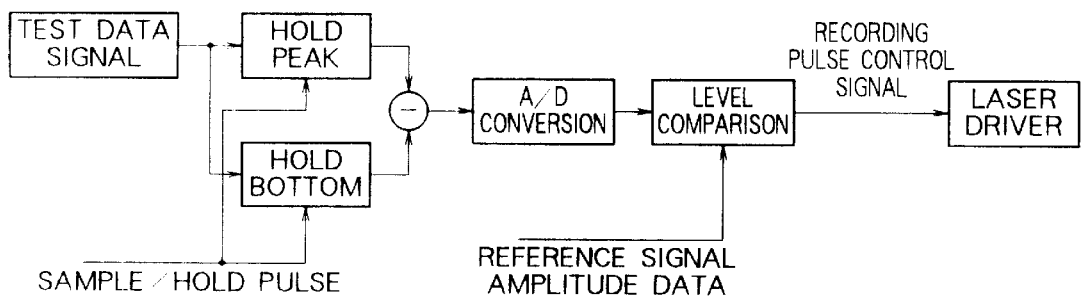
FIG. 113 is a block diagram showing a first example of an optimum condition detecting circuit which is applied to the multi-valued recording/reproducing system according to the twenty-ninth example.

FIG. 113 shows a block diagram of an optimum condition detecting circuit. A reference signal amplitude can be determined from a signal which is recorded on a medium outside of a user area and outside of a test area beforehand. Also, the generation of the reference signal amplitude by the recording/reproducing apparatus is possible by reading data concerning the reference signal amplitude recorded on a medium beforehand. Further, data concerning the reference signal amplitude may be stored beforehand in a memory provided in the recording/reproducing apparatus.

In the foregoing example, the test pattern is recorded with the laser power being changed. However the test pattern can also be recorded with a recording pulse width being changed. Further, the test pattern may be recorded with both the laser power and the recording pulse width being changed.

[Thirtieth Example Of Multi-Valued Recording Method]

A multi-valued recording method of the present example is characterized in that a test signal for controlling the amplitude of a multi-valued recording signal (or the width of a multi-valued recording magnetic domain) to be constant irrespective of the temperature of a driving device, the environmental temperature, the variations of driving devices and/or the variations of optomagnetic recording media is recorded in a test area provided outside of a user area of an optomagnetic recording medium and a recording external magnetic field is controlled on the basis of a reproduced signal of the test signal so that an amplitude between multi-valued recording signal levels becomes equal. As an optomagnetic recording medium is used a medium having a format shown in FIGS. 48 and 49 above referred to.

In a manner similar to that in the twenty-ninth example, the optomagnetic recording medium is first mounted to a recording/reproducing apparatus to position an optical head at a desired address in a test area 22. Also, a magnetic head is positioned in the vicinity of the desired track. Thereafter, the optical head and the magnetic head are driven so that a fixed test pattern including the combination of multi-value recording signals to be recorded on the optomagnetic recording medium is recorded into the test area to control an external magnetic field so that a signal amplitude between the levels of a multi-valued recording signal becomes constant.

Figure 114:
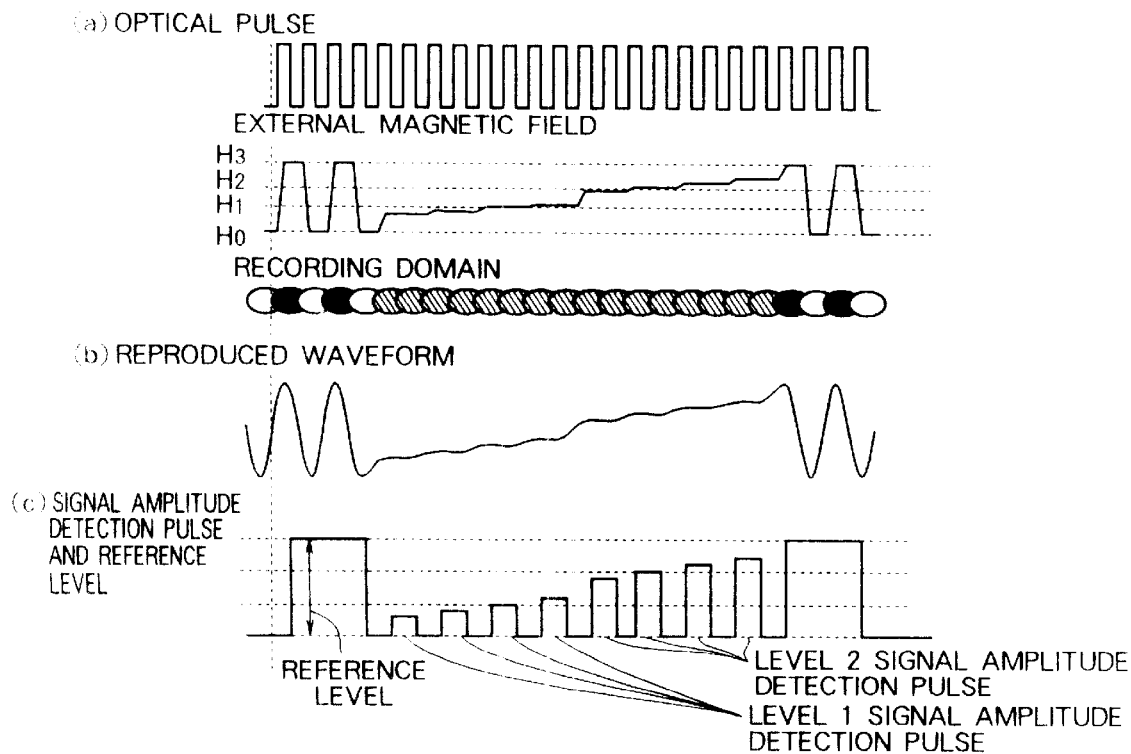
FIG. 114 is an explanatory diagram showing a thirtieth example of a multi-valued recording/reproducing system.
Figure 115:
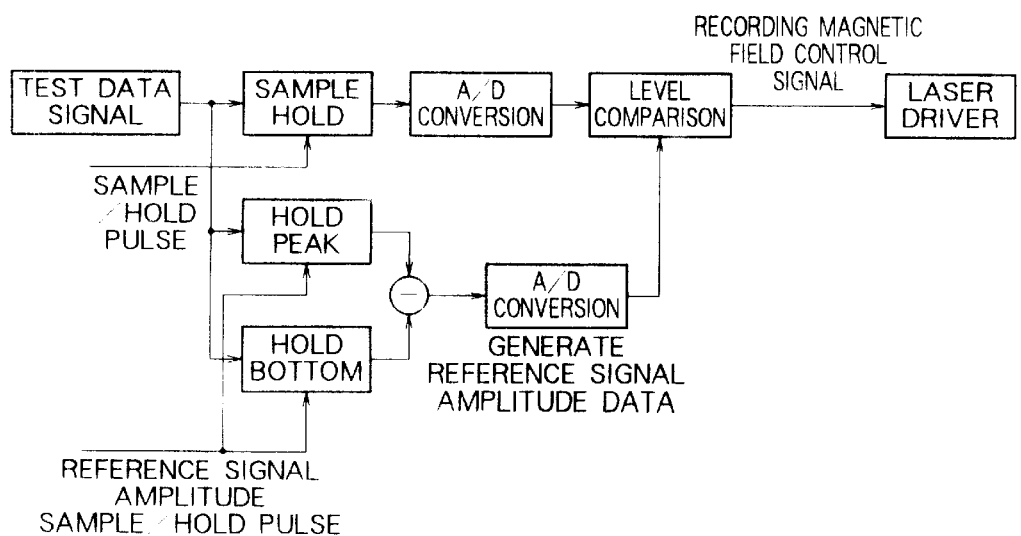
FIG. 115 is a block diagram showing a second example of an optimum condition detecting circuit which is applied to the multi-valued recording/reproducing system according to the thirtieth example.

The recording of the test pattern is made using a test pattern including all of multi-valued recording levels two of which are taken as references to change an external magnetic field for each of the other multi-valued recording levels, as shown in FIG. 114(*a*). In the present example, the recording of the test pattern was made with the external magnetic field being changed over four-stepwise for each multi-valued recording level. A reproduced signal waveform in this case is shown in FIG. 114(*b*). FIG. 115 shows a block diagram of an optimum condition setting circuit. A reference signal amplitude and a signal level for a reproduced signal for each recording magnetic field are sampled and held to determine a signal amplitude. Also, the obtained multi-valued signal levels are compared and the combination of external magnetic fields with which signal level intervals becomes equal to each other is taken as the optimum recording condition.

Since the other is the same as the recording/reproducing method in the twenty-ninth example, the explanation thereof will be omitted in order to avoid the repetition.

[Thirty-First Example Of Multi-Valued Recording Method]

A multi-valued recording method of the present example is characterized in that in order to control the recorded signal amplitude of a multi-valued recording signal (or the width of a multi-valued recording magnetic domain) to be constant irrespective of the temperature of a driving device, the environmental temperature, the variations of driving devices and/or the variations of optomagnetic recording media, the recording of a test signal is performed at two or more kinds of beam pulse periods with at least one of a laser beam power and a laser beam pulse width being changed and at least one of the laser beam power and the laser beam pulse width is controlled so that a difference between the respective average signal level values for the two or more kinds of beam pulse periods takes a constant value. An example of an optomagnetic recording medium capable of being used is a medium which has a format shown in FIGS. 48 and 49.

In a manner similar to those in the twenty-ninth example and the thirtieth example, the optomagnetic recording medium is first mounted to a recording/reproducing apparatus to position an optical head at a desired address in a test area 22. Also, a magnetic head is positioned in the vicinity of the desired track. Thereafter, the optical head and the magnetic head are driven so that a multi-valued recording signal to be recorded on the optomagnetic recording medium is recorded into the test area at two or more kinds of beam pulse periods while changing at least one of a laser beam power and a laser beam pulse width. Next, the recorded test signal is reproduced to make a control so that a difference between the average values of respective signal levels of reproduced signals for the two or more kinds of periods becomes constant. Thereby, the width of a recording magnetic domain of the optomagnetic recording medium is controlled to be constant.

Figure 116:
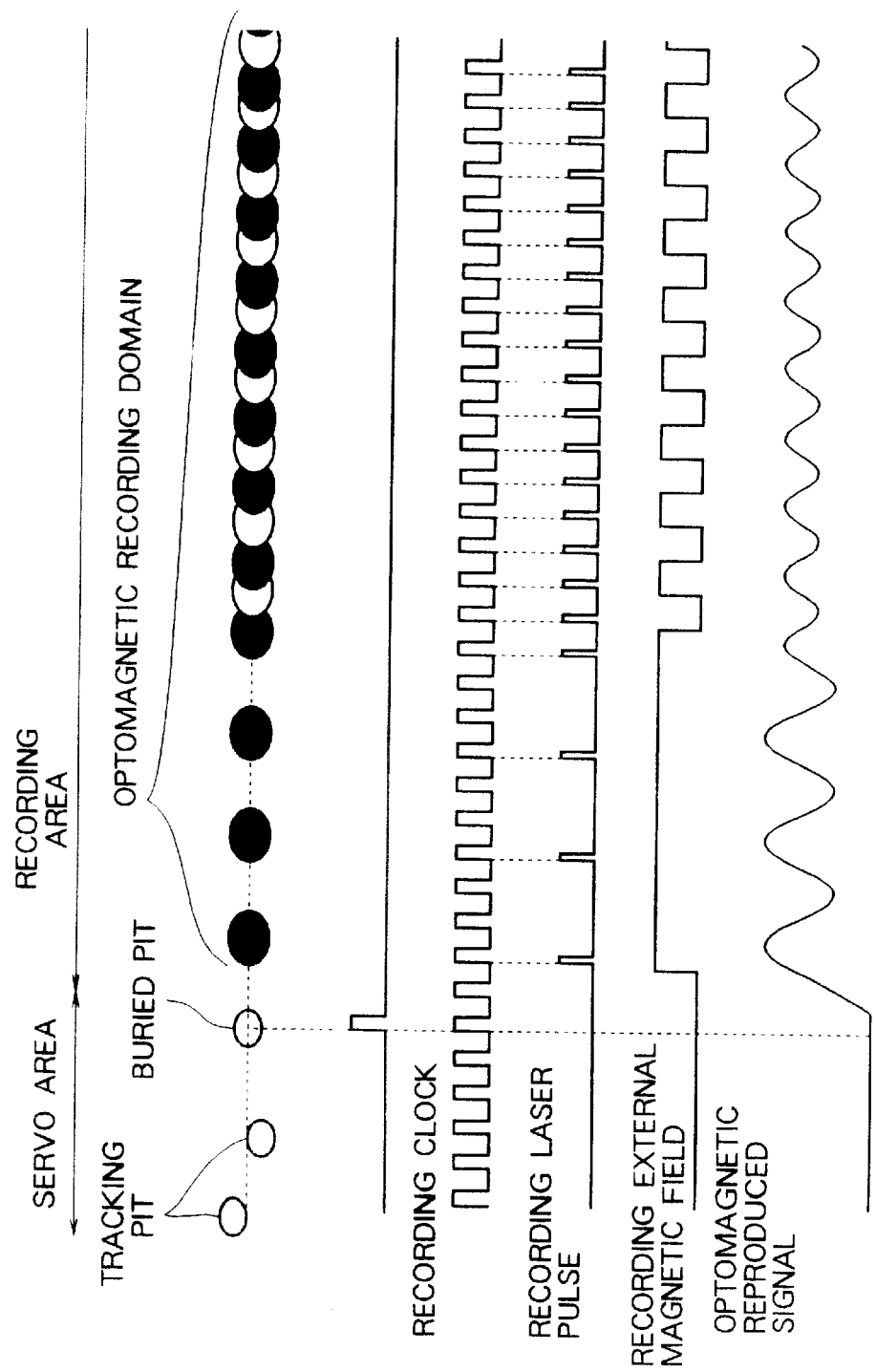
FIG. 116 is an explanatory diagram showing a first example of a test signal recording method which belongs to a thirty-first example of a multi-valued recording/reproducing system.
Figure 117:
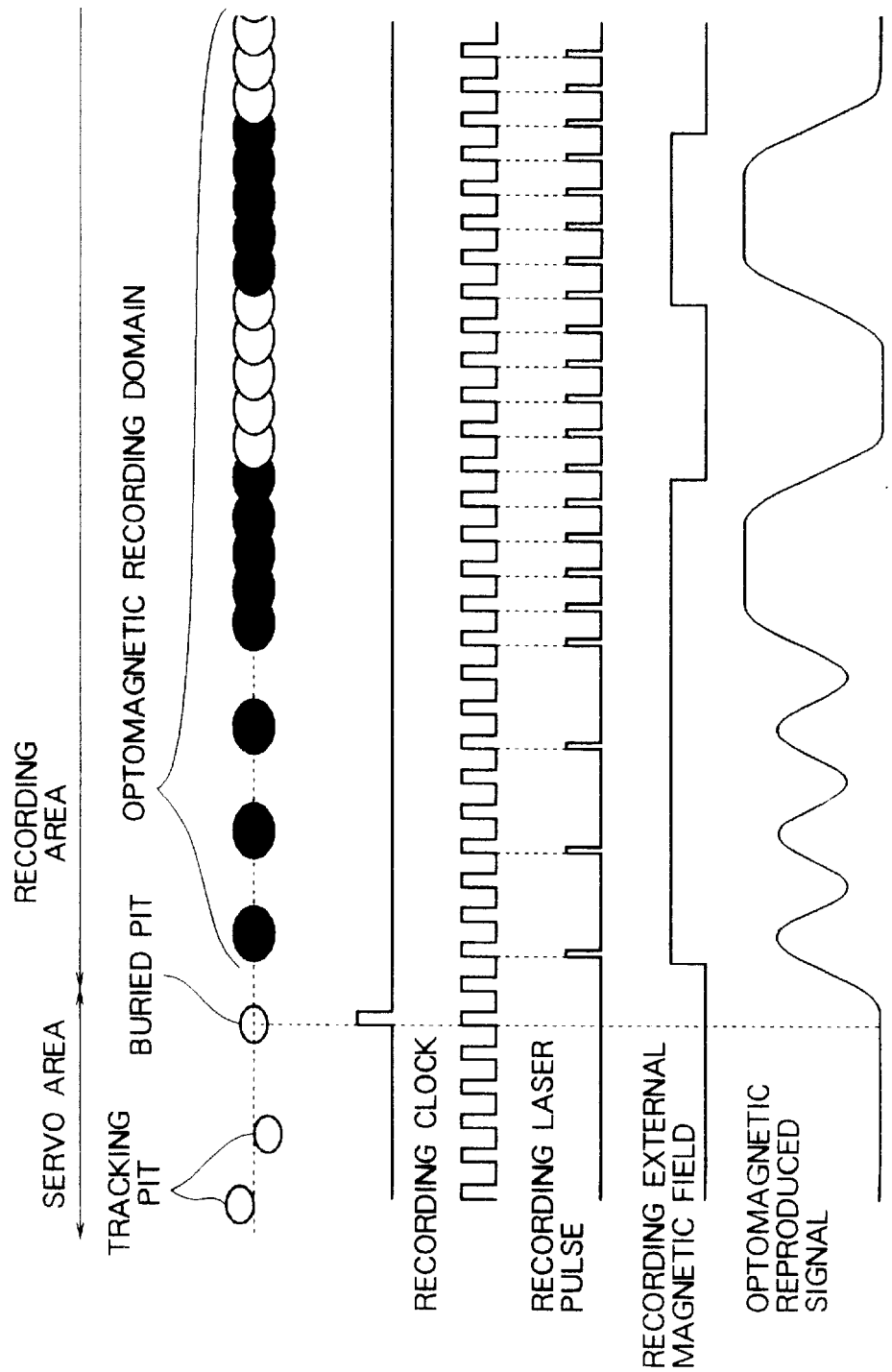
FIG. 117 is an explanatory diagram showing a second example of a test signal recording method which belongs to the thirty-first example of the multi-valued recording/reproducing system.
Figure 118:
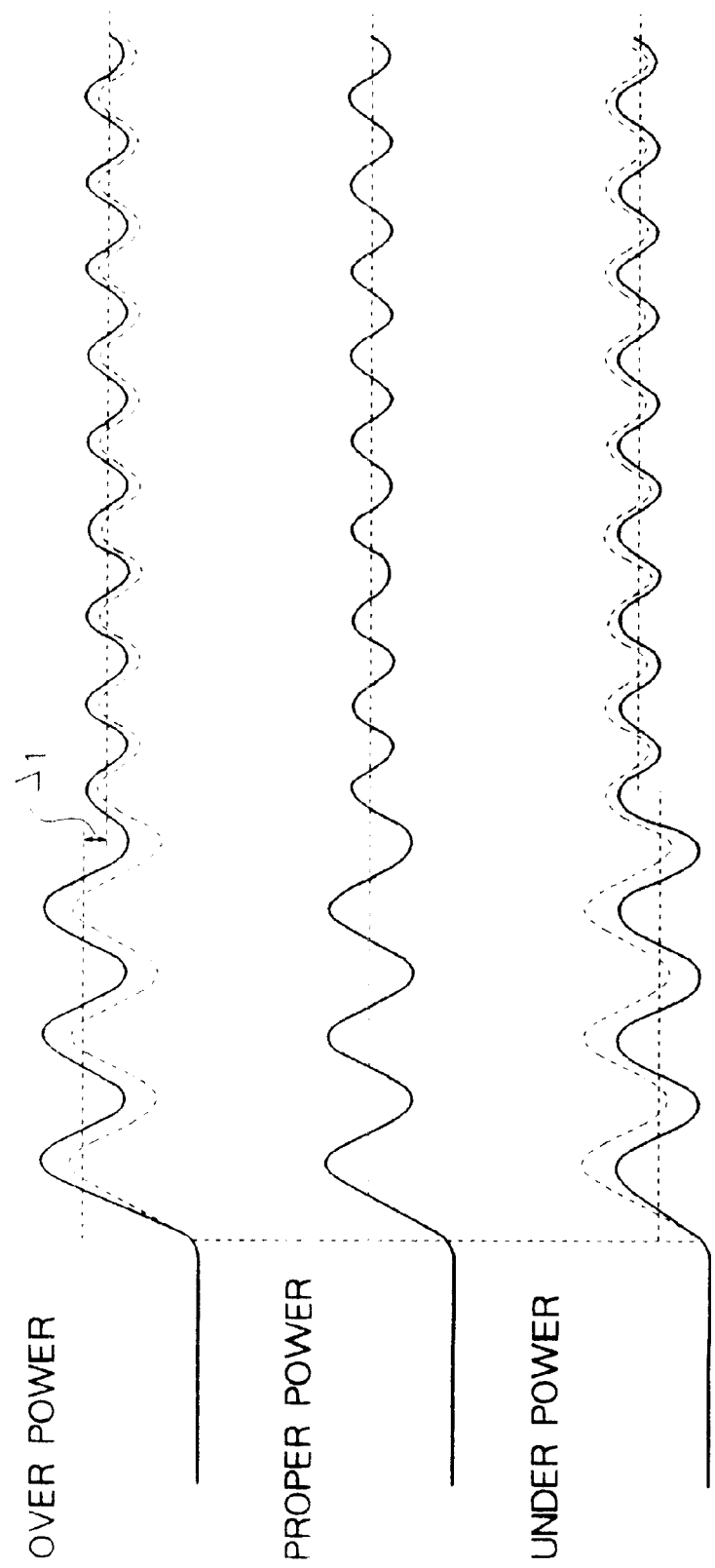
Figure 119:
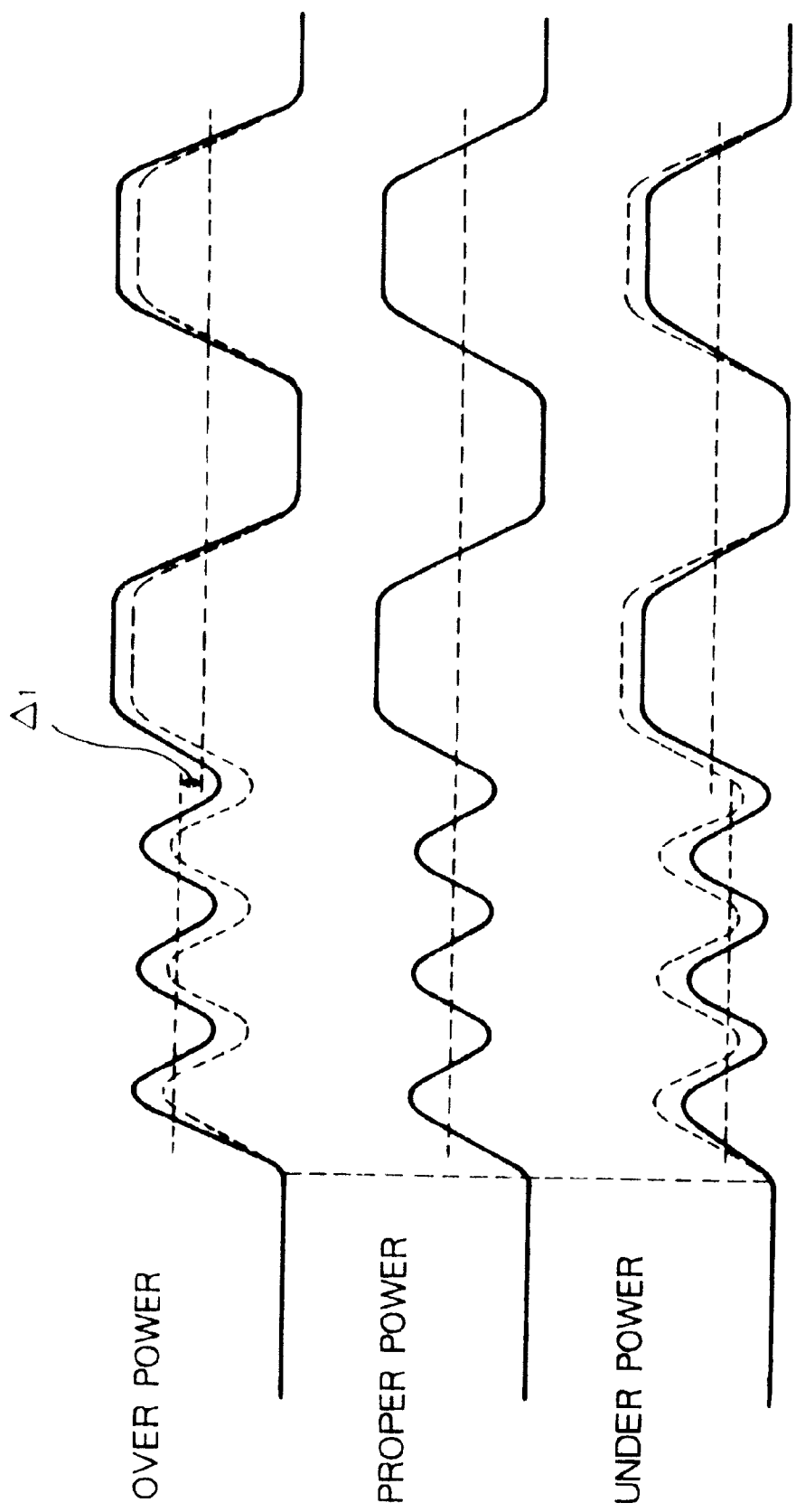

The recording of the test signal is made using two or more kinds of recording laser beam pulse periods between two levels of a multi-valued recording signal having the largest amplitude, as shown in FIG. 116 or FIG. 117. At least one of the two or more kinds of recording laser beam pulse periods is set to a period with which recording magnetic domains do not overlap each other, and at least one of the other kinds of recording laser beam pulse periods is set to a period with which recording magnetic domains overlap each other. The recording was made changing a recording laser power stepwise while applying a recording external magnetic field of a fixed intensity with the polarity thereof being changed over at such a timing shown in FIG. 116 or 117. FIG. 118 represents a reproduced signal waveform corresponding to the case FIG. 116. Also, FIG. 119 represents a reproduced signal waveform corresponding to the case of FIG. 117. In both the case of FIG. 118 and the case of FIG. 119, it is shown that when the recording laser power is changed, the average value of signal levels of a signal recorded at the period causing no overlapping of recording magnetic domains has a large change as compared with the average value of signal levels of a signal recorded at the period causing the overlapping of recording magnetic domains. A difference ($\Delta_1$) between the average values for the two periods is detected for all of the stepwise changed recording conditions. As the optimum recording condition is set a condition with which the value of $\Delta_1$ is most close to a reference value. In the case where the preset reference value is 0, there is insusceptible to influences of the variations of optomagnetic recording media and/or the DC offset or drift of the circuit. Therefore, it is desirable that the period causing no overlapping of recording magnetic domains is made approximately equal to an effective beam spot diameter in order that the reference value can be set to 0.

Figure 120:
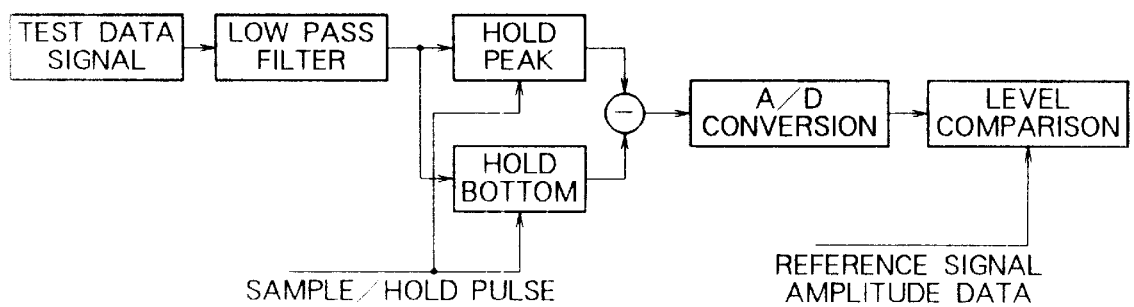

FIG. 120 shows an example of a block diagram of an optimum condition detecting circuit. A reproduced test signal is passed through a low-pass filter having a cut-off frequency which is sufficiently lower than the above-mentioned recording laser pulse period Thereby, the reproduced test signal gets the average value of reproduced signal levels for each recording laser pulse period. Then, it is possible to detect $\Delta_1$ by peak-holding the maximum and minimum values of the signal and producing a difference between the peak-held values.

Since the other is the same as the recording/reproducing method in the twenty-ninth example, the explanation thereof will be omitted in order to avoid the repetition.

[Thirty-Second Example Of Multi-Valued Recording Method]

A multi-valued recording method of the present example is characterized in that a recording signal including more values than the number of magnetic field regions for stable recording states of an optomagnetic recording medium for multi-valued recording is recorded on the optomagnetic recording medium for multi-valued recording. An optomagnetic recording medium capable of being used includes all the optomagnetic recording media according to the above-mentioned first to seventh examples of construction. Herein, explanation will be made in conjunction with the case where a 16-valued recording is performed using an optomagnetic recording medium for 4-valued recording (for example, the media of the fifth example of construction shown in FIGS. 23 to 27, - - - ).

First, the optomagnetic recording medium is mounted to a medium driver such as a turn table and optical head and a magnetic head are disposed on the transparent substrate of the optomagnetic recording medium and on the protection layer side thereof, respectively. The medium driver is activated to drive the optomagnetic recording medium and the optical and magnetic heads relative to each other at a predetermined linear velocity so that the optical head and the magnetic head are positioned on a predetermined track. Thereafter, the irradiation of the predetermined recording track therealong with a laser beam having a fixed intensity is made by the optical head while a magnetic field signal-modulated pulsewise by a desired recording signal is applied from the magnetic head, thereby effecting the signal recording.

Figure 121:
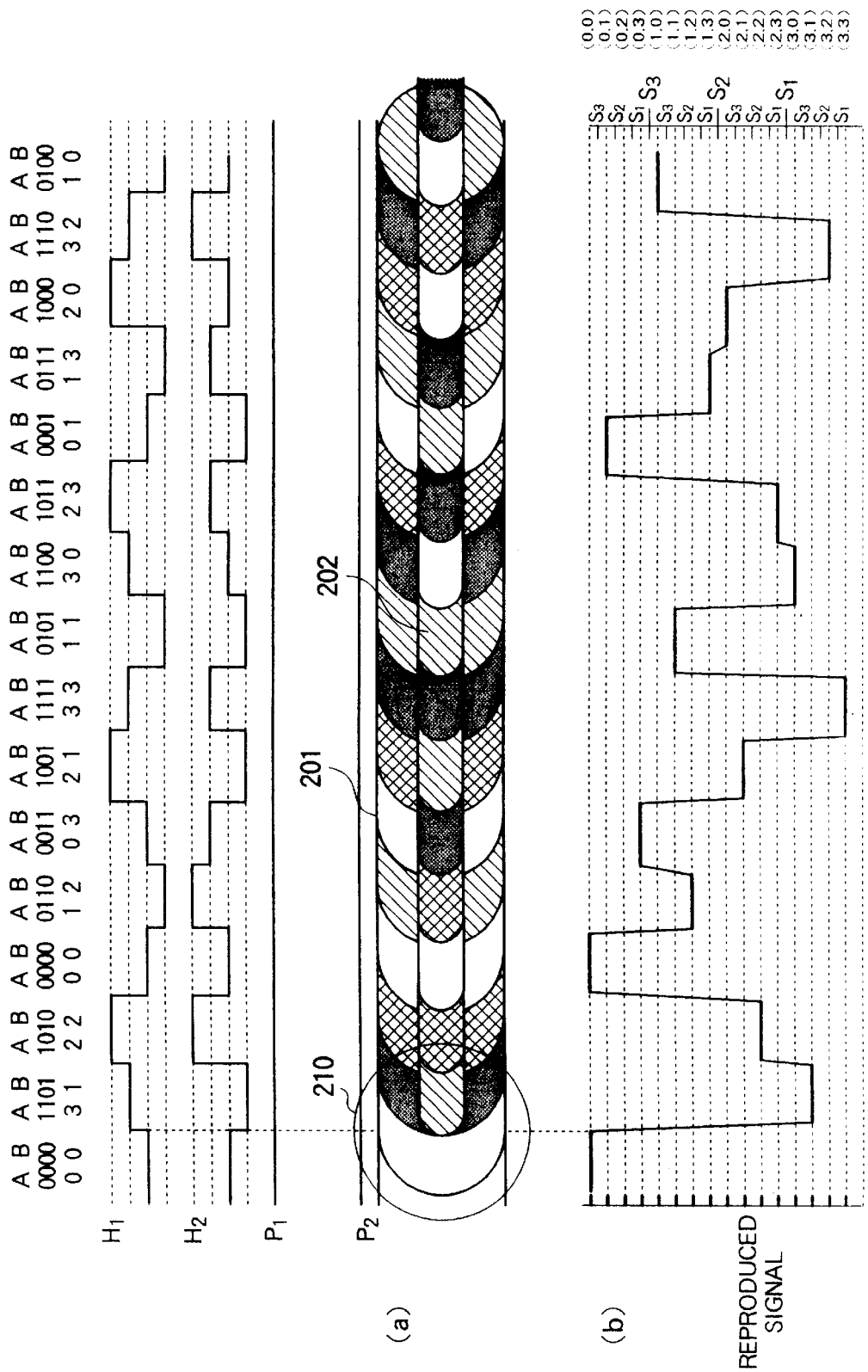

In this case, a 4-valued recording signal (0031220012032133113023011320321 0) is divided into a first signal string of (0320102313201231) and a second signal string of (0120231310313020) in such a manner that the 4-valued recording signal is converted into a signal string of (00), (31), (22), (00), (12), (03), (21), (33), (11), (30), (23), (01), (13), (20), (32) and (10) by partitioning the recording signal two by two from the head thereof and the first signal and the second signal of each set in this signal string are extracted separately, as shown in FIG. 121.

When the laser beam reaches the head position of the desired recording track, the intensity of the irradiation laser beam from the optical head is changed over into a recording level $P_1$ while a magnetic field $H_1$ signal-modulated pulsewise by the first signal string is applied from the magnetic head. Thereby, a first writing signal string 201 having a larger width is formed in the optomagnetic recording medium, as shown in FIG. 121(a).

Next, the laser beam is positioned again at the head position of the recording track subjected to the formation of the first writing signal string 201 and the intensity of the laser beam for irradiation from the optical head is changed over into a recording level $P_2$ ($P_1$>$P_2$) capable of rewriting the first writing signal string 201 while a magnetic field $H_2$ signal-modulated pulsewise by the second signal string is applied from the magnetic head. Thereby, a second writing signal string 202 having a width smaller than that of the first writing signal string 201 is formed in the central portion of the first writing signal string 201, as shown in FIG. 121(a). The rewriting of a part of the first writing signal string 201 into the second writing signal string 202 with the width of the second writing signal string 202 made smaller than the width of the first writing signal string 201 can also be performed by changing the size of a spot by use of two recording laser beams having different wavelengths.

The reproduction of the recording signal can be performed by irradiating the recording track there-along with a reproducing laser beam 210 having a spot diameter D which is larger than the width of the first writing signal string 201. Namely, when the recording track is irradiated therealong with the reproducing laser beam 210 having the spot diameter D larger than the width of the first writing signal string 201, a 16-valued recording signal can be detected, as shown in FIG. 121(b), by assigning "0'" to "15" to the respective states of total magnetization of a region where the signals of the first and second signal strings are both "3", a region where the signal of the first signal string is "3" and the signal of the second signal string is "2", a region where the signal of the first signal string is "3" and the signal of the second signal string is "1", a region where the signal of the first signal string is "3" and the signal of the second signal string is "0", a region where the signal of the first signal string is "2" and the signal of the second signal string is "3", a region where the signal of the first signal string is "2" and the signal of the second signal string is "2", a region where the signal of the first signal string is "2" and the signal of the second signal string is "1", a region where the signal of the first signal string is "2" and the signal of the second signal string is "0", a region where the signal of the first signal string is "1" and the signal of the second signal string is "3", a region where the signal of the first signal string is "1" and the signal of the second signal string is "2", a region where the signal of the first signal string is "1" and the signal of the second signal string is "1", a region where the signal of the first signal string is "1" and the signal of the second signal string is "0", a region where the signal of the first signal string is "0" and the signal of the second signal string is "3", a region where the signal of the first signal string is "0" and the signal of the second signal string is "2", a region where the signal of the first signal string is "0" and the signal of the second signal string is "1", and a region where the signals of the first and second signal strings are both "0", since the state of total magnetization in an area irradiated with the reproducing laser spot 210 is different among those regions.

Thus, the recording/reproducing system of the present example makes it possible to realize the 16-valued recording of a signal by use of the medium for 4-valued recording. Accordingly, there can be provided an optomagnetic recording medium which is low in cost and has a large amount of recording information.

It is of course that similar 16-valued recording can also be realized by using a light modulating system in lieu of the magnetic field modulating system.

[Thirty-Third Example Of Multi-Valued Recording Method]

A multi-valued recording method of the present example is characterized in that the 16-valued recording of a signal in an optomagnetic recording medium for 4-valued recording is performed on the basis of a light and magnetic field modulating system.

Figure 122:
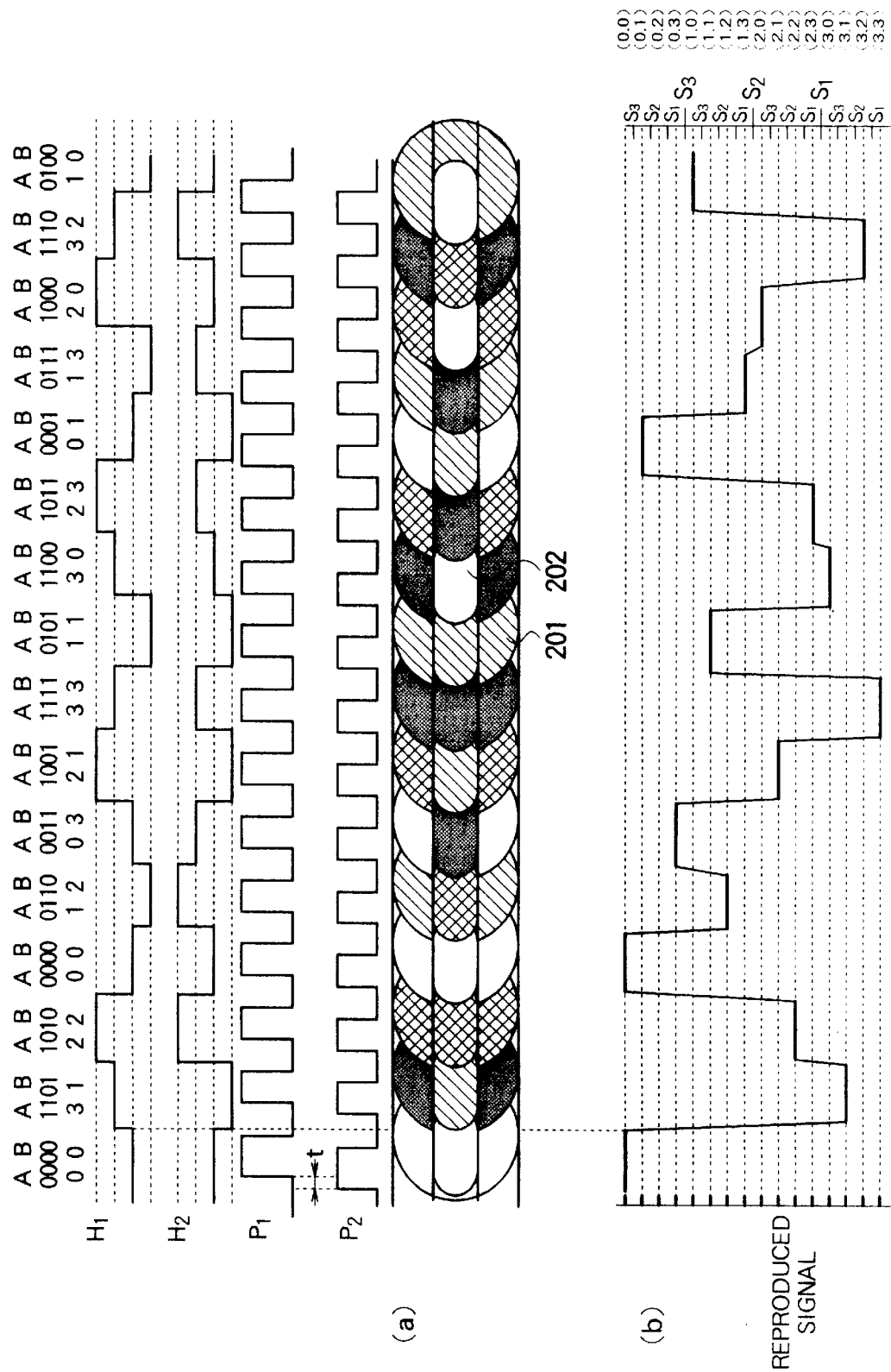

In a manner similar to that in the case where the thirty-second example, the optomagnetic recording medium is mounted to a medium driver such as a turn table and an optical head and a magnetic head are disposed on the transparent substrate of the optomagnetic recording medium and on the protection layer side thereof, respectively. The medium driver is activated to drive the optomagnetic recording medium and the optical and magnetic heads relative to each other at a predetermined linear velocity so that the optical head and the magnetic head are positioned on a predetermined track. Thereafter, as shown in FIG. 122, the irradiation of the predetermined recording track therealong with a laser beam intensity-modulated pulsewise is made by the optical head while a magnetic field signal-modulated pulsewise by a desired recording signal is applied from the magnetic head, thereby effecting the signal recording.

The recording signal is divided into a first signal string and a second signal string in a method similar to that in the case where the thirty-second example. When the laser beam reaches the head position of the desired recording track, the laser beam for irradiation from the optical head is changed over pulsewise while the intensity thereof is changed over into a recording level $P_1$. Also, a magnetic field $H_1$ signal-modulated pulsewise by the first signal string is applied from the magnetic head. Thereby, a first writing signal string 201 having a larger width is formed in the optomagnetic recording medium, as shown in FIG. 122(a). The irradiation with the pulse-like recording laser beam is made at a timing when the external magnetic field applied from the magnetic field reaches a target value.

Figure 123:
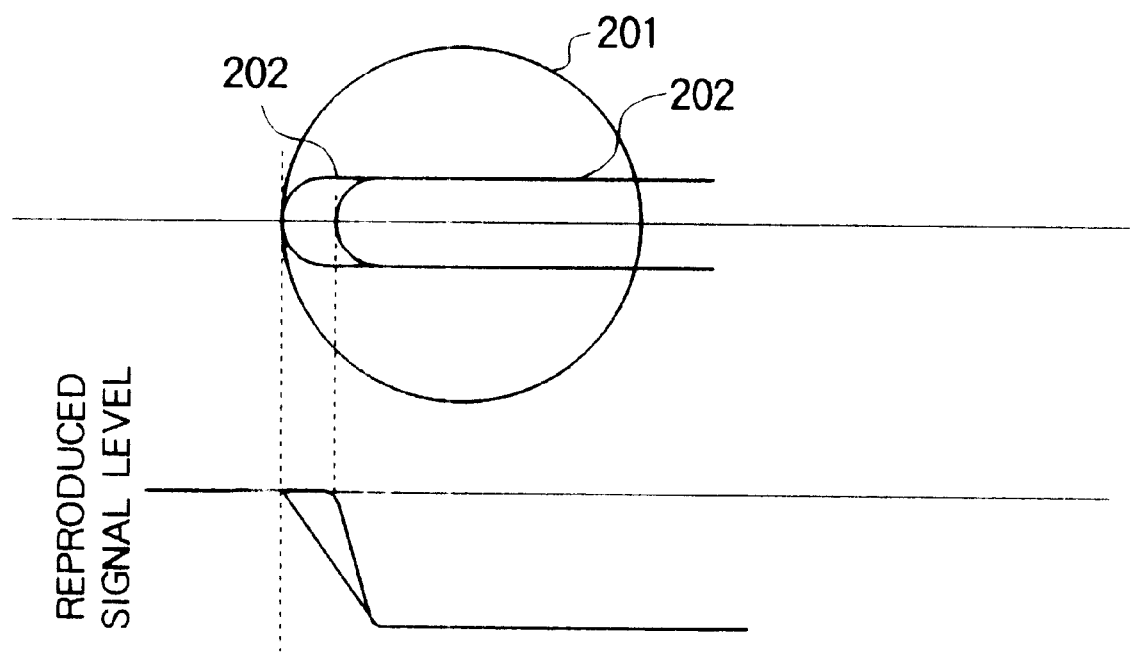

Next, the laser beam is positioned again at the head position of the recording track subjected to the formation of the first writing signal string 201 and the laser beam for irradiation from the optical head is changed over pulsewise while the intensity thereof is changed over into a recording level $P_2$ ($P_1$>$P_2$) capable of rewriting the first writing signal string 201. Also, a magnetic field $H_2$ signal-modulated pulsewise by the second signal string is applied from the magnetic head. Thereby, a second writing signal string 202 having a width smaller than that of the first writing signal string 201 is formed in the central portion of the first writing signal string 201 as shown in FIG. 122(a). In this case too, the irradiation with the pulse-like recording laser beam is made at a timing when the external magnetic field applied from the magnetic field reaches a target value In the recording/reproducing system of the present example, the timings of emission of the recording laser beam at the time of first recording and at the time of second recording are shifted from each other by a time t. With such a shift, the waveform of a reproduced signal detected from each region becomes more sharp as compared with the case where the timings of emission of the recording laser beam at the time of first recording and at the time of second recording coincide with each other (see FIG. 123). The time t is adjusted to a value with which the waveform of the reproduced signal becomes most sharp.

The reproduction of the recording signal can be performed by irradiating the recording track therealong with a reproducing laser beam 210 having a spot diameter D which is larger than the width of the first writing signal string 201. Namely, when the recording track is irradiated therealong with the reproducing laser beam 210 having the spot diameter D larger than the width of the first writing signal string 201, the 16-valued recording signal can be detected, as shown in FIG. 122(b), by assigning "0" to "15" to the respective states of total magnetization of a region where the signals of the first and second signal strings are both "3", a region where the signal of the first signal string is "3" and the signal of the second signal string is "2", a region where the signal of the first signal string is "3" and the signal of the second signal string is "1", a region where the signal of the first signal string is "3" and the signal of the second signal string is "0", a region where the signal of the first signal string is "2" and the signal of the second signal string is "3", a region where the signal of the first signal string is "2" and the signal of the second signal string is "2", a region where the signal of the first signal string is "2" and the signal of the second signal string is "1", a region where the signal of the first signal string is "2" and the signal of the second signal string is "0", a region where the signal of the first signal string is "1" and the signal of the second signal string is "3", a region where the signal of the first signal string is "1" and the signal of the second signal string is "2", a region where the signal of the first signal string is "1" and the signal of the second signal string is "1", a region where the signal of the first signal string is "1" and the signal of the second signal string is "0", a region where the signal of the first signal string is "0" and the signal of the second signal string is "3", a region where the signal of the first signal string is "0" and the signal of the second signal string is "2", a region where the signal of the first signal string is "0" and the signal of the second signal string is "1", and a region where the signals of the first and second signal strings are both "0", since the state of total magnetization in an area irradiated with the reproducing laser spot 210 is different among those regions.

The present example provides an effect similar to that in the above-mentioned thirty-first example. Further, since the irradiation with the pulse-like recording laser beam is made at the timing when the external magnetic field applied from the magnetic field reaches the target value, the edge of each magnetized domain becomes sharp and hence a margin for jitter can be made large. Also, since the timings of emission of the recording laser beam at the time of first recording and at the time of second recording are shifted, each region can provide a reproduced signal which is more sharp as compared with the case where the timings of emission of the recording laser beam at the time of first recording and at the time of second recording coincide with each other. With these effects, pit edge recording becomes possible.

If the recording is divided into three signal strings and these signal strings are overwritten on the same track, a 64-valued signal recording can be performed in accordance with a similar principle.

[Thirty-Fourth Example Of Multi-Valued Recording Method]

A multi-valued recording method of the present example is characterized in that the recording and reproduction of a signal are performed for an optomagnetic recording medium in which minute pre-pits are formed at minute intervals along a recording track.

The following may be considered as the construction and use of this optomagnetic recording medium.

(a) An optomagnetic recording layer is formed on a substrate including an information recording area having a group of pre-pits divided into data units and an optomagnetic signal is recorded in the pre-pit or between the pre-pits.

(b) A recording film capable of being subjected to multi-valued recording is laminated on the medium of the above item (a).

(c) The group of pre-pits in the item (a) are arranged regularly for each track. The arrangement of pre-pits in a radius direction may be such that they are aligned on a straight line or shifted by ½ period. Thereby, the quantization of crosstalk becomes possible.

(d) In the medium of the item (a), the composition and/or thickness of the film inside of the pre-pit and that outside thereof may be different.

(e) The pre-pit of the medium of the item (a) is formed with a size smaller than the diameter of a reproducing beam spot and a recording film capable of magnetic super-resolution is laminated on the medium.

(f) The above-mentioned various multi-valued recording methods are applied to the media of the items (a) to (e).

The improvement in recording density is one of technical subjects which are most important to an optomagnetic recording medium. If recording magnetic domains are miniaturized so that a signal is recorded closely in a track direction, the recording density can be improved. However, in the case where the recording magnetic domains are miniaturized, signals reproduced from the adjacent magnetic domains are liable to interfere with each other so that it becomes difficult to separate those signals from each other.

In the case where minute pre-pits are formed at minute intervals along a recording track, a reflected-beam signal from a portion including the pre-pit and a reflected-beam signal from a portion including no pre-pit, when the recording track is irradiated therealong with a reproducing laser beam, are different due to the diffraction and/or interference of beam. Therefore, the presence/absence of a pre-pit can be detected by detecting the reflected-beam signal (or so-called sum signal). On the other hand, an optomagnetic signal (or so-called difference signal) recorded in a magnetic film can be detected by detecting the direction of magnetization of a recorded magnetic domain irrespective of the presence/absence of a pre-pit. Accordingly, if the recording magnetic domains and the pre-pits are formed with a positional relation therebetween, it is possible to clarify the position of the recording magnetic domain even if the recording magnetic domain is miniaturized. As a result, the separation of signals becomes easy and hence the recording density can be improved.

Figure 124:
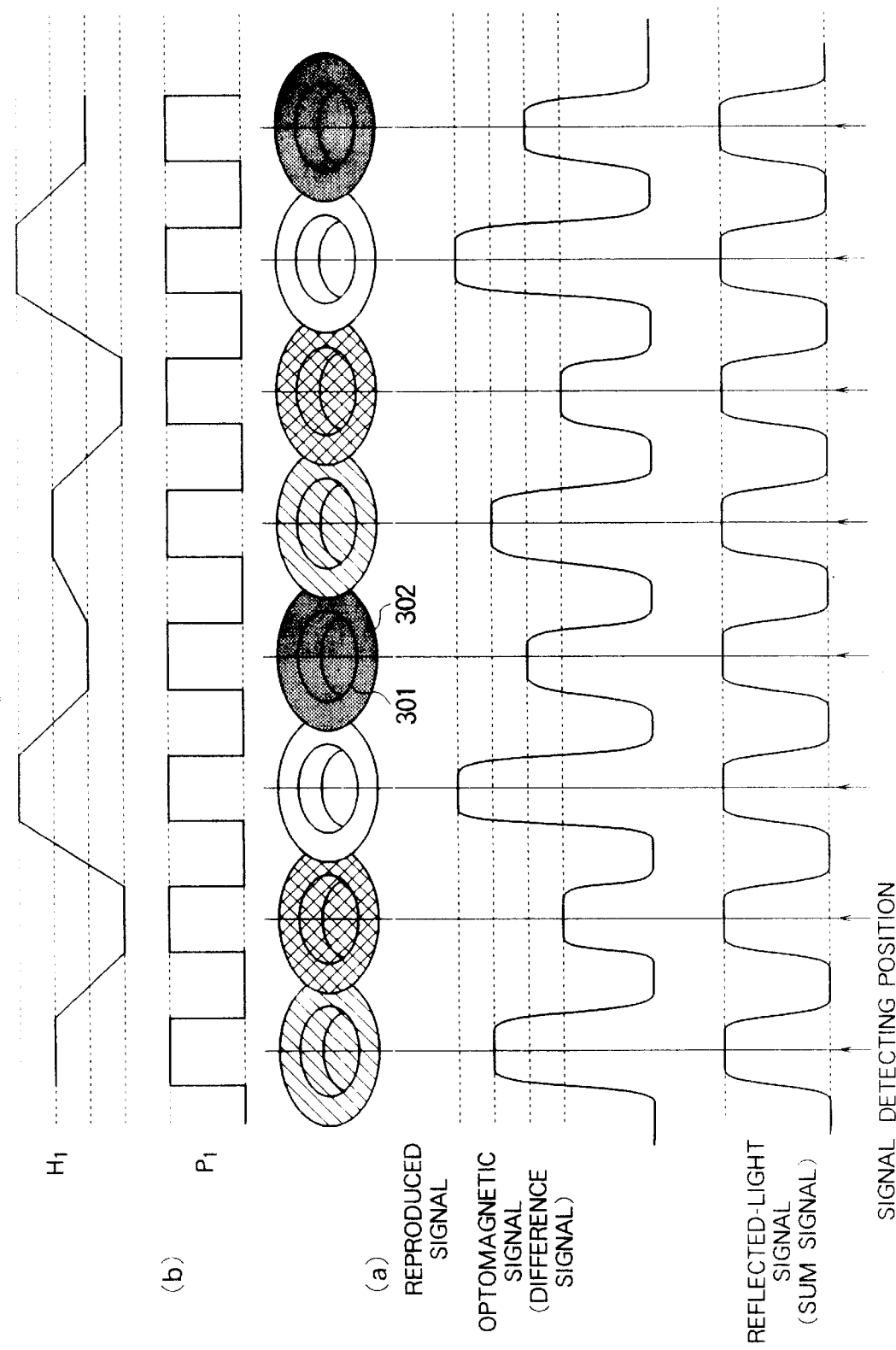

FIG. 124 shows the case where a recording magnetic domain 302 is formed on a pre-pit 301. In the case of the present example, the sum signal and the difference signal have a one-to-one correspondence.

Therefore, the recording magnetic domain 302 can be detected by detecting the peak of the sum signal.

Figure 125:
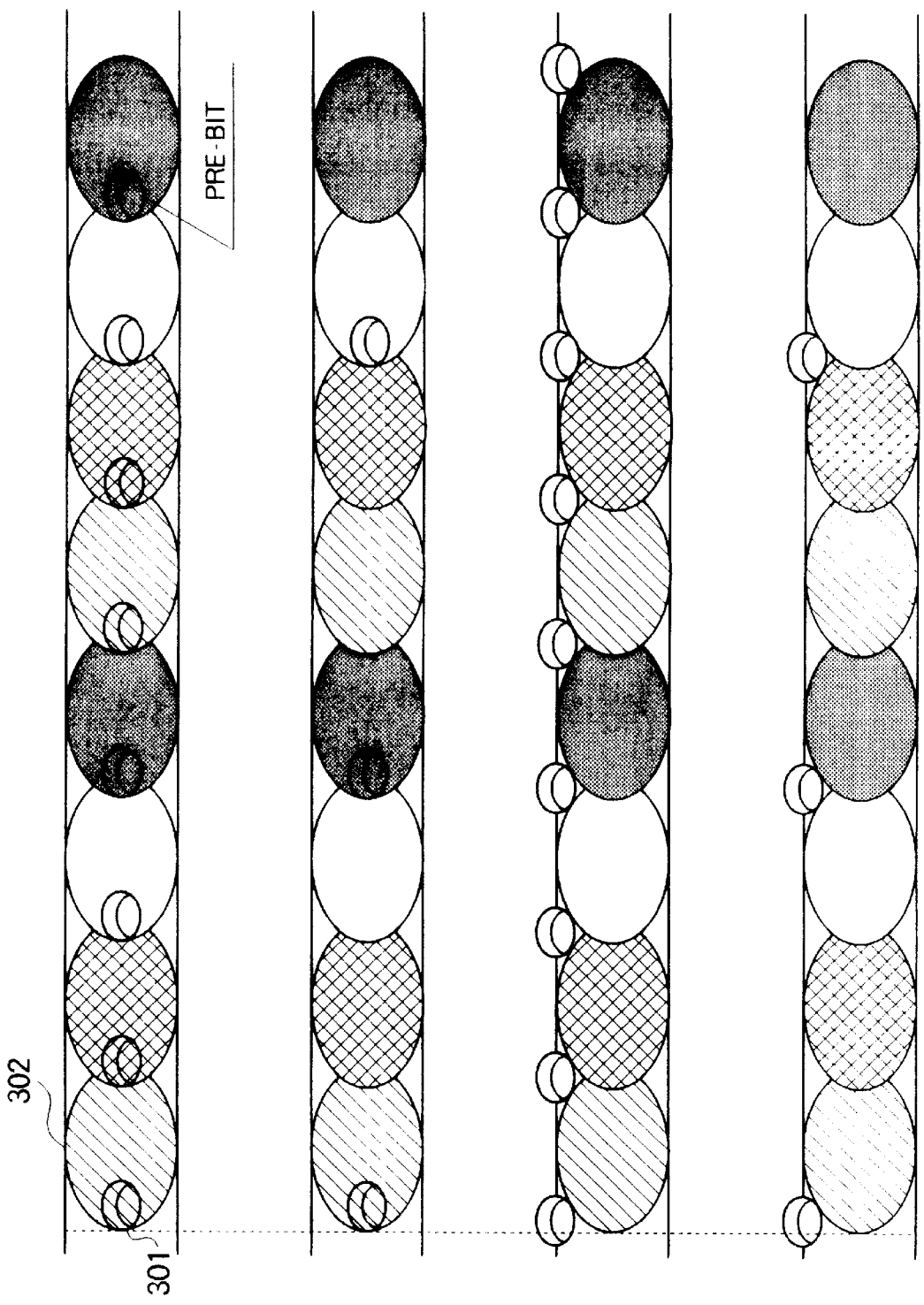

FIG. 125(a) shows the case where a recording magnetic domain 302 is formed such that the leading edge of the recording magnetic domain 302 overlaps a pre-pit 301. FIG. 125(b) shows the case where a plurality of (three in the present example) recording magnetic domains 302 are formed between adjacent pre-pits 301. FIG. 125(c) shows the case where the center of arrangement of pre-pits 301 and the center of arrangement of recording magnetic domains 302 are shifted from each other. FIG. 125(d) shows the case where the center of arrangement of pre-pits 301 and the center of arrangement of recording magnetic domains 302 are shifted from each other and a plurality of (three in the present example) recording magnetic domains 302 are formed between adjacent pre-pits 301.

Figure 126:
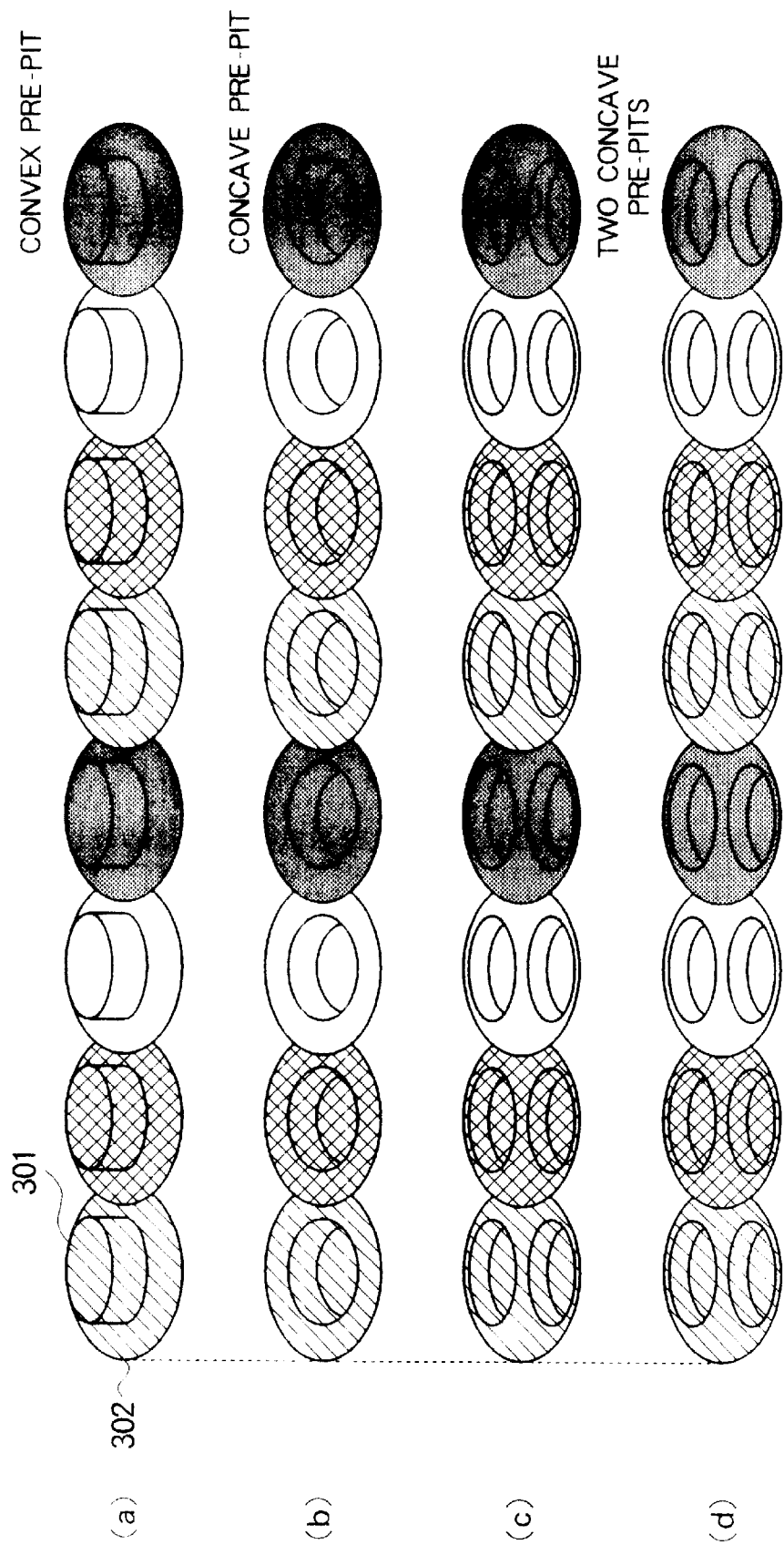

FIG. 126(a) shows the case where a pre-pit 301 is provided in a convex form. FIG. 126(b) shows the case where a pre-pit 301 is provided in an elliptic form. FIG. 126(c) shows the case where one recording magnetic domain 302 is formed on two convex pre-pits 301a and 301b. FIG. 126(d) shows the case where one recording magnetic domain 302 is formed on two concave pre-pits 301a and 301b.

Figure 127:
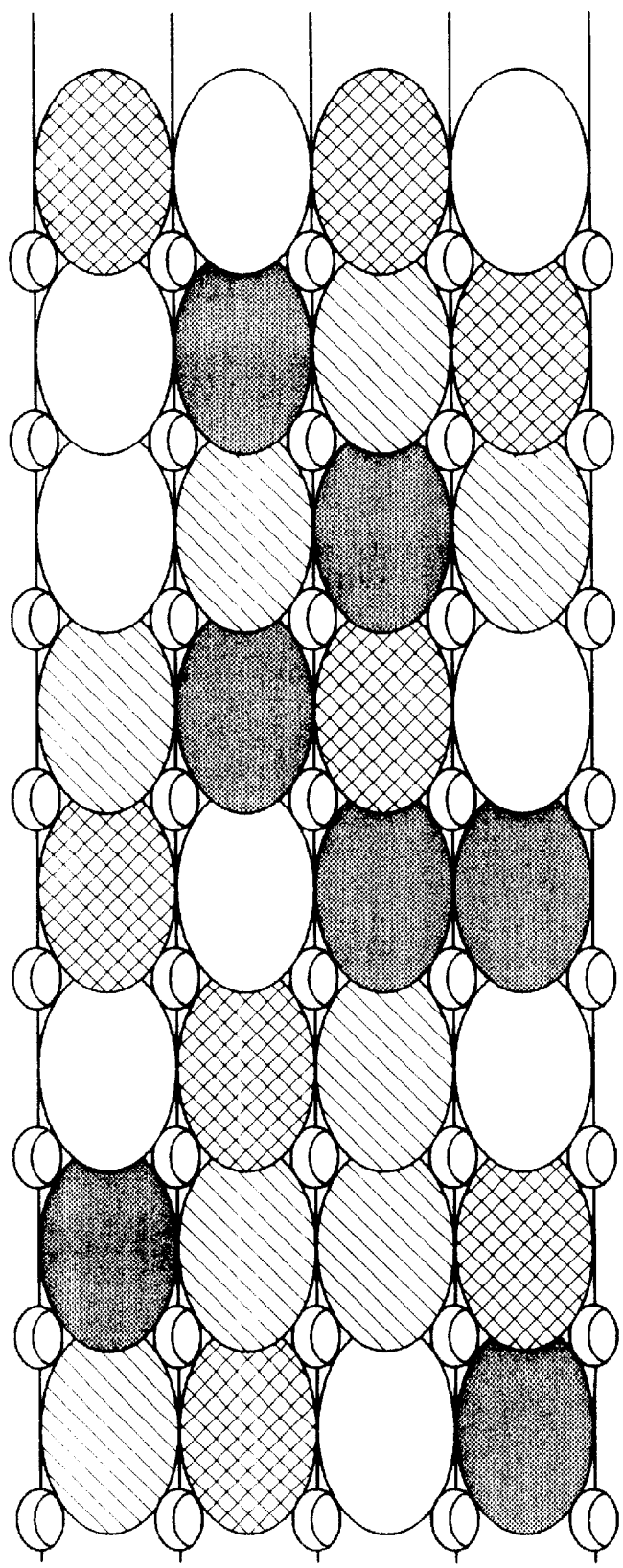

FIG. 127 shows the case where pre-pits 301 are formed with a regularity not only in a track direction but also in an inter-track direction. When the regularity is given to a positional relationship between pre-pits on adjacent tracks so that recording magnetic domains are formed using such pre-pits as a guide, the level of leakage of a recording signal from the adjacent track or the level of so-called crosstalk can be made into a level quantized by a recording pattern.

Figure 128:
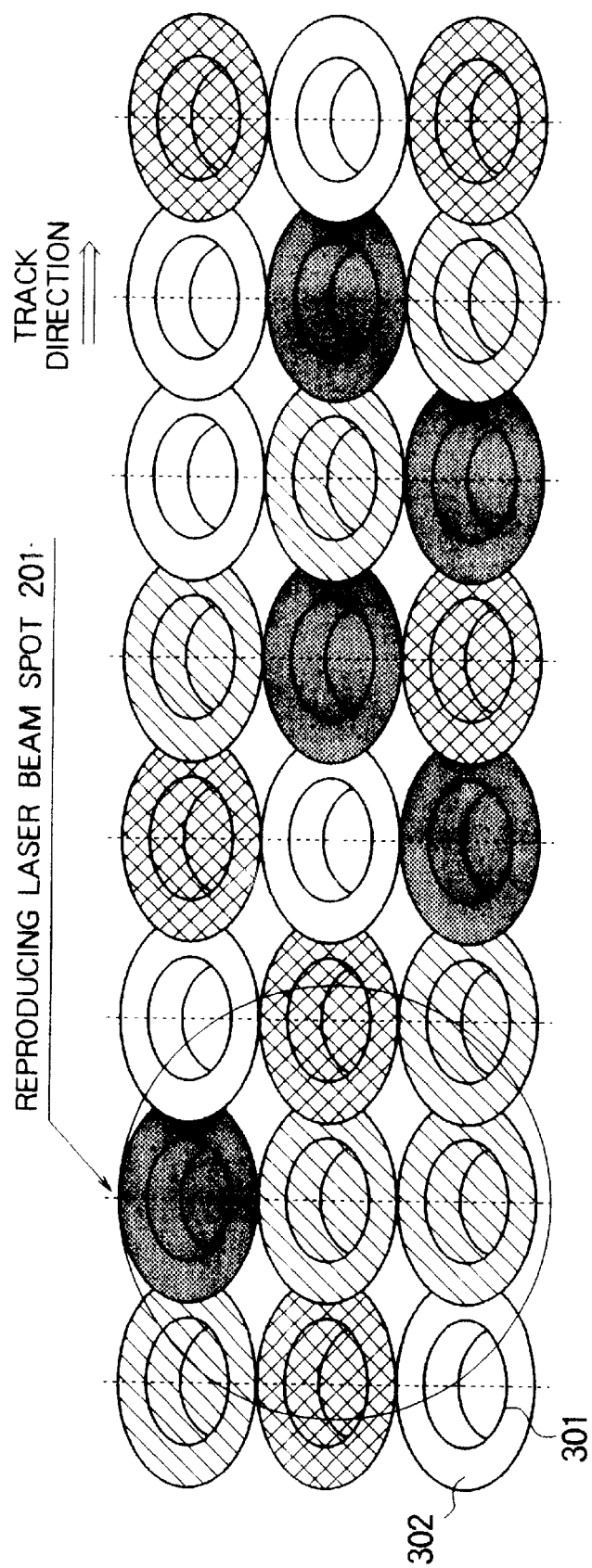

FIG. 128 shows a state in which a reproducing laser spot 210 is scanned so that the center of the reproducing laser spot 210 passes along a central track. With such a scan, a reproduced signal level is outputted as a multi-valued signal separated into six levels by the combination with the recording patterns of both side tracks. The original signal is reproduced cancelling leakage signals in accordance with a relationship between signals reproduced so that the center of the reproducing laser spot 210 passes along the center of each track. In this case, since the signal level is once reproduced as multi-valued record and it is separated into six steps, the cancellation of crosstalk is easy.

The recording/reproducing method in the present example is a recording/reproducing system in which a plurality of recording pits exist in a reproducing beam spot and a laser beam travelling direction or a cross-track direction and each level of a reproduced signal appearing in accordance with each combination of the recorded states of pits is in a decided multilevel. This system can be applied to the recording/reproducing of a signal using not only optomagnetic recording media for multi-valued recording but also ordinary optomagnetic recording media for 2-valued recording or magnetic super-resolution type of optomagnetic recording media.

Other multi-valued recording methods of the present invention will be enumerated in the following.

Figure 129:
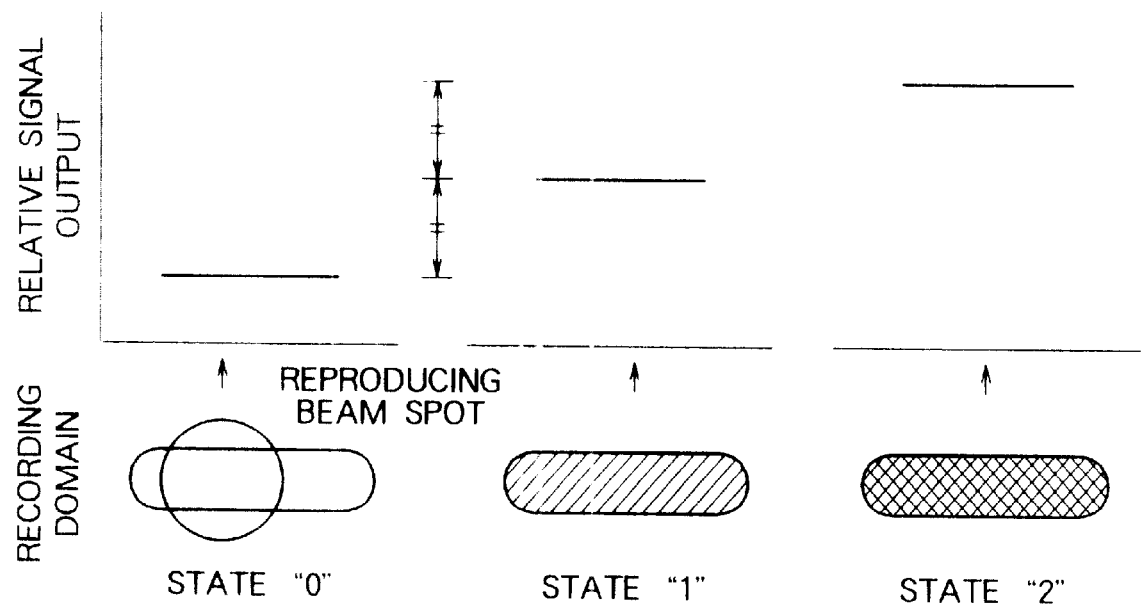

(1) Intervals between relative signal outputs corresponding to respective recording states are made equal to each other by adjusting the refraction factor or thickness of each film laminated on a transparent substrate, the Kerr rotation angle of a vertically magnetized film, or the like. For example, in the case of a 3-valued recording medium, the intervals between the respective levels of a recording signal corresponding to "0", "1" and "2" are made equal to each other, as shown in FIG. 129. As a result, S/N of a reproduce signal for the transition of each interval between the levels of a recording signal is equalized, thereby enhancing the signal efficiency totally. The present method is particularly effective in the case where the size of the minimum recording magnetic domain is relatively large as compared with the spot diameter of a reproducing beam, for example, in the case where the former is larger than ½ of the latter.

(2) In the case where the size of the minimum recording magnetic domain is smaller than the spot diameter of the reproducing beam, particularly, in the case where the recording is performed with the size of the minimum recording magnetic domain smaller than ½ of the spot diameter, a signal level from a minute magnetic domain generated by interference between waveforms and a signal level generated from a large magnetic domain for each recording state are made different from each other.

In the case where the size of the minimum recording magnetic domain is relatively small as compared with the spot diameter of the reproducing beam, for example, in the case where the former is smaller than ½ of the latter, the continuation of such magnetic domains results in that a signal output takes an intermediate value between two states due to interference between the waveforms of reproduced signals. For example, in the case where the minute recording magnetic domains of a state "0" and a state "2" having the same size are repeatedly recorded in a multi-valued recording medium of the present invention, a signal level in this case becomes the same as the level of a reproduced signal of a magnetic domain for a state "1" having a large size relative to the spot diameter of the reproducing beam, as shown in FIG. 130. Namely, it becomes impossible to make a distinction between both the signal levels.

Therefore, with the construction in which a signal level from a minute magnetic domain generated by interference between waveforms and a signal level generated from a large magnetic domain for each recording state are made different from each other, a multi-valued recording of higher order becomes possible by assigning respective signals to a state "0", a state "1", a state "2", a level between the states "0" and "1" generated by interference between waveforms, a level between the states "0" and "2" generated by interference between waveforms and a level between the states "1" and "2" generated by interference between waveforms, respectively.

The respective signal levels are set so that they do not coincide with each other. It is preferable that the signal levels are equidistant. A method for realizing this includes a method based on a medium and a method based on a recording system. An example of the method based on medium is a method, as shown in FIG. 131, in which the multiple-interference condition of each film is set so that a signal level generated from a large magnetic domain for each recording state is positioned at a signal level different from a signal level from a minute magnetic domain generated by interference between waveforms. An example of the method based on recording system is a method, as shown in FIG. 132, in which the area ratio of recording magnetic domains to each other is controlled so that a signal level generated from a large magnetic domain for each recording state is positioned at a signal level different from a signal level from a minute magnetic domain generated by interference between waveforms. More particularly, there can be employed a method in which when a medium is inserted into a recording/reproducing apparatus, the apparatus performs the trial recording with the area ratio of minute recording magnetic domains being changed and selects an area ratio with which signal levels from minute magnetic domains generated by interference between waveforms do not coincide with signal levels generated from large magnetic domains for the respective recording states and are preferably equidistant therefrom. Further, the method based on medium and the method based on recording system can be used in combination. According to this combined system, the adjustment of each signal level is more facilitated and it is possible to make the intervals between signal levels equidistant from each other. Also, it is possible to adjust the position of the signal level arbitrarily by controlling the area ratio of recording magnetic domains.

Next, explanation will be made of a signal recording method when the pit edge recording or a by-term mark edge recording is performed for a multi-valued recording medium.

FIGS. 133A, 133B and 133C show a mark edge recording method in which the edge portion of a recording magnetic domain (or mark edge) is caused to carry 3-valued information and a method for reproduction of a signal from a multi-valued recording medium for which the mark edge recording by the mark edge recording method is performed. As the optomagnetic recording medium is used an optomagnetic recording medium such as the optomagnetic recording medium of the first example of construction (as shown in FIGS. 9 to 12) in which the recording of 3-valued information into a magnetic layer is possible.

First, explanation will be made of the mark edge recording method for the optomagnetic recording medium. In order to record three-valued information "0", "1" and "2" into the optomagnetic recording medium, it is necessary to change over the state of magnetization of a magnetic layer (or the state of total magnetization for the states of magnetization possessed by magnetic layers in the case where there are a plurality of magnetic layers) three-stepwise. Provided that the three steps of magnetization states are A, B and C (whose magnitudes of magnetization satisfy A<B<C) and the recording of information is performed (1) with information of "0" being assigned to a portion in which the magnetization state A represented by white ground continues, a portion in which the change-over from the magnetization state B of oblique lines into the magnetization state A of white ground is made and a portion in which the change-over from the magnetization state C of cross lines into the magnetization state A of white ground is made, (2) with information of "1" being assigned to a portion in which the change-over from the magnetization state A of white ground into the magnetization state B of oblique lines is made, a portion in which the magnetization state B of oblique lines continues, a portion in which the change-over from the magnetization state C of cross lines into the magnetization state B of oblique lines is made, and (3) with information of "2"being assigned to a portion in which the change-over from the magnetization state A of white ground into the magnetization state C of cross lines is made, a portion in which the change-over from the magnetization state B of oblique lines into the magnetization state C of cross lines is made and a portion in which the magnetization state C of cross lines continues, as shown in FIG. 133B, the 3-valued information of, for example, (10202201210) can be recorded in a mark string shown in FIG. 133A.

Next, explanation will be made of a method for signal reproduction from the medium subjected to the mark edge recording of 3-valued information by the above method. When the mark string shown in FIG. 133A is irradiated therealong with a reproducing beam, a reproduced signal waveform represented below the mark string shown in FIG. 133A is obtained corresponding to the magnitude of magnetization of each recording magnetic domain. The reproduced signal waveform shown in FIG. 133A is sliced on the basis of two different slice levels $S_1$ and $S_2$ satisfying $a<S_2<b<S_1<c$ wherein a reproduced signal output detected from a recording magnetic domain for A is a, a reproduced signal output detected from a recording magnetic domain for B is b and a reproduced signal output detected from a recording magnetic domain for C is c. Thereby, the cross point of the slice level $S_1$ or $S_2$ and the reproduced signal output is detected. In the middle column of FIG. 133A, the presence/absence of a signal detected by each slice level $S_1$ or $S_2$ is indicated by symbol "○" or "-". The upper row of the middle column indicates the detection pattern of a signal detected by the slice level S1 and the lower row thereof indicates the detection pattern of a signal detected by the slice level S2. In this indication, symbol "○" represents the case where the cross point is detected and symbol "-" represents the case where the cross point is not detected.

It is apparent from FIG. 133A that the present example includes four kinds of combinations of the signal detected by the slice level $S_1$ and the signal detected by the slice level $S_2$ that is, the case where the signal detected by the slice level $S_1$ is "-" and the signal detected by the slice level $S_2$ is "○" (this combination will hereinafter be represented by "-, ○" and in a similar representation in the following, the signal detected by the slice level $S_1$ will be described at the front portion of the interior of "○" and the cross point of the slice level $S_2$ will be described at the rear portion thereof), the case of "○", "-", the case of "○, ○" and the case of "-, -".

Thus, the original 3-valued information (10202201210) can be reproduced, as shown at the lower column of FIG. 133A, by storing data preceding each signal detection portion by one and making assignment as shown in FIG. 133C, that is, (1) assigning "2" of reproduced data to the case where the one-preceding data is "○, ○" and the detected signal is "-, -" ("x" in FIG. 133C represents the case where no cross point is detected), the case where the one-preceding data is "-, ○" and the detected signal is "○, -" and the case where the one-preceding data is "-, -" and the detected signal is "○, ○", (2) assigning "1" of reproduced data to the case where the one-preceding data is "○, ○" and the detected signal is "○, -", the case where the one-preceding data is "-, ○, ○" and the detected signal is "-, -" and the case where the one-preceding data is "-, -" and the detected signal is "-, ○" and (3) assigning "0" of reproduced data to the case where the one-preceding data is "○, ○" and the detected signal is "○, ○", the case where the one-preceding data is "-, ○" and the detected signal is "-, ○" and the case where the one-preceding data is "-, -" and the detected signal is "-, -".

The explanation of FIG. 133 is made of the mark edge recording/reproducing method taken as an example in conjunction with the case where the optomagnetic recording medium for 3-valued recording is used. However, even in the case where there is used an optomagnetic recording medium for 2-valued recording or an optomagnetic recording medium for 4 or more-valued recording, the mark edge recording/reproduction of information can be performed in a manner similar to that mentioned above.

In the example shown in FIG. 133, the recording of information is performed with the information of "0" being assigned to the portion in which the magnetization state A of white ground continues, the portion in which the change-over from the magnetization state B of oblique lines into the magnetization state A of white ground is made and the portion in which the change-over from the magnetization state C of cross lines into the magnetization state A of white ground is made, with the information of "1" being assigned to the portion in which the change-over from the magnetization state A of white ground into the magnetization state B of oblique lines is made, the portion in which the magnetization state B of oblique lines continues, the portion in which the change-over from the magnetization state C of cross lines into the magnetization state B of oblique lines is made, and with the information of "2" being assigned to the portion in which the change-over from the magnetization state A of white ground into the magnetization state C of cross lines is made, the portion in which the change-over from the magnetization state B of oblique lines into the magnetization state C of cross lines is made and the portion in which the magnetization state C of cross lines continues. However, the assignment of any specified information to any specified change in magnetization state is not limited the present embodiment but can be changed properly, as required.

In the following, there will be shown the examples of construction of a magnetic head device which is applicable to the multi-valued recording of an optomagnetic recording medium.

[First Example Of Construction Of Magnetic Head Device]

A magnetic head device of the present example is characterized in that two windings are provided to one magnetic circuit, as shown in FIG. 134, so that the two windings can be driven independently from each other. This magnetic head device is disposed on the protection film side of an optomagnetic recording medium.

The magnetic head device of the present example can be applied to the first example, the third to eighth examples, the eighteenth example, the twenty-first example and the twenty-second example of construction of the multi-valued recording method. Namely, since a multi-valued external magnetic field can be applied to the optomagnetic recording medium in such a manner that magnetic head driving circuits 1 and 2 for applying currents to the two windings are independently driven in synchronism with a recording clock signal when those multi-valued recording methods are performed, the irradiation with optical pulses synchronous with the recording clock signal at the same time as the application of the multi-valued external magnetic field makes it possible to effect the multi-valued recording of a signal for a portion with the optical pulse.

Also, the magnetic head device of the present example can be applied to the tenth example, the eleventh example, the thirteenth example, the fifteenth to seventeenth examples, the nineteenth example and the twentieth example of the multi-valued recording method. Namely, a magnetic field of a fixed period offset from the magnetic field of zero can be applied to the optomagnetic recording medium by forming a resonance circuit by one of the two windings and its magnetic head driving circuit-to generate a magnetic field of a fixed frequency synchronous with the recording clock signal and applying a fixed current to the other winding to generate a fixed bias magnetic field.

Further, the magnetic head device of the present example can be applied to the ninth example and the fourteenth example of the multi-valued recording method. Namely, a magnetic field of a fixed period having an changing intensity can be applied to the optomagnetic recording medium by forming a resonance circuit by one of the two windings and its magnetic head driving circuit to generate a magnetic field of a fixed frequency synchronous with the recording clock signal and driving the other winding in synchronism with the recording clock signal.

Though the above example of construction is explained in conjunction with the case where the number of windings is 2, a similar construction is possible even in the case where the number of windings is 3 or more than that.

[Second Example Of Construction Of Magnetic Head Device]

A magnetic head device of the present example is characterized in that two magnetic heads capable of being independently driven are provided in proximity to each other, as shown in FIG. 135. This magnetic head device too is disposed on the protection film side of an optomagnetic recording medium.

The magnetic head device of the present example can be applied to the first example, the third to eighth examples, the eighteenth example, the twenty-first example and the twenty-second example of construction of the multi-valued recording method. Namely, since a multi-valued external magnetic field can be applied to the optomagnetic recording medium by driving a magnetic head 1 and a magnetic head 2 independently from each other in synchronism with a recording clock signal when those multi-valued recording methods are performed, the irradiation with optical pulses synchronous with the recording clock signal at the same time as the application of the multi-valued external magnetic field makes it possible to effect the multi-valued recording of a signal for a portion with the optical pulse.

Also, the magnetic head device of the present example can be applied to the tenth example, the eleventh example, the thirteenth example, the fifteenth to seventeenth examples, the nineteenth example and the twentieth example of the multi-valued recording method. Namely, a magnetic field of a fixed period offset from the magnetic field of zero can be applied to the optomagnetic recording medium by forming a resonance circuit by one of the two magnetic heads and its magnetic head driving circuit to generate a magnetic field of a fixed frequency synchronous with the recording clock signal and applying a fixed current to the other magnetic head to generate a fixed bias magnetic field.

Further, the magnetic head device of the present example can be applied to the ninth example and the fourteenth example of the multi-valued recording method. Namely, a magnetic field of a fixed period having an changing intensity can be applied to the optomagnetic recording medium by forming a resonance circuit by one of the two magnetic head and its magnetic head driving circuit to generate a magnetic field of a fixed frequency synchronous with the recording clock signal and driving the other magnetic head in synchronism with the recording clock signal.

[Third Example Of Construction Of Magnetic Head Device]

A magnetic head device of the present example is characterized in that two magnetic heads capable of being independently driven are provided in proximity to each other and a permanent magnet for application of a bias magnetic field is disposed in proximity to the two magnetic heads, as shown in FIG. 136. This magnetic head device too is disposed on the protection film side of an optomagnetic recording medium.

The magnetic head device of the present example can be applied to the first example, the third to eighth examples, the eighteenth example, the twenty-first example and the twenty-second example of construction of the multi-valued recording method. Namely, a multi-valued external magnetic field can be applied to the optomagnetic recording medium by driving a magnetic head 1 and a magnetic head 2 independently from each other in synchronism with a recording clock signal when those multi-valued recording methods are performed. Also, a fixed bias magnetic field can be applied to the optomagnetic recording medium by a permanent magnet. Accordingly, by making the irradiation with optical pulses synchronous with the recording clock signal at the same time as the application of the magnetic field, it is possible to effect the multi-valued recording of a signal for a portion with the optical pulse.

Also, the magnetic head device of the present example can be applied to the tenth example, the eleventh example, the thirteenth example, the fifteenth to seventeenth examples, the nineteenth example and the twentieth example of the multi-valued recording method. Namely, a magnetic field of a fixed period offset from the magnetic field of zero can be applied to the optomagnetic recording medium by forming a resonance circuit by the magnetic heads and the magnetic head driving circuits to generate a magnetic field of a fixed frequency synchronous with the recording clock signal and applying a fixed bias magnetic field by the permanent magnet.

Further, the magnetic head device of the present example can be applied to the ninth example and the fourteenth example of the multi-valued recording method. Namely, a magnetic field of a fixed period having an changing intensity can be applied to the optomagnetic recording medium by forming a resonance circuit by one of the two magnetic head and its magnetic head driving circuit to generate a magnetic field of a fixed frequency synchronous with the recording clock signal and driving the other magnetic head in synchronism with the recording clock signal. In this case, since a fixed bias magnetic field is applied by the permanent magnet, the magnetic field of the fixed period offset from the magnetic field of zero can be applied to the optomagnetic recording medium.

Since the magnetic head of the present example is provided with the permanent magnet for application of a bias magnetic field, it is not necessary to apply a DC current to the magnetic head. Accordingly, it is possible to reduce a power consumption and to increase the signal transmission rate.

[Fourth Example Of Construction Of Magnetic Head Device]

A magnetic head device of the present example is characterized in that two magnetic heads are provided in proximity to each other and on the protection film side of an optomagnetic recording medium and a leakage magnetic field from a focusing lens actuator is used as a bias magnetic field, as shown in FIG. 137. Since the other is the same as the magnetic head device according to the third example of construction, the explanation thereof will be omitted.

[Fifth Example Of Construction Of Magnetic Head Device]

A magnetic head device of the present example is characterized in that one magnetic head and a permanent magnet for application of a bias magnetic field are provided in proximity to each other and on the protection film side of an optomagnetic recording medium, as shown in FIG. 138.

[Sixth Example Of Construction Of Magnetic Head Device]

A magnetic head device of the present example is characterized in that one magnetic head is provided on the protection film side of an optomagnetic recording medium and a leakage magnetic field from a focusing lens actuator is used as a bias magnetic field, as shown in FIG. 139.

[Seventh Example Of Construction Of Magnetic Head Device]

A magnetic head device of the present example is characterized in that two magnetic heads are provided in proximity to each other and an electromagnetic coil for application of a bias magnetic field is disposed in proximity to the two magnetic heads, as shown in FIG. 140. The magnetic head device of the present example too is disposed on the protection film side of an optomagnetic recording medium.

[Eighth Example Of Construction Of Magnetic Head Device]

A magnetic head device of the present example is characterized in that two magnetic heads are provided in proximity to each other and on the protection film side of an optomagnetic recording medium and an electromagnetic coil for application of a bias magnetic field is disposed around a focusing lens actuator, as shown in FIG. 141. The magnetic head device of the present example too is disposed on the protection film side of an optomagnetic recording medium.

The examples disclosed in the foregoing embodiments are only specified examples of embodiments of the present invention. Various signal recordings can be performed by combining any medium according to the present invention and any recording/reproducing system and recording/reproducing apparatus. Particularly, the magnetic head device is not limited to the disclosure in the above examples of construction but can be used in a form in which the number of windings of a magnetic head, the quantity and arrangement of magnetic heads, the quantity and arrangement of permanent magnets or electromagnetic coils as bias magnetic field applying means, or the like is properly changed.

From the above, the combination of any medium and any recording/reproducing method enumerated in the present specification is possible.

Possibility Of Industrial Utilization

As explained above, the present invention realizes a higher-density signal recording with a simpler laminated structure of films. Also, in an optomagnetic recording medium of the present invention, each recording state is very stable for a change in external magnetic field and it is not necessary to delicately match the magnetic characteristic of each magnetic layer and the intensity of a laser beam and the intensity of an external magnetic field at the time of recording/reproduction. Therefore, it is possible to structure an optomagnetic recording/reproducing system which is excellent in stability, mass-producibility and practicability.

What is claimed is:

1. A recording/reproducing method for an optomagnetic recording medium, wherein an optical head and a magnetic head are driven relative to the optomagnetic recording medium so that an external magnetic field having an applied magnetic field intensity signal-modulated multi-stepwise in accordance with a recording signal is applied from said magnetic head while a recording track of said optomagnetic recording medium is irradiated therealong with a laser beam from said optical head continuously, periodically or pulsewise, whereby an at least 3-valued signal is recorded in said magnetic layers;

wherein the optomagnetic recording medium comprises at least two magnetic layers, which are (i) laminated directly together or (ii) laminated together through a non-magnetic layer, each of said magnetic layers being formed by an optomagnetic recording film, wherein magnetization of each of said magnetic layers directs in a certain direction upon recording in a magnetic field region under applied magnetic field to said magnetic layers, said magnetic field region defines amplitude and direction of the magnetic field, and said magnetic field region of each of said magnetic layers differs.

2. The recording/reproducing method for an optomagnetic recording medium according to claim 1, whereby a magnetic domain having a domain length not larger than one half of the spot diameter of said laser beam and a magnetic domain having a domain length not smaller than one half of the spot diameter of said laser beam are formed in a coexisting manner, whereby an at least 5-valued signal is recorded in said magnetic layers.

3. The recording/reproducing method for an optomagnetic recording medium according to claim 1, whereby an at least 5-valued signal is recorded in said magnetic layers and said magnetic layer consists of at least four layers.

4. A recording/reproducing method for an optomagnetic recording medium, wherein an optical head and a magnetic head are driven relative to the optomagnetic recording medium so that an external magnetic field is applied from said magnetic head at a fixed frequency while a recording track of said optomagnetic recording medium is irradiated therealong with a laser beam from said optical head having a laser intensity signal-modulated at least three-stepwise in accordance with a recording signal, whereby an at least 3-valued signal is recorded on said optomagnetic recording medium;

wherein the optomagnetic recording medium comprises at least two magnetic layers, which are (i) laminated directly together or (ii) laminated together through a non-magnetic layer, each of said magnetic layers being formed by an optomagnetic recording film, wherein magnetization of each of said magnetic layers directs in a certain direction upon recording in a magnetic field region under applied magnetic field to said magnetic layers, said magnetic field region defines amplitude and direction of the magnetic field, and said magnetic field region of each of said magnetic layers differs.

5. The recording/reproducing method for an optomagnetic recording medium according to claim 4, wherein the laser intensity signal-modulated at least five-stepwise in accordance with a recording signal, whereby an at least 5-valued signal is recorded on said optomagnetic recording medium, and wherein the magnetic layer consists of at least four layers.

6. An optomagnetic recording medium for direct overwriting of information onto prerecorded information without erasing the prerecorded information, comprising at least two magnetic layers, which are (i) laminated directly together or (ii) laminated together through a non-magnetic layer, each of said magnetic layers being formed by an optomagnetic recording film, wherein magnetization of each of said magnetic layers directs in a certain direction upon recording in a magnetic field region under applied magnetic field to said magnetic layers, said magnetic field region defines amplitude and direction of the magnetic field, and said magnetic field region of each of said magnetic layers differs, wherein said magnetic layer consists of two magnetic layers for 4-valued recording by combination of two magnetized states.

7. An optomagnetic recording medium for direct overwriting of information onto prerecorded information without erasing the prerecorded information, comprising at least two magnetic layers, which are (i) laminated directly together or (ii) laminated together through a non-magnetic layer, each of said magnetic layers being formed by an optomagnetic recording film, wherein magnetization of each of said magnetic layers directs in a certain direction upon recording in a magnetic field region under applied magnetic field to said magnetic layers, said magnetic field region defines amplitude and direction of the magnetic field, and said magnetic field region of each of said magnetic layers differs, wherein said magnetic layer consists of at least four layers and a magnetization state is a 5-value combination.

* * * * *